(12) United States Patent
Lee et al.

(10) Patent No.: US 11,677,707 B2
(45) Date of Patent: Jun. 13, 2023

(54) DATA PROCESSING TERMINALS, ICON BADGES, AND METHODS OF MAKING AND USING THE SAME

(71) Applicants: Jae kyu Lee, Siheung (KR); Youngtack Shim, Seoul (KR); Jae lark Jung, Goyang (KR)

(72) Inventors: Jae kyu Lee, Siheung (KR); Youngtack Shim, Seoul (KR); Jae lark Jung, Goyang (KR)

( * ) Notice: Subject to any disclaimer, the term of this patent is extended or adjusted under 35 U.S.C. 154(b) by 0 days.

(21) Appl. No.: 17/382,170

(22) Filed: Jul. 21, 2021

(65) Prior Publication Data

US 2021/0352035 A1 Nov. 11, 2021

Related U.S. Application Data

(63) Continuation of application No. 16/678,585, filed on Nov. 8, 2019, now Pat. No. 11,108,722.

(30) Foreign Application Priority Data

Nov. 26, 2018 (KR) .......................... 10-2018-0147249

(51) Int. Cl.
*H04L 12/58* (2006.01)
*G06F 3/0482* (2013.01)
(Continued)

(52) U.S. Cl.
CPC .......... *H04L 51/224* (2022.05); *G06F 3/0482* (2013.01); *G06F 3/04817* (2013.01); *H04L 51/216* (2022.05)

(58) Field of Classification Search
CPC ......... H04L 51/24; H04L 51/16; H04L 51/22; H04L 12/58; H04L 51/10; H04L 51/224;
(Continued)

(56) References Cited

U.S. PATENT DOCUMENTS

2009/0305732 A1* 12/2009 Marcellino ............. H04L 67/60
455/466
2013/0013716 A1* 1/2013 Buchheit ................ G06Q 10/10
709/206
(Continued)

FOREIGN PATENT DOCUMENTS

JP 2003-131778 A 5/2003
JP 2005-346493 A 12/2005
(Continued)

OTHER PUBLICATIONS

"Introduction to LINE: Smartphone, even beginners can definitely understand." Standers Corp. (Sep. 10, 2017), pp. 64, 65, 68, and 69.
(Continued)

*Primary Examiner* — Tonia L Dollinger
*Assistant Examiner* — Mehulkumar J Shah
(74) *Attorney, Agent, or Firm* — Stein IP, LLC

(57) ABSTRACT

This disclosure relates to various configurations or methods of displaying push information such as a number or a substance of push information which is received by an app implemented to a data processing terminal such as a smartphone. More particularly, this disclosure relates to various methods of creating and using (1) an unread content which a sender selects a user as a labeled receiver but the user has not yet confirmed or read), and (2) a labeled icon badge which can represent a number of such unread labeled contents or a substance of such labeled contents. This disclosure also relates to various methods of creating and using a labeled icon badge which can distinguish a labeled content from an unlabeled content, where the labeled content is the one with more need for a user to confirm and where the unlabeled content is the one with less need for a user to confirm.

21 Claims, 24 Drawing Sheets

(51) Int. Cl.
*G06F 3/0481* (2022.01)
*H04L 51/224* (2022.01)
*G06F 3/04817* (2022.01)
*H04L 51/216* (2022.01)

(58) Field of Classification Search
CPC ..... H04L 51/216; H04L 51/42; G06F 3/0482; G06F 3/04817; G06F 3/04883; G06F 3/0481; G06F 3/0488
See application file for complete search history.

(56) References Cited

U.S. PATENT DOCUMENTS

| | | | | |
|---|---|---|---|---|
| 2013/0041958 | A1 | 2/2013 | Post | 709/206 |
| 2016/0182430 | A1* | 6/2016 | Sachidanandam ... | G06Q 10/107 715/752 |
| 2017/0308390 | A1 | 10/2017 | Venis et al. | G06F 9/4443 |
| 2017/0358181 | A1 | 12/2017 | Moussette | |
| 2018/0091613 | A1 | 3/2018 | Goel et al. | H04L 67/26 |
| 2019/0087082 | A1 | 3/2019 | Chaudhri | |
| 2019/0141494 | A1* | 5/2019 | Gross | H04W 4/029 |
| 2020/0028961 | A1 | 1/2020 | Wang | |
| 2020/0259946 | A1* | 8/2020 | Mao | G06F 3/04883 |

FOREIGN PATENT DOCUMENTS

| | | |
|---|---|---|
| JP | 2014-529152 A | 10/2014 |
| JP | 2018-005557 A | 1/2018 |

OTHER PUBLICATIONS

Hiroko Higashi, "Introduction to LINE for adults." Mainabi Corp. (Naoki Takiro) (1$^{st}$ ed.), Sep. 29, 2017.

* cited by examiner

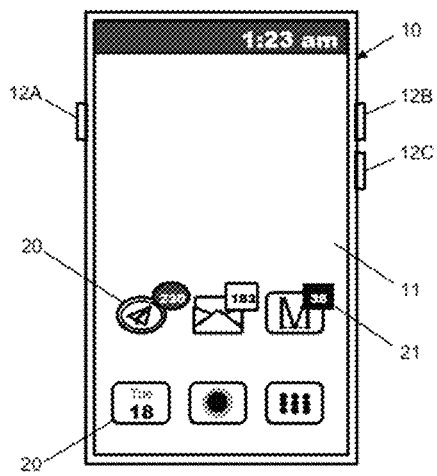
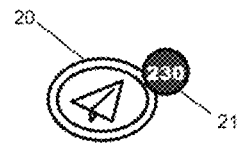
FIG. 1A  FIG. 1B
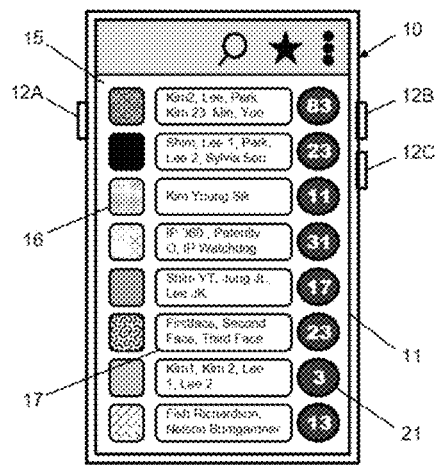
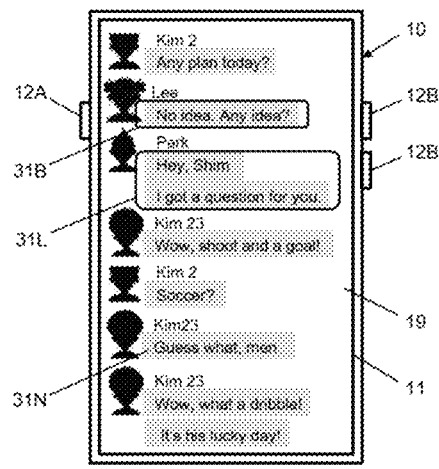
FIG. 2A  FIG. 2B
FIG. 3A
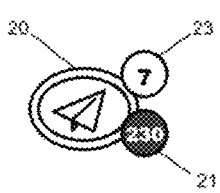

FIG. 9M
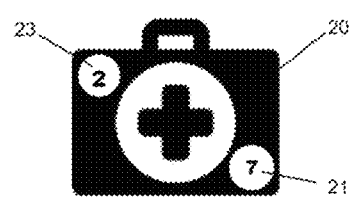
FIG. 9N
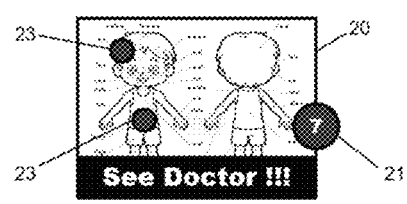
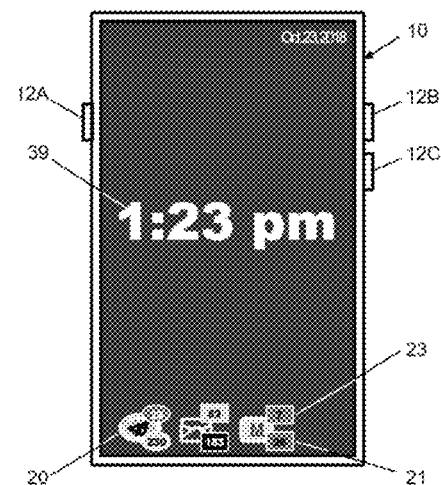
FIG. 10A

FIG. 11A
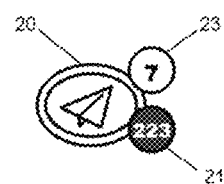
FIG. 11B
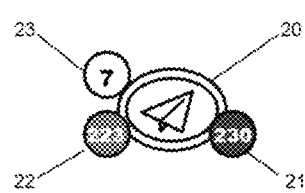
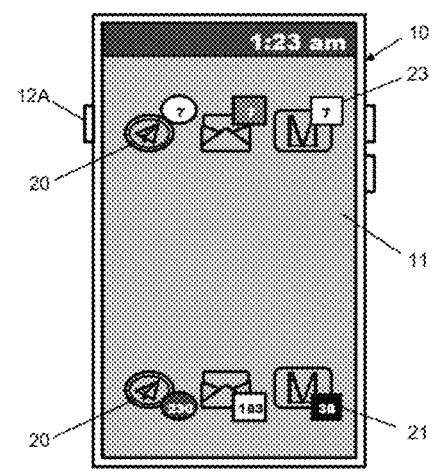
FIG. 11C

FIG. 11E

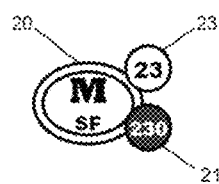

FIG. 11F

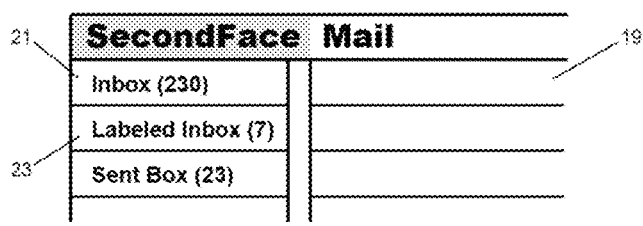

```
Intent badgeIntent = new Intent("android.intent.action.BADGE_COUNT_UPDATE");
badgeIntent.putExtra("badge_count", badgeCOUNT);
badgeIntent.putExtra("badge_count_package_name", getPackageName());
badgeIntent.putExtra("badge_count_class_name", getLauncherClassName());
sendBroadcast(badgeIntent);

private String getLauncherClassName() {
  Intent = new Intent(Intent.ACTION_MAIN);
  Intent.addCategory(Intent.CATEGORY_LAUNCHER);
  PackageManager pm = getApplicationContext().getPackageManager();
  List resolveInfos = pm.queryIntentActivities(Intent, 0);
  for (ResolveInfo resolveInfo : resolveInfos) {
      Striking pkgName = resolveInfo.activityInfo.applicationInfo.packageName;
      if (pkgName.equalsIgnoreCase(getPackageName())) {
          return resolveInfo.activityInfo.name;
      }
  }
  return null;
}
```

FIG. 12A

```
Intent labelIntent = new Intent("android.intent.action.LABEL_COUNT_UPDATE") ;
labelIntent.putExtra("label_count", labelCOUNT) ;
labelIntent.putExtra("label_count_package_name", getPackageName( ) ) ;
labelIntent.putExtra("label_count_class_name", getLauncherClassName( ) ) ;
sendBroadcast(labelIntent) ;

private String getLauncherClassName( ) {
  Intent = new Intent(Intent.ACTION_MAIN) ,
  Intent.addCategory(Intent.CATEGORY_LAUNCHER) ;
  PackageManager pm = getApplicationContext( ).getPackageManager( ) ;
  List resolveInfos = pm.queryIntentActivities(intent, 0) ;
  for (ResolveInfo resolveInfo : resolveInfos) {
      Striking pkgName = resolveInfo.activityInfo.applicationInfo.packageName ;
      if (pkgName.equalsIgnoreCase(getPackageName( ) ) ) {
          return resolveInfo.activityInfo.name;
      }
  }
  return null;
}
```

FIG. 12B

Calculate_Badgecount (Device_ID, APP_ID, Service_ID, Badge_Prioirty_Count, Badge_Count, Mode, Code)
Update_Badge(Settng_Parameter);
Pushing_Badge(Database(Badge_Info), PARAMETER)
Management_Badge()

Broadcating_RequestBadge(Device_ID, App_ID, Service_ID, Mode, Code)
Get_BadgeInfo()
Display_Badgeinfo()

FIG. 12C

DATA PROCESSING TERMINALS, ICON BADGES, AND METHODS OF MAKING AND USING THE SAME

CROSS-REFERENCES TO RELATED APPLICATIONS

This application is a continuation application of U.S. application Ser. No. 16/678,585 filed Nov. 8, 2019, which claims the priority from Korean Patent Application No. 10-2018-0147249 filed Nov. 26, 2018, and Korean Patent Application No. 10-2018-011662 filed Sep. 29, 2018 and which is incorporated herein by reference in its entirety.

FIELD OF DISCLOSED TERMINALS, ICON BADGES, AND METHODS

This disclosure relates to displaying a number or a type of push information that can be received by an operating system or various units of a data processing terminal such as, e.g., a smart-phone or a mobile phone. In particular, this disclosure relates to various methods of creating or using [1] an (unread) labeled content that is included in the push information which a sender creates for at least one labeled or designated receiver, or [2] an (unread) labeled icon badge that can display the number or the type of the (unread) labeled content.

Therefore, a content sender may selectively send a receiver [1] a labeled content which a receiver is relatively strongly required to read or [2] an unlabeled content which a receiver is relatively less required to read. In addition, a content receiver may readily confirm which content is highly required to read or confirm based on the type of the content, i.e., whether labeled or unlabeled.

A sender's terminal incorporates the content into a "data packet" of various types and, using its transmitter, transmits the packet via the internet or through a communication network. A receiver's terminal receives the data packet, and extracts the content form the packet. Thus, the sender and receiver can exchange the content. In addition, data processing terminals such as conventional smart-phones or mobile phones as well as desktop computers, laptop computers, and wired or wireless phones can exchange the contents as above.

As used herein, a "data packet" may include a header, a content, and a tail, but may include only one of the header and the tail. As used herein, an "unlabeled data packet" is deemed to be identical to a prior art data packet that may have various formats and, therefore, the unlabeled data packet may also include a header, a content, and a tail, where the packet may not include one of the header and the tail. For the simplicity of illustration, the content included in the unlabeled data packet is to be referred to as the "unlabeled content."

In contrary and as used herein, a "labeled data packet" may include a header, a content, a tail, and a "label signal" and may include only one of the header and tail. For simplicity of illustration, the content included in the labeled data packet is to be referred to as the "labeled content." When transmitting a labeled data packet, a sender of a certain group established by a certain app may label a certain member of the group as the labeled receiver. The "label signal" typically signifies the labeled (or designated) receiver.

A data packet may include the label signal as a portion which is separate from its header, tail, and content. Alternatively, a data packet may include the label signal in its header, in its tail or in its contents. In contrary, a terminal may transmit the label signal separately from the transmission of the data packet, where such a packet may be deemed not as a labeled data packet but as an unlabeled data packet and where the label signal may include information [1] about the labeled receiver or [1] for locating the unlabeled data packet which was transmitted with the label signal by the sender.

Based on the above definitions, this disclosure relates to various [1] labeled contents, [2] labeled icon badges, [3] configurations about such labeled contents or labeled icon badges, [4] methods of creating such labeled contents or labeled icon badges, or [5] methods of using such labeled contents or labeled icon badges, where each of the above labeled contents and labeled icon badges may relate to push information or push notification which may be created by various apps and which may be displayed along with app icons of such apps, and where examples of such apps may include, e.g., SNS (social network service) apps, groupware software apps, e-mail apps, messenger apps, scheduling apps, and the like.

This disclosure also relates to a number or a type of "push information" which may be transmitted or received by an operating system or other units of data processing terminals such as, e.g., smart-phones and mobile phones. More particularly, this disclosure relates to [1] various "push information" such as, e.g., labeled data packets, with which a sender may label (or designate) at least one receiver (i.e., a labeled receiver), [2] various labeled contents which may be included in the push information, [3] various labeled icon badges that may represent a number or a type of the labeled contents, [4] various methods of creating such labeled contents or labeled icon badges, [5] various methods of using the labeled contents or labeled icon badges, [6] various labeled icon badges capable of displaying the labeled content differently from the unlabeled content, where a receiver may be more or highly (in a relative sense) required to read or confirm the labeled content than the unlabeled content, or [7] various methods of creating or using such labeled icon badges.

In addition, this disclosure relates to incorporating such labeled contents or labeled icon badges into [1] data processing terminals such as mobile phones or smart-phones, [2] mobile pads or web pads, [3] personal digital assistants, [4] wired telephone, [5] inter-phone, [6] wireless communication devices, [7] wired or wireless data processing devices, [8] computers, or [9] other communication devices.

This disclosure further relates to various configurations and methods of applying such labeled contents, labeled data packets or labeled icon badges to [1] wired or wireless data processing unit, [2] wired or wireless control units or [3] wired or wireless communication units of various "devices," where examples of such devices may include [1] vehicles, buildings, robots, or drones, [2] various electric devices or electronic devices, [3] an internet-of-things (i.e., IoT) network, or [4] various devices of the [1] to [3] of this paragraph which is coupled to the IoT network. Therefore, a user of various devices or units of this paragraph, or a user who receives a data packet from such units or devices may readily confirm (or read) a number or a type of the labeled content that may be included in the data packet.

BACKGROUND

A user of a data processing terminal may drive a certain app, may exchange contents with members of a certain group which is set up by the app, and may finish running the app. When another member of the same group transmits a content to the user, the user may not immediately confirm (or read) the content. The terminal or the app may notify the user that he has received at least one "unread content" which the user has not confirmed (or read). To this end, a conventional terminal has employed various "unread icon badges" that may represent a number of such unread contents. FIG. 1A shows exemplary software applications (to be abbreviated as "apps" hereinafter) that are installed to a data processing terminal and exemplary unread icon badges of such apps displayed on a display unit with the app icons.

On its display unit (11), a terminal (10) may represent the app as an app icon (20) which is a user interface of the app. For the simplicity of illustration, an "app" may refer to the "app icon (20)" that is also a user interface of the app itself or, alternatively, an "app icon" may refer to the app (20). For example, the terminal (10) in FIG. 1A includes a touch-screen type display unit (11) on its front surface, and displays a total of six app icons (20) on the display unit (11).

It is noted that the terminal (10) of FIG. 1A is currently operating in its unlock state. Accordingly, the terminal (10) displays a home screen in which the terminal (10) also displays multiple app icons (20) (i.e., user interfaces) of multiple apps that the user may load and run in the unlock state. Accordingly, when the user applies a user input to the app icon (20), the terminal (10) can run the app. In addition, when the terminal (10) requires a user authentication to advance to the unlock state, the terminal (10) of FIG. 1A may be deemed to have switched to the unlock state after the user passed a user authentication.

The terminal (10) may display an unread icon badge (21) of a certain app on the display unit (11) as well. For example, the terminal (10) of FIG. 1A displays, on its display unit (11), three app icons (20) each of which is attached with (or includes) an unread icon badge (21) and other three app icons (20) each of which is not attached with any unread icon badge (21).

The terminal (10) includes at least one input unit capable of receiving various user inputs that are applied by the user. The input unit may be, e.g., [1] a hard-button type input unit that is one of hardware elements of the terminal (10), [2] a touch-screen type input unit that may occupy at least a portion of the display unit (11), or [3] a soft-button type input unit that may be provided as a U/I (i.e., a user interface) on a touch-screen or a regular display screen. When placed with its front surface facing upward, the terminal (10) of FIG. 1A may include a hard-button type input unit (12A) on its left, and a pair of hard-button type input units (12B)(12C) on its right.

Although not displayed in FIG. 1A, the hard-button type input units (12A)(12B)(12C) may be replaced by at least one soft-button type input unit that may be displayed on the display unit (11) and that may function as a user interface. When desirable, the terminal (10) may also include at least one soft-button type input unit and/or at least one hard-button type input unit.

FIG. 1B shows details of an exemplary app icon (or app) attached with an unread icon badge with a numeral "230." For the simplicity of illustration and as used in this disclosure, this is to be referred to as "the unread icon badge (21) reads 230" and it is to mean that the push information that has been received by a receiver of a certain group from multiple senders of the same group after the receiver ran and then closed the app (20) amounts to 230 contents. Thus, when the receiver runs the app (20) thereafter, the app (20) is to display a total of 230 new, unread contents to the receiver.

FIG. 2A exemplifies multiple groups of an app that a terminal displays on its display unit when a user runs the app, and also exemplifies an unread icon badge capable of displaying a number of unread contents in each of such groups. For example, a terminal (10) displays a group window (15) of an app (20) on its display unit (11) when a receiver runs the app (20). More particularly, on the group window (15), the terminal (10) may display multiple group icons (16) representing multiple groups each of which includes multiple members who also run the same app (20). In addition, the terminal (10) may display the IDs or names of the members or member U/I (17) next to or adjacent to the group icon (16). For example, the group window (15) of FIG. 2A shows that the Group 1 includes the members such as Kim2, Lee, Park, Kim23, Min, and Yoo, while Shim, Lee1, Park, Lee2, and Sylvia are members of the Group 2 of the same app (20).

As also shown in FIG. 2A, the terminal (10) or app (20) may display the number (21) of unread contents of each group. For example, the Group 1 includes 83 unread contents, the Group 2 includes 23 unread contents, the Group 3 includes 11 unread contents, the Group 4 includes 31 unread contents, the Group 5 includes 17 unread contents, the Group 6 includes 23 unread contents, the Group 7 includes 3 unread contents, and the Group 8 includes 13 unread contents.

FIG. 2B exemplifies multiple contents that have been exchanged by the members of the Group 1 of FIG. 2A and that are displayed on the display unit. That is, when a user of the terminal (10) of FIG. 1A provides a user input to the app (20) of FIG. 1B, the terminal (10) runs the app (20) and displays the screen of FIG. 2A on the display unit (11). When the user provides another user input to a group icon (16) that corresponds to the Group 1 that is one of multiple groups displayed on the group window (15), the terminal (10) may then display a content window (19) of FIG. 2B on the display unit (11), where the content window (19) typically displays multiple contents exchanged by the members of the Group 1. It is appreciated, for the simplicity of illustration, FIG. 2B does not include the reception times at which the receiver receives each of such contents. In addition, the boundaries around the contents (31N)(31L)(31B) are included only for the ease of illustration only, and are not actually displayed on the display unit (11).

In the content (31L) displayed on the content window (19), a member of the Group 1, Park, asks a question to Shim who is the user of the terminal (10) and who is also a member of the Group 1. Accordingly, the content (31L) is the one that relates relatively less to the rest of the members of the Group 1. In other words, the content (31L) may be regarded as the "labeled content" which the sender, Part, labels Shim as the labeled receiver.

To the contrary, the content (31N) may be regarded as the content that a sender, Kim23 who is a member of the Group 1, provides to all members of the Group 1, including the user, Shim. That is, the content (31N) is not the one which Kim23 sends while specifically labeling the user, Shim. Rather, the content (31N) is the one which Kim23 sends to all members of the Group 1, including himself.

Therefore, the need which the user, Shim, has to answer to the content (31N) may be regarded to be less than the need which Shim has to answer to the content (31L). That is, in the perspective of Shim, the content (31N) may not be regarded as the "labeled content" which the sender specifically labels Shim. Rather, the content (31N) may be regarded as the "unlabeled content" which the sender doesn't label Shim as a labeled receiver.

In contrary, the content (31B) is the one which the sender, Lee who is the member of the Group 1, sends to all members of the Group 1. When comparing the contents 31B and 31N, the content (31B) may be regarded to require the response from the user, Shim, more than the content (31N). However, when comparing the contents 31B and 31L, the content (31B) may be regarded to require the response from the user, Shim, less than the content (31L). In this context, the content (31B) may be regarded to be more the "labeled content" than the "unlabeled content." When desirable, such a content (31B) may be referred to as the "partly labeled content" hereinafter.

As explained above, the contents represented by the prior art unread icon badge (21) may include different contents, and examples of such contents may include [1] a content which a sender sends to all members including the user, [2] the content of the above [1] which other members send to each other and, therefore, which relates less or none to the user, or [3] the content of the above [1] which the sender specially labels the user as the labeled receiver.

When a user desires to find out whether the unread contents may include a labeled content which the sender specifically labels the user as the labeled receiver, the user should check each and every unread content and see whether the sender sent the content to the user as the labeled content. Because the conventional unread icon badge simply represents a total number of the unread contents, the user cannot tell whether there is any content which labels the user as the labeled receiver, until the user opens a certain group icon.

However, when the icon badge accompanies a big numeral (i.e., there are too many unread contents), it becomes difficult for the user to check whether the unread contents may include any labeled content. In addition, due to such a huge number, it may take an enormous amount of time of the user to check or read each and every unread content.

SUMMARY

This disclosure relates to various configurations and methods of overcoming the above disadvantageous features of the prior art unread icon badges. That is, various data processing terminals of this disclosure overcome the above shortcomings of the prior art unread icon badges by employing various labeled icon badges where, unlike the conventional unread icon badges, the (unread) labeled icon badges may represent a number or a type of the (unread) labeled contents and where the labeled contents are the ones that a sender may label a certain receiver as the specifically labeled or designated receiver. More particularly, various terminals of this disclosure may create an (unread) labeled icon badge (to be abbreviated as a "labeled icon badge" hereinafter unless otherwise specified) that visually represents a number of the (unread) labeled contents (to be abbreviated to as the "labeled contents" unless otherwise specified) that was received in a certain app, a type of such (unread) labeled contents, or the like. Thus, this configuration and method may provide various benefits to both the receiver and the sender.

In addition, this disclosure relates to various configurations or methods of creating and using such "labeled contents" as well as "labeled icon badges," while various software elements (to be abbreviated as "S/W elements hereinafter) of a terminal such as, e.g., an operating system (to be abbreviated as an "O/S" hereinafter), computer program, or software applications (to be referred to as an "app" hereinafter) may run various operations such as, e.g., a wired calling operation, a wireless calling operation, a groupware S/W operation, a SNS (i.e., social network service) operation, a messenger operation, an e-mail operation, other wired or wireless communication operations, or the like.

More particularly, this disclosure relates to various configurations and methods of effectively using a number or a type of various "push information" that may be received by the S/W elements or other units of a data processing terminal such as a smart-phone or a mobile phone. In addition, this disclosure relates to various methods of using "push notification" such as, e.g., [1] a "labeled icon badge" which may represent a number or a type of the "labeled contents" (i.e., the contents which a sender labels at least one receiver as the labeled receiver and sends such contents, while setting up other receivers and sending the same contents to such receivers) which is included in the push information, [2] a "labeled icon badge" which may visually distinguish the "labeled contents" of the push information from the "unread contents" or from the "unlabeled content" (i.e., the contents which a sender sets up multiple receivers and sends the contents to such receivers, without labeling any of such receivers as the labeled receiver), [3] a "labeled icon badge" capable of distinguishing the "labeled content" which may carry a great need for the receiver to read or confirm from the "unlabeled content" which has a less need for the receiver to read or confirm, [4] various methods of creating and using the "labeled content," [5] various push notification capable of distinguishing the "labeled content" from the "unlabeled content," or [6] various push notification utilizing the "labeled icon badge."

It is noted that such a need described in the above paragraph and the rest of this disclosure can be established by various methods. For example, a content sender may establish which content may carry more "need" to be reviewed by a receiver. That is, the content sender may establish such a "need" based on his determination. In the alternative, a sender's terminal may determine which content may carry more "need" to be reviewed by a receiver. For example, before transmitting the content, the sender's terminal may analyze the content to be transmitted or other contents which have been previously exchanged between the sender and a certain receiver. Based upon the analysis, the sender's terminal may establish the "need." Or the receiver's terminal may determine the "need" for the receiver to confirm or read the content. For example, upon receiving the content, the receiver's terminal may analyze the received content or other contents which have been previously exchanged between the receiver and a certain sender. Based on such analysis, the receiver's terminal may then establish the "need." Or a server may determine the "need" for the receiver to read or confirm the content. For example, the server may analyze the content received from the sender or may analyze other contents which have been previously exchanged by the sender and a certain receiver, and determine the "need" based on such analysis.

In other words, even when the receiver receives a labeled content which has been labeled by the sender, by the sender's terminal or by the receiver's terminal, the receiver may review the labeled content and then may or may not respond to the sender. In addition, even when the receiver confirms that there are unread labeled contents in a certain app or in a certain group of the app, the receiver [1] may open the group window and read the labeled content or [2] may not even open the group window and may not read the labeled content at all. For example, when the group of a certain app having numerous labeled contents happens to include many members who belong to a certain social group but when the user do not participate in the group, the receiver may readily find out that the group has received lots of labeled contents but may choose to not read such contents. That is, the receiver's terminal may notify the receiver of the arrival of the labeled content, but it is still the receiver who decides to read it or not.

Various (unread) labeled contents, labeled data packets including the (unread) labeled contents, or labeled icon badges representing a number of such (unread) labeled contents may be incorporated to various data processing terminals such as mobile phones or smart-phones and may offer the benefit of allowing a content sender and a content receiver to more efficiently communicate with each other. Accordingly, such labeled contents, labeled data packets or labeled icon badges may be efficiently applied to various messenger apps, e-mail apps, SNS apps, or groupware software apps, each incorporated to the terminal. In addition, such labeled contents, labeled data packets or labeled icon badges may be readily applied to scheduling apps, advertisement (or simply "ad") displaying apps, alarm apps or event notifying apps, each incorporated into the terminal.

Various labeled contents and labeled icon badges of this disclosure may also be applied in order to control various hardware elements or software elements of the data processing terminals such as mobile phones, smart-phones, and so on. Such labeled contents, labeled data packets or labeled icon badges may also be applied to communicate with or to control various electric devices or their units which may be included in or incorporated into buildings, vehicles, robots, drones or internet-of-things.

1. Objectives

The first objective of this disclosure relates to various configurations or methods of creating and using "(unread) labeled contents" using various "label signals." To this end, the terminal of this disclosure may drive its conventional hardware elements or software elements to create or transmit such label signals in the form of a conventional data packet. For example, the terminal may [1] include the label signal in a header or a tail of the data packet, [2] include the label signal in a content of the data packet, or [3] change the content according to the label signal and then include the changed content in the data packet.

Alternatively, the terminal may drive its conventional hardware elements or software elements to create and transmit a data packet with a new format which is different from that of the conventional data packet. For example, the terminal may define an additional portion in addition to the aforementioned header, content, and tail, and then include the label signal in the additional portion. In the alternative, the terminal may create two data packets, include the content in the first data packet, include the label signal in the second data packet, and then transmit the first and second data packets at the same time or sequentially. Alternatively, the terminal may transmit the label signal and the data packet (which does not include the label signal) to a server separately. The server may save the label signal, and then the receiver's terminal may then retrieve the label signal from the server or may receive the label signal from the server. It is noted that such a server of this disclosure may refer to a central server or a local server, and both servers will be collectively referred to as a "server."

The second objective of this disclosure relates to various configurations or methods of creating and using various "labeled data packets" which may include the "label signals." To this end, the terminal of this disclosure [1] may employ various prior art hardware elements or software elements to create and to transmit (or receive) the "labeled data packet" which may include the label signal, or [2] may employ various prior art hardware elements or software elements to create and to transmit (or receive) the data packet of the aforementioned new format, where the data packet may include the label signal but the new format may be different from the format of the prior art data packet. Or the receiver's terminal of this disclosure may receive the prior art data packet which does not include the label signal, and the terminal may confirm where the content is a labeled content or an unlabeled content by assessing [1] the label signal stored in a server or [2] other data. Alternatively, the receiver's terminal may receive the data packet which does not include the label signal, and then may confirm where the content is labeled or unlabeled based on characteristics of the contents such as, e.g., a font of the content, its size, its shape, its color, its transparency, its background, its background, and the like.

The third objective of this disclosure relates to various configurations or methods of creating and utilizing various "(unread) labeled icon badges" which represents a number or a type of the "(unread) labeled contents" which are included in the unread contents. To this end, the terminals of this disclosure may display an app icon of a certain app, while [1] also displaying the number or the type of the labeled contents which are included in the unread contents using the labeled icon badges, [2] also displaying the presence or absence of such labeled contents in the unread contents using the labeled icon badges, or [3] also displaying an absence of any labeled contents, if the unread contents do not include any labeled contents, using the labeled icon badges in various configurations.

The terminal of the [1] or [2] of the above paragraph may display the number of the labeled contents included in the unread contents or the presence or absence of the labeled contents in the unread contents by manipulating [1] various visual characteristics of the labeled icon badges, where examples of such characteristics may include characters, numerals, images, symbols or figures, [2] a color, a font or a background of the labeled icon badge, [3] a shape or size of the labeled icon badge, or [4] a position or an orientation of the labeled icon badge. The terminal of the [3] of the above paragraph [1] may display the labeled icon badge as "0" or may incorporate "0" into the labeled icon badge, [2] may display the labeled icon badge for the unread contents which may include no labeled content therein (to be abbreviated as the "labeled icon badge$_{(O)}$" hereinafter) in the same color, font or background as that of another labeled icon badge for the unread contents which include at least one labeled content therein (to be abbreviated as the "labeled icon badge$_{(N)}$" hereinafter) but display the labeled icon badge$_{(O)}$ in the shape, size, position or orientation which may be different from that of the labeled icon badge$_{(N)}$, [3] may display the labeled icon badge$_{(O)}$ in the identical shape, size, position or orientation as that of the labeled icon badge$_{(N)}$ but may display the labeled icon badge$_{(O)}$ in the color, font or background which may be different from that of the labeled icon badge$_{(N)}$, or [4] may display the unread icon badge, without displaying any labeled icon badge.

The fourth objective of this disclosure relates to various configurations or methods of displaying or using the "labeled icon badge" which may represent a number or a type of the "(unread) labeled contents" included in the unread contents, while displaying simultaneously (or together) [1] an "unlabeled icon badge" which represents a number or a type of the "(unread) unlabeled contents"

included in the unread contents or [2] the prior art "unread icon badge" for representing a total number of the unread contents. For example, the terminal of this disclosure may display an app icon of a certain app on its display unit and may also display [1] the labeled icon badge for representing a number or a type of the labeled contents included in the unread contents, [2] the unread icon badge and labeled icon badge in different positions on a display unit according to various arrangements, [3] the unlabeled icon badge and labeled icon badge in different locations on a display unit according to various arrangements, [4] the labeled icon badge in such a configuration that the labeled icon badge may readily be distinguished from the unread icon badge or from the unlabeled icon badge, or [5] the labeled icon badge and the unread icon badge (or the unlabeled icon badge) in different configurations or arrangements.

When the terminal displays the labeled icon badge together with (or simultaneously) displaying the unread icon badge (or the unlabeled icon badge) on the display unit, the terminal may help a user readily distinguish such badges from each other by displaying such badges [1] using different images or figures, [2] in different fonts, thicknesses, colors, transparencies or backgrounds, [3] in different shapes or sizes, or [4] in different positions or orientations.

The terminal may display the labeled icon badge and the unread (or unlabeled) icon badge on the display unit in various arrangements. For example, the terminal may display such badges [1] apart from each other by a certain distance on the display unit, e.g., one over the other or side by side, [2] symmetrically with each other with respect to a certain point (or line) on the display unit, [3] asymmetrically, [4] while allowing such badges to overlap at least a portion of each other, [5] while allowing the badges to contact at least a portion of each other, [6] apart from each other by a certain distance and in a concentric circular (or polygonal) arrangement, [7] apart from each other by a certain distance and inside a certain figure or image, [8] in a concentric circular (or polygonal) arrangement and also overlapping (or contacting) at least a portion of each other, or [9] inside a certain figure or image and also contacting (or overlapping) at least a portion of each other.

The fifth objective of this disclosure relates to various configurations or methods of allowing a user to provide a mechanical user input to the terminal and to select a "labeled receiver" based upon the user input, and to various configurations or methods of creating and using the "label signal" and the "labeled content" based upon such selection by the user. For example, the user may create the label signal [1] by providing the user input of manipulating a hard keyboard or soft keyboard, [2] by providing the user input of touching (or contacting) or otherwise manipulating the touch screen, or [3] by providing the user input of manipulating another hard-button type or soft-button type input unit.

The sixth objective of this disclosure relates to various configurations or methods of allowing a user to provide a different user input to the terminal and to select the "labeled receiver" based on the user input, and to various configurations or methods of creating and using the "label signal" as well as the "labeled content." To this end, the user may create the label signal [1] by providing the user input which may involve various movements or gestures of the user, or [2] by providing at least one electrical, magnetic, acoustic or electromagnetic user input. In particular, the terminal of the [1] of this paragraph may create a label signal [3] by electrically, magnetically or acoustically sensing the movements or gestures of the user, or [4] by electromagnetically acquiring and analyzing a static image or a dynamic image of such movements or gestures.

The seventh objective of this disclosure relates to various configurations or methods of analyzing the content transmitted by the sender or received by the receiver using various prior art information analysis algorithms and to various configurations or methods of creating the label signal upon finding a "label request information" in the content, thereby creating the "labeled content" based on the label signal. To this end, the terminal may employ various prior art information analysis algorithms which are commonly utilized in the field of artificial intelligence (i.e., to be abbreviated as an "AI" hereinafter), machine learning, deep learning, natural language processing or big data, in order to search for a name of a certain member of a certain group, a title or a nickname of the member, or other words, texts or symbols which may mean or represent the member from the content. Once identifying the label request information, the terminal may then select a labeled receiver based on such information, and may convert the text into the labeled content.

The terminal may also search for certain images or sounds which may be included in the content transmitted by the sender or received by the receiver using the conventional information analysis algorithms. Thus, upon identifying that the image corresponds to a picture or a video clip of a certain member, or to the name, title or nickname of the member, the terminal may then regard this as the label request information. Similarly, the terminal may also analyze the sound which is included in the sender's or receiver's content using the prior art information analysis algorithms. Upon identifying a certain sound which may correspond to the sound of a certain member or to a name, title or nickname of the member, the terminal may regard this as the label request information. When the terminal identifies such a label request information, the terminal may then select the labeled receiver, and may also convert such a content into the labeled content.

The eighth objective of this disclosure relates to various configurations or methods of displaying the content enough to allow the user to readily distinguish the labeled content from the unread contents. For example, when displaying the unread contents on the display unit, the terminal [1] may selectively simplify or minimize the unlabeled contents, or [2] may not display any unlabeled contents. At the same time, the terminal may display the labeled contents on the display unit with or without highlights (i.e. emphasis).

Alternatively, the terminal may display the unread contents and read contents, while [1] selectively simplifying, [2] selectively minimizing or [3] not displaying the (unread or read) unlabeled contents. Therefore, the terminal may display the (unread or read) labeled contents on the display unit with or without any highlight. Alternatively, the terminal may only display the (unread or read) labeled contents.

The ninth objective of this disclosure relates to various configurations or methods of selectively displaying, out of unread contents, such labeled content which may relate to the user. For example, the terminal may [1] selectively display the labeled content transmitted to the receiver on the display unit or store the labeled content, or [2] separately display the content transmitted by the user or may store such a labeled content.

More particularly, as far as the labeled content that is transmitted to the user is concerned, the terminal [1] may only display the unread labeled content or may store such a content, [2] may only display the read labeled content or may store such a content, [3] may display both of the read and unread labeled contents or may store such contents, [4] may display the (unread or read) labeled content which is transmitted by at least one certain member to the user or may store such a content or [5] may display the read labeled content which is transmitted to the user by at least one certain member as well as the content which the user transmits to the member as a reply to that read labeled content, or may store such contents.

In addition, as far as the labeled content which is transmitted by the user is concerned, the terminal [1] may display the (unread or read) labeled content transmitted to a certain labeled receiver or store such a content, [2] may display the (unread or read) labeled contents transmitted to all labeled receivers or store such contents, [3] may display the (unread or read) contents which may be the replies to the contents sent by the user or store such contents, or [4] may display labeled content that is transmitted by the user to at least one certain member and the content which is transmitted by the certain member as a reply to the user's content or store such contents.

The tenth objective of this disclosure relates to various configurations or methods of selectively displaying various contents transmitted to or received by a user, sender or receiver. For example, the terminal [1] may display the unread labeled content, read labeled content or all labeled contents which are transmitted to the user by a certain member on the display unit or may store the contents in the server or terminal, [2] may display the unread unlabeled content, read unlabeled content or all unlabeled contents which are transmitted by a certain member of a certain group to all members of the group on the display unit or may store such contents in the terminal or server, [3] may display unread or read (labeled or unlabeled) contents which are transmitted by the user to a certain member or all members of a certain group on the display unit or may store such contents in the terminal or the server, or [4] may display unread or read (unlabeled or labeled) contents which are transmitted by a member of a group to another member or all members of the group on the display unit or may store such contents in the server or terminal, where the members of this [4] is not the user.

The eleventh objective of this disclosure relates to various classifications of the contents. To this end, such contents may be classified as either the unlabeled content or the labeled content. Alternatively, the contents transmitted by the user or a sender may be classified as the unlabeled content, the labeled content, and at least one partly labeled content. Thus, various icon badges may also be classified as an unlabeled icon badge, a labeled icon badge, and an optional partly labeled icon badge.

The twelfth objective of this disclosure relates to displaying the number, the type, or the presence or absence of the labeled contents by employing various labeled icon badges. For example, the terminal may display the app icon for a certain app on its display unit, while also displaying an unread icon badge for representing the number of unread contents as well as a labeled icon badge for representing the number of the unread labeled contents. Alternatively, the terminal may create the labeled icon badge based on various label signals, thereby informing the receiver whether the labeled content included in the unread contents may be a text, an image or a sound, how big the size of the labeled content is, or when the labeled content was transmitted or received.

The thirteenth objective of this disclosure relates to displaying the labeled content which the user transmits only to a receiver who may be labeled as a "labeled receiver" by the user. For example, unlike the first to twelfth objectives as described above, once a user labels a certain receiver as the labeled receiver, the terminal [1] may transmit the labeled content of the user only to the labeled receiver but not to other members, or [2] may transmit the content of the user to all members, manipulate a terminal of the labeled receiver to display the content, but manipulate the terminals of other receivers to not display the contents.

To this end, the terminal may include a certain label signal in the labeled data packet for the above [1] of the preceding paragraph and, as a result, the content included in the labeled data packet is then called the labeled content. Alternatively, the server may transmit the labeled data packet which includes the labeled content only to the labeled receiver. Alternatively, the terminal of the labeled receiver may receive the labeled content and then display such a content on its display unit, but other members' terminals may not receive the labeled content at all. Alternatively, the terminal of the labeled receiver may receive the labeled content and then display such a content on its display unit, but other members' terminals may receive the labeled content but may not display the content on their display units. In the alternative, the terminal of the labeled receiver may display the labeled content after the app receives such a content, however, other members' terminals may receive the labeled content but may not display the content on their display units.

The fourteenth objective of this disclosure relates to various configurations or methods of implementing the label signal, the labeled data packet or the labeled icon badge to various devices. For example, the label signals, labeled data packets or labeled icon badges may be used in [1] various data processing devices such as, e.g., smart-phones, mobile phones, web pads, personal data assistants, or the like, [2] various computers, or [3] various communication devices such as wired or wireless phones, inter-phones or wireless communication devices, or the like. In addition, the label signals, the labeled data packets or the labeled icon badges may also be implemented into [1] various wireless or wired data processing units, communication units or control units that are included in buildings, vehicles, robots or drones, [2] various control units or data processing units that are included in the internet-of-things, or [3] electrical or electronic devices which are coupled to the internet-of-things.

The fifteenth objective of this disclosure relates to providing a data processing terminal which may perform a function of allowing a user to confirm the number of unread labeled contents by performing less steps or while receiving less user inputs, without having to open a content window. To this end, various terminals of this disclosure may provide an improved user interface (U/I) which may allow a user to more easily confirm whether the unread contents transmitted by the members of a certain app has labeled the user and then transmitted such labeled contents to the user.

Thus, a user may readily confirm whether the unread contents (which have been received from the members of multiple group windows of a certain app or from the members of a certain group window) may contain any labeled contents and, if so, how many labeled contents the user has received, without having to perform the step of pressing a certain app icon and opening a group window of the app, or without having to perform the step of selecting a certain group from the group window and opening a content window of the group.

Therefore, the data processing terminals or their display units of this disclosure which may not be fabricated beyond a certain size may display various icon badges around or inside an app icon, thereby readily representing the number of unread contents and the number of unread labeled contents or unread unlabeled contents.

The sixteenth objective of this disclosure relates to providing a user with an improved app icon (or U/I) by combining one app icon (or U/I) having a new functionality with a prior art app icon (U/I) with a conventional functionality. Thus, when various terminals of this disclosure may display an app icon on a display unit, the terminals may display the unread icon badge which has the conventional functionality with the (unread) labeled icon badge with the new functionality. As a result, such terminals of this disclosure may provide various solutions to the problems or limitations inherent in the unread icon badges commonly used in the prior art data processing devices.

2. Benefits

According to the above first objective, the terminals of this disclosure may incorporate configurational or operation features of the prior art mobile phones or smart-phones. Accordingly, a manufacturer may minimize the cost of making such terminals. The user may also readily operate such terminals of this disclosure which adopt the prior art configurational or operation features.

According to the above second objective, various terminals of this disclosure may transmit or receive the label signal by including such a label signal in various prior art data packets. Therefore, such terminals may incorporate configurational or operation features of the prior art mobile phones or smart-phones. As a result, a manufacturer may minimize the cost of making such terminals, and the user may also readily operate such terminals of this disclosure which adopt the prior art configurational or operation features.

According to the above third objective, a user of a terminal may readily find out whether the unread contents may include any labeled contents, only by looking at a number (i.e., a numeral or a labeled icon badge) which may be attached to an app icon of a certain app displayed on the display unit. Upon confirming that number or numeral, the user may also easily find out how may labeled contents are included in the unread contents from the number or numeral as well. Similarly, a sender who transmits a content to the labeled receiver may ensure the labeled receiver to pay additional attention to the content and may induce the receiver to read or confirm the content.

According to the above fourth objective, a user of a terminal of this disclosure may easily and visually confirm the presence or absence of the unread labeled contents in the unread contents. The user may also easily and readily find out the presence or the absence of the labeled content included in the unread contents or the number of the labeled contents in the unread contents.

According to the above fifth objective, a user of a terminal of this disclosure may readily create the label signal by manipulating the input units of the terminal in a way which may be identical or similar to the way of manipulating the input units of the prior art mobile phones or smart-phones. Accordingly, a manufacturer may minimize the cost of making such terminals.

According to the above sixth objective, various terminals of this disclosure may use various prior art hardware elements in receiving the mechanical, electrical, magnetic, electromagnetic or acoustic user inputs and, accordingly, may reduce the cost of manufacturing such terminals. In addition, the user may create the label signal by easily manipulating the terminal and by providing the user input in various methods.

According to the above seventh objective, the terminal of this disclosure may automatically find out whether the unread contents include any labeled content therein, even when the content sender does not create any label signal. That is, a user of the terminal may create the label signal without necessarily providing an additional (mechanical) user input in order to create a label signal. Or a content sender may create the label signal by capturing an image which is related to himself, the labeled receiver, or a certain member using a camera and using that image as the user input, or by recording his voice using a microphone and using the voice as the user input. The terminal of the labeled receiver may then display the content as the labeled content. The receiver's terminal, not the sender's terminal, may also create the label signal, when the sender's signal does not create the label signal. For example, when the receiver's signal receives such an image or voice, the terminal may recognize that image or voice and then label the content transmitted by the sender as the labeled content. In addition, various methods of creating the label signal of this paragraph may be combined with at least one of the above fifth and sixth objective.

According to the above eighth objective, the user of the terminal of this disclosure may confirm the labeled contents which are included in the unread contents, while getting rid of or minimizing the confusion caused by the unlabeled contents. The user of the terminal may also confirm the labeled contents included in the read or unread contents, while getting rid of or minimizing the visual confusion caused by the unlabeled contents.

According to the above ninth objective, the user of such terminals of this disclosure may [1] easily distinguish the contents which do not label the user as the labeled receiver from the contents which do label the user as the labeled receiver, [2] easily distinguish the labeled contents which the user transmits to a certain labeled receiver from the labeled contents which a certain member or all members send to the user, [3] easily confirm whether a certain member replied to the user in response to the labeled content which the user had sent to the member, [4] easily confirm whether the user replied to a certain member in response to the labeled content which the member had sent to the user, or [5] readily understand mutual opinions or relationship by readily confirming the contents which have been exchanged between the user and the member.

According to the above tenth objective, the user of the terminal of this disclosure may [1] easily confirm or distinguish those unlabeled or labeled contents which have been exchanged with a certain member or [2] easily understand mutual opinions or relationship by readily confirming the contents which have been exchanged between at least two members.

According to the above eleventh objective, the user of the terminal of this disclosure may easily confirm or distinguish those unlabeled or labeled contents which have been transmitted by a certain member or which have been sent to the member. Therefore, the user may readily confirm the contents which have been exchanged between the user and the member or between other members (excluding the user), thereby readily understanding the opinions or relationship between the user and the member or between other members.

According to the above twelfth objective, the user of the terminal of this disclosure may easily confirm the context of the labeled content which is included in the unread contents simply by using the labeled icon badge. For example, the user may readily confirm whether the labeled content is a text, a file, an image or a sound.

According to the above thirteenth objective, the user of the terminal of this disclosure may ensure that other members may not know of the content which the user transmits to the labeled receiver. As a result, the user may communicate only with the labeled receiver, even in a group window.

According to the above fourteenth objective, the user of the terminal of this disclosure may also control such "devices" or "units" which have been described hereinabove and hereinafter by exchanging the contents with such devices through the terminal. More particularly, the user may [1] connect his terminal to such devices or units wirelessly or through wire and manipulate such devices, or [2] remotely manipulate such devices by using his terminal as a remote controller for such devices.

According to the above fifteenth objective, various terminals of this disclosure may allow a user to perform a certain function more simply or by providing a smaller number of user inputs. For example, when a user of a prior art data processing device wants to confirm whether unread contents include any unread labeled contents, he or she has to provide at least two user inputs. First, the user has to provide a first user input of switching a device from its off state to its lock (or unlock) state, and has to provide a second user input to a certain app which is attached with an unread icon badge which represents a number of unread contents, thereby opening a group window of the app. In the group window which displays multiple groups of the app, the user then has to provide a third user input to a certain group which is attached with the unread icon badge which represents the number of unread contents in the group, thereby opening a content window of that group. Thereafter, the user may confirm whether that group may include labeled contents out of the unread contents by reading the unread contents included in the content window. In other words, the user of such a device has to endure the inconvenience of not being able to readily confirm whether the unread contents may include any labeled content until he or she may open the content window. Even when the user may confirm that such unread contents include the unread labeled contents, however, he has to count all labeled contents when he wants to find out how many unread labeled contents he has received.

However, a user of various data processing terminals of this disclosure may easily confirm the number of unread labeled contents which are included in the unread contents, by providing only the first user input or the first and second user inputs of the above paragraph. As a result, the app icons (i.e., a U/I) which is attached with the unread labeled icon badge can readily solve the inconveniences or problems inherent in the prior art app icons (i.e., a prior art U/I) used in the conventional data processing devices. For example, when the terminal may display the app icons and related labeled icon badges on a lock screen in its lock state, a user may readily find out how many labeled contents he or she has received in a certain app by simply providing the first user input of the above paragraph. In addition, when such a terminal displays a home screen in an unlock state after receiving the first user input, the user may also readily find out the number of unread labeled contents received by the app. In addition, when the user opens a group window by providing the second user input of the above paragraph (after providing the above first user input and selecting a certain app from multiple apps displayed on the screen), the user may even easily confirm the numbers of such unread labeled contents in various groups of the app. Accordingly, compared with the user of the prior art data processing device which employs the U/I such as an app icon, the user of the terminal of this disclosure which employs an improved U/I which is improved in the sense of being attached with the unread labeled icon badge can accomplish the same results or improved results, more simply, by performing less steps, or by providing a less number of user inputs.

According to the above sixteenth objective, a user of various terminals of this disclosure may more simply and more easily confirm the existence of or the number of the labeled contents included in the unread contents. Or the user of such terminals of this disclosure may run an operation of confirming the number of the labeled contents, which the user of the conventional data processing devices may not be able to run at all. Alternatively, compared with a user of the conventional data processing devices, the user of such terminals of this disclosure may perform an improved function of confirming the number of the unread labeled contents while performing a less number of steps of while providing a less number of user inputs.

3. Definitions

It is appreciated that various words or phrases of this disclosure may mean the followings.

As used herein, a "data processing terminal" or simply a "terminal" collectively refers to electrical or electronic devices which can, either wirelessly or through wire, transmit or receive various data (e.g., various contents or various data packets which include such contents), which can process the data, or which can store such data. The terminal may be constructed as a mobile type or a portable type. Or the terminal may also be constructed as an immobile type.

The "terminal" may correspond to a "mobile (or portable) data processing terminal" and examples of such terminals may include, e.g., [1] smart-phones, [2] mobile phones, [3] mobile pads, [4] web pads, [5] personal digital assistants, or the like. The terminal may correspond to, e.g., wired or wireless [1] communication devices or phones, [2] interphones, [3] data processing devices, [4] computers or [5] other communication devices.

The "terminal" may also correspond to various electrical devices or electronic devices, where examples of such "terminals" may include [1] wired or wireless control units or data processing units which may be included in or incorporated into private, commercial or military transportation vehicles which may move with two, three, four or more wheels, [2] wired or wireless control units or data processing units which may be included in or incorporated into private, commercial or military aerial transportation vehicles such as planes or helicopters, [3] wired or wireless control units or data processing units which may be included in or incorporated into private, commercial or military surface transportation vehicles such as yachts, ships or submarines, or [4] wired or wireless control units or data processing units which may be included in or incorporated into private, commercial or military architectures such as houses or buildings. Various vehicles of the [1] to [3] of this paragraph are to be collectively referred to as the "vehicles" hereinafter.

The "terminal" may also correspond to other electrical devices or electronic devices, where examples of such "terminals" may include [1] wired or wireless control units, data processing units or communication units that may be included in or incorporated into various robots or drones, [2]

wired or wireless control units, data processing units or communication units that may be included in or incorporated into various internet-of-things, or [3] wired or wireless control units, data processing units or communication units included in or incorporated into various electrical or electronic devices which may be coupled to or included in the internet-of-things. Such wired or wireless control units, such wired or wireless data processing units, or such wired or wireless communication units of this paragraph and this disclosure are to be collectively referred to as the "units" hereinafter.

As used herein, the phrase "a terminal runs a certain operation" may generally mean that [1] a hardware element or a software element implemented to the terminal runs the operation, [2] an O/S which is one of the software elements of the terminal runs the operation, or [3] a software application (to be abbreviated as an "app" hereinafter) which is implemented into the terminal and which is also one of the software elements of the terminal runs the operation. Accordingly, the phrase "a terminal or an app runs a certain operation" may mean that a hardware element, an O/S, an app or another software element runs the operation. A terminal manufacturer may implement such an app onto the terminal during or after manufacturing the terminal. Instead, a distributer of the terminal may implement the app to the terminal during the distribution of the terminal. Alternatively, a user of the terminal may implement the app to the terminal after purchase.

The terminal of this disclosure may transmit or receive various "contents" through the internet or a certain network in the form of various "data packets." A conventional data packet may have a variety of formats, depending on the type of contents included therein or upon a certain internet protocol. In general, the "data packet" of this disclosure is to include a "header," at least one "content," and a "tail," where such a packet may not include one of the header or tail. The header may generally include data which are related to overall information, service, and other data related to the transmission or reception of various contents, whereas the tail may include data which are related to the transmission or reception of such contents, the content type, the content feature, or processing of the content.

As used herein, a "content" refers to a text such as, e.g., a sentence or a document, each including characters, numerals or symbols. A "content" may also include a point, a line, a figure or a geometric object, and may also include an image or a sound. Alternatively, such a "content" may include an attached file. In addition, the "content" may include such a figure, object, image or sound, without necessarily including such text.

As used herein, an "unlabeled data packet" refers to a data packet which includes a content which is in turn transmitted while a sender does not label a certain receiver. As used herein, an "unlabeled data packet" is deemed to by synonymous with the prior art data packet. Accordingly, the "unlabeled data packet" may similarly include a header, at least one content, and a tail, where one of the header or tail may be omitted. In addition, the content included in the "unlabeled data packet" is to be referred to as the "unlabeled content" which the sender transmits without labeling a certain receiver. Therefore, the sender may generally transmit the unlabeled data packet or unlabeled content to all (or multiple) members of the group to which the sender also belongs.

As used herein, a "labeled data packet" refers to a data packet which includes a content which is in turn transmitted by the sender to a certain receiver, while the sender desires or requests a labeled receiver to read or confirm the content transmitted by the sender. That is, the "labeled data packet" is the data packet which includes a content which is labeled to a certain receiver by the sender. It is noted that the "labeled data packet" includes at least one "label signal" in addition to the content and at least one of the header and the tail. In addition, the content which is included in the "labeled data packet" is to be referred to as the "labeled content," i.e., the content which the sender specifically labels a certain receiver as the "labeled receiver."

Accordingly, the sender may generally label at least one member of the group as a labeled receiver, and may transmit the labeled data packet or labeled content to the labeled receiver, while also transmitting the same labeled data packet or labeled content to all (or some) members of the same group. In contrary, depending upon the configuration of the terminal, app or server or the feature of the network, the sender may transmit the labeled data packet or labeled content only to the labeled receiver, while not transmitting the labeled data packet or labeled content to the rest of the members of the group.

It is noted that the content (i.e., the "unlabeled content") which is included in the "unlabeled data packet" may generally have the format or configuration which is identical or similar to the format or configuration of the content (i.e., the "labeled content") which is included in the "labeled data packet." That is, when a content is included in the "unlabeled data packet," the content may be to be referred to as the "unlabeled content," while the similar or same content is to be referred to as the "labeled content" when such a content is included in the "labeled data packet."

The terminal may incorporate the "label signal" into the header, content or tail of the labeled data packet. Alternatively, the terminal may not include the "label signal" in the data packet at all. In this latter configuration, the terminal may transmit or receive the "label signal" separately or independently from the data packet. To this end, the terminal may transmit or receive the "label signal" as an individual or separate signal or may form an additional data packet which includes the "label signal" therein. That is, the terminal may use a labeled data packet which may have a structure or a format which may be different from those of the conventional data packet. In such a case, the "labeled data packet" may include the label signal or the labeled content as explained hereinabove or hereinafter. Alternatively, the terminal may transmit the label signal or the labeled content to the terminal of a receiver or transmit information about the label signal or the labeled content to the receiver's terminal.

A user driving various terminals of this disclosure may manipulate a certain app which is implemented into the terminal and which allows the user to set up a certain group of multiple members and to exchange the content with at least one of such members. As used herein, "(regular) set up" or simply "set up" means an operation in which a content sender who belongs to a certain group sets up the rest of the members of the group as the receivers (i.e., "regular receiver") of his or her content. Thus, when a sender transmits such a content (i.e., the "unlabeled content" which is included in the "unlabeled data packet") to all members of a certain group, such members may receive the contents in the data packets of the same type, and then display the content of the same type on the display unit.

When the receiver's terminal receives the content which is transmitted by the sender, the receiver's terminal may display the content in a content window provided by a certain app. In addition, the sender's terminal may or may not display the content which was transmitted by the sender in the same content window. Unless otherwise stated, when a sender who belongs to a certain group transmits a content, the terminal of this disclosure or the app implemented to the terminal may also display the content in the content window of the sender's terminal. The sender's terminal may also display the content transmitted by the sender differently, thereby allowing the sender to easily recognize that the content is the one which he transmitted.

Contrary to such "set up" and as used herein, "label" of this disclosure means an operation in which a content sender labels and selects at least one member (i.e., at least one "labeled receiver") of a certain group that is established in a certain app, and in which the labeled receiver is specifically asked by the content sender to read or confirm the content. The sender or terminal may employ various methods to create the "label signal," and the terminal may create the "labeled data packet" which includes the label signal. As the content sender selects at least one labeled receiver and transmits the labeled data packet which includes the labeled content, the labeled receiver and the rest of the members of the group receive the labeled content. Thereafter, the terminals of the rest of the members may display the labeled content as the unlabeled content in the display unit. However, the terminal of the labeled receiver displays the labeled content in the format which is different from a format of the unlabeled content. As a result, the labeled receiver may easily recognize that he or she has been asked by the content sender to read or confirm the labeled content.

The terminal of the content sender may transmit the content and the label signal in various formats or types. For example, the terminal [1] may incorporate the content and label signal into the labeled data packet, and transmit the labeled data packet, [2] may separately transmit the label signal and the unlabeled data packet, where the unlabeled data packet includes the content and information that may designate the label signal to the unlabeled data packet (or vice versa), or [3] may separately transmit the label signal and the unlabeled data packet, where the unlabeled data packet includes the content, and where a server stores information which can designate the label signal to the unlabeled data packet (or vice versa). The receiver's terminal may also receive the label signal in various formats or types. For example, the terminal [1] may receive the labeled data packet, and may extract the content and label signal from the labeled data packet, or [2] may receive the label signal, confirm the unlabeled data packet which is designated to the label signal, and then extract the labeled content from the unlabeled data packet.

As used herein, "push information" refers to various contents, data packets or label signals which various senders such as an internet publisher or a server may transmit to a receiver through the internet or a network. It is noted that such push information may be deemed to be an opposite to information which may be initiated by a user's request and then transferred as a pull/get format. Therefore, the push information means various data packets or contents such as, e.g., [1] a labeled data packet, [2] an unlabeled data packet, [3] a labeled content, or [4] an unlabeled content, where the contents of the [1] and [2] of this paragraph are identical to those defined above. When the sender's terminal transmits a label signal separately from a data packet, the label signal may be regarded as the push information as well.

More particularly, various senders can send the push information. For example, when multiple members of a certain group established in a certain app can exchange contents, a user who also is the member of the group can be a sender of the push information. In such a case, the terminal or app may receive the content from the user, and then transmit the content to the rest of the members of the group as the push information. When desirable, the terminal or app may also transmit the content to the user. Alternatively, a certain member who may not be the user but who also belongs to the same group can be a sender of the push information. In this case, the terminal or app of that member receives the content from that member, and transmit the content to the rest of the members of the same group as the push information. In this case, the "all" members may include the user therein.

When a certain app is not used to exchange contents between multiple members, the terminal or app may provide a user with a content which the terminal or the app creates itself or which the terminal or app receives from an external source. In this case, the sender of the push information may be the terminal or the app. When various electrical or electronic devices create the content and then transmits the content directly to the terminal of a receiver, the device may be the sender of the push information. But when the device may create the content and transmit the content to a server and when the server transmits the content to the receiver, the electrical or electronic device may be the sender of the push information or, in the alternative, the server may be deemed as the sender of the push information.

The push information may also be transmitted by other senders. For example, the server or the internet publisher may transmit the push information without a command from the terminal or user. Similarly, the terminal may transmit the push information without a command from the user. In addition, various control units, data processing units or communication units of the aforementioned vehicles, buildings, airplanes, drones or robots may create the push information without any command from [1] a user, [2] an IoT network, or [3] a manager of the IoT network, and may then transmit the information to the terminal of the receiver as the push information.

As used herein, "push notification" means a numeral, a character, a symbol, a text, an image or a sound which may represent a number or a type of the "push information" which a receiver of a certain group established in a certain app may receive.

It is appreciated that various senders of the push information (e.g. a terminal, a server or an app) may provide such push notification in various methods. In one example, when a sender (i.e., the sender means the push information sender only in this paragraph) provides a push information, a receiver's terminal or app informs a user of the push information in the form of a push notification, particularly, in the form of an unread icon badge or an (unread) labeled icon badge. Thus, when the user turns on a display unit, the terminal may display an app icon attached with an unread icon badge or a labeled icon badge. As the user provides another user input to the app icon, the terminal may display a group window which may then a number of unread contents for each group displayed in the group window. In other words, in this configuration, the user may not be able to find out whether there is any unread push information waiting to be read or confirmed by the user, until a user turns on a display unit.

In another example, when a sender (i.e., the sender means the sender of the push information in this paragraph as well) provides a push information, a receiver's terminal or app may inform the receiver of the push information in the form of the push notification as explained in the above paragraph, not only in an unlock state but also in a lock state (e.g., a state where a display unit is turned on but a user has not passed a user authentication or has not typed in a correct password) or even in an off-state (e.g., a state in which a display unit may be turned off). More particularly, the terminal or app may display the unread icon badge or an (unread) labeled icon badge in the lock state or in the off state, except displaying routine data in the off state. Therefore, a user may easily find out whether he has received an unread (unlabeled or labeled) content while his terminal is in the off state or in the lock state.

In general, the routine data refer to those data obtainable without running an operation in response to a user input. It is noted that such routine data may relate to, e.g., various information such as, e.g., a date, a time, a clock, a stopwatch, a battery charge, a temperature, a weather, a wireless connection, an armed alarm, an arrival of a new e-mail or a new message, a notice of an incoming call, a notice of an upcoming event, or the like. In addition, when a terminal may display routine data or other information on a display unit while keeping "at least 80% of the pixels" of such a display unit turned off, this display unit is also deemed to be turned off and to be in an off state within the scope of this disclosure.

It is also noted that the terminal may provide the push notification along with various visual, audible or tactile signals. In other words, the terminal may provide various push notifications as exemplified in the above three paragraphs, while the terminal also provides the visual, audible or tactile signals in order to inform a user of a reception of an unread content. For example, upon receiving the unread content, the terminal may turn on the display unit or other output units, make sounds or generate vibrations. The terminal may also generate such signals before, during or after providing such push notifications.

It is noted that such push notification may be purpose specific. Accordingly, details of such push notification may differ depending upon a purpose or various characteristics of each app. Followings exemplify detailed characteristics of the push notification for different apps. It is appreciated that, although details of the push notification are exemplified for only ten different apps below, various features of this disclosure may also apply to other apps, along with such visual, audible or tactile signals explained in the above paragraph.

For example, for a "wired or wireless calling app," examples of the "push notification" may include, but not limited to [1] a number of calls missed by a user, [2] information related to a caller of the missed call, a phone number of the caller, or a time of such missed call, [3] a number of calls that the user answered after a certain time or during a certain period, [4] information related to such call of the [3] of this paragraph, its caller, a phone number of the caller, or a time of the call, [5] a number of voice or text messages left by the caller of the [1] or [2] of this paragraph, [6] information related to the left message of the [5] of this paragraph, its caller, a phone number of the caller or a time of the left message, or [7] information related to a status a wired or wireless phone or a state of malfunction of the phone. Such push notification may be limited to [8] information not confirmed or read by a user (or contents related to such unread information) of the [1] to [7] of this paragraph, or [9] both of the unread and read information (or content related to such information) of the [1] to [7] of this paragraph which has been received after a certain time.

In the case of a "SNS app," examples of the "push notification" may include, but not be limited to, [1] a number of messages including a character, a symbol or a text, [2] information related to a sender or a time of reception of the message of the [1] of this paragraph, [3] a number of the image files received by the user, [4] information which is related to a size, a sender or a time of reception of the image file of the [3] of this paragraph, [5] a number of received voice files, [6] information related to a sender or a time of reception of the voice file of the [5] of this paragraph, [7] a number of the SNS contents which a user has not responded, or [8] information related to a sender or a time of reception of the content of the [7] of this paragraph. Instead, the push information may be related to [9] the unread information (or contents related to such information) of the [1] to [8] of this paragraph, or [10] both the unread and read information (or content related to such information) of the [1] to [8] of this paragraph which has been received after a certain time.

In the case of a "groupware software app," examples of the "push notification" may include, but not limited to, [1] a number of messages which may include a character, a symbol or a text, [2] information related to a sender or a time of reception of the message of the [1] of this paragraph, [3] a number of received image files, [4] information related to a size, a sender or a time of reception of the image file of the [3] of this paragraph, [5] a number of received voice files, [6] information related to a sender or a time of reception of the voice file of the [5] of this paragraph, [7] a number of unread groupware messages, [8] information related to a sender or a time of reception of the message of the [7] of this paragraph, [9] a number of notice messages uploaded by a manager of a certain group, or [10] information related to a time of reception of the message of the [9] of this paragraph. Instead, the push notification may be related to [11] the unread information (or contents related to such information) of the [1] to [10] of this paragraph, or [12] both of the read and unread information (or contents related to such information) of the [1] to [10] of this paragraph that has been received after a certain time.

In the case of a "messenger app," examples of the "push notification" may include, but not be limited to [1] a number of messages which may include a text, a character or a symbol, [2] information which is related to a sender or a time of reception of the message of the [1] of this paragraph, [3] a number of received image files, [4] information related to a size, a sender or a time of reception of the image file of the [3] of this paragraph, [5] a number of received voice files, or [6] information related to a sender or a time of reception of the voice file of the [5] of this paragraph. In addition, the push notification [7] may be limited to the unread information (or contents related to such information) of the [1] to [6] of this paragraph, or [8] may be related to both the read and unread information (or contents related to such information) of the [1] to [6] of this paragraph which has been received after a certain time.

In the case of an "e-mail app," examples of the "push notification" may include, but not be limited to [1] a number of e-mails which may include a character, a text or a symbol, [2] information related to a sender or a time of reception of the e-mail of the [1] of this paragraph, [3] a number of received image files, [4] information which is related to a size, a sender or a time of reception of the image file of the [3] of this paragraph, [5] a number of received voice files, [6] information related to a sender or a time of reception of the voice file of the [5] of this paragraph, [7] a number of e-mails with or without an attachment, or [8] information related to a sender or a time of reception of the e-mail of the [7] of this paragraph. Or the push notification [9] may be limited to the unread information (or contents related to such information) of the [1] to [8] of this paragraph, or [10] may be related to both the read and unread information (or content) of the [1] to [8] of this paragraph which has been received after a certain time.

For a "scheduling app," examples of the "push notification" may include, but not be limited to, [1] a number of imminent appointments, [2] information related to a location, a time or participants of the appointment of the [1] of this paragraph, [2] a number of the confirmed appointments, [4] information related to a location, a time or participants of the appointment of the [3] of this paragraph, [5] a number of confirmed appointments in which the user has failed to participate, [6] information which is related to a location, a time or an agenda of the appointment of the [5] of this paragraph, [7] a number of appointments in which a user has a special task, or [8] information related to a location or a time of the appointment of the [7] of this paragraph. Alternatively, the push information [9] may be limited to the unread information (or contents related to such information) of the [1] to [8] of this paragraph, or [10] may be related to both the read and unread information (or contents related to such information) of the [1] to [10] of this paragraph which has been received after a certain time.

In the case of an "ad displaying app," examples of such "push notification" may include, but not be limited to, [1] a number of messages which may include characters, symbols or texts related to an ad, [2] a number of image files related to an ad, [3] a number of voice files related to an ad, [4] information which is related to a sender or a time of reception of ad of the [1] to [3] of this paragraph, [5] a number of ads relates to products or services which a user has already requested or reserved, [6] information which is related to a sender or a time of reception of the ad of the [5] of this paragraph, [7] a number of ads which includes special sales offer or other benefits, [8] information related to a sender or a time of reception of the ad of the [7] of this paragraph, [9] a number of ads related to a user's preference which has been already provided by the user, [10] information related to a sender or a time of reception of the ad of the [9] of this paragraph, [11] a number of ads related to a current location of the user or a destination of the user, or [12] information related to a sender or a time of reception of such an ad of the [11] of this paragraph. Instead, the push information [13] may be limited to such unread information (or contents related to such information) of the [1] to [12] of this paragraph, or [14] may be related to both read and unread information (or contents related to such information) of the [1] to [14] of this paragraph which has been received after a certain time.

In the case of an "event notifying app," examples of the "push notification" may include, but not be limited to [1] a number of messages which is related to a certain event already selected by a user or other events similar to the certain event and which also includes a text, a symbol or a character, [2] a number of image files or voice files related to the event of the [1] of this paragraph, [3] information related to a location or a time the event of the [1] and [2] of this paragraph, [4] a number of messages which include a character, a symbol or a text and which is related to an event which can cause a certain event, i.e., which can be an economic or political cause of the event, [5] a number of images files or voice files related to the event of the [4] of this paragraph, or [6] information related to a location or a time of the event of the [4] of this paragraph. Examples of such information related to the above event may include, but not be limited to [7] information of an event related to the safety or health of the user, [8] information of an economic event related to stocks, bonds or real estate investment of a user, or [9] information of an event related to the user, user's family or user's acquaintances. Instead, such push information [10] may be limited to the unread information (or contents related to such information) of the [1] to [9] of this paragraph, or [11] may be related to both the read and unread information (or contents related to such information) of the [1] to [9] of this paragraph which has been received after a certain time.

In the case of an "alarm app," examples of the "push notification" may include, but not be limited to [1] information related to a certain time, [2] information related to a remaining time to a certain time, [3] information related to a remaining time to a certain appointment, or [4] information related to a location or an agenda of the time of the [1] to [3] of this paragraph. Or the push information [5] may be limited to the unread information (or contents related to the information) of the [1] to [4] of this paragraph, or [6] may be related to both the read and unread information (or contents related to such information) of the [1] to [4] of this paragraph which has been received after a certain time.

In the case of an "control app" for the aforementioned various electric devices or electronic devices, examples of the "push notification" may include, but not be limited to [1] a number of requests to a user for user's control or user's command requested by the device, [2] information related to a type of the control or command of the [1] of this paragraph, [3] a numeral representing the extent of completion of a certain operation which is run by the device according to such a control or command, [4] a number of a part or an operation of the device which requires the user's control, [5] a number of malfunctioning parts or operations of the device, [6] a numeral representing the operational status of the device, [7] a number of imminent control by or command from the user, or [8] a number of operations which has been run by the device for a certain period or after a certain time. Or the push information [9] may be limited to the unread information (or contents related to such information) of the [1] to [8] of this paragraph, or [10] both the read and unread information (or contents related to such information) of the [1] to [8] of this paragraph which has been received after a certain time.

As used herein, each of a sender, a receiver, and a user can drive his or her own mobile data processing terminal, and each of them is also a member of a certain group established by a certain app. As used herein, a "sender" is a member of the group of the app, and the "sender" may be a "user" of the terminal of this disclosure. In general, the sender may set up all members of the group as the receivers, and [1] may transmit an unlabeled content to all members by transmitting an unlabeled data packet to all members, or [2] may transmit a labeled content to a labeled receiver by transmitting a labeled data packet to the labeled receiver, however, may transmit an unlabeled content to the rest of the receivers of the group.

As used herein, a "receiver" is also a member of the group established by the app, and the "receiver" may be a "user" of the terminal of this disclosure. In general, the receiver may receive a content from the sender, together with the rest of the members of the group. The receiver may also be classified as the "unlabeled (or regular) receiver" or the "labeled receiver" depending on the nature of the received data packet or the received content.

As used herein, an "unlabeled (or regular) receiver" is one of the receivers. An unlabeled receiver may receive an unlabeled data packet transmitted by a sender and, therefore, may receive an unlabeled content. That is, an unlabeled receiver may receive an unlabeled data packet as well as an unlabeled content, both transmitted by the sender, under the same condition as the rest (except a labeled receiver) of the members. Therefore, unless otherwise specified, "all unlabeled receivers" of a certain group that may be established by a certain app may be deemed to be identical to "all members except a labeled receiver" of the same group.

As used herein, a "labeled receiver" is one of the receivers. The labeled receiver may receive a labeled data packet which is transmitted by a sender and, therefore, may also receive a labeled content transmitted by the sender. In one example, when a sender transmits the labeled data packet, the rest of the members of the group may receive the unlabeled data packet, but the labeled receiver may receive the labeled data packet which includes a label signal. Accordingly, unless otherwise specified, "at least one of the receivers" can be the "labeled receiver," i.e., "at least one of the members" can be the "labeled receiver." But in another example, when a sender transmits the labeled data packet, all members' terminals may receive the labeled data packet which includes the label signal [1] through the server or [2] directly from the sender's terminal. Upon confirming from a label signal that a receiver is the labeled receiver, the terminal (or app) of the labeled receiver may display the content included in the labeled data packet as a labeled content on its display unit. However, upon confirming from a label signal that a receiver is not the labeled receiver, the terminal (or app) of the unlabeled receiver may then display the content included in the labeled data packet as an unlabeled content on its display unit.

In general, this disclosure provides detailed configurational and operational features for the cases where a sender or a terminal selects a single labeled receiver. However, such configurational or operational features apply to the cases where a sender or a terminal selects multiple labeled receivers. In addition, this disclosure provides details of the transmission or the reception of the label signal according to one of two examples explained in the above paragraph. However, those two examples are similar or identical to each other, except those differences provided in the above paragraph and, therefore, may be interchangeably used.

As used herein, a "user" is a member of a group which is established by an app, and is either a sender or a receiver. Unless otherwise specified, when a user receives a content from a sender, the user is either a labeled receiver or an unlabeled receiver. That is, when a user is a receiver, depending on the types of the data packet or the presence or absence of the label signal, the user is either a labeled receiver or an unlabeled receiver, as will be explained in further detail below.

When this disclosure uses the phrase that a user transmits (or sends) a content to "all members" of a certain group, such "all members" are deemed to include all members of the group, including the user. As a result, a terminal of the user may also display such a content which the user himself transmitted. It is noted that a user's terminal may display a content which the user created on a content window of the user's terminal using various methods. The first exemplary method is a display based upon transmission. In other words, when a user creates a content and transmits the content to a server or directly to a receiver's terminal, a user's terminal may then display such a content directly on its content window. In this case, the server may transmit the same content back to the user's terminal or may not do so. The different and second exemplary method is a display based upon reception. That is, when a user creates a content and then transmits the content to a server, the server may transmit the content to all members of the group, including the user. Accordingly, the user's terminal may receive the content, and then display such a content as a sort of "received content."

Accordingly, as used herein, the phrase that "a user transmits (or sends) a content to all members of a certain group" is deemed to mean that the user transmits his own content to all members of the group, including himself, where the user's terminal may display the content on its content window using either of two methods explained in the above paragraph.

Unless otherwise specified, detailed explanations about various operations run by various terminals of this disclosure are to be provided on the perspective of the "user." However, because the user may be the sender or the receiver, such explanations hereinafter may also be understood in the perspective of the sender or the receiver.

This disclosure may classify the contents into different types based upon whether or not a certain receiver of a certain group established in a certain app is labeled as a "labeled receiver."

As used herein, an "unlabeled (or undesignated) content" means a content which may be included in an unlabeled data packet, where a sender of the unlabeled data packet may set up all members of the group as the "unlabeled receivers" and where the sender may send the content to such all members in the form of such push information. The unlabeled data packet may not include the "label signal," and [1] may include a word, a text, an image or a sound which sets up all members of the group in its content, header or tail, or [2] may not include any word, text, image or sound which may label a certain member in its content, header or tail. When a user is not a receiver of a labeled content, such a user may be [1] an unlabeled receiver of an unlabeled data packet which the sender transmits, or [2] a sender of an unlabeled content. That is, the unlabeled data packet which includes the unlabeled content may include a header, a content, and a tail, [1] where neither of the header, the content, nor the tail may include the "label signal" or [2] where the unlabeled data packet is not provided along with another data packet which includes the "label signal."

That is, the "unlabeled content" is a content which is included in a data packet not including a "label signal" and [1] which is transmitted to all members of a group after the user sets up such all members, [2] which includes a word, a text, an image or a sound that may refer to all members of the group, even when the user does not set up all members of the group as the receivers, or [3] which may not include a word, a text, an image or a sound that may label a certain member, even when the user does not set up all members as the receivers.

In contrary, the "unlabeled content" received by the user does not include the "label signal" and may correspond to the content [1] which the sender may transmit to all members of the group after setting up such all members as the receivers, [2] which may include a word, a sound or an image which may refer to all members, even when the user does not set up all members as the receivers, or [3] which may not include any word, image or sound which may label a certain member, even when the user does not set up all members of the group as the receivers.

As used herein, a "labeled (or designated) content" means a content which may be included in a labeled data packet, where a sender of the labeled data packet may set up all members of the group as the "unlabeled receivers," where the sender may create a "label signal," thereby labeling a single or multiple members of the group as the "labeled receiver," and where the sender transmits the content to such all members, including the labeled receiver in the form of such push information. The labeled data packet may include a content, a tail, a header, and a "label signal," where the labeled data packet may only include one of the header or tail. The sender of the labeled content [1] may select the labeled receiver himself, thereby creating the label signal, or [2] may create the label signal himself, thereby selecting the labeled receiver.

In contrary, even when the sender of the labeled content does not create the label signal himself, a terminal may proactively create the label signal. For example, when a sender sets up all members of the group as the receivers and transmits a content to all members, the content sender may not create the "label signal" himself. However, the content may include a "label request information" such as, e.g., [1] a name, a title or a nickname of a certain member of the group, or [2] a text, an image or a sound representing the certain member of the group. The terminal may employ various prior art information analysis algorithm in order to search for the presence of the label request information. Upon confirming such label request information from the content, the terminal may create the "label signal" and include the signal into the data packet. As a result, the terminal may create such a data packet as the "labeled data packet" and the content which is included in such a data packet becomes the "labeled content."

Once the labeled data packet is created, the sender (or terminal) may transmit the labeled content to a labeled receiver and recommend the labeled receiver to confirm the labeled content. Similarly, the labeled receiver may readily find out the labeled content labeled to him. It is noted that the user may be [1] a sender of the labeled content, [2] an unlabeled receiver but not the labeled receiver of the labeled content, or [3 the unlabeled receiver as well as the labeled receiver of the labeled content. However, as explained below, the user may be the labeled receiver but not the unlabeled receiver, depending upon the types of the data packet or the label signal.

In other words, the "labeled content" which is transmitted by a sender may be the content [1] where the sender sets up all members of a certain group as the "unlabeled receivers" and where the sender labels a certain member as the "labeled receiver," [2] where the sender sets up all members of the group as the "unlabeled receivers" and does not label any member as the "labeled receiver," however, such a content may include the "label request information," or [3] where the sender does not label any member of the group as the "labeled receiver" and where the content does not include any character, word, text, image or sound which sets up all members as the unlabeled receivers.

To the contrary, the "labeled content" which is received by the user may be the content [1] where the sender sets up all members as the "unlabeled receiver" and where the sender also labels the user as the "labeled receiver" or [2] where the sender sets up all members as the "unlabeled receivers" and does not label any member as the "labeled receiver," however the content may include the label request information.

As used herein and in the perspective of a receiver, a "partly labeled (or partly designated) content" refers to a content which may not be [1] the "labeled content" or [2] the "unlabeled content." For example and in the perspective of a sender of a certain group established by a certain app, exemplary partly labeled contents may include those contents [1] where the sender sets up all members of the group as the "unlabeled content" and where the sender labels at least one but all of such members as the "labeled receiver," [2] where the sender sets up at least one but not all of such members as the "unlabeled receivers" and where the sender also labels a certain member as the "labeled receiver," or [3] where the sender sets up multiple but not all of the members as the "unlabeled receivers" but where the sender also labels some "unlabeled members" as the "labeled receivers."

Further exemplary partly labeled contents in the perspective of a user who belongs to a certain group established by a certain app may also include those contents [1] where the user sets up all members of the group as the "unlabeled receivers" but labels some but not all of such members as the "labeled receivers," [2] where the user sets up multiple but not all members of such a group as the "unlabeled receivers" but where the sender also labels a certain unlabeled receiver as the "labeled receiver," or [3] where the user sets up some but not all members as the "unlabeled receivers" but where the sender labels multiple unlabeled receivers as the "labeled receivers."

Various exemplary aspects of this disclosure focus on cases where various contents are classified into two types, Accordingly, unless otherwise specified, the partly labeled content may be deemed as the labeled content hereinafter.

This disclosure may also classify the contents into different types based upon whether or not a receiver of a certain group established by a certain app has read or confirmed a received content. As used herein, an "unread content" refers to the content where a sender of a certain group of a certain app transmitted to a receiver but where a receiver has not run the app after receiving the content and, thus, the receiver has not read or confirmed the content. That is, the unread content is the one which a single or multiple senders transmitted to the receiver, where the unread contents may include "M" (unread) unlabeled contents and "N" (unread) labeled contents, and where "M" and "N" range from "O" to any integer.

In contrary, a "read content" refers to the content where a single or multiple senders of a certain group established by a certain app has transmitted the content to a receiver and where the receiver has run the app after receiving the content and, thus, the receiver gas read or confirmed the content. Thus, the read contents may include "M" (read) unlabeled contents and "N" (read) labeled contents, where "M" and "N" range from "O" to any integer.

As used herein, an "icon badge" refers to a badge which may represent "push notification" which may in turn be related to various push information which may be received by a certain app implemented into a terminal. Such an icon badge may represent a number of such push information or a type of such push information. For example, to represent the number of the push information, the icon badge may manipulate [1] a numeral, a character or a figure, [2] a font or a thickness of the numeral, character or figure, [3] a background, a size or a shape of such a numeral, character or figure, [4] a location, an arrangement or an orientation of the numeral, character or figure, or [5] a color, a brightness, a chroma, a transparency or an intensity of the numeral, character or figure.

To represent a substance or a type of the push information, an icon badge may similarly manipulate [1] a code numeral (e.g., a numeral "1" means a text, a numeral "2" means an image or a numeral "3" means a sound), [2] a font or a thickness of such a code numeral or character, [3] a background, a size or a shape of the code numeral, character or figure, [4] a location, an arrangement or an orientation of the character, code numeral or figure, or [5] a color, a brightness, a chroma or an intensity of the code numeral, character or figure.

As discussed above, this disclosure may also classify the contents into different types based upon whether or not a receiver of a certain group established by a certain app has read or confirmed a received content. As used herein, an "unread icon badge" refers to a badge which may represent a number, a type or a substance of unread contents in a certain group or in a certain app. As defined hereinabove, an "unread content" refers to the content where a single or multiple senders of a certain group or a certain app transmits the content to a receiver, but where the receiver has not run the app after receiving the content and, accordingly, the receiver has not read or confirmed the content. The terminal may represent the unread icon badge by various manipulating methods described heretofore and hereinafter.

In contrary and as used herein, a "read icon badge" refers to a badge which may represent a number, a type or a substance of the read contents in a certain group or in a certain app. As defined hereinabove, a "read content" refers to the content where a single or multiple senders of a certain group or a certain app transmitted a content to a receiver, and where the receiver ran the app after he has received the content and, accordingly, the receiver has read or confirmed the content. The read icon badge may represent [1] a number, a type or a substance of the contents which a receiver has read or confirmed during a certain period, [2] a number, a type or a substance of the contents which a receiver has read or confirmed out of all contents which have been transmitted by a certain sender, or [3] a number, a type or a substance of the contents which the receiver has read or confirmed out of all contents which have been transmitted by multiple members of the group. The terminal may or may not display the read icon badge. The terminal may also represent the read icon badge by various manipulating methods as described heretofore and hereinafter.

This disclosure may classify the contents into different types based upon whether or not a sender of a certain group which is established by a certain app labels a content receiver while creating or transmitting the content. For example and as used herein, an "unlabeled icon badge" means a badge which represents a number, a type or a substance of an "unlabeled content" which a sender creates or transmits without specifically labeling a labeled receiver. In contrary and as used herein, a "labeled icon badge" means a badge which represents a number, a type or a substance of a "labeled content" which a sender creates or transmits while a sender or terminal specifically labels at least one receiver as the labeled receiver. The terminal may represent the "unlabeled icon badge" or "labeled icon badge" by various manipulating methods as described hereinafter and hereinabove.

Unless otherwise specified, an "unlabeled content" and a "labeled content" are deemed to mean an "unread unlabeled content" and an "unread labeled content" in this disclosure, respectively. Similarly and unless otherwise specified, a "partly labeled content" is deemed to mean an "unread partly labeled content." Unless otherwise specified, an "unlabeled icon badge" and a "labeled icon badge" are deemed to mean an "unread unlabeled icon badge" and "unread labeled icon badge," respectively.

As used herein, a "user input" collectively refers to various inputs of various types which a user directly or indirectly provides to an input unit of a terminal by directly or indirectly manipulating at least one portion of the input unit. The user may provide the user input in many different methods. For example, a user may provide the user input [1] by using at least one body part of the user, [2] by manipulating at least one non-user object (to be simply referred to as an "object") such as, e.g., a special pen, a stylus, and the like, or [3] by employing various mechanical, electrical, magnetic, electromagnetic or acoustic methods as will be explained below.

For simplicity of illustration, the phrase that a user "provides a user input" to at least one input unit of a terminal means [1] that the user may provide the user input using at least one of his body part, [2] that the user may provide the user input by manipulating at least one object (i.e., the above non-user object) which can be recognized by various input units of a terminal, [3] that the terminal may proactively acquire (e.g., while the user is not aware of such acquisition) such biometric information of the user, or [4] that the terminal may acquire electromagnetic waves or acoustic waves which are related to the user or the non-user object.

As used herein, a "mechanical user input" may refer to a user input that may be provided to at least a portion of an input unit by a user's direct and mechanical manipulation of the portion. Examples of the mechanical user input may include, but not be limited to [1] "moving" such as, e.g., [1-1] pressing, pushing, pulling or sliding up or down or left to right, [1-2] rotating or pivoting at least a portion of the input unit about an axis of rotation, or [1-3] other manipulation of the portion, [2] "touching (or contacting)" between a user's body part and the portion of the input unit, or [3] a combination of the [1] and [2] of this paragraph.

Other examples of the mechanical user input may include user's "mechanical biometric information," where examples of the mechanical user input may include, e.g., a blood pressure or a heart rate measured in a certain position of the user, a blood flow rate measured at another certain position of the user, other cardiovascular information, a breathing rate in rest or during exercise, a respiratory flow rate, other respiratory information, or other biometric information related to skeletal or muscular body parts.

The mechanical user input may also relate to a "static feature" or a "dynamic feature" of the above mechanical user input. Examples of such a mechanical user input may include, e.g., [1] a (scalar or vector) force associated with a movement of at least a portion of an input unit or a contact between the portion of the input unit and the user's body part, [2] a (scalar or vector) velocity of such a movement, [3] a (scalar or vector) acceleration of the movement, [4] a (scalar or vector) displacement of the portion due to the movement, [5] a direction of the force, velocity, acceleration or displacement, [6] a direction of the contact, [7] a duration of the [1] through [6] of this paragraph, [8] a number (of applications) of the repetition of the [1] to [6] of this paragraph, [9] a temporal overlap between at least two of the [1] to [6] of this paragraph, or [10] a temporal gap between two of the [1] to [6] of this paragraph.

The mechanical user input may also include a "mechanical property" of a user's body part or that of a non-user object which is used to provide the mechanical user input to the portion of the input unit, where examples of such mechanical user input may include, e.g., an elasticity, a roughness, various moduli, or the like. An amplitude or a frequency of a force exerted onto a sensor of an input unit is also an example of this mechanical user input.

As used herein, an "electrical user input" is an electrical signal which is provided to at least a portion of an input unit capable of receiving such a user input. For example, a user may use [1] a non-user object (e.g., a special pen, a wearable device or other portable devices) to generate and provide a direct current (DC) or alternating current (AC) electrical signal to the input unit, or [2] another terminal so as to generate and provide the electrical signal. A user may also provide electrical biometric information of his body part as the electrical user input, where examples of such electrical user inputs may include, but not be limited to, an electrocardiogram (ECG), an electromyogram (EMG), an electroencephalogram (EEG), or any other electrical signals measured in a certain position of the body.

The electrical user input may also relate to a "static feature" or a "dynamic feature" of the electrical user input. Examples of this electrical user input may include, e.g., [1] an electrical current, [2] an electrical voltage, [3] an electrical power, [4] a magnitude or an amplitude of the [1] to [3] of this paragraph, [5] a phase angle of such [1] to [3], [6] a phase lag of such [1] to [3], [7] a frequency of such [1] to [3], [8] a wave-length of such [1] to [3], or [9] a (scalar or vector) flux of such [1] to [3]. The electrical user input may further include an "electrical property" of a user's body part or a non-user object which is used to provide the electrical user input to a proper portion of the input unit, where examples of the electrical user input may include various electrical properties of the body part or the object such as a resistivity, a conductivity, a capacitance, a permittivity, a dielectric property or a thermoelectricity, where such electrical properties may be measured in a constant (or dynamic) electric or magnetic field. A fingerprint of a user monitored by a capacitive sensor of a capacitive input unit is an example of this electrical user input.

As used herein, a "magnetic user input" is a magnetic signal provided to at least one portion of an input unit capable of receiving such a magnetic user input. For example, a user may employ [1] a non-user object such as a special pen, a wearable device or other portable devices to provide a direct current (DC) or alternating current (AC) magnetic signal to the input unit, or [2] another terminal for providing the magnetic signal. A user may also provide various magnetic biometric information of his body part as the magnetic user input, where examples of such magnetic user inputs may be a magnetocardiogram (MCG), a magnetoencephalogram (MEG), a magnetomyogram (MMG), or any other magnetic signals measured in a certain position of the body.

The magnetic user input may also relate to a static feature or a dynamic feature of the magnetic user input. Examples of such magnetic user inputs may include a magnitude of its magnetic B-field or H-field, its direction, a number or a property of magnetic poles, a phase angle, a phase lag, a frequency, a wave-length, or a (scalar or vector) flux. The magnetic user input may include a "magnetic property" of a user's body part or a non-user object which is employed to provide the magnetic user input to the portion of the input unit. Examples of such magnetic user input may include, e.g., various magnetic properties such as, e.g., a magnetic polarity, a magnetic permeability or a magnetic susceptibility. Such magnetic properties may be measured in a constant (or dynamic) electric or magnetic field.

As used herein, an "electromagnetic user input" is various electromagnetic waves emitted to at least a portion of an input unit which may be able to receive the electromagnetic user input. For example, a user may employ various portable devices which may be implemented to or synchronized with various articles and which may provide the electromagnetic waves having various frequencies. Examples of the above articles may include [1] a special pen or stylus, [2] a watch, [3] a wearable device such as, e.g., glasses, a goggle, a lens, an arm band or a head band, each of which may be implemented with an electrical device, [4] a wearable accessory such as, e.g., a lens, a hat, glasses, a goggle, a head band, an ear plug, a mask, a glove or a belt, or [5] a wearable ornament such as, e.g., an artificial fingernail, a ring, a bracelet, an arm band, a necklace, an earring, a pendant or a brooch. Or the user may provide the electromagnetic waves using other terminals.

The user may also provide an "image" of a body part (e.g., a face, an eye, an iris, a retina, an ear or a nose) or an "image" of a non-user object to the input unit, where such images may be provided to the input unit in a frequency range of the visible electromagnetic waves, UV rays, IR rays, or other electromagnetic waves of specific frequency ranges. The electromagnetic user input may be provided as still images, video clips, or a combination thereof, When the electromagnetic user input is provided in the visible wave range, that user input may be regarded as an "optical user input."

The "electromagnetic user input" may correspond to an image of a user's body part, where the image may be acquired by a camera, a CCD (i.e., charge-coupled device), or other hardware elements of the terminal capable of acquiring such images. For example, when the hardware element may capture [1] the sunlight or light from an illumination device which is reflected by a body part of the user or [2] the light which is emitted from the terminal but reflected from the body part, such lights may be deemed as the image of this paragraph and, therefore, such lights are also deemed as the electromagnetic user input. In addition, such lights may be the visible light ways, IR light or UV light, each of which may be provided with or without a color filter, or each of which may or may not be polarized.

The electromagnetic user input may also relate to a static feature or a dynamic feature of the electromagnetic waves. Examples of such electromagnetic user inputs may include a magnitude of such waves, their phase angle, the phase lag, the wave-length, the frequency or the (scalar or vector) flux. When the electromagnetic user input relates to the above images, examples of such electromagnetic user inputs may include a color (e.g., its hue, color value or intensity) of such images, their contrast, their sizes, figures or substances included in such images, arrangement of such images or orientation of such images.

As used herein, an "acoustic user input" refers to "acoustic waves" emitted to at least a portion of an input unit capable of receiving the acoustic user input. For example, a user may provide the acoustic waves by [1] using various non-user objects such as, e.g., a certain pen, various wearable devices, wearable accessories, wearable ornaments or other non-user objects portably which can be worn by a user, or [2] using another terminal. The user may provide the input unit with his voice or body sound using his body parts such as, e.g., clapping, finger snaps, or the like. The user may provide a "non-user sound" to the input unit, where such sound may be in a range of audible, ultrasonic or other specific frequency ranges.

The acoustic user input may also relate to a static feature or a dynamic feature of the acoustic user input. Examples of this acoustic user input may include a magnitude of such a wave, its phase angle, its phase lag, its wave-length, its frequency, or its (scalar or vector) flux. When the acoustic user input relates to the user's voice or body sound, examples of this acoustic user input may also include a duration, a tone, an envelope or a location of a source thereof.

In addition to the above, the mechanical, electrical, magnetic, electromagnetic or acoustic user input may also include temporal changes of any of such user inputs such as, e.g., a change in a movement pattern over time, a temporal change in an intensity of force exerted to the input unit over time, or the like. The user input may also include spatial changes of the above user inputs such as, e.g., a change in positions of contact between the user's body part and an input unit, a change in distribution of force applied to a certain area of an input unit, or the like.

As used herein, a "user interface" may be abbreviated as a "U/I" hereinafter. Such U/I's may include [1] a graphic U/I, [2] a touch U/I, [3] a text-based U/I, [4] a direct manipulation U/I, [5] a web-based U/I, [6] a command line U/I, [7] a hardware U/I, [8] a firmware U/I, [9] an attentive U/I, [10] a batch U/I, [11] a conversational U/I, [12] a crossing-based U/I, [13] a gesture U/I, [14] a hologram U/I, [15] a motion-tracking U/I, [16] a multi-screen U/I, or [17] a reflective U/I. The following portion of this disclosure primarily relates to various exemplary configuration or methods using the graphic U/I or the touch U/I. But such configurations or methods may equally apply to other terminals which employ other U/Is provided in this paragraph.

As used herein, a "software element" of a terminal collectively refers to an operating system (to be abbreviated as an "O/S"), a (software) application, a computer command, a computer program, and a set of computer programs. As used herein, a "software application" or an "app" is one of the above software elements of a terminal, and refers to a computer command or a set of computer programs which are specifically designed to run a certain operation or to perform a certain function. The app may be driven (or run) by a CPU unit, the O/S or by a different app. By driving the app, the user or the terminal may run a certain operation or perform a certain function. In addition, driving an app may allow the user or the terminal to drive at least one hardware element of the terminal.

The "app" is deemed to not a part of the O/S and, therefore, the "app" is deemed to be different from the O/S throughout this disclosure. A manufacturer or a distributor of the terminal may download at least one app to the terminal before the sale of the terminal. Or a user may download at least one app to the terminal after purchase. In addition, the O/S, terminal or an app which is already implemented to the terminal may download a new app from an external memory device, an external website, or the like.

4. Detailed Aspects

The No. 1 detailed aspect of this disclosure relates to an app, where a sender creates and then transmits a content, where a receiver receives the content wirelessly with a data processing terminal which includes a display unit, where a sender labels at least one content and transmits the labeled content to a receiver while labeling the receiver as a labeled receiver, where a terminal wirelessly receives the content, and where the app displays such content on the display unit. The app may display a $1^{st}$ numeral along with its own app icon on the display unit, where the $1^{st}$ numeral may represent the number of unread contents which have been received but have not been read or confirmed by the receiver. The app may display a $2^{nd}$ numeral along with the app icon and the $1^{st}$ numeral on the display unit, where the sender has labeled some unread contents as the labeled contents, where the $2^{nd}$ numeral may represent the number of such labeled contents, and where the $1^{st}$ numeral may not be less than the $2^{nd}$ numeral. Therefore, the receiver may easily find out the number of the unread contents simply from the $1^{st}$ numeral, and may also easily find out the number of such labeled contents (included in the unread contents) simply from the $2^{nd}$ numeral.

The No. 2 detailed aspect of this disclosure relates to an app, where a sender creates multiple contents and transmits them to a receiver, where the sender may transmit at least one of such contents as a labeled content which labels at least one receiver as a labeled receiver, where the receiver may wirelessly receive the content using a data processing terminal which includes a display unit, and where the app may display the contents on the display unit. In particular, the app may display a $1^{st}$ numeral along with its own app icon on the display unit, where the $1^{st}$ numeral represents a number of the unread contents which have been received by a receiver but which have not been read (or confirmed). The app may also display a $2^{nd}$ numeral along with the app icon and the $1^{st}$ numeral on the display unit, where the $2^{nd}$ numeral which represents the number of such labeled contents which are included in such unread contents, and where the $1^{st}$ numeral is not less than the $2^{nd}$ numeral. Accordingly, the receiver may easily find out the number of such unread contents as well as the number of such labeled contents included in such unread contents, respectively, simply from the $1^{st}$ numeral and the $2^{nd}$ numeral.

In the above No. 1 or No. 2 detailed aspects, the app may display the $1^{st}$ numeral or the $2^{nd}$ numeral inside or around the app icon. The app may be implemented (or downloaded) into the terminal, into a server which may communicate with the terminal, or into a cloud storage which may communicate with the terminal. The app may display the $1^{st}$ numeral in a shape, a size, a color, a font, a background, a position or an orientation at least one of which is different from that of the $2^{nd}$ numeral. The app may display the $1^{st}$ numeral below or on the right side of the $2^{nd}$ numeral.

The No. 3 detailed aspect of this disclosure relates to an app, where a sender creates and transmits a content, where a receiver receives the content wirelessly using his data processing terminal which includes a display unit, where the sender may label as a labeled content which may in turn label the receiver as the labeled receiver, and where the app displays the content on the display unit when the terminal receives the content wirelessly. More particularly, when there exists at least one unread content which the app has received but which the receiver has not yet confirmed (or read), the app displays an unread icon badge along with its own app icon on the display unit. The app may also display the $1^{st}$ numeral along with the app icon on the display unit, where the $1^{st}$ numeral represents the number of such unread contents. When the unread contents includes at least one labeled content, the app may also display a labeled icon badge along with the unread icon badge on the display unit.

In addition, the app displays the $2^{nd}$ numeral along with the labeled icon badge on the display unit, where the $2^{nd}$ numeral represents the number of the labeled contents and where the $1^{st}$ numeral is not less than the $2^{nd}$ numeral. Therefore, the receiver may readily find out the number of such unread contents and the number of such labeled contents which are included in such unread contents, respectively, simply from looking at the $1^{st}$ and $2^{nd}$ numerals.

The No. 4 detailed aspect of this disclosure relates to an app, where a sender creates multiple contents and transmits them to a receiver, where the sender may transmit at least one of such contents in the form of a labeled content which may label the receiver as a target for reception, where the sender may receive the content wirelessly using his data processing terminal including a display unit, and where the app may display such contents on the display unit. More particularly, the app may display an unread icon badge along with its own app icon on the display unit when there exists at least one unread content which has been received by the app but which has not been read by the receiver. The app may also display the $1^{st}$ numeral along with the unread icon badge on a display unit, where the $1^{st}$ numeral may represent the number of such unread contents. The app may similarly display a labeled icon badge along with the app icon on the display unit when the unread contents may include at least one labeled content. The app may also display the $2^{nd}$ numeral along with the labeled icon badge on the display unit, where the $1^{st}$ numeral is not less than the $2^{nd}$ numeral and where the $2^{nd}$ numeral represents the number of the labeled contents. Accordingly, the receiver may easily find out the number of such unread contents from the $1^{st}$ numeral as well as may easily find out the number of the labeled contents included in the unread contents from the $2^{nd}$ numeral.

In the above No. 3 or No. 4 detailed aspects, the app may display the unread icon badge or the labeled icon badge around or inside the app icon. The app may respectively display the $1^{st}$ numeral or the $2^{nd}$ numeral around or inside the unread icon badge or the labeled icon badge. The app may be implemented (or downloaded) into the terminal, into a server which may communicate with the terminal, or into a cloud storage which may communicate with the terminal. The app may display the $1^{st}$ numeral in a shape, a size, a background, a color, a font, a position or an orientation at least one of which may be different from that of the $2^{nd}$ numeral. The app may also display the $1^{st}$ numeral below or on the right side of the $2^{nd}$ numeral.

The No. 5 detailed aspect of this disclosure relates to an app, where a sender may create a $3^{rd}$ plurality of contents and a $2^{nd}$ plurality of label signals, may include such contents into each of a 1st plurality of data packets, and may then transmit such data packets to a receiver, where the $3^{rd}$ plurality is not less than the $2^{nd}$ plurality. The sender may also transmit the $2^{nd}$ plurality of data packets in the format of the labeled data packets each of which may include the label signal and at least one of such contents, where the $1^{st}$ plurality is not less than the $2^{nd}$ plurality. When a receiver receives the $1^{st}$ plurality of data packets using a data processing terminal with a display unit, the app may display such contents included in the data packets on the display unit. More particularly, the app may be implemented (or downloaded) into the terminal of a receiver or into a server which may receive the $1^{st}$ plurality of such data packets from the sender and which may then transmit such data packets to the receiver. The app may display the $1^{st}$ numeral representing the $1^{st}$ plurality, the $2^{nd}$ numeral representing the $2^{nd}$ plurality, and its own app icon on the display unit. As a result, the receiver may readily find out the total number of the data packets received by the receiver from the $1^{st}$ numeral, and may as well find out the number of such labeled data packets from the $2^{nd}$ numeral.

The No. 6 detailed aspect of this disclosure relates to an app, where a sender creates a 3rd plurality of contents and a $2^{nd}$ plurality of label signals and transmits a $1^{st}$ plurality of data packets each of which includes at least one of such contents, where the 3rd plurality is not less than the $2^{nd}$ plurality. The sender may transmit the $2^{nd}$ plurality of such data packets to a receiver in the format of a labeled data packet, where each labeled data packet includes the label signal and at least one of such contents, and where the $1^{st}$ plurality is not less than the $2^{nd}$ plurality, and where the app may display such contents which are included in the $1^{st}$ plurality of the data packets. More particularly, the app may be implemented (or downloaded) into the terminal of a receiver or into a server which may receive the $1^{st}$ plurality of such data packets from the sender and then may transmit such data packets to the receiver. When the terminal wirelessly receives the $1^{st}$ plurality of the data packets, the app may display the contents which are included in such data packets on the display unit, and may also display the $1^{st}$ numeral representing the $1^{st}$ plurality and the $2^{nd}$ numeral representing the $2^{nd}$ plurality on the display unit, along with its own app icon. As a result, the receiver may readily find out the number of all received data packets from the $1^{st}$ numeral, as well as finding out the number of the labeled data packets from the $2^{nd}$ numeral.

In the above No. 5 or No. 6 detailed aspects, the app may display the $1^{st}$ or $2^{nd}$ numeral around or inside the app icon. The app may display the $1^{st}$ numeral in a shape, a size, a color, a font, a background, a position or in an orientation at least one of which may be different from that of the $2^{nd}$ numeral. The app may display the $1^{st}$ numeral below or on the right side of the $2^{nd}$ numeral.

The No. 7 detailed aspect of this disclosure relates to an app, where a sender may create a 3rd plurality of contents and a $2^{nd}$ plurality of label signals, and may transmit such contents to a receiver by including at least one of such contents into each of a $1^{st}$ plurality of data packets, where the 3rd plurality is not less than the $2^{nd}$ plurality. The sender may transmit the $2^{nd}$ plurality of data packets to the receiver in the format of the $2^{nd}$ plurality of labeled data packets, where each labeled data packet may include the label signal and at least one of such contents, and where the $1^{st}$ plurality is not less than the $2^{nd}$ plurality. When the receiver wirelessly receives the $1^{st}$ plurality of data packets with a data processing terminal including a display unit, the app may display such contents included in such data packets on the display unit. More particularly, the app may be implemented (or downloaded) into the terminal of the receiver or into a server which may receive the $1^{st}$ plurality of data packets and then may transmit such data packets to the receiver. When the $1^{st}$ plurality is not zero ("0"), the app may display an unread icon badge along with its own app icon on the display unit, and may also display the $1^{st}$ numeral representing the $1^{st}$ plurality along with the unread icon badge on the display unit. When the $2^{nd}$ plurality is not zero ("0"), the app may display a labeled icon badge along with the unread icon badge on the display unit, and may also display the $2^{nd}$ numeral representing the $2^{nd}$ plurality along with the labeled icon badge on the display unit. As a result, simply by looking at the $1^{st}$ numeral or the $2^{nd}$ numeral, the receiver may easily find out the number of all received data packets or the number of the labeled data packets, respectively.

The No. 8 detailed aspect of this disclosure relates to an app, where a sender may create multiple contents and multiple label signals, and may transmit multiple unread data packets to a receiver, where each unread data packet includes at least one of such contents. The sender may also transmit at least one of such unread data packets in the format of a labeled data packet to the receiver, where the labeled data packet includes the content as well as the label signal. When the receiver wireless receives such multiple unread data packets with his data processing terminal which includes a display unit, the app may display such contents included in the unread data packets. More particularly, the app may be implemented (or downloaded) into the terminal of the receiver or into a server which may receive such data packets from the sender and then may transmit such data packets to the receiver. Upon receiving the unread data packets, the app may display an unread icon badge along with its app icon on the display unit. Upon obtaining the number of such unread data packets, the app may also display the $1^{st}$ numeral along with the unread icon badge on the display unit. When there exists at least one labeled data packet in the unread data packets, the app may display a labeled icon badge on the display unit. Upon obtaining the number of such labeled data packets, the app may also display a $2^{nd}$ numeral along with the labeled icon badge on the display unit, where the $2^{nd}$ numeral represents the number of such labeled data packets. As a result, just by looking at the $1^{st}$ or $2^{nd}$ numeral, the receiver may readily find out the number of all received data packets or the number of the received labeled data packets.

In the above No. 7 or No. 8 detailed aspects, the app may display the unread icon badge or the labeled icon badge around or inside the app icon. The app may display the $1^{st}$ (or $2^{nd}$) number around or inside the unread icon badge (or labeled icon badge). The app may display the $1^{st}$ number in a shape, a size, a color, a font, a background, a position or in an orientation at least one of which may be different from that of the $2^{nd}$ number. The app may display the $1^{st}$ number below or on the right side of the $2^{nd}$ number.

The No. 9 detailed aspect of this disclosure relates to an app, where the app is implemented (or downloaded) to a data processing terminal which may include a display unit and a reception unit, and where the app extracts a content from a data packet when the reception unit receives the data packet. In particular, the app may extract multiple unread contents from multiple unread data packets which a receiver has received after the receiver finished running the app and, therefore, the receiver has not confirmed or read. The app then obtains the number of such unread contents. When the unread data packet includes the content as well as a label signal, the app obtains the number regards the content as a labeled content and obtains the number of such labeled contents. The app may then display its app icon, the $1^{st}$ numeral which represents the number of such unread contents, and the $2^{nd}$ numeral which represents the number of such labeled contents. As a result, the receiver may easily find out the number of such unread contents as well as the number of the labeled contents included in the unread contents, simply from the $1^{st}$ numeral and the $2^{nd}$ numeral, respectively. The app may directly count (or calculate) the number of such unread contents or the number of such labeled contents. Alternatively, the app may receive such numbers from the server.

The No. 10 detailed aspect of this disclosure relates to an app which may be implemented (or downloaded) into a data processing terminal including a display unit and a reception unit, and which may extract a content from a data packet when the reception unit of the terminal receives the data packet. In particular, the app may extract multiple unread contents from multiple unread data packets which a receiver has received after the receiver finished running the app and, therefore, the receiver has not confirmed or read. The app then obtains the $1^{st}$ number of such unread contents. When the unread data packet includes the content as well as a label signal, the app regards the content as a labeled content and obtains the $2^{nd}$ number of such labeled contents. The app may display its app icon, an unread icon badge representing the presence of such unread contents, the $1^{st}$ numeral representing the $1^{st}$ number, a labeled icon badge representing the presence of the labeled contents, and the $2^{nd}$ numeral representing the $2^{nd}$ number, on a screen which may be an off screen, a lock screen or an unlock screen. As a result, the receiver may easily find out the number of such unread contents as well as the number of the labeled contents included in the unread contents, simply from the $1^{st}$ numeral and the $2^{nd}$ numeral, respectively.

In the above No. 9 or No. 10 detailed aspects, the app may display the $1^{st}$ numeral (or unread icon badge) or the $2^{nd}$ numeral (or labeled icon badge) around or inside the app icon. The app may display the $1^{st}$ numeral in a shape, a size, a color, a font, a background, a position or an orientation at least one of which may be different from that of the $2^{nd}$ numeral. The app may directly count the number of the unread data packets or the number of the labeled data packets, or the app may receive such numbers from the server.

The No. 11 detailed aspect of this disclosure relates to a data processing terminal including a reception unit, a display unit, and an O/S. More particularly, the reception unit receives multiple 3rd data packets directed to an app implemented (or downloaded) into the terminal, where each of the $3^{rd}$ data packets includes a 3rd content but does not include a label signal. The reception unit also receives multiple $2^{nd}$ data packets directed to the app, where each of the $2^{nd}$ data packets includes a $2^{nd}$ content and the label signal. The O/S may extract the 3rd or $2^{nd}$ content respectively from the $3^{rd}$ or $2^{nd}$ data packet, may respectively count the 3rd number or $2^{nd}$ number of such 3rd contents or $2^{nd}$ contents, and may calculate the $1^{st}$ number which is the sum of the $1^{st}$ and $2^{nd}$ numbers. The O/S may then display an app icon of the app, the $1^{st}$ numeral representing the $1^{st}$ number, and the $2^{nd}$ numeral representing the $2^{nd}$ number on the display unit.

The No. 12 detailed aspect of this disclosure relates to a data processing terminal which includes a reception unit, a display unit, and an O/S. The reception unit receives 3rd multiple contents and $2^{nd}$ multiple label signals. The O/S may implement (or download) a certain app to the terminal, may count the 3rd number representing the number of such contents whenever the reception unit receives the content, may count the $2^{nd}$ number representing the number of such label signals whenever the reception unit receives the label signal, and may count a $1^{st}$ number which is the sum of the 3rd number and the $2^{nd}$ number. The O/S may display an app icon of the app, and a $1^{st}$ numeral representing the $1^{st}$ number, and a $2^{nd}$ numeral representing the $2^{nd}$ number on the display unit.

In the above No. 11 or No. 12 detailed aspects, the O/S may display the $1^{st}$ numeral or the $2^{nd}$ numeral around or inside the app icon. The O/S may display the $1^{st}$ numeral in a shape, a size, a color, a font, a background, a position or an orientation at least one of which may be different from that of the $2^{nd}$ numeral. The O/S may display the $1^{st}$ numeral below or on the right side of the $2^{nd}$ numeral. Or the O/S may display the $2^{nd}$ numeral along with the $1^{st}$ numeral and the 3rd numeral on the display unit.

The No. 13 detailed aspect of this disclosure relates to a data processing terminal which includes a reception unit, a display unit, and an O/S, and which may receive a data packet transmitted by a server using the reception unit. In particular, the reception unit may receive the 3rd data packets and the 3rd number directed to a certain app implemented (or downloaded) into the terminal. Each of the $3^{rd}$ data packets may include a 3rd content but may not include a label signal, where the 3rd number represents the number of such 3rd contents. The reception unit may also receive the $2^{nd}$ data packets and the $2^{nd}$ number directed to the app, where each of the $2^{nd}$ data packets may include a $2^{nd}$ content and the label signal. The O/S may extract the 3rd content and the $2^{nd}$ content respectively from the $3^{rd}$ data packet and the $2^{nd}$ data packet. When the O/S obtains the $1^{st}$ number which is the sum of the $3^{rd}$ number and the $2^{nd}$ number, the O/S may display an app icon of the app, the $1^{st}$ numeral representing the $1^{st}$ number, and the $2^{nd}$ numeral representing the $2^{nd}$ number.

The No. 14 detailed aspect of this disclosure relates to a data processing terminal which includes a reception unit, a display unit, and an O/S and which may receive a content transmitted by a server using the reception unit. More particularly, the reception unit may receive 3rd multiple contents a 3rd number representing the number of such contents directed to a certain app implemented (or downloaded) to the terminal. The reception unit may receive $2^{nd}$ multiple label signals directed to the app as well as the $2^{nd}$ number representing the number of such label signals. The O/S may obtain the $1^{st}$ number which is the sum of the 3rd number and the $2^{nd}$ number, and may display an app icon of the app along with the $1^{st}$ numeral representing the $1^{st}$ number, and the $2^{nd}$ numeral representing the $2^{nd}$ number.

In the above No. 13 or No. 14 detailed aspects, the O/S may display the $1^{st}$ or $2^{nd}$ numeral around or inside the app icon. The O/S may display the $1^{st}$ numeral in a shape, a size, a color, a font, a background, a position or an orientation at least one of which may be different from that of the $2^{nd}$ numeral. The O/S may display the $1^{st}$ numeral below or on the right side of the $2^{nd}$ numeral. The O/S may display the $2^{nd}$ numeral along with the $3^{rd}$ and $2^{nd}$ numerals on the display unit. The O/S may count the $2^{nd}$ or $1^{st}$ number, or may receive the $2^{nd}$ or $1^{st}$ numeral from the server.

The No. 15 detailed aspect of this disclosure relates to a data processing terminal including a display unit and implemented (or downloaded) with a certain app. The terminal may display an app icon of the app, an unread icon badge, and a labeled icon badge on an off screen, on a lock screen in a lock state, or on a home screen on an unlock state. The app icon is a user interface of the app, and a user may run the app when the user provides a user input to the user interface. The unread icon badge may display a number, a substance or a type of unread contents on the display unit, where the terminal has received such unread contents after the user finally terminated running the app and, therefore, which the user has not read or confirmed. The labeled icon badge may display a number, a substance or a type of the unread labeled contents on the display unit, where the labeled content is the content which a sender labels the user as the labeled receiver. On the display unit, the terminal may display the unread icon badge or the labeled icon badge around or inside the app icon.

The No. 16 detailed aspect of this disclosure relates to a data processing terminal which includes a display unit and which is implemented or downloaded with at least one app. The terminal may display an app icon of the app, an unread icon badge, and a labeled icon badge on the display unit, i.e., on an off screen, on a lock screen in a lock state or on a home screen in an unlock state. The app icon may be a user interface of the app and, therefore, the terminal may run the app when a user provides a user input to the app icon. The unread icon badge may display a number, a substance or a type of unread contents on the display unit, where the unread contents are the contents which the terminal has received after a user finished running the app and, therefore, which the user has not confirmed or read. The labeled icon badge may display a number, a substance or a type of unread labeled contents on the display unit, where the labeled contents are included in the unread contents. In addition, the terminal may display the unread icon badge or the labeled icon badge around or inside the app icon.

In the above No. 15 or No. 16 detailed aspects, the substance of the content may be a name of a sender, a sender's nickname, a sender's ID, a sender's title, a sender's organization, importance of the content, or the like. The content type may be a text, a symbol, a number, a figure, a still image, a dynamic image, or the like. The terminal may display [1] a numeral representing the number, [2] a symbol or a figure representing the substance, [3] a symbol representing the type, or [4] a figure representing the type on a display unit, while also displaying at least one of such icon badges. The terminal may display at least one of such icon badges around or inside the app icon. The labeled icon badge may represent the number of such unread labeled contents, and the terminal may display the number of such labeled contents around or inside the labeled icon badge. The terminal may directly count the number of such unread contents or the number of the labeled contents. The server may receive the labeled contents transmitted by the sender, and may then transmit such labeled contents as well as the number of such labeled contents to the terminal. After receiving the number of the labeled contents, the terminal may display such a number on the display unit.

The No. 17 detailed aspect of this disclosure relates to a data processing terminal which includes a display unit and which is implemented or downloaded with at least one app. More particularly, the terminal may display an app icon of the app on the display unit in an off state, in a lock state or in an unlock state, where the app icon is a user interface of the app. The terminal may display a $1^{st}$ number around or inside the app icon, where the $1^{st}$ number represents a number, a substance or a type of unread contents which the terminal has received after a user finally finished running the app and, therefore, which the user has not confirmed or read. The terminal may display the $2^{nd}$ number representing a number, a substance or a type of certain contents in a position which is different from that of the $1^{st}$ number.

The No. 18 detailed aspect of this disclosure relates to an app which is implemented (or downloaded) into a data processing terminal which includes a display unit. More particularly, the app may display an app icon of an app on the display unit in an off state, a lock state or an unlock state, where the app icon is a user interface of the app. The app may display a $1^{st}$ number around or inside the app icon, where the $1^{st}$ number represents a number, a substance or a type of contents which the app has received after the user terminated running the app and, therefore, which the user has not confirmed or read. The app may display the $2^{nd}$ number representing a number, a substance or a type of certain contents in a position which is different from that of the $1^{st}$ number.

In the above No. 17 or No. 18 detailed aspects, the substance of the content may be a name of a sender, a sender's nickname, a sender's ID, a sender's title, a sender's organization, importance of the content, or the like. The content type may be a text, a symbol, a number, a figure, a still image, a dynamic image, or the like. The terminal (or app) may display the $1^{st}$ numeral or the $2^{nd}$ numeral around or inside the app icon. The terminal (or app) may directly count the number of such unread contents or the number of such labeled contents. The server may receive such contents transmitted by the sender, and may then transmit such contents, the $1^{st}$ number, and the $2^{nd}$ number to the terminal (or app). The terminal may then display the $1^{st}$ number and the $2^{nd}$ number on the display unit.

The No. 19 detailed aspect of this disclosure relates to a method of displaying a $1^{st}$ number and a $2^{nd}$ number with an app implemented or downloaded into a terminal with a display unit, where the 1st number may represent a number of unread contents which a sender has transmitted but a receiver has not confirmed or read, and where the $2^{nd}$ number may represent a number of unread labeled contents which the sender labeled the user as the labeled receiver. The method may include a receiving step of receiving the unread contents transmitted by the sender; a $1^{st}$ number counting step of increasing the $1^{st}$ number by one ("1") as receiving the unread content; a label signal confirming step of confirming whether a label signal is also received along with the unread content; a $2^{nd}$ number counting step of increasing the $2^{nd}$ number by one ("1") as receiving the label signal; and a displaying step of displaying the app icon, the $1^{st}$ number, and the $2^{nd}$ number on an off screen, a lock screen or an unlock screen of the terminal.

The No. 20 detailed aspect of this disclosure relates to an app implemented (or downloaded) into a data processing terminal which includes a display unit and, more particularly, relates to a method of classifying unread contents into unread labeled contents and unread unlabeled contents and then displaying a number of unread contents and a number of labeled contents which are included in such unread contents, where such unread contents are the contents which are received by the app from a sender but which a receiver has not yet confirmed or read. The method may include a receiving step of receiving data packets which include such unread contents transmitted by the sender; a $1^{st}$ number counting step of increasing the number of the unread contents by one ("1") upon receiving a new data packet; a label signal confirming step of confirming whether the data packet includes a label signal; a $2^{nd}$ number counting step of increasing the $2^{nd}$ number by one ("1") upon confirming the label signal; and a displaying step of displaying an app icon of the app, the $1^{st}$ number, and the $2^{nd}$ number on an off screen, a lock screen or an unlock screen provided on the display unit.

In the above No. 19 or No. 20 detailed aspects, the $1^{st}$ number counting step or the $2^{nd}$ number counting step may include an initialization step of initializing the $1^{st}$ and $2^{nd}$ numbers as zero ("0") after a user finished running the app and before increasing the $1^{st}$ and $2^{nd}$ numbers by one ("1"). The displaying step may include the step of displaying the $1^{st}$ or $2^{nd}$ number around or inside the app icon. The displaying step may include the step of displaying the $1^{st}$ number in a shape, a size, a color, a font, a background, a position or an orientation at least one of which is different from that of the $2^{nd}$ number. The receiving step may include the steps of transmitting such unread contents (or data packets including such unread contents) by the sender to a server; and transmitting such unread contents (or data packets including such unread contents) by the server to the user.

The No. 21 detailed aspect of this disclosure relates to a data processing terminal which may receive $1^{st}$ plurality of contents as well as $2^{nd}$ plurality of label signals transmitted by a sender through a certain app and received by a server, and relates to a method of displaying a $1^{st}$ number of such contents and a $2^{nd}$ number of such label signals on a display unit of a terminal which is implemented (or downloaded) with an app. The method may include a receiving step of receiving such contents and label signals from the server; a $1^{st}$ number counting step of replacing the 1st number by a new number which is greater than the $1^{st}$ number by one ("1") upon receiving each of such contents; a $2^{nd}$ number counting step of replacing the $2^{nd}$ number by another new number which is greater than the $2^{nd}$ number by one ("1") upon receiving each of such label signals along with the contents; and a displaying step of displaying an app icon of the app, the $1^{st}$ number, and the $2^{nd}$ number on an off screen, a lock screen or an unlock screen provided on the display unit.

The No. 22 detailed aspect of this disclosure relates to a data processing terminal which may receive a $1^{st}$ plurality of contents and a $2^{nd}$ plurality of label signals from a server which in turn has received such contents and label signals from a sender through a certain app and which has then transmitted such contents and label signals to the terminal. In particular, this No. 22 detailed aspect relates to a method of displaying the $1^{st}$ number of unread contents and the $2^{nd}$ number of unread labeled contents on a display unit, where the terminal may include the display unit and may be implemented (or downloaded) with app, where the terminal may classify the unread contents into the unread labeled contents and the unread unlabeled contents, and where the unread contents are those contents which the terminal has received from the server but which the user has not confirmed or read. The method may include a receiving step of receiving such data packets which includes the unread contents with the terminal from the server; a $1^{st}$ number counting step of increasing the 1st number by one ("1") whenever the terminal receives the data packet; a label signal confirming step of checking whether the data packet includes the label signal; a $2^{nd}$ number counting step of increasing the $2^{nd}$ number by one ("1") as confirming the label signal; and a displaying step of displaying an app icon of the app, the $1^{st}$ number, and the $2^{nd}$ number on an off screen, a lock screen or an unlock screen provided on the display unit.

In the above No. 21 or No. 22 detailed aspects, the $1^{st}$ number or $2^{nd}$ number counting step may include an initializing step of setting the $1^{st}$ and $2^{nd}$ numbers as zero ("0") after the user has stopped running the app and before increasing the $1^{st}$ and $2^{nd}$ numbers by one. The displaying step may include the step of displaying the $1^{st}$ or $2^{nd}$ number around or inside the app icon. The displaying step may include the step of displaying the $1^{st}$ number in a shape, a size, a color, a font, a background, a position or an orientation at least one of which is different from that of the $2^{nd}$ number.

The No. 23 detailed aspect of this disclosure relates to a method of displaying a $1^{st}$ number and a $2^{nd}$ number on a display unit of a data processing terminal which includes the display unit and which is implemented (or downloaded) with a certain app, and which may receive a $1^{st}$ plurality of contents and a $2^{nd}$ plurality of label signals from a server, where the server has received such contents and label signals from a sender through the app, and where the terminal may receive such contents, label signals, a $1^{st}$ number representing the number of such contents, and a $2^{nd}$ number representing the number of such label signals. The method may include a receiving step of receiving such contents, label signals, the $1^{st}$ number, and the $2^{nd}$ number with the terminal from the server; an app icon displaying step of displaying an app icon of the app on an off screen, lock screen or unlock screen of the terminal; and a displaying step of displaying the $1^{st}$ and $2^{nd}$ numbers around or inside the app icon, where the $1^{st}$ number is not less than the $2^{nd}$ number.

The No. 24 detailed aspect of this disclosure relates to a server which may receive a 3rd plurality of unlabeled data packets as well as a $2^{nd}$ plurality of labeled data packets both of which have been transmitted by a sender through a certain app, and also relates to a method of displaying numbers of contents included in such data packets on a display unit of a data processing terminal which includes the display unit and to which the app is implemented (or downloaded), where the terminal may wirelessly communicate with the server, where each of the unlabeled data packets includes a content but does not include a label signal, while each of the labeled data packets includes not only a content but also a label signal. The method may include a receiving step of receiving such contents, $3^{rd}$ number, and $2^{nd}$ number with the terminal from the server; a $1^{st}$ number counting step of calculating the $1^{st}$ number as the sum of the 3rd number and the $2^{nd}$ number; an app icon displaying step of displaying an app icon of the app on an off screen, a lock screen or an unlock screen; and a displaying step of displaying the $1^{st}$ number or the $2^{nd}$ number around or inside the app icon.

The No. 25 detailed aspect of this disclosure relates to a server which may receive a 3rd plurality of unlabeled data packers as well as a $2^{nd}$ plurality of labeled data packets both of which have been transmitted by a sender through a certain app, and relates to a method of displaying numbers of certain contents on a display unit of a data processing terminal which can communicate with the server, which may include the display unit, and into which a certain app is implemented (or downloaded), where each of the unlabeled data packets includes a content but does not include a label signal, where each of the labeled data packets includes not only the content but also the label signal, and where the app calculates a $1^{st}$ number which is the sum of a 3rd number of the 3rd plurality and a $2^{nd}$ number of the $2^{nd}$ plurality. The method may include a receiving step of receiving the contents, the $1^{st}$ number, and the $2^{nd}$ number from the server using the terminal; an app icon displaying step of displaying an app icon of the app on an off screen, on a lock screen or on an unlock screen of the terminal; and displaying the $1^{st}$ number and the $2^{nd}$ number around or inside the app icon.

In the above No. 23 through No. 25 detailed aspects, the displaying step may include the step of displaying the $1^{st}$ number in a shape, a size, a position, a color, a font, a background or an orientation at least one of which may be different from that of the $2^{nd}$ number.

The No. 26 detailed aspect of this disclosure relates to a method of displaying a number of contents received by a certain app which may be implemented (or downloaded) into a data processing terminal which also includes a display unit. More particularly, the method includes an app icon displaying step of displaying an app icon of the app on an off screen, a lock screen or an unlock screen of the terminal by the app; a $1^{st}$ number displaying step of displaying the $1^{st}$ number around or inside the app icon by the app; and a $2^{nd}$ number displaying step of displaying the $2^{nd}$ number around or inside the app icon, where the $1^{st}$ number is not less than the $2^{nd}$ number, and where the app may display the $1^{st}$ number in a shape, a size, a color, a font, a position, a background or an orientation at least one of which is different from that of the $2^{nd}$ number, thereby allowing a user to easily distinguish one number from another number by simply looking at such numbers.

The No. 27 detailed aspect of this disclosure relates to a method of rendering a certain app display a $1^{st}$ number and a $2^{nd}$ number on a display unit of a data processing terminal which includes the display unit and to which the app is implemented (or downloaded), where the $1^{st}$ number represents a number of $1^{st}$ contents which the app has received after a user stopped running the app and where the $2^{nd}$ number represents a number of $2^{nd}$ contents which are parts of the $1^{st}$ contents. The method may include an app icon displaying step of displaying an app icon of the app on an off screen, a lock screen or an unlock screen provided on the display unit, where the app icon is the user interface of the app; and a displaying step of displaying the $1^{st}$ number and the $2^{nd}$ number around or inside the app icon, where the $1^{st}$ number is not less than the $2^{nd}$ number, and where the app may display the $1^{st}$ number in a shape, a size, a color, a font, a background, a position or an orientation at least one of which is different from that of the $2^{nd}$ number, thereby allowing the user to easily distinguish the $1^{st}$ number from the $2^{nd}$ number (or vice versa).

It is noted that each of various apps or O/S's of the above detailed aspects as well as various apps or O/S's of various exemplary aspects of this disclosure may be regarded as an aggregation of multiple computer commands or instructions. Thus, each app or O/S of the above detailed aspects or exemplary aspects of this disclosure may be regarded to include multiple parts for running specific operations, where each of such multiple computer instruction parts may include one or multiple computer commands or instructions. When a certain computer instruction part includes multiple computer commands (or lines), all of multiple computer commands may be included in a single portion of the app or O/S, or may be scattered in multiple portions of the app or O/S.

For example, the app of the No. 10 detailed aspect may include multiple parts such as, e.g., a 3rd part for running an operation of extracting multiple unread contents from multiple unread data packets, a 4th part for running an operation of obtaining a $1^{st}$ number of the unread contents, and the like. Similarly, the O/S of the No. 14 detailed aspect may include multiple parts such as, e.g., a 6th part for running an operation of receiving a 3rd plurality of contents related to a certain app and receiving a 3rd number which represents the number of such contents, a 7th part for obtaining a 1st number which is the sum of the 3rd number and the $2^{nd}$ number, and the like.

The No. 28 detailed aspect of this disclosure relates to an app which may allow a sender to create and transmit a content, which may be implemented (or downloaded) to a data processing terminal including a display unit, and which may also allow a receiver to receive the content. As the app receives contents which the receiver receives after he or she had finished running the app most recently and which remain unread, the app may obtain a $1^{st}$ number of the unread contents, may classify the contents into the unlabeled and labeled contents, and may obtain a $2^{nd}$ number of the labeled contents. The app may then display its app icon, a $1^{st}$ numeral representing the $1^{st}$ number, and a 2nd numeral representing the $2^{nd}$ number, where the $1^{st}$ numeral is not less than the $2^{nd}$ number. The app may display the $1^{st}$ or $2^{nd}$ numeral in an interior, in an exterior or on an edge of the app icon, Accordingly, the receiver may readily find out the number of the unread contents or the number of the unread labeled contents, simply by looking at the $1^{st}$ or $2^{nd}$ numeral, respectively.

When the app receives the unread content along with the label signal, the app may regard the content as the labeled content. However, when the app receives the unread content but does not receive the label signal, the app may regard the content as the unlabeled content. The app may receive a data packet including the unread content. When the data packet includes the unread content and the label signal, the app may regard the content as the labeled content. However, when the data packet includes the unread content but does not include any label signal, the app may regard the content as the unlabeled content.

The No. 29 detailed aspect of this disclosure relates to an app which may allow a sender to create and to transmit a content, which may be implemented (or downloaded) into a data processing terminal which includes a display unit, and which may allow a receiver to receive the content with his or her terminal. The app may display an app icon which is a user interface of the app on an off screen, a lock screen or a home screen of the terminal. Upon receiving a content after the receiver has terminated running the app most recently, the content has not been read by the receiver. The app may then display an unread icon badge on the display unit, may count a $1^{st}$ number of such unread contents, and may display the $1^{st}$ numeral representing the $1^{st}$ number, by attaching the 1st numeral to the unread icon badge. As the app receives an unread content along with a label signal, the app may classify the content as a labeled content and may display a labeled icon badge on the display unit. As the app receives the labeled content, the app may count a $2^{nd}$ number, and may then display the $2^{nd}$ numeral representing the $2^{nd}$ number, by attaching the $2^{nd}$ numeral to the labeled icon badge, where the $1^{st}$ number is not less than the $2^{nd}$ number. Accordingly, the receiver may easily find out the number of the unread contents or the number of the labeled contents simply by looking at the $1^{st}$ or $2^{nd}$ numeral, respectively.

The No. 30 detailed aspect of this disclosure relates to a server which may receive a content created by a sender through a certain app, and may transmit the content to a data processing terminal of a receiver through the app. The server may regard a content which it may receive from the sender after the receiver has terminated the app most recently as an unread content. The server may count a $1^{st}$ number of such unread content as the server receives the unread content. When the server receives the unread content as well as a label signal, the server may classify the content as a labeled content, and may count a $2^{nd}$ number of such labeled contents as the server receives the labeled content. The server may also transmit the unread contents, the $1^{st}$ number, and the $2^{nd}$ number to the terminal of the receiver. As a result, the terminal may display an app icon of the app, a $1^{st}$ numeral representing the $1^{st}$ number, and a $2^{nd}$ numeral representing the $2^{nd}$ number, thereby allowing the receiver to easily find out the number of such unread contents or the number of such labeled contents, simply by looking at the $1^{st}$ or $2^{nd}$ numeral, respectively.

The No. 31 detailed aspect of this disclosure relates to an app which may be implemented (or downloaded) into a data processing terminal and which may allow a receiver to receive a content which is transmitted by a sender, where the terminal includes a display unit. The app may include at least five computer instruction parts. The first computer instruction part may receive contents which have been received after a receiver stopped running the app and, therefore, which have not been read by the receiver. The second computer instruction part may obtain a first number of the unread contents. The third computer instruction part may classify such unread contents into unlabeled contents and labeled contents, and may also obtain a second number of such labeled contents. The fourth computer instruction part may display an app icon of the app, a first numeral representing the first number, and a second numeral for representing the second number on the display unit, where the first number is not less than the second number. The fifth computer instruction part for may display the first and second numbers in an interior, in an exterior or on an edge of the app icon. As a result, the receiver may easily find out the number of such unread contents and the number of such labeled contents based only on the first numeral and the second numeral, respectively.

In the No. 31 detailed aspect, the second computer instruction part may classify the content as the labeled content when the app may receive the content together with a label signal. However, the second computer instruction part may classify the content as the unread content when the app receives the content but does not receive the label signal. The app may receive a data packet which includes the unread content, where the second computer instruction part classifies the content as the labeled content when the data packet includes the content as well as a label signal. But the second computer instruction part may classify the content as the unread content when the data packet includes the content but does not include the label signal. The fifth computer instruction part may display the first numeral in a shape, a size, a color, a font, a position, a background, or an orientation at least one of which may be different from that of the second numeral. The fifth computer instruction part may display the app icon, first numeral, and second numeral simultaneously (or at the same time). In contrary, the fifth computer instruction part may display at least two of the app icon, first numeral, and said second numeral not simultaneously but consecutively. The fifth computer instruction part may display the second numeral as "0" when such unread contents do not include the labeled content. The fifth computer instruction part may display at least one of the app icon, first numeral, and second numeral on an off screen in an off state of the terminal, a lock screen in a lock state of the terminal, or a home screen in an unlock state of the terminal. The third computer instruction part may classify the contents into the unlabeled content and labeled content based on a substance included in the contents.

The No. 32 detailed aspect of this disclosure relates to an app which may be implemented to a data processing terminal with a display unit and which may allow a receiver to receive a content transmitted by a sender with the terminal. The app may also include multiple computer instruction parts. The first computer instruction part may display an app icon of the app on one of an off screen, a lock screen, or a home screen of the terminal, wherein the app icon may be a user interface of the app. The second computer instruction part may display an unread icon badge on the display unit when the app receives a content after the receiver stopped running the app and, as a result, the receiver has not read the content. The third computer instruction part may count a first number of the unread contents as the app receives such unread contents. The fourth computer instruction part may display a first numeral representing the first number, and may display the first numeral by attaching the first numeral to the unread icon badge. The fifth computer instruction part may display a labeled icon badge on the display unit when the app receives the content with a label signal while classifying the content as a labeled content. The sixth computer instruction part may also count a second number of the labeled contents as the app receives the labeled contents, and may display a second numeral representing the second number while attaching the second numeral to the labeled icon badge, where the first number is not less than the second number. Thus, the receiver may easily find out the number of such unread contents and the number of such labeled contents, simply based on the first numeral and the second numeral, respectively.

In the No. 32 detailed aspect, the fourth computer instruction part may display the first numeral in an interior, in an exterior, on an edge of the unread icon badge, or the like. The sixth computer instruction part may display the second numeral in an interior, in an exterior, or on an edge of the labeled icon badge or an app icon. The app may also display the unread icon badge in a shape, a size, a color, a font, a position, a background, and an orientation at least one of which is different from that of the labeled icon badge. The app may display the first numeral in a shape, a size, a color, a font, a position, a background, or an orientation at least one of which may be different from that of the second numeral. The app may display the app icon, unread icon badge, and labeled icon badge simultaneously (e.g., at the same time or consecutively. The app may also display the app icon, first numeral, and second numeral simultaneously (e.g., at the same time) or consecutively.

The No. 33 detailed aspect of this disclosure relates to a server which may receive a content created by a sender through a certain app and which may transmit the content to a receiver's data processing terminal through the app. The server may include multiple computer instruction parts. The first computer instruction part may identify a content which the server receives after the receiver stopped running the app as an unread content. As the server receives a new unread content, the second computer instruction part may count a number of such unread contents as a first number. But when a server receives a content along with a label signal, the third computer instruction part may identify a content as a labeled content. When the server receives the new labeled content, the fourth computer instruction part may count a number of such labeled contents as a second number. The fifth computer instruction part may transmit the unread content, the first number, and the second number to the terminal of the receiver. Therefore, the terminal may then display an app icon of the app, a first numeral which represents the first number, and a second numeral which represents the second number, and the receiver may easily find out the number of such unread contents and the number of such labeled contents.

In the No. 33 detailed aspect, the server may receive a data packet including a content. When the data packet includes the content and the label signal, the server may identify the content as the labeled content. However, when the data packet includes a content but does not include a label signal, the server may identify the content as the unread content. The server may set the second number as "0" when such unread contents do not include any labeled content.

The No. 34 detailed aspect of this disclosure relates to an app system which may include at least one server, hardware element, software element, and app. More particularly, the app system may also include an app implemented to a data processing terminal of a sender of a content (i.e., a "transmitting app") as well as another app implemented to another data processing terminal of a receiver of the content (i.e., a "receiving app"). The server of the app system may receive a content which is created by a sender with the terminal of the sender and which is transmitted by the transmitting app. The server of the app system may then transmit the content to the receiving app of a terminal of the receiver.

The server or the receiving app of the app system may display the app icon and the first numeral on the display unit of the terminal of the receiver, where the first numeral represents the number of unread contents which have been received after the receiver stopped running the app most recently and, therefore, which have not been confirmed by the receiver. The server or the receiving app of the app system may the second numeral along with the app icon and the first numeral on the display unit, where the second numeral represents the number of the labeled contents, where the sender labels the receiver as the labeled receiver of such labeled contents, and where the first number is not less than the second number. As a result, the receiver may readily find out the number of such unread contents as well as the number of such labeled contents, simply by looking at the first and second numerals, respectively.

In the No. 34 detailed aspect, the app system may create or use the number of unread contents, the number of unread labeled contents, the unread icon badges or the labeled icon badges in various configurations or methods as explained in the above detailed aspects or in various exemplary aspects, their embodiments or their examples. It is noted, however, that such servers, apps implemented to the terminal of the sender (i.e., the transmitting app), and apps implemented to the terminal of the receiver (i.e., the receiving app) are to be regarded as the hardware or software elements of the app system.

5. Miscellaneous

Unless otherwise specified in this disclosure, all technical or scientific terms used carry the same meaning as commonly understood by one having ordinary skill in the relevant art to which [1] various data processing terminals, [2] various contents which can be created by, transmitted by, received by or stored in such terminals, [3] various data packets which can include such contents, or [4] various labeled icon badges which can represent a number or a type of the unread labeled contents.

Followings explain various configurations, methods or operational sequences of exemplary terminals, contents, data packets or labeled icon badges. In order to embody such configurations, methods or operational sequences of such terminals, contents, data packets or labeled icon badges, various aspects, embodiments or examples of this disclosure may be replaced by similar aspects, embodiments or examples or may be replaced by equivalent aspects, equivalent embodiments or equivalent examples.

It is to be understood that all publications, patent applications, patents, or other references mentioned herein are incorporated herein by reference in their entirety. In case of conflict, the definitions and explanations provided in this disclosure will control. In addition, various configurations, methods or operational sequences related to various terminals, contents, data packets or labeled icon badges described herein are only illustrative and not intended to be limiting the scope of this disclosure.

BRIEF DESCRIPTION OF THE DRAWINGS

FIG. 1A shows exemplary user interfaces and prior art unread icon badges for such interfaces which are displayed on a display unit of a data processing terminal;

FIG. 1B shows an exemplary prior art unread icon badge;

FIG. 2A shows multiple groups and exemplary unread icon badges for such groups which a certain app displays on a display unit when a user runs the app;

FIG. 2B shows an exemplary content window of the app of FIG. 2A displaying contents which have been exchanged between members of a certain group on a display unit;

FIGS. 3A to 3G show exemplary configurations and arrangements of various unread icon badges and labeled icon badges;

FIGS. 9M and 9N show exemplary configurations or methods of applying the label signal, the labeled content, and the labeled icon badge to a health management app;

FIG. 10A shows an exemplary configuration and methods of displaying icon badges when a display unit is turned off (i.e., an off state);

FIGS. 11A and 11B show exemplary configurations and methods of displaying labeled and unlabeled icon badges;

FIGS. 11C and 11D show exemplary configurations and methods of displaying groups of different icon badges for multiple apps in different locations on a display unit;

FIGS. 11E and 11F show exemplary configurations and methods of applying labeled signals, labeled contents, labeled data packets, and labeled icon badges to apps operating through a network; and FIGS. 12A to 12C show exemplary source codes of counting a number of unread or labeled contents.

DETAILED DESCRIPTION OF THE INVENTION

Figure 3B:
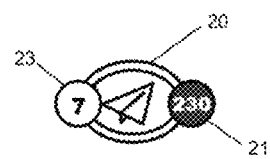

Disclosed hereinafter provides explanations of exemplary configurations, methods or operational sequences of various data processing terminals of this disclosure, various labeled contents, various labeled data packets, and various labeled icon badges. More specifically, this disclosure provides exemplary configurational or operational features of such terminals, labeled contents, labeled data packets or labeled icon badges. This disclosure exemplifies various methods of manufacturing or using such terminals, labeled contents, labeled data packets, and labeled icon badges. This disclosure also exemplifies various hardware elements or software elements related to the terminals, labeled contents, labeled data packets or labeled icon badges. This disclosure further exemplifies various methods of driving such hardware or software elements.

It is to be understood that this disclosure is provided with reference to accompanying drawings and with reference to text, in which such exemplary aspects, embodiments or examples only represent different forms. However, various configurational or operational features of such terminals, labeled contents, labeled data packets, or labeled icon badges, various methods of fabricating or using the terminals, labeled contents, labeled data packets, or labeled icon badges may also be embodied in many other different configurations, structures, methods, processes, or sequences in such a way that they should not be limited to various exemplary aspects and embodiments as set forth hereinabove and hereinafter. Rather, such exemplary aspects, embodiments or examples described herein are provided such that this disclosure will be thorough and complete, and fully convey the scope of configurational features, operational features, and various methods of fabricating or using such terminals, labeled contents, labeled data packets, and labeled icon badges, to one of ordinary skill in the relevant art.

Unless otherwise specified and for simplicity of illustration, various systems, units, elements, portions or parts of various data processing terminals may not typically be drawn to proportions or scales in the accompanying figures for ease of illustration. It is to be understood that such systems, units, elements, portions, or parts of the data processing terminals as well as their operations, steps, and sequences designated by the same numerals in the accompanying figures represent the identical, similar or functionally equivalent systems, units, elements, portions, parts, operations, steps, and sequences, respectively.

Reference is made to accompanying drawings which show, by way of illustration, various exemplary aspects, embodiments or examples in which various data processing terminals may be constructed and used and in which various labeled contents, labeled data packets or labeled icon badges may be created, transmitted, received, displayed or otherwise utilized. It is noted that numerals appearing between parentheses "(" and ")" such as (10) or (60) in this disclosure, represent such systems, units, elements, portions, screens or sequences which appear in the drawings.

It is noted that various exemplary aspects, embodiments or examples of such data processing terminals, labeled contents, labeled data packets or labeled icon badges of this disclosure, although different, are not necessarily mutually exclusive unless otherwise specified. That is, a particular feature, structure, operation, function, method, operational sequence or characteristic of various terminals, labeled contents, labeled data packets or labeled icon badges described herein in connection with one exemplary aspect or embodiment may also be implemented into those terminals, labeled contents, labeled data packets or labeled icon badges of another exemplary aspect or embodiment of this disclosure, as long as [1] they may not conflict each other, [2] they may not depart from a spirit and a scope of such terminals, labeled contents, labeled data packets or labeled icon badges. When necessary, however, depending upon detailed context of the disclosure, at least a part of the above feature, structure, operation, function, method, operational sequence or characteristic of various terminals, labeled contents, labeled data packets or labeled icon badges may be [1] modified, [2] omitted, or [3] added with a different part.

It is also appreciated that an arrangement or a position of each system, unit, element, portion, or part of various exemplary aspects or embodiments of this disclosure may also be modified to certain extents without departing from the spirits and scopes of other exemplary terminals of this disclosure. Therefore, the following detailed description exemplifies various operations which may allow a user to easily confirm or distinguish contents specifically transmitted to himself. The following detailed description relates to various terminals which can provide various labeled contents, labeled data packets or labeled icon badges and, therefore, is not to be taken to limit the scope of various terminals, labeled contents, labeled data packets or labeled icon badges.

The scope of such terminals, labeled content, labeled data packet or labeled icon badge and methods related to such terminals, labeled content, labeled data packet and labeled icon badge are to be defined only by appended claims that should be appropriately interpreted in a full range of equivalent terminals, equivalent labeled content, equivalent labeled data packet, and equivalent labeled icon badges. In the drawings, like reference numerals identify like or similar elements or functions in different views.

Exemplary aspects, embodiments, and examples of various data processing terminals, labeled contents, labeled data packets as well as labeled icon badges of this disclosure will now be explained in detail hereinafter, in both the hardware and software perspectives and with reference to the accompanying drawings. As a result, one skilled in the relevant art can easily understand, fabricate, and use such data processing terminals, labeled contents, labeled data packets, and labeled icon badges. In addition, those skilled in the relevant art can manufacture such terminals, labeled contents, labeled data packets, and labeled icon badges, and can perform various operations or steps in various sequences.

1. Displaying Labeled Icon Badges and Unread Icon Badges

The first exemplary aspect of this disclosure relates to displaying an unread icon badge for a certain application (to be abbreviated as an "app" hereinafter) together with a labeled icon badge. For example, a terminal may display on its display unit an unread icon badge for unread contents and a labeled icon badge for labeled contents which are included in the unread contents. Therefore, a user may readily confirm a number of the unread contents from a numeral displayed in the unread icon badge as well as confirm a number of the labeled contents which are included in the unread contents from a numeral of the labeled icon badge. In addition, the terminal may display the unread icon badge and the labeled icon badge around or inside an app icon which represent the app, thereby allowing a user to readily confirm which badge corresponds to which app.

The terminal may display a numeral (to be abbreviated as "$N_{UR}$" hereinafter) with the unread icon badge in order to represent a number of the unread contents, and may display another numeral (to be abbreviated as "$N_{LB}$" hereinafter) with the labeled icon badge in order to represent a number of the (unread) labeled contents. The terminal may also display the $N_{UR}$ and $N_{LB}$ [1] in the same or similar font, size, shape, color, background or orientation, or [2] in different fonts, sizes, shapes, colors, backgrounds or orientations.

The terminal may display the labeled icon badge and unread icon badge inside or around the app icon. For simplicity of illustration, as far as the labeled icon badge and unread icon badge are concerned, the terminal may display the labeled icon badge [1] on the right or left side of the unread icon badge, [2] above or below the unread icon badge, or [3] inside or outside the unread icon badge. However, when a size of the labeled icon badge is greater than a size of the unread icon badge, the terminal may display the unread icon badge inside the labeled icon badge. Alternatively, the terminal may display the labeled icon badge and unread icon badge in a symmetric arrangement with respect to a certain point (i.e., a point symmetry) or a certain line (i.e., a line symmetry) of the app icon. Or the terminal may display the labeled icon badge and unread icon badge in an asymmetric arrangement.

The terminal may display the labeled icon badge and unread icon badge [1] by manipulating at least portions of such badges to overlap each other, [2] by manipulating at least portions of such badges to contact but to not overlap each other, or [3] by separating the badges by a certain distance. When one of the labeled icon badge and unread icon badge is displayed inside the other, the terminal may display [1] such badges in a circular (or polygonal) concentric arrangement, [2] such badges in a non-concentric arrangement, [3] such badges at least portions of which may overlap each other, [4] such badges at least portions of which may contact but not overlap each other, or [5] badges which are separated by a certain distance.

As discussed above, the unread contents of this disclosure may include both of the unread unlabeled contents and the unread labeled contents. Accordingly, the numeral of the unread icon badge (i.e., $N_{UR}$) is always greater than or equal to the numeral of the labeled icon badge (i.e., $N_{SB}$). FIGS. 3A to 3G exemplify various configurations or arrangements of such unread icon badges and labeled icon badges.

Figure 3C:
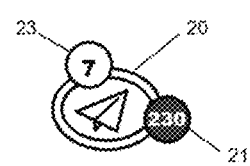

In the first exemplary embodiment of this first exemplary aspect, a terminal may display an unread icon badge as well as a labeled icon badge together on a display unit. FIGS. 3A to 3C exemplify various configurations or arrangements of various unread icon badges and labeled icon badges at least one of which is disposed around an app icon. For example, the terminal of FIG. 3A may display the unread icon badge (21) and the labeled icon badge (23) together on the right (of left) side, or above (or below) the app icon (20). Alternatively, the terminal of FIG. 3B may display the unread icon badge (21) and the labeled icon badge (23) on the opposite sides of the app icon (20). Or the terminal of FIG. 3C may display the unread icon badge (21) and the labeled icon badge (23) on different but not opposite sides of the app icon (20).

The terminal may display the unread icon badge and labeled icon badge, while manipulating at least one of the badges [1] to overlap an edge of the app icon, or [2] outside the app icon, i.e., separating at least one of the badges from the app icon by a certain distance. The terminal may also display the unread icon badge and labeled icon badge, while manipulating such badges [1] to overlap at least portions of each other, [2] to contact but not to overlap such portions, or [3] to be separated from each other by a certain distance.

Figure 3D:
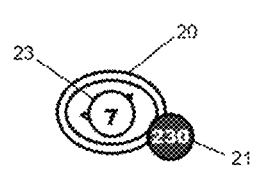

In the second exemplary embodiment of this first exemplary aspect, a terminal may display one of the unread and labeled icon badges around the app icon, but the other of such badges inside the app icon. FIG. 3D exemplifies a different configuration or arrangement of a labeled icon badge and an unread icon badge. For example, the terminal of FIG. 3D displays the unread icon badge (21) around the app icon (20) but the labeled icon badge inside the app icon (20). Alternatively, the terminal may display the unread icon badge inside the app icon, while displaying the labeled icon badge around the app icon.

The terminal may display the unread icon badge and the labeled icon badge, while positioning an entire (or only a) portion of at least one of such badges inside the app icon. Or the terminal may display the unread icon badge and the labeled icon badge, while manipulating at least one of the badges [1] to overlap at least portions of each other, [2] to contact but not to overlap at least portions of each other, or [3] to be spaced away from each other by a certain distance.

Figure 3E:
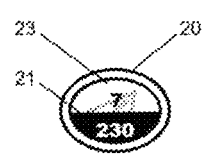

In the third exemplary embodiment of this first exemplary aspect, a terminal may also display an unread icon badge and a labeled icon badge inside an app icon. FIG. 3E exemplifies another configuration or arrangement of an unread icon badge and a labeled icon badge. The terminal may divide an interior of an app icon (20) vertically, display the unread icon badge (21) in the lower portion, and display the labeled icon badge (23) in the upper portion. In contrary to FIG. 3E, the terminal may display one of the unread and labeled icon badges to have a size bigger than at least one half of the size of app icon, or may display each of both badges to have a size which is less than at least one half of the size of the app icon. The terminal may display the unread icon badge and labeled icon badge, while manipulating at least one of the badges [1] to overlap at least portions of each other, [2] to contact but not to overlap at least portions of each other, or [3] to be separated away from each other by a certain distance.

Figure 3F:
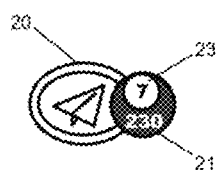

In the fourth exemplary embodiment of this first exemplary aspect, a terminal may display the unread icon badge and the labeled icon badge in a complete overlapping arrangement, i.e., a terminal displays one of such badges inside the other badge. FIG. 3F exemplifies another configuration or arrangement of the unread and labeled icon badges, where the terminal displays the labeled icon badge (23) inside the unread icon badge (21), while positioning both badges (21)(23) around the app icon (20). In addition, the terminal displays the entire portion of the labeled icon badge (23) inside the unread icon badge (21), while both badges (21)(23) contact each other on the top portion. As a result, the centers of such badges (21)(23) may not coincide each other.

In contrary, the terminal may display the unread icon badge and labeled icon badge in a concentric circular (or polygonal) arrangement, thereby rendering the centers of such badges (21)(23) coincide with each other. In addition, the terminal may display [1] an entire portion of at least one of the unread and labeled badges inside an app icon, [2] at least a portion of at least one of such badges inside the app icon, or [3] entire portions of such badges outside the app icon. Or the terminal may display the unread and labeled icon badges (21)(23) in such a way that [1] at least portions of edges of both badges may overlap each other, [2] at least portions of the badges contact but not overlap each other, or [3] both badges are separated from each other by a certain distance.

Figure 3G:
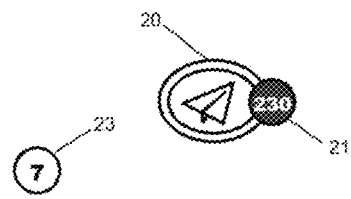

In the fifth exemplary embodiment of this first exemplary aspect, a terminal may display the unread icon badge and labeled icon badge in a certain distance from each other. FIG. 3G exemplifies a configuration or arrangement of such badges, where the terminal displays the unread icon badge (21) around the app icon (20), while displaying the labeled icon badge (23) away from the unread icon badge (21) by a certain distance. In this case, the terminal may display the labeled icon badge (23) on a left, right side, upper or lower portion of the display unit. When multiple apps may be implemented, the terminal may display all of the labeled icon badges for such multiple apps in a certain location on the display unit. Therefore, a user may readily observe the labeled icon badges selectively clustered on the certain position on the display unit, thereby easily confirming which app has received the labeled contents.

The terminal may instead display the labeled icon badge around or inside the app icon, while the terminal may display [1] multiple (or all) unread icon badges of multiple (or all) apps in a certain location of the display unit, or [2] multiple (or all) unlabeled icon badges of such apps in the certain location. Or the terminal may display multiple (or all) unread icon badges in a first location on the display unit, but may display multiple (or all) labeled icon badges in a second location on the display unit.

The above terminals, labeled contents, and labeled icon badges of the first exemplary aspect may also be varied or modified in various configurations or methods. Followings are various examples of such modifications or variations, where such modifications or variations [1] may be applied to modify or vary various embodiments or examples of this first exemplary aspect, or [2] may be applied to modify or vary different embodiments or examples of different exemplary aspects described hereinabove or hereinafter.

The first example of such modifications or variations of this first exemplary aspect relates to using an unlabeled icon badge instead of an unread icon badge. That is, instead of displaying the unread icon badge along with the labeled icon badge which represents a number or a type of the labeled contents included in the unread contents, a terminal may display the labeled icon badge along with au unlabeled icon badge which may in turn represent a number or a type of the unlabeled contents included in the unread contents. In such a case, a sum of a first numeral (for the labeled icon badge) and a second numeral (for the unlabeled icon badge) may be the same as a numeral for the unread icon badge.

The second example of such modifications or variations of this first exemplary aspect relates [1] to representing a number of such labeled contents as well as a substance or a type of the labeled contents with the labeled icon badge or [2] to representing a substance or a type (but not a number) of the labeled contents with the labeled icon badge. In general, a "substance of a content" refers to various information such as, e.g., information related to a sender of the content (e.g., a name, a nickname or an ID of the sender), other information related to a sender of the content (e.g., a rank, an organization, a sex, an age, a nationality, physical characteristics, or other personal information), other information related to the content (e.g., a size, a date or time of creation, or a date or time of transmission, or a storage location), or importance of the content in the perspective of a receiver or a sender (e.g., extremely important, important, less important, not important or a spam). In general, a "type of a content" refers to various information related to a structure of the content such as, e.g., a datum, a file or a folder which may include a text, a symbol, a number, a figure, a still image, a dynamic image (e.g., a video clip), a sound, and the like.

Alternatively, the terminal may display the unread icon badge and the labeled icon badge in different periods of time. For example, when the user may be more interested in the number of the labeled contents, the terminal may [1] continuously display the labeled icon badge but blink the unread icon badge, [2] blink both the unread and labeled icon badges but may blink the labeled icon badge faster (or slower), or [3] continuously display the unread icon badge but blink the labeled icon badge in such a manner to attract the user's attention.

The third example of such modifications or variations of this first exemplary aspect relates to displaying an unread icon badge along with a labeled icon badge. For example, the terminal may display [1] the unread icon badge and the labeled icon badge at the same time (i.e., temporally simultaneously), [2] the unread icon badge and the labeled icon badge (temporally) sequentially, or [3] the unread icon badge and the labeled icon badge (temporally) sequentially, with at least one temporal overlap between displaying such badges or with at least one temporal gap between displaying such badges.

The fourth example of such modifications or variations of this first exemplary aspect relates to combining the first to fourth embodiment of the first exemplary aspect and to modifying or varying the first exemplary aspect. For example, the terminal may display a number of (unread) labeled contents using the labeled icon badge. However, when a user provides another user input, the terminal may then display a substance of the (unread) labeled contents.

In the second exemplary aspect of this disclosure, a terminal may display an unread icon badge along with a labeled icon badge when the unread contents do not include any labeled contents. For example, when the unread contents do not include any labeled contents, a terminal may display the unread icon badge (for the unread contents) along with the labeled icon badge (for the labeled contents). That is, employing various configurations or methods, the terminal may inform the user of the fact that the unread contents do not include any labeled contents.

For example, a terminal may represent a number of the unread contents with a numeral of the unread icon badge, but the terminal may also represent that a number of the labeled contents is "0" with a numeral of the labeled icon badge in many different ways. To this end, the terminal may display a numeral for the unread icon badge (to be abbreviated as the "$N_{UR}$") and another numeral for the labeled icon badge (to be abbreviated as "$N_{SB}$") [1] in the same or similar font, size, thickness, shape, color, background or orientation, or [2] different fonts, sizes, thicknesses, shapes, colors, backgrounds or orientations. As described hereinabove, the labeled icon badge for the unread contents which include no labeled content is abbreviated as the "labeled icon badge$_{(O)}$," whereas the labeled icon badge for the unread contents which include at least one labeled content is to be abbreviated as the "labeled icon badge (N)."

In addition and similar to the above first exemplary aspect, a terminal may display the labeled icon badge$_{(O)}$ [1] on the left or right side of the unread icon badge, [2] above or below the unread icon badge, [3] inside or outside the unread icon badge, or [4] in a line symmetry, in a point symmetry, or in an asymmetric arrangement. In this case, the terminal may display the labeled and unread icon badges such that [1] such badges may overlap at least portions of each other, [2] such badges may contact but not overlap at least portions of each other, or [3] such badges may be separated by a certain distance.

Therefore, a user may easily learn that the unread contents of a certain app may not include any (unread) labeled contents. In response thereto, the user [1] may neither run the app nor confirm the unread contents of the app, or [2] may run the app and confirm the (unread) unlabeled contents. FIGS. 4A to 4H exemplify various configurations and arrangements of the unread icon badges and the labeled icon badges when the unread contents do not include any labeled contents.

Figure 4A:
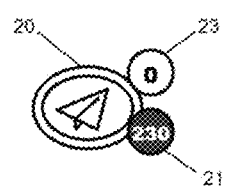
FIGS. 4A to 4H show exemplary configurations and arrangements of various unread icon badges and labeled icon badges when unread contents do not include any labeled content.
Figure 4B:
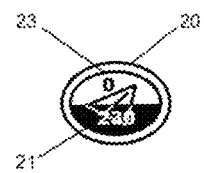
Figure 4C:
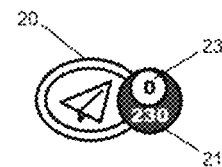

In the first exemplary embodiment of this second exemplary aspect and when the unread contents do not include any labeled contents, a terminal may use a numeral ($N_{LB}$) for the labeled icon badge as "0" and may display $N_{LB}$ (i.e., "0") along with the unread icon badge for the unread contents. FIGS. 4A to 4C exemplify various configurations or arrangements of the unread icon badges and the labeled icon badges when the unread contents do not include any labeled contents, where the terminal displays the numeral "0" with the labeled icon badge$_{(O)}$ exemplified in various embodiments or examples (e.g., FIGS. 3A to 3G) of the first exemplary aspect. Accordingly, the user may readily and visually confirm that no labeled contents have been received. More specifically, FIG. 4A shows the labeled icon badge of FIG. 3A along with the numeral "0," FIG. 4B shows the labeled icon badge of FIG. 3E along with the numeral "0," and FIG. 4C shows the labeled icon badge of FIG. 3F along with the numeral "0."

The terminal may also display the numeral "0" in various methods. For example, the terminal may emphasize that a number of (unread) labeled contents in the unread contents is "0 (i.e., $N_{LB}$)" [1] by displaying $N_{LB}$ bigger, brighter or darker than the unread icon badge or its numeral ($N_{UL}$), [2] by displaying $N_{LB}$ while rotating $N_{LB}$ (with respect to a certain axis of rotation), shaking $N_{LB}$ (in a lateral direction or in a vertical direction) or otherwise moving $N_{LB}$, [3] by changing the size of $N_{LB}$, [4] by changing the shape of $N_{LB}$, [5] by changing the color, brightness or transparency of $N_{LB}$, or [6] by performing the manipulations of the [1] to [3] of this paragraph onto a certain portion of $N_{LB}$, onto an edge of $N_{LB}$ or onto a background of $N_{LB}$. In the alternative, the terminal may inform a user that he has not received any labeled contents which he has to ungently confirm, because the unread contents do not include any labeled contents anyway. To this end, the terminal may display the numeral $N_{LB}$ (i.e., "0") smaller, darker or thinner than the unread icon badge or a numeral (i.e., Nus) of the unread icon badge, or in other un-emphasizing (or un-highlighting) configuration.

Figure 4D:
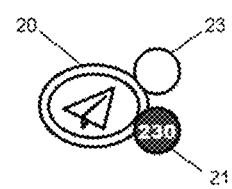

In the second exemplary embodiment of this second exemplary aspect, a terminal may display the unread icon badge (for such unread contents) along with the labeled icon badge$_{(O)}$ even when no labeled contents are included in the unread contents. However, the terminal may not display any numeral for the labeled icon badge$_{(O)}$. To this end, a terminal may display various labeled icon badges exemplified in the embodiments or examples of the first aspect (i.e., FIGS. 3A to 3G), while displaying only traces of the labeled icon badges$_{(O)}$ but not displaying any numerals for the labeled icon badges$_{(O)}$. FIG. 4D exemplifies the configuration or the arrangement similar to that of FIG. 3A, where a terminal displays the unread icon badge (21) in the lower right region of the app icon (20) and the labeled icon badge$_{(O)}$(23) in the upper right region of the app icon (20), but where the labeled icon badge (23) does not accompany any "0" or numerals inside or around itself (23).

Figure 4E:
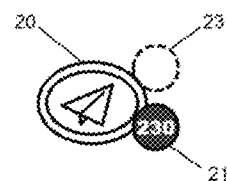
Figure 4F:
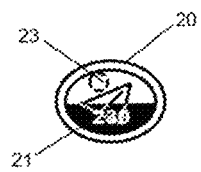

The terminal may emphasize that the unread contents do not include any labeled contents in different configurations or arrangements. For example, the terminal may display the labeled icon badge$_{(O)}$ without any numeral for the labeled contents, $N_{LB}$, while displaying such $N_{LB}$ (i.e., $N_{LB}$=0) differently from the $N_{LB}$ with at least one labeled content (i.e., $N_{LB}$ is greater than 1). FIGS. 4E and 4F exemplify various configurations or arrangements for the unread icon badge and labeled icon badge when the unread contents do not include any labeled contents (i.e., $N_{LB}$=0).

For example, FIG. 4E shows a labeled icon badge which emphasizes that the unread contents do not include any labeled contents. The terminal displays a labeled icon badge$_{(O)}$(23) on the upper right region of the app icon (20). The terminal does not display any numeral for the labeled icon badge$_{(O)}$(23), while displaying the edges of the labeled icon badge$_{(O)}$(23) using a dotted line. In another example, FIG. 4F shows a labeled icon badge$_{(O)}$ emphasizing that the unread contents do not include the labeled contents. The terminal displays the unread icon badge (21) in a lower interior portion of the app icon (20), while displaying the labeled icon badge$_{(O)}$(23) in an upper interior portion of the app icon (20). The terminal does not attach any numeral to the labeled icon badge$_{(O)}$(23), and emphasize the edges of the labeled icon badge (23) with the dotted lines.

Figure 4G:
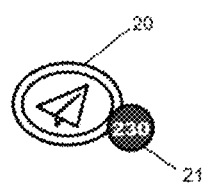
Figure 4H:
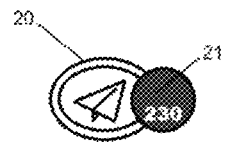

In the third exemplary embodiment of this second exemplary aspect, when the unread contents do not include any labeled contents, a terminal may omit displaying labeled icon badge$_{(O)}$ or, alternatively, may display the unread icon badge along with the labeled icon badge$_{(O)}$ which, however, does not include any numeral. FIGS. 4G and 4H exemplify the configuration or arrangement of the unread icon badge and labeled icon badge when the unread contents do not include the labeled contents. For example, the terminal may display the unread icon badges of various embodiments or examples of the first exemplary aspect (i.e., FIGS. 3A to 3G). But, unlike the terminals of FIGS. 3A to 3D, the terminal of FIG. 4G omits the labeled icon badge$_{(O)}$. Similarly, unlike the terminal of FIG. 3F, the terminal of FIG. 4H omits the labeled icon badge$_{(O)}$.

The terminal may vary or modify the embodiment of the above paragraph in order to display the (unread) labeled contents. For example, the terminal may display the unread icon badge, but only dimly display the labeled icon badge, thereby informing a user that the unread contents do not include any labeled content. As the terminal displays the labeled icon badge less dimly, a user may more easily find out that the unread contents do not include the labeled contents. But this configuration may then become more similar to that of the second embodiment of the second exemplary aspect. Alternatively, the terminal may vary the configuration or arrangement of the unread icon badge to inform the user that the labeled icon badge has been omitted. However, as such variation becomes more conspicuous, that is, as the user can find it out more readily, such a configuration may become more similar to that of the second embodiment of the second exemplary aspect, as will be disclosed below.

The above terminals, labeled contents, and labeled icon badges of the second exemplary aspect may be varied or modified in various configurations or methods. Followings are various examples of such modifications or variations, where such modifications or variations [1] may be applied to modify or vary various embodiments or examples of this second exemplary aspect, or [2] may be applied to modify or vary different embodiments or examples of different exemplary aspects described hereinabove or hereinafter.

The first example of such modifications or variations of this second exemplary aspect relates to configurations or arrangements capable of emphasizing that the unread contents do not include the labeled contents. For example, the terminal may [1] display the edges of the labeled icon badge$_{(O)}$ thicker, brighter, darker or in other emphasizing configurations than the edges of the unread icon badge, [2] display the edges of the labeled icon badge$_{(O)}$ thinner, dimmer, lighter or in other un-emphasizing configurations than the edges of the unread icon badge in order to emphasize to the user that the unread contents do not include any labeled contents and, therefore, that the user does not have to urgently check any unread content, or [3] display the labeled icon badge$_{(O)}$(i.e., the labeled icon badge representing that the unread contents do not include any labeled content) differently from the labeled icon badge$_{(N)}$(i.e., the labeled icon badge representing that the unread contents include at least one labeled content), in different configurations or methods.

The second example of such modifications or variations of this second exemplary aspect relates to configurations or methods of finding an app which has received the unread contents which, however, do not include any labeled contents. For example, when a terminal is in an off state (i.e., its display unit is turned off) or when the terminal is displaying a lock screen (i.e., the screen displayed on a display unit in an on state but before a user passes the authentication), the terminal may [1] display all app icons for all apps each of which includes at least one unread content, or [2] display app icons for those apps each of which includes at least one (unread) labeled content. Such a terminal may not display any app icon for an app which includes the unread contents but which does not include any labeled content.

The third exemplary aspect of this disclosure relates to various configurations or methods of displaying a single icon badge while using the badge either as an unread icon badge or as a labeled icon badge. More particularly, this third aspect relates to the configuration and method of differently displaying the single icon badge when the unread contents do include or do not include any labeled contents such that the terminal may use a single icon badge either when a certain app may have received the labeled content or when the app may not have received any labeled content. In other words, the terminal may display the unread icon badge but may not display the labeled icon badge, while displaying different unread icon badges when the unread contents include or do not include the labeled contents, thereby using the single unread badge both as a labeled icon badge and an unread icon badge.

For example, the terminal may display various unread icon badges as shown in various embodiments or examples of the first exemplary aspect (i.e., FIGS. 3A to 3G), may not display the labeled icon badges of FIGS. 3A to 3G, but may represent the unread icon badges and the unlabeled icon badges only using the unread icon badges. Accordingly, a user may readily and visually find out whether the unread contents may include any labeled content. For illustration purposes and as far as only this third exemplary aspect is concerned, the icon badge for the unread contents which do not include any labeled content is referred to as the "unread icon badge," while the icon badge for the unread contents which do include the labeled content is referred to as the "labeled icon badge."

Thus, when the unread contents do not include any labeled content, the terminal of this third exemplary aspect may display the unread icon badges like those badges of FIGS. 3A to 3G and FIGS. 4A to 4H. However, when the unread contents include the labeled contents, the terminal may then manipulate the unread icon badge, and use such manipulated unread icon badge as the labeled icon badge. For example, when the unread contents include the labeled contents, the terminal may display the unread icon badge as the labeled icon badge by changing [1] a font, size, thickness, shape, color or background of the unread icon badge, or [2] a position or orientation of the unread icon badge.

In particular, when the unread contents may include the labeled contents, the terminal may display the unread icon badge [1] by moving its position to a left side, a right side, an upper portion or a lower portion of the display unit, thereby displaying the unread icon badge as the labeled icon badge, or [2] by moving its position in a point symmetric arrangement, a line symmetric arrangement or an asymmetric arrangement, thereby displaying the unread icon badge as the labeled icon badge. Or the terminal may display the labeled icon badge by emphasizing the unread icon badge or its numeral, when the unread contents include the labeled contents. For example, the terminal [1] may rotate the unread icon badge or its numeral (with respect to a certain axis), shake the unread icon badge or its numeral either in a vertical or lateral direction, or otherwise move the unread icon badge or its numeral, [2] may change a size or a shape of the unread icon badge or its numeral, or [3] may change a color, a brightness or a transparency of the unread icon badge or its numeral, thereby using the manipulated unread icon badge as the labeled icon badge.

FIGS. 5A to 5D exemplify various configurations or arrangements of manipulating various features or positions of the unread icon badge, thereby using the manipulated unread icon badge as the labeled icon badge.

Figure 5A:
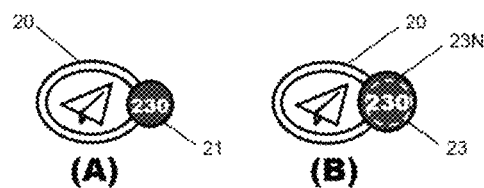
FIGS. 5A to 5D show exemplary configurations and arrangements of various labeled icon badges created by varying various features of the unread icon badges.

In the first exemplary embodiment of this third exemplary aspect, a terminal may manipulate a size of a single icon badge, e.g., bigger or smaller (or vice versa) when the unread contents do or do not include any labeled content, thereby using the single icon badge as an unread icon badge or as a labeled icon badge. FIG. 5A exemplifies the configuration or arrangement of using the unread icon badge as the labeled icon badge by varying the size of the badge. That is, when the unread contents do not include any labeled content (panel (A) of FIG. 5A), the terminal may display the icon badge in a smaller size and show that the badge represents the unread icon badge (21) for the unread contents (or a number of such contents) which do not include the labeled contents. But when the unread contents include at least one labeled content, the terminal may display the icon badge in a size bigger than the one in the panel (A) in order to show that the badge is the labeled icon badge (23) (or a number of the labeled contents) for the unread contents which include the labeled contents.

Alternatively and as illustrated in the panel (B) of FIG. 5A, a terminal may [1] display the labeled icon badge (23) bigger than the unread icon badge (21) or [2] display the icon badge of the same size but may display the numeral of the labeled icon badge (23) bigger than the numeral of the unread icon badge (21). Or the terminal may not manipulate the size of the icon badge or its numeral but may manipulate [1] a color, transparency, shape or background of the badges (21)(23), [2] a color, transparency shape or thickness of the edges of such badges (21)(23), or [3] a font, a thickness, a color, a transparency or a shape of the numeral of the badges (21)(23), thereby displaying the same or similar badges as the unread icon badge (21) and the labeled icon badge (23).

When a terminal uses a single icon badge as an unread icon badge as well as a labeled icon badge while manipulating various features of the single icon badge, a first-time user may be confused which badge is the unread or labeled icon badge. To obviate this confusion, the terminal may add a "reference mark" to the icon badge. In other words, when using the icon badge as a labeled icon badge or as an unread icon badge, the terminal may also display a size or a position of the icon badge when it is to be used as an unread icon badge or as a labeled icon badge to a user. For example, the terminal of FIG. 5A may display a single icon badge as the labeled icon badge (23), but may also display a reference mark (23N) for the unread icon badge (21) inside the labeled icon badge (23). Therefore, even when the terminal may only display a single icon badge, the user may readily compare the position or size of the badge and may tell whether the badge is used as the unread icon badge or as the labeled icon badge.

Figure 5B:
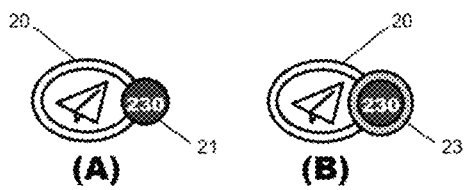

In the second exemplary embodiment of this third exemplary aspect, a terminal may use a single icon badge, however, may manipulate various features of the single icon badge (e.g., a size of an outer portion of the icon badge or an edge of the icon badge) differently when the unread contents may include or may not include any labeled content, thereby using the single icon badge as the unread icon badge or as the unread labeled icon badge. FIG. 5B exemplifies the configurations or methods of displaying an unread icon badge as well as a labeled icon badge by manipulating the edges of a single icon badge. For example, when the unread contents do not include the labeled content, the terminal of the panel (A) of FIG. 5B displays a single icon badge, and represents that the badge corresponds to the unread icon badge (21) for the unread contents (or a number of the unread contents) which do not include any labeled content. When the unread contents may include at least one labeled content, however, the terminal may display an additional edge around the icon badge, thereby informing a user that the badge corresponds to the labeled icon badge (23) for the unread contents which include the labeled contents or that the badge corresponds to a number of the labeled contents included in the unread contents.

In this respect, a single icon badge in the panel (A) of FIG. 5B may be deemed as an unread icon badge (21) with a circular shape, while a single icon badge in the panel (B) of FIG. 5B may be deemed as an unread labeled icon badge (23) to which a ring is added and which is positioned around the edge of the single icon badge or outside of the single icon badge. Alternatively, the ring added to the single icon badge in the panel (A) of FIG. 5B itself may be deemed as an unread labeled icon badge (23), while the single icon badge may then be deemed as an unread icon badge (21), where the ring may contact the edge of the unread icon badge (21) or may be separated from an edge of the unread icon badge (21) by a certain distance.

Figure 5C:
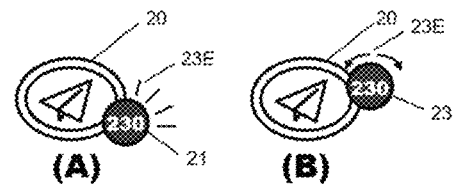
Figure 5D:
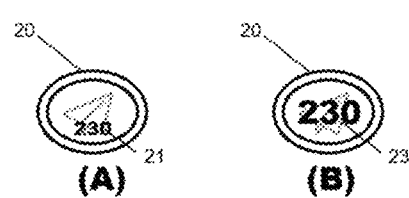

In the third exemplary embodiment of this third exemplary aspect, a terminal may use a single icon badge, however, may represent the icon badge with no labeled contents and the icon badge with at least one labeled icon badge, by manipulating a position of a single icon badge on a display unit, thereby using the single icon badge as the unread icon badge and the labeled icon badge. FIG. 5C exemplifies the configuration or method of sharing a single icon badge as the unread icon badge or the labeled icon badge depending on a location in which it is displayed on a display unit. For example, when the unread contents do not include the labeled contents, the terminal of the panel (A) of FIG. 5C may display the single icon badge in the right lower portion of the app icon (20), thereby using the single badge as the unread icon badge (21). However, when the unread contents include the labeled contents, the terminal of the panel (B) of FIG. 5C may display the single icon badge in a different position, thereby sharing the single badge but using it as the labeled icon badge (23).

When a terminal uses a single icon badge as an unread icon badge (21) or an unread labeled icon badge (23), the terminal may display such badges (21)(23) to have different features, based on whether or not the unread contents include any unread labeled content. In the fourth exemplary embodiment of this third exemplary aspect, a terminal may display neither the unread icon badge nor the labeled icon badge, however, may only display a numeral of the badge. This may correspond to a configuration in which the terminal uses a single numeral which may represent either a number of the unread contents or a number of the labeled contents, thereby replacing the unread icon badge or the labeled icon badge by such a number. For example, FIG. 5D exemplifies configurations or methods of manipulating a size of a single numeral and displaying such a numeral in different sizes one at t time on a display unit, thereby sharing a single numeral as an unread icon badge or a labeled icon badge. That is, when the unread contents do not include any labeled content, the terminal in the panel (A) of FIG. 5D may display a single numeral in a lower portion inside an app icon (20), thereby using such a single numeral as the unread icon badge (21). However, when the unread contents do include at least one labeled content, the terminal in the panel (B) of FIG. 5D may manipulate the features such as a size or a location of the single numeral (21), e.g., displaying the numeral bigger and in a center portion inside the app icon (20), thereby using the single numeral as the unread labeled icon badge (23).

The terminal may instead display the numeral (23) corresponding to the labeled icon badge [1] to have a shape, a color or a background which is different from that of the numeral (21) corresponding to the unread icon badge, or [2] to have a position or orientation which may be different from that of the numeral (21) corresponding to the unread icon badge. Alternatively, the terminal may display the unread icon badge (21) (or a numeral attached to the badge) and the labeled icon badge (23) (or a numeral attached to the badge) such that various differences between the positions of such badges (or their numerals), e.g., a distance between the badges (21)(23) or an angle between the badges (21)(23) may be proportional to a number of the labeled contents which are included in the unread contents. When displaying the labeled icon badge (23), the terminal may display the reference mark (23N) inside or around the app icon (20), thereby displaying the original feature (such as a size or a position) of the unread icon badge (21).

The terminal may also emphasize differences between the numeral (23) for the labeled icon badge and the numeral (21) for the unread icon badge. To this end, the terminal may [1] use different fonts, sizes, thicknesses, colors, degrees of transparency or shapes, or [2] display such numerals in different positions.

The above terminals, labeled contents, and labeled icon badges of the third exemplary aspect may be also modified or varied in various configurations or methods. Followings are various examples of such modifications or variations, where such modifications or variations [1] may be applied to modify or vary various embodiments or examples of this third exemplary aspect, or [2] may be applied to modify or vary different aspects, embodiments or examples described hereinabove or hereinafter.

The first example of the modifications or variations of this third exemplary aspect relates to configurations or methods of emphasizing the numerals corresponding to the labeled (or unlabeled) icon badge, thereby allowing a user to easily recognize the labeled (or unread) icon badge. For example, when the unread contents do not include any labeled content, the terminal [1] may rotate the numeral about a certain axis, shake the numeral either vertically or laterally, or otherwise move such a numeral, [2] may change a size or a shape of the numeral, [3] may vary a size, a color, a thickness or a brightness of the numeral, [4] change a degree of transparency of the numeral, or [5] may manipulate the entire portion, a certain portion, an edge or a background of the numeral similar to those methods of the [1] to [4] of this paragraph. The terminal may also display the reference mark (23N) together, thereby allowing a user to easily compare the numeral with the reference mark (23N).

The second example of such modifications or variations of this third exemplary aspect relates to various configurations or methods for manipulating various features of the app icon, thereby allowing a user to easily recognize whether a single numeral may represent [1] the features of the labeled icon badge (e.g., a number or a substance of the labeled content), or [2] the features of the unread contents. For example, the terminal may display a single numeral inside or around the app icon, [1] while manipulating a size, a shape or a color of the app icon, thereby informing the user which icon badge the numeral may represent, or [2] while displaying a character or a symbol inside or around the app icon, thereby informing the user which icon badge the numeral may represent, based on such a character or symbol.

The third example of such modifications or variations of this third exemplary aspect relates to various configurations or arrangements for displaying various features of the unread icon badge or the labeled icon badge by using multiple numerals, characters or symbols. For example, the terminal may display the numerals such as, e.g., "23/127" or "23:127" similar to the embodiments or examples of the third exemplary aspect, where "23/127" or "23:127" may mean that a certain app or a certain group of the app includes a total of 127 unread contents, and where 23 of such unread contents are labeled contents.

Various embodiments and examples of the above first, second, and third exemplary aspects which are exemplified in the "1. Displaying Labeled Icon Badges and Unread Icon Badges" may be interchangeable. In other words, as long as the embodiments or examples may not contradict each other, such embodiments or examples [1] may also apply to corresponding features of other aspects, embodiments, or examples of this disclosure, [2] may be incorporated into corresponding features of other aspects, embodiments, or examples of this disclosure, [3] may replace corresponding features of other aspects, embodiments, or examples of this disclosure, [4] may be replaced by corresponding features of other aspects, embodiments, or examples of this disclosure, or [5] may be combined with corresponding features of other aspects, embodiments, or examples of this disclosure.

2. Creating the Labeled Content in the Perspective of a User

Various data processing terminals of this disclosure may transmit or receive various contents in various arrangements. That is, when a user is to create a certain content, a terminal may incorporate the content as well as a "label signal" into a certain data packet, thereby creating a "labeled data packet." This is to be referred that a terminal "creates or converts" the content into a labeled content throughout this disclosure. However, when the terminal creates an unlabeled data packet which includes the content but does not include the label signal, this is to be referred that a terminal "creates or converts" the content into an unlabeled content throughout this disclosure.

A user or terminal of this disclosure may create the "label signal" in various methods. For example, while running a certain app, a user of a certain group which is established by a certain app may select at least one member of the group as a labeled receiver, before creating the content, while creating the content or after creating the content. In other words, the user may manually select a labeled receiver [1] by manipulating a member icon (or member U/I) of a member who is displayed in a content window in which multiple members would exchange their contents, or [2] by retrieving a member list in a group window or in a content window. Such configurations or methods of this paragraph are to be referred in this disclosure that [1] a user manually selects at least one labeled receiver and, therefore, "the user directly creates a label signal," or [2] "a terminal indirectly creates a label signal" based on the user's selection of the labeled receiver, where the [1] and [2] of this sentence are deemed to have the same meaning.

To the contrary, a user of a certain group of a certain app may drive the app, but may choose to not select any labeled receiver before, during or after creating a content. However, the content created by the user may include a "label request information" such as, e.g., [1] a name, [2] a title, [3] a nickname, or [4] a character, a text, an image or a sound, where each of the [1] to [4] of this sentence may refer to or mean at least one certain member of the same group. In this case, the terminal may employ various prior art information analysis algorithms, may analyze the content with such algorithms, may select at least one member of the group as a labeled receiver based on the analysis, and may then create the "label signal" corresponding to the labeled receiver.

For example, a terminal may employ various information analysis algorithms such as [1] analysis algorithms for artificial intelligence (i.e., "AI"), machine learning or deep learning, [2] analysis algorithms for natural language processing, [3] analysis algorithms for analyzing big data, or [4] other text or voice analysis algorithms. Such configurations or methods described in this paragraph are to be referred in this disclosure [1] that a terminal may proactively select at least one labeled receiver and, therefore, "the terminal directly creates a label signal," or [2] that "a user indirectly creates a label signal" by manipulating the terminal using the "label request information," where the [1] and [2] of this sentence are deemed to have the same thing throughout this disclosure.

The fourth exemplary aspect of this disclosure relates to various configurations or methods of allowing a user in a group window or in a content window to select at least one labeled receiver, creating a label signal, and then creating a labeled content.

When a user of a certain group established by a certain app drives then app, the user may select a labeled receiver before advancing to a content window of a certain group which is one of multiple groups provided in a group window. For example, the user who is operating the app in a group window (15) of FIG. 2A may touch or press a member ID or a member U/I (17), [2] may manipulate a hard-button type keyboard (to be abbreviated as a "hard keyboard hereinafter) or a soft-button type keyboard (to be abbreviated as a "soft keyboard" hereinafter), or [3] may manipulate other input units, thereby selecting at least one certain member as a labeled receiver. Alternatively, when a terminal displays multiple group windows (15) on a display unit, the user may choose one group window (15) from multiple group windows, may then choose a certain group which may correspond to one of multiple groups displayed on the chosen group window (15), may then open a content window (19) of the certain group, and may then select a certain group as a labeled receiver by providing a user input to a member ID or a member U/I in the content window (10).

Alternatively, the user may provide an acoustic user input (e.g., his voice) to an input unit (e.g., a microphone), thereby selecting at least one member as a labeled receiver, where such a member corresponds to one of multiple member IDs or member U/Is (17) displayed in a group window (15) or a content window (19). Alternatively, the terminal may acquire an image of a user's iris, retina, other eye parts or face, and may extract an electromagnetic user input, thereby indirectly or proactively selecting at least one member of the group as the labeled receiver. For example, the terminal may analyze a line of sight of a user staring at the group window (15) or content window (19), and may then select a certain member as the labeled receiver.

As described above, the user who is operating a certain app and who belongs to a certain group can select at least one member of the group as the labeled receiver, or may select multiple members of multiple groups as the labeled receivers. For simplicity of illustration, following embodiments and examples of this fourth exemplary aspect mainly explain various configurations and methods with which a user (or a content sender) may select a single member as the labeled receiver. However, following embodiments and examples of this fourth exemplary aspect as well as other exemplary aspects of this disclosure may equally apply to configurations and methods with which a user or a terminal may select multiple members as the labeled receivers, for selecting multiple labeled receivers may be easily performed by repeating the selection of the single labeled receiver simultaneously or sequentially. Following FIGS. 6A to 6D exemplify various configurations or methods of selecting a labeled receiver, by user's direct manipulation of a hard keyboard, a soft keyboard, other input units or a display unit.

The first exemplary embodiment of this fourth exemplary aspect relates to various configurations or operational sequences of a terminal, where a user may directly manipulate various hardware elements of the terminal for selecting a labeled receiver. In particular, FIGS. 6A and 6B exemplify various configurations or methods of allowing a user to provide a user input by directly manipulating a hard keyboard, a soft keyboard, an input unit or a touch-screen type display unit, thereby allowing the user to provide a user input and to select at least one labeled receiver in a content window.

Figure 6A:
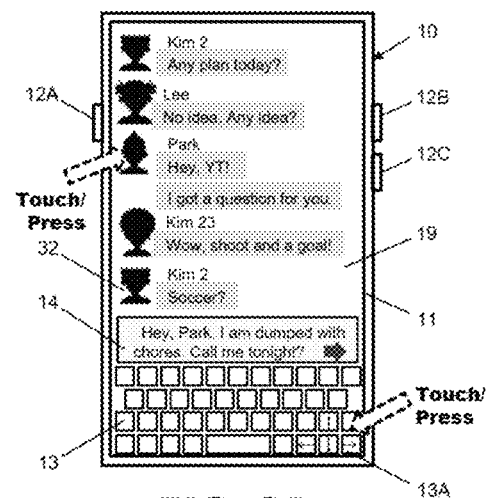
FIGS. 6A to 6D show exemplary configurations and methods of selecting a labeled receiver by manipulating or touching a hard keyboard or a soft keyboard.

As shown in FIG. 6A, a terminal (10) may include various hardware elements and software elements, where examples of such hardware elements may include a display unit (11) which is one of many output units, at least one hard-button type input unit (12A)(12B)(12C), and other units implemented into an interior of the terminal (10) such as a transmission unit, a reception unit, a control unit, a storage unit, an output unit (e.g., a speaker), or the like. It is noted that, when the display unit is the touch-screen type, a hard-button type input unit may be replaced by a soft-button type input unit.

Examples of the software elements of the terminal (10) may include an input window (14), a content window (19), a soft keyboard (13), a soft arrow key (13A), a soft send button (or a send U/I) (13S), and the like. However, when the terminal may include a hard-button type keyboard or a hard-button type arrow key, the terminal may not require a soft-button type keyboard or a soft-button type arrow key. It is noted that, when a user may transmit a data packet using a hard-button type input unit or when the terminal includes a hard-button type send button, the terminal may not need the soft-button type send button.

Examples of other software elements may also include an operating system (O/S) of the terminal (10), multiple apps implemented into the terminal (10), and other computer commands, computer programs or sets of computer programs which may be related to the O/S or which may be independent of the O/S. As used herein, when the above O/S, apps, commands or programs run a certain operation, it is to be collectively referred to as "a terminal runs a certain operation."

As shown in FIG. 6A, a terminal may display a variety of information using a content window (19). For example, the terminal may display on the content window (19) [1] the member icons (or member U/Is) (32) of the members of a certain group, [2] various contents which are transmitted by such members (i.e., unlabeled contents transmitted to all members of the group as well as labeled contents transmitted to a certain member), [3] an input window (14) in which a user may type or create a content, [4] a content send button (or U/I) (35), or [5] a soft keyboard (13) or an arrow key (13A) when the display unit (11) is a touch-screen type. For simplicity of illustration, however, FIG. 6A does not include other detailed information such as, e.g., a time of receiving the content.

A user may create a contents in various methods. For example, the user may create the content [1] by manipulating a soft keyboard or a hard keyboard (13), [2] by manipulating an arrow key (13A), or [3] by attaching a file or a folder of various types. The terminal displays the content created by a user on the input window (14). As a result, a user may [1] easily confirm the content which he is creating or he has already created, or [2] easily correct any error included in the content.

A user may select at least one member of the group as a labeled receiver in various methods, before, during or after creating a content in an input window (14). To this end, a user may select a certain member as the labeled receiver [1] by pressing or contacting a member ID (or a member U/I) (17), [2] by manipulating a hard keyboard or a soft keyboard, or [3] by manipulating other input units.

For example, FIG. 6A exemplifies a situation in which a user touches or presses an icon (or an U/I) (32) of "Park" who is the third member from the top of the members displayed in a content window (19) and, as a result, a terminal selects "Park" as a labeled receiver. As a result and as shown in FIG. 6B, the terminal (10) may emphasize the icon (or U/I) (32) of "Park" as in (33), and the user may easily confirm whether the selected member is the one whom the user intended as the labeled receiver.

Figure 6B:
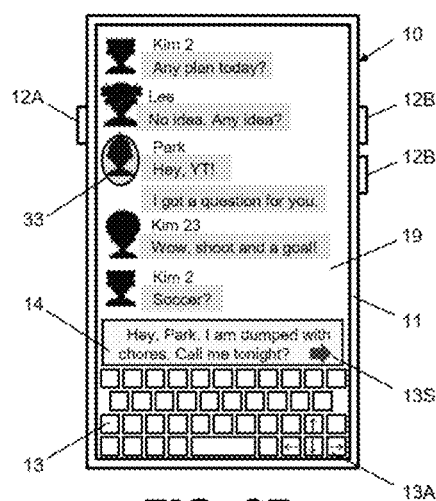

The terminal (10) of FIGS. 6A and 6B displays the member IDs (17) or the member icons (32) in the content window (19). In particular, the terminal (10) may display the contents according to the time of reception and, thus, may display the content which the terminal received most recently from another member above the input window (14) or which the user has just transmitted above the input window (14). As a result, the content which is displayed at the bottom of the content window (19) is the one which is more recently received or transmitted than the content which is displayed above the content window (19).

Therefore, when a user selects a certain member as a labeled receiver, a user may not be able to see the member's ID (17) or icon (32) in the content window (19) when that member has not transmitted any content recently and, as a result, the user may not easily select that member. To obviate this inconvenience, the terminal (10) may allow a user to scroll up or down the content window (19) and to select a labeled receiver before, during or after creating the content. Alternatively and as will be explained in detail below, a user may provide an acoustic user input or an electromagnetic user input, thereby selecting a certain labeled receiver without having to scroll up or down the content window (19).

When the terminal (10) displays multiple unread contents in the content window (19), the terminal (10) may display such unread contents in an order of reception on the display unit (11) for the user. In such a case, the content which is displayed immediately above the input window (14) may not be the most recent unread content.

When a user finishes manipulation of the member icon (or U/I) (32), a terminal (10) may create a "label signal" which represents a labeled receiver who is selected and labeled based on the user's manipulation. That is the label signal may be regarded as a signal which may represent which member of a certain group is the labeled receiver. Such a label signal may be constructed as a matrix or a database, or may be constructed as an element of the above matrix or database. Thereafter, the terminal (10) may create a "labeled data packet" by including the content created by the user, the "label signal" created by the user, and at least one of a header or a tail in the data packet. When a user completes creating the content and then selecting the labeled receiver, or when the user completes selecting the labeled receiver and then creating the content, the user may manipulate the send button (or U/I) (13S) (e.g., by pressing or touching), and transmit the content.

When the user manipulates the send button (or U/I) (13S) in order to transmit the content which he created, the terminal may transmit the labeled data packet (including the labeled content) to a (central or local) server. Upon receiving the labeled data packet, the server may transmit the labeled data packet to [1] all members of the group, or [2] some but not all members of the group. In addition, when a user presses the send button (13S), the terminal (10) may request a confirmation of transmission from the user. Or the terminal (10) may ask the user to confirm whether the member which the user selected is a correct labeled receiver. When the user confirms that the selected member is indeed the labeled receiver, the terminal (10) may then transmit the labeled data packet. However, when the user rejects the confirmation, the terminal (10) [1] may hold the content transmission, and may request the user to select the right labeled receiver, or [2] may transmit the content as the unlabeled content.

Upon receiving the labeled content from the user in the form of a labeled data packet, a terminal of a receiver may extract the content and the label signal from the labeled data packet. When the receiver's terminal confirms that the receiver is the labeled receiver based on the label signal (i.e., the label signal corresponds to that receiver), the terminal of the receiver may display the content in the content window (19) as the labeled content. However, when the receiver is not the labeled receiver (i.e., the label signal does not correspond to that receiver), the receiver is an unlabeled receiver, not the labeled receiver. Therefore, the receiver's terminal may display the content in the content window (19) as an unlabeled content.

Figure 6C:
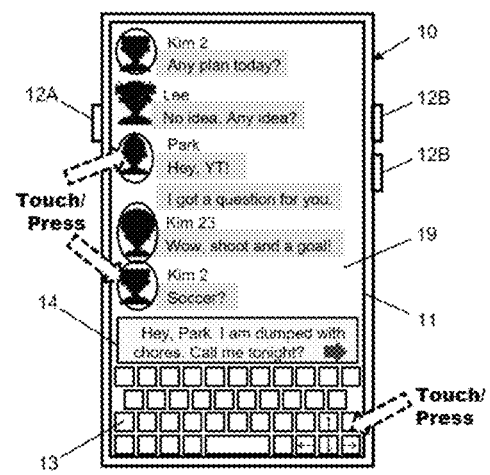
Figure 6D:
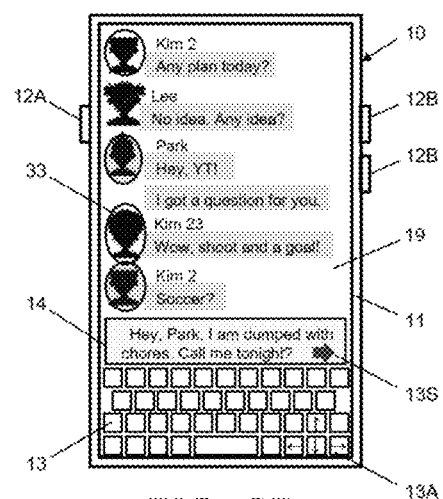

The second exemplary embodiment of this fourth exemplary aspect may relate to exemplary configurations or operational sequences of a terminal which may allow a user to select a labeled receiver by allowing the user to manipulate its various hardware elements. FIGS. 6C and 6D exemplify the configuration or operational sequences of a terminal which may allow a user to manipulate its hard keyboard, its soft keyboard or input units or which may allow the user to provide a user input by directly touching its touch-screen type display unit, thereby allowing the user to select a labeled receiver in the content window.

Various configurations and methods of FIGS. 6C and 6D are generally identical to those of FIGS. 6A and 6B, but differ in configurations and methods of selecting the labeled receiver. It is noted that a terminal (10) of FIGS. 6C and 6D includes various hardware and software elements which may be identical or similar to those of the terminal of FIGS. 6A and 6B and, therefore, that further details are omitted. In addition, the content window (19) of FIG. 6C is similar or identical to that of FIG. 6A and, therefore, further details are omitted.

That is, the difference between the terminals of FIGS. 6A and 6C is that a content window of the terminal (10) of FIG. 6A may display the member icons of all members of a certain group, but that the terminal (10) of FIG. 6C may display the member icons of all members of the group in its content window (19), while displaying the member icons (or U/Is) (32) of those members whom the user may select as the labeled receivers differently from the member icons (or U/Is) (32) of the members whom the user may not select as the labeled receivers. As a result, the terminal may offer the benefit of preventing the user from accidently transmitting the labeled content to those members who cannot be the labeled receivers.

For example, the terminal (10) of FIG. 6C displays most members' icons (32) in their active state (e.g., the active state is described as an oval surrounding the member icon) in the content window (19), while the member icon (32) for the second member, "Lee," is displayed in its inactive state (e.g., the inactive state is described as having no oval). Thus, the user may not select "Lee" as the labeled receiver. As a result, the user may transmit an unlabeled contents to "Lee" but cannot send a labeled content to "Lee." This configuration offers the benefit of preventing the user from making a mistake of transmitting a labeled content to "Lee" who has been excluded from the list of the labeled receivers.

A user may manually (or directly) [1] exclude at least one member of a certain group of a certain app from the list of labeled receivers, or [2] add that member to the list of non-receivers. It is noted that adding the member to the list of non-receivers corresponds to excluding the same member from the list of labeled receivers. Therefore, following embodiments and examples will focus on the case of [1] of this paragraph, while omitting the case of [2] of this paragraph.

When a user deletes the member from the list of labeled receivers, the terminal (10) may [1] delete the member from the list of labeled receivers for that group only, [2] delete the member from all lists of labeled receivers of all the groups established by the app, [3] delete the member from the lists of labeled receivers of some but not all groups established by the app, [4] delete the member from all lists of labeled receivers of all the groups established by all the apps implemented to the terminal, or [5] delete the member from the lists of labeled receivers of all the groups established by some but not all the apps implemented to the terminal.

A user may delete a certain member from the list of labeled receivers or may add the member to the list of non-receivers, by employing various methods of selecting the labeled receivers which may be similar to or identical to those explained in the first embodiment of the fourth exemplary aspect. Alternatively, the user may use the set-up function of the terminal in order to delete the member from the list of labeled receivers or to add the member to the list of non-receivers. As a result, the user may receive the unlabeled content or labeled content transmitted by that member, but the user may not transmit the labeled content to that member. Depending upon various settings of the terminal or app settings, the user may not transmit even unlabeled contents to that member.

To the contrary, the terminal may use various information analysis algorithms such as, e.g., those used in artificial intelligence, machine learning, deep learning, natural language processing, big data, voice analysis, or text analysis, and choose the member to be deleted from the list of the labeled receivers. For example, the above information analysis algorithms may analyze various data stored in [1] the terminal, [2] the app, or [3] a certain group of a certain app. Based on such analysis, the terminal may confirm a certain member whom the user may avoid, may choose such a member, and may then delete that member from the list of labeled receivers. More particularly, the terminal may choose the member to be deleted from the list of labeled receivers by considering the contents exchanged between the user and the member, or the business or personal relationship between the user and the member.

A user may create a content in the input window (14) in various methods, which are similar or identical to those explained in conjunction with FIGS. 6A and 6B and, therefore, further details are omitted herein. Before, during or after creating the content, the user may select a labeled receiver [1] from the members who are included in the list of labeled receivers, or [2] from the members who are not included in the list of non-receivers. Further details of selecting such labeled receivers are similar or identical to those exemplified in conjunction with FIGS. 6A and 6B and, therefore, are omitted herein.

Once the user finishes manipulation of the member icon (or U/I) (32), the terminal (10) may create a "label signal" which may represent a labeled receiver who is selected based on the user's manipulation. The terminal (10) may then attach a "label mark (33)" on or around the member icon (32) of the member who has been labeled in the content window (19) displayed on the display unit (11).

The terminal (10) may request the user's confirmation whether or not the selected member is the labeled receiver in various methods. For example, when a user checks the label mark (33) and finds out that a first member with a label mark (33) in a content window (19) is not the member whom the user intended, the user may manipulate the member icon (32) and cancel the selection of the first member. Thereafter, the user may select a second member as the labeled receiver. In response thereto, the terminal (10) may cancel the label mark (33) for the first member.

Alternatively, when a user presses the send button (13S), the terminal (10) may request the user's confirmation for the transmission. For example, the terminal (10) may ask the user to confirm whether the first member selected by the user is the labeled receiver. When the user confirms that the first member whom the user selected is the correct labeled receiver, the terminal (10) may transmit a labeled data packet. When the user does not confirm, the terminal (10) may hold the transmission of the data packet, and [1] may request the user to re-select a new labeled receiver, or [2] may transmit the content as the unlabeled content immediately or after a certain period of time.

When the user fails to respond to the confirmation requests explained in the above two paragraphs within a certain period of time, the terminal (10) [1] may regard that as the user's confirmation, and transmit the content created by the user in the form of the labeled data packet, [2] may regard the content created by the user as the unlabeled content, and transmit the content in the form of the unlabeled data packet, [3] may request the confirmation by the user once more, or [4] may hold the transmission of the content until the user takes a certain action.

When the user confirms the label mark (33) and manipulates the send button (13S), the terminal (10) may transmit a labeled data packet which includes the labeled content to a (central or local) server. Upon receiving such a data packet, the server may transmit the labeled data packet [1] to all members of the group or [2] to some but not all members of the group. Detailed of such configurations or methods have been provided in conjunction with FIGS. 6A and 6B and, therefore, are omitted herein.

The above terminals, labeled contents, or labeled icon badges of the fourth exemplary aspect may be also modified or varied in various configurations or methods. Followings are various examples of such modifications or variations, where such modifications or variations [1] may be applied to modify or vary various embodiments or examples of this fourth exemplary aspect, or [2] may be applied to modify or vary different embodiments or examples of different exemplary aspects described hereinabove or hereinafter.

The first example of such modifications or variations of this fourth exemplary aspect relates to the configurations or methods of creating various label signals which are different from those label signals exemplified above. For example, instead of the label signal in the form of a matrix or a database, the terminal may use the label signal which may be either "0" or "1." Accordingly, when the label signal is "1," it means that the receiver is the labeled receiver. However, when the label signal is "0," the receiver is not the labeled receiver but the unlabeled receiver.

When the terminal transmits the labeled data packet to a server, the server receives the labeled data packet, and then may transmit the packet to all members of the group. Upon receiving the labeled data packet, a terminal of the receiver may extract the content from the labeled data packet, and may check the label signal. When the receiver is the labeled receiver (i.e., the label signal is "1"), the terminal may display the content as the labeled content. However, when the receiver is an unlabeled receiver (i.e., the label signal is "0"), the terminal may display the content as an unlabeled content.

The second example of such modifications or variations of this fourth exemplary aspect relates to various configurations or methods of checking the labeled content. For example and contrary to the above, the terminal may create not only the labeled data packet but also an "unlabeled data packet" which may include the content created by the user, a header, and a tail but which does not include the label signal. The terminal may transmit both the labeled data packet and the unlabeled data packet to a server. Upon receiving such packets, the server may transmit the labeled data packet to the labeled receiver, while transmitting the unlabeled data packet to the rest of the members of the group. Accordingly, a terminal of the labeled receiver may receive the labeled data packet, and display the content as the labeled content. However, a terminal of the unlabeled receiver may receive the unlabeled data packet, and display the content as the unlabeled content.

The third example of such modifications or variations of this fourth exemplary aspect relates to various configurations and methods of transmitting various data packets and label signals. Contrary to the above, the terminal may create the "unlabeled data packet" which may include the content created by the user, a header, and a tail but which does not include the label signal. The terminal may transmit the unlabeled data packet and the label signal to a server. The server receives the unlabeled data packet and the label signal, may then transmit both of the unlabeled data packet and label signal to the labeled receiver, but may transmit only the unlabeled data packet to the rest of the members of the group. After receiving the unlabeled data packet and the label signal, a terminal of the labeled receiver may display the content as the labeled content. However, the terminals of the rest of the members may receive only the unlabeled data packet, and may then display the content as the unlabeled content.

The fourth example of such modifications or variations of this fourth exemplary aspect relates to various configurations or methods of storing and retrieving various contents or label signals. Various terminals and servers of this disclosure may store such contents, label signals, unlabeled data packets or labeled data packets in various methods. For example, a server may receive, process, or store the contents, label signals, unlabeled data packets or labeled data packets. The server may then [1] transmit only one of the unlabeled data packet and labeled data packet to a receiver, [2] transmit the content and label signal to a labeled receiver but transmit only the content to an unlabeled receiver, or [3] inform a receiver (or a terminal of the receiver) of a storage location in a server in which the labeled content, unlabeled content or label signal may be stored.

Alternatively, a server may receive both of the unlabeled data packet and the labeled data packet, and then transmit such data packets after processing such data packets or without any processing. Accordingly, when a receiver's terminal receives the labeled data packet, the terminal may display the content included in the labeled data packet as the labeled content. When the receiver's terminal receives the unlabeled data packet, however, the terminal may display the content that is included in the unlabeled data packet as the unlabeled content. When desirable, the server may process or store an entire portion or only a portion of the unlabeled data packet or labeled data packet.

Alternatively, a server may receive a label signal and a data packet which does not include any label signal, and then may transmit the label signal and the data packet to a receiver, with or without processing or storing such a label signal or data packet. When a terminal of a receiver receives only the data packet, the terminal may display the content included in the data packet as an unlabeled content. In contrary, when the receiver's terminal receives the label signal as well as the data packet, the terminal may display the content included in the data packet as the labeled content. When desirable, the server may process or store an entire portion or only a portion of the data packet or label signal.

In contrary, the server may transmit various contents or various data packets to the receiver's terminal in various methods which may be a combination or a modification of such configurations or methods of this fourth exemplary aspect. For example, a server may receive [1] at least one of a labeled data packet and an unlabeled data packet, [2] a content and a label signal, [3] an unlabeled data packet and a label signal, or [4] a label signal, an unlabeled data packet, and a labeled data packet. The server may store at least one of the content, label signal, labeled data packet, and unlabeled data packet. Similarly, the server may transmit [1] at least one of an unlabeled data packet and a labeled data packet, [2] a content and a label signal, [3] a label signal and an unlabeled data packet, or [4] a label signal, a labeled data packet, and an unlabeled data packet. As described above, a receiver's terminal may [1] receive from a server or from a user one of such data packets and then extract a content therefrom, [2] directly receive a content instead of such data packets, or [3] information as to the storage location of the content in the server.

The fifth example of such modifications or variations of this fourth exemplary aspect relates to the configurations or methods of selecting a labeled receiver using the user inputs of various types. For example, a user may select a labeled receiver by providing the mechanical user input as described above or other mechanical user inputs of different types. In other words, a user may select a labeled receiver by manipulating not his body part but a non-user object and by providing various mechanical, electric or magnetic user inputs to various input units of the terminal.

In contrary, a user may stare at a member ID of a certain member of the user's choice in a group window or a content window, or may stare at a member ID of a certain member or a content which has been transmitted by that member in a content window, while providing an electromagnetic user input to various input units of the terminal and allowing the terminal to select a certain member as the labeled receiver. More particularly, the terminal may acquire an image of a user's iris, retina, other parts of his eye or face using a camera or another image acquisition unit, and may analyze the image to extract a line of sight of a user from the image. Based on the analysis, the terminal may identify a certain member whom the user stares at in the group window or content window, and select that member as the labeled receiver.

The user may also select a labeled receiver by providing an acoustic user input (e.g., his voice or other sounds) to a microphone or other equivalent input units of the terminal. For example, the user may select a certain member as the labeled receiver by speaking [1] a name, [2] a title, [3] a nickname, [4] an ID, or [5] a numeral, a symbol or a title assigned to the certain member to the microphone. Alternatively, the user may select a certain member as the labeled receiver by speaking to the microphone [1] a task or a schedule related to a certain member, [2] a word or a phrase included in the contents exchanged with the certain member, or [3] a word, a phrase or description of an image related to the certain member.

More particularly, when a user provides the electromagnetic user input (e.g., an image) or the acoustic user input (e.g., a voice), the user may select a certain member as the labeled receiver, even when the display unit may or may not display an input window or a content window. In addition, when the terminal or app receives the acoustic user input by using the voice recognition unit, the user may select a certain member as the labeled receiver by speaking [1] a name, a short name or a nickname, or [2] a word like "label" or its equivalent, after the user chooses a certain member or after the terminal displays an input window on the display unit.

The sixth example of such modifications or variations of this fourth exemplary aspect relates to various configurations and methods for confirming the selection of a certain labeled receiver. In other words, the terminal may ask a user, even when the user has not selected any labeled receiver. For example, the terminal may ask a user whether or not to select a labeled receiver [1] when a user requests an input window, [2] when the user begins to create a content in the input window, [3] when the contents created by a user may include a name, a title, or a nickname of a certain member, [4] when the contents created by a user may include a word which points or reminds a certain member, [5] when a user creates a content which exceeds a certain length or a certain size, or [6] when the user presses the send button without selecting any labeled receiver.

When the user provides an input that he does not select any labeled receiver, the terminal may regard the content created by the user as an unlabeled content, may include the content into an unlabeled data packet, and may then transmit the unlabeled data packet. In contrary, when the user provides an input that he will select at least one labeled receiver, the terminal may wait for the selection by the user, may label the receiver selected by the user as the labeled receiver, may include the contents into a labeled data packet, and may then transmit the labeled data packet. To accommodate convenience on the part of the user, the terminal may display a member list of a certain group or a list of the labeled receivers of the group.

The seventh example of such modifications or variations of this fourth exemplary aspect relates to various configurations or methods of selecting multiple members of a certain group established by a certain app as the labeled receivers. To this end, a terminal may create various "label signals" [1] each of which may label a different member of the group as the labeled receiver or [2] each of which may label multiple members of the group as the labeled receivers.

For example, when the label signal has a format of a matrix or a database and when the group includes N members, the matrix or the database may include various data for the cases for 0 labeled receiver (i.e., all members not unlabeled receivers), for 1 labeled receiver, for 2 labeled receivers, . . . , for (N−3) labeled receivers, for (N−2) labeled receivers, or for (N−1) labeled receivers (i.e., all members except the user are labeled receivers). That is, the terminal may store information regarding all possible combinations of such N members and the label signals for such combinations. When desirable, the terminal may limit the maximum number of such labeled receivers, or may construct the matrix or database while excluding a certain member. The terminal may store such combinations and corresponding label signals, not for all members of a certain group, but for those members included in the list of the labeled receivers.

When the label signal is "0" or "1," the terminal may transmit the unlabeled data packet with the label signal "0" (i.e., the receiver is not a labeled receiver) or the labeled data packet with the label signal "1" (i.e., the receiver is a labeled receiver) to one or multiple members. Therefore, when the user does not label any member as the labeled receiver, the terminal may transmit the unlabeled data packet with the label signal "0" to all members of the group. Alternatively, when the label signal may be any number, character or symbol, a terminal may transmit a data packet (i.e., a labeled data packet) in which any number, character or symbol is included in a certain portion which is assigned to a label signal to a single or multiple members. In addition, such a terminal may transmit another data packet (i.e., an unlabeled data packet) in which the certain portion assigned to the label signal is empty to other members of the group. The terminal may also select multiple members as the labeled receivers using various methods described heretofore and hereinafter.

As described above, when a terminal transmits either a labeled data packet (including a label signal) or an unlabeled data packet (without a label signal), a terminal of a receiver may display a certain content either as a labeled content or as an unlabeled content, depending upon an existence or an absence of a label signal in the data packet. In this case, the label signal may be any number, any character or any symbol. In other words, when a certain portion of a data packet which is specifically assigned to a label signal is empty, the terminal may regard such a data packet as an unlabeled data packet. However, when the above portion includes any number, character, symbol, image or other information, the terminal may regard such a data packet as a labeled data packet.

The eighth example of such modifications or variations of this fourth exemplary aspect relates to various configurations or methods for creating and using an "anti-label signal" which may be regarded as an opposite to the label signal. For example, a terminal may create an "anti-label signal" which represents at least one non-labeled receiver of a labeled content, in contrary to the label signal which represents at least one labeled receiver. The terminal may then create and use an "unlabeled data packet" which includes the anti-label signal. That is, the anti-label signal may be regarded as a signal which may represent that a certain member of a group is not a labeled receiver but an unlabeled receiver. Therefore, a terminal which may receive a data packet including the anti-label signal may display the content as an unlabeled content, whereas a terminal which may receive another data packet which does not include the anti-label signal may display the content as a labeled content.

The configurations of this example may apply to the aforementioned label signals as well as to other embodiments or examples related to the label signals. That is, a terminal may use the anti-label signal which is the opposite to the label signal, in confirming an unlabeled receiver and then regarding at least one member as a labeled receiver. As a result, the terminal may display the content included in a data packet with the anti-label signal as the unlabeled content, while displaying the content included in a data packet without the anti-label signal as the labeled content.

The ninth example of such modifications or variations of this fourth exemplary aspect relates to various configurations and methods for selective transmission of a labeled content to a certain member. That is, a user may transmit a labeled data packet or a labeled content only to a labeled receiver of a certain group, not to all members of the group. As a result, an unlabeled receiver may not even receive an unlabeled data packet which include the same content. In other words, the unlabeled receiver may not receive the content which a user transmits to the labeled receiver, and the user may only transmit the labeled content only to the labeled receiver.

To this end, when the label signal has a type of a matrix or database, the terminal [1] may modify the elements of the matrix or database and exclude those members who do not correspond to the label signal, thereby ensuring that such members may not even receive any unlabeled data packet, or [2] may ensure that the content may be transmitted only to those receivers who correspond to the label signal by using various methods described in this disclosure or other prior art methods.

When the terminal uses the label signal which is either "0" or "1," the terminal may set a label signal of a labeled data packet which is to be transmitted to a labeled receiver as "1," while setting a label signal of an unlabeled data packet which is to be transmitted to the rest of the members as "0," thereby ensuring that the rest of the members may not even receive an unlabeled data packet. The terminal may use "2" in addition to "0" and "1" as the label signals in such a way [1] that the terminal does not transmit any content to a member who is assigned with the label signal of "0," [2] that the terminal may transmit the content as an unlabeled content to a member assigned with another label signal of "1," or [3] that the terminal may transmit the content as a labeled content to a member who may be assigned with a label signal of "2." The terminal may also employ other conventional methods to transmit a content only to a receiver who matches the label signal.

The tenth example of such modifications or variations of this fourth exemplary aspect relates to various configurations and methods for direct transmission of an unlabeled data packet, a labeled data packet, a content or a label signal to other members of a certain group from a terminal of the user, without having to go through a server. That is, by changing settings of a terminal or changing a structure of a network of a server, a user may directly transmit a labeled data packet, unlabeled data packet, content or label signal to other members of the group, without having to route via the server. This example may apply to cases where a terminal of a user may be able to directly exchange contents with a terminal of a receiver without the intervention of a server through, e.g., a bluetooth, an NFC, or the like.

Various embodiments and examples of the above fourth exemplary aspect may be interchangeable with the embodiments or examples of other exemplary aspects. Therefore, as long as there is no contradiction, various embodiments or examples of this fourth aspect [1] may also apply to corresponding features of other embodiments or examples of this fourth aspect or other embodiments or examples of other aspects of this disclosure, [2] may be incorporated into corresponding features of other embodiments or examples of this fourth or other aspects, [3] may replace corresponding features of other embodiments or examples of this fourth or other aspects, [4] may be replaced by corresponding features of other embodiments or examples of this fourth or other aspects of this disclosure, or [5] may be combined with corresponding features of other embodiments or examples of this fourth or other aspects.

The fifth exemplary aspect of this disclosure relates to various configurations or methods of using various member lists displayed on the display unit in selecting a single or multiple members as the labeled receivers, in creating a labeled signal, and also in creating a labeled data packet including a content and a label signal. A user driving a certain app may select at least one labeled receiver before inputting a content into an input window, during such inputting or after such inputting. To this end, a user may consult a "member list" which displays all (or multiple) members or their member IDs of a certain group established by a certain app.

Although the following embodiments and examples of this aspect may mainly explain various configurations and methods of selecting a single member of a certain group of a certain app as a labeled receiver, the terminal may readily modify such configurations or methods to allow a user to repeat such procedures and to select multiple members as multiple labeled receivers. Therefore, further details of such configurations or methods of selecting multiple member as the labeled receivers are omitted.

The first exemplary embodiment of this fifth exemplary aspect relates to various configurations or operational sequences of a terminal which may allow a user to directly select a labeled receiver using a "member list" displayed on a group window. For example, when the terminal (10) may display a member list which may include the member IDs (or U/Is) (17) of all (or multiple) members of a certain group set up by a certain app in a group window (15) as exemplified in FIG. 2A, a user may then select a labeled receiver from the member list [1] by directly pressing, contacting or otherwise manipulating the member ID (17), [2] by manipulating the member ID (17) with a hard keyboard or a soft keyboard, or [3] by manipulating the member ID (17) with other input units.

Alternatively, the user may open a content window (19) on a display unit (11) by selecting a certain group from multiple groups displayed in a group windows (15), may display a member list on a content window (19) after providing a user input, and may then select a certain receiver from the member list as a labeled receiver. Or a user may display the member list on the display unit (11), and may then select a certain member as a labeled receiver in a group window (15) or a content window (19) by providing an acoustic user input such as his voice to an input unit such as a microphone.

Or the terminal may display the member list on a display unit (11), may acquire an electromagnetic user input such as, e.g., an image of an iris, retina or eye, and may select a certain member as a labeled receiver from a content window (19) displayed on a display unit (11). For example, the terminal may analyze the line of sight of a user who is staring at a certain portion of the member list displayed on the content window (19), may locate a certain member ID

(17) of the member list coinciding with the line of sight, and then select a member whose member ID is the above ID. The user may provide a certain user input to the terminal and may manipulate the terminal to acquire the line of sight and to analyze it. Alternatively, after displaying the member list on the display unit, the terminal may then acquire the line of sight within a certain period of time, and then analyze the line of sight. In the latter case, a user may just look at a certain member ID (17) of the member list within that period of time, without having to provide other additional user inputs to the terminal, thereby offering another convenience to the user in selecting a labeled receiver.

Figure 6E:
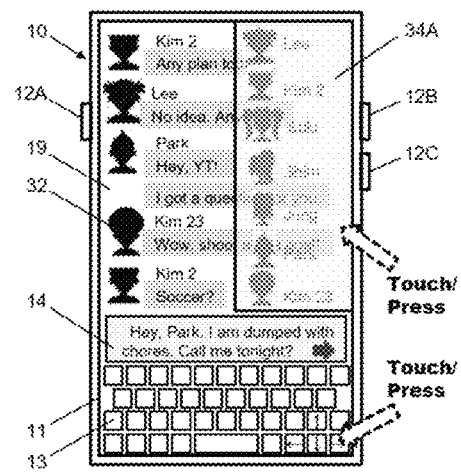
FIGS. 6E to 6K show exemplary configurations and methods of selecting a labeled receiver using a member list of a certain group.
Figure 6F:
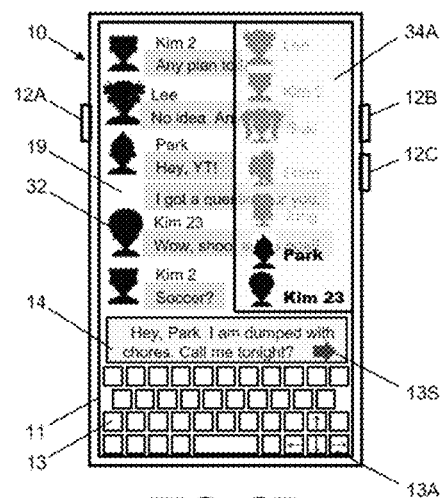

The second exemplary embodiment of this fifth exemplary aspect relates to the configurations and operational sequences of a terminal which may allow a user to directly select a labeled receiver using a member list which is displayed on a content window. FIGS. 6E and 6F exemplify various configurations or methods of selecting a labeled receiver in a content window, while allowing a user to provide various user inputs by directly manipulating a hard or soft keyboard or other input units or by directly contacting a display unit.

The terminal (10) may include various hardware elements or software elements which may be identical or similar to those of the terminals of FIGS. 6A to 6D and, thus, further explanations are omitted herein. In addition, a content window (19) displayed on a display unit (11) of the terminal of FIGS. 6E and 6F are similar or identical to that of FIGS. 6A to 6D. Therefore, in order to create a content, a user may also manipulate the terminal (10) in the manner which is identical or similar to the manner for creating a content with the terminal of FIGS. 6A to 6D. Thus, further details are omitted herein.

A user who drives the terminal of FIGS. 6E and 6F may select a single or multiple members of a certain group as the labeled receivers in various methods before, during or after creating a content to be transmitted. To this end, a user may request to a terminal in various ways to display a member list (34A) on its display unit (11), where the member list (34A) may include the member icons (32) or IDs (17) of multiple (or all) members of the group. The user may also provide such a request [1] by manipulating at least one of the hard-button type input units (12A)(12B)(12C), [2] by manipulating a soft keyboard or a hard keyboard (13), or [3] a hard-button or soft-button type arrow key (13A).

In response to the user input of the above paragraph, the terminal (10) displays the member list (34A) on the display unit (11). A user may then select a certain member included in the member list (34A) as a labeled receiver [1] by pressing or contacting a member icon (32) or a member ID (17) of the certain member, [2] by manipulating a soft or hard keyboard, or [3] by manipulating other input units.

The terminal (10) may display the member lists (34A) of various shapes or types on its display unit (11). For example, the terminal (10) of FIGS. 6E and 6F may display the member list (34A) in one region of the display unit (11) such as, e.g., a right side, a left side, an upper region, a lower region or a center of the display unit (11), where the member list (34A) may display the member icons (23) or member IDs (17) of all (or multiple) members in a vertical direction.

In the case of FIG. 6E, a user may press or contact the member icons (32) of two members, "Park" and "Kim23," both of whom are listed at the bottom of the member list (34A) which is displayed in a content window (19). When a user selects such members, the terminal (10) may also emphasize or highlight the member icons (32) of "Park" and "Kim23," thereby allowing the user to readily confirm whether the selected members are the ones whom the user intended to select.

The terminal (10) may display the member icons (32) or member IDs (17) in the member list (34A) in various methods. For example, the terminal (10) may display the member IDs (17) or icons (32) in the order of the members' names, ID characters (e.g., English alphabets or Korean letters) or numerals. Alternatively, the terminal (10) may display the member IDs (17) or icons (32) in their chronological order of joining the group. Or the terminal (10) may display the member IDs (17) or icons (32) in the order of contents as displayed in the content window (19).

However, when a certain group includes too many members, a terminal may not be able to display the member IDs (17) or icons (32) of all members on the member list (34A) displayed on the display unit. In such a case, the terminal (10) [1] may display the member IDs (17) or icons (32) in smaller sizes in order to display as many member IDs (17) or icons (32) as possible, or [2] may allow a user to scroll the member list (34A) in a vertical direction when the user provides various certain user inputs. Or the terminal (10) may display the member IDs (17) or icons (32) in multiple lateral or vertical rows or columns or in other arrangements.

When the user is finished with manipulating the member ID (17) or the member icon (32) and with selecting at least one labeled receiver, the terminal (10) may create a "label signal" which denotes the receiver labeled by such manipulation. When the user completes creating a content and then selecting a labeled receiver (or when the user completes selecting a labeled receiver and then creating a content), the user may press, touch or otherwise manipulate the send button (13S). As a result, the terminal (10) or the app may create a "labeled data packet" which may include the content created by the user, the "label signal" also created by the user, a header, and a tail. In this respect, the label signal may be deemed as the signal denoting which member of a certain group the user selects as a labeled receiver. In this respect, the label signal may be constructed in the form of a matrix or a database.

The terminal (10) may also run various operations for confirming the labeled receiver or for confirming transmission of a certain content as exemplified in the above fourth exemplary aspect. After finishing various confirmation procedures, the terminal (10) may transmit the labeled data packet to a (central) server, which may in turn transmit such a packet to all or certain members of the group.

After receiving the data packet, a terminal of a receiver may extract a content from the data packet, and [1] may check whether the data packet includes any label signal or [1] may confirm various features of the label signal. When the receiver is the labeled receiver (i.e., the label signal corresponds to the receiver), the terminal (10) may display the content as the labeled content. However, when the receiver is the unlabeled receiver (i.e., the label signal does not correspond to the receiver), the terminal (10) may then display such a content as the unlabeled content.

The third exemplary embodiment of this fifth exemplary aspect relates to various configurations and operational sequences of a terminal which may allow a user to directly select a labeled receiver using a member list which is displayed on a content window.

Figure 6G:
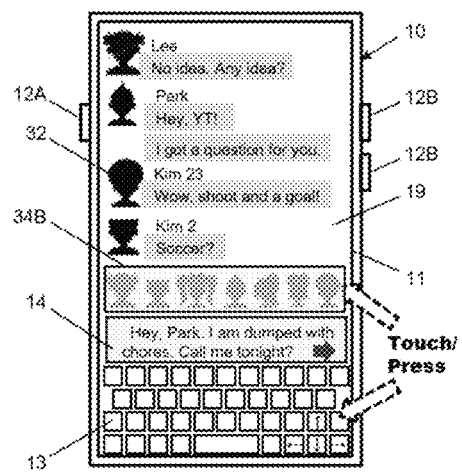
Figure 6H:
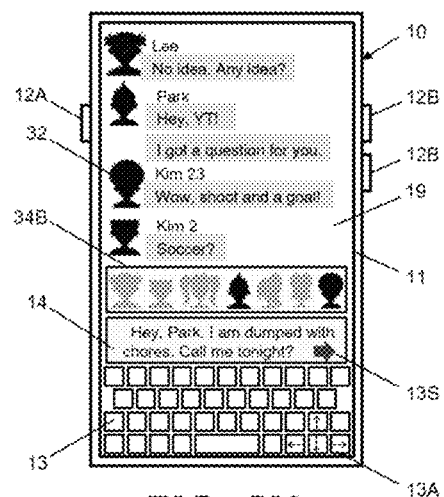

FIGS. 6G and 6H exemplify various configurations or methods of selecting a labeled receiver in a content window, while allowing a user to provide various user inputs by directly manipulating a hard or soft keyboard or other input units or by directly contacting a display unit. The terminal (10) of FIGS. 6G and 6H may also include various hardware elements or software elements which may be similar or identical to those of FIGS. 6E and 6F and, therefore, further details are omitted herein.

In addition, a content window (19) displayed on a display unit (11) of the terminal of FIGS. 6G and 6H may be similar or identical to that of FIGS. 6E and 6F. Therefore, in order to create a content, a user may also manipulate the terminal (10) in the manner which is identical or similar to the manner for creating a content with the terminal of FIGS. 6E and 6F. Thus, further details are omitted herein.

A user who drives the terminal of FIGS. 6G and 6H may select a single or multiple members of a certain group as the labeled receivers in various methods before, during or after creating a content to be transmitted. To this end, the user may provide a user input in various ways as explained in FIGS. 6E and 6F. In response thereto, the terminal (10) may display a member list (34B) on its display unit (11), and a user may select a certain receiver included in the member list (34B) as a labeled receiver [1] by pressing or touching a certain member icon (32) or ID (17) displayed in the member list (34B), [2] by manipulating the member icon (32) or ID (17) using a hard keyboard or a soft keyboard, or [3] by manipulating the member icon (32) or ID (17) using other input units.

The terminal (10) may display on its display unit (11) a member list (34B) which has a different shape or a different type from that of FIGS. 6E and 6F. For example, the terminal (10) of FIGS. 6G and 6H may display a member list (34B) in a certain region (e.g., a left side, a right side, an upper portion, a lower portion or a center) of the display unit (11), where the member list (34B) may display the member IDs (17) or member icons (32) of all (or multiple) members in a lateral direction.

For example, the terminal (10) of FIGS. 6G and 6H may display the member list (34B) above an input window (14). In FIG. 6G, a user may press or touch the member icons (32) which are positioned in the middle and the right end of the member list (34B). The terminal (10) may highlight the member icons (32) of those two members, and the user may readily confirm whether the selected members are the members whom the user has intended.

However, when a certain group has too many members to display their member IDs (17) or member icons (32) of all members on such a list (34B) displayed on the display unit, the terminal (10) may [1] display such member IDs (17) or member icons (32) in smaller sizes in order to display as many IDs (17) or icons (32) as possible, or [2] allow a user to scroll the member list (34B) in a lateral direction when the user provides various user inputs. Alternatively, the terminal (10) may display the member IDs (17) or icons (32) in multiple lateral or vertical rows or columns or in other arrangements.

As the user completes manipulating the member icon (32) or member ID (17) and selects a labeled receiver, the terminal (10) may create a "label signal" for denoting a labeled receiver using the same or similar manipulations exemplified in FIGS. 6E and 6F, may also create various data packets, and may transmit the data packet to a receiver. It is noted that the terminal (10) may perform various procedures to confirm the labeled receiver or transmission of the content. Thereafter, the terminal (10) may transmit the labeled data packet to a server which may then transmit the data packet to all (or certain) members of the group.

After receiving the data packet, a terminal of the receiver may extract the content from the data packet and [1] may then check whether the data packet includes a label signal or [2] may analyze the features of the label signal. When the terminal confirms that the receiver is the labeled receiver (i.e., when the data packet may include the label signal or when the label signal may correspond to the receiver), the terminal (10) may display the content as a labeled content. But when the terminal confirms that the receiver is the unlabeled receiver (i.e., when the data packet does not include a label signal or when the label signal does not correspond to the receiver), the terminal (10) may then display the content as the unlabeled content.

Figure 6I:
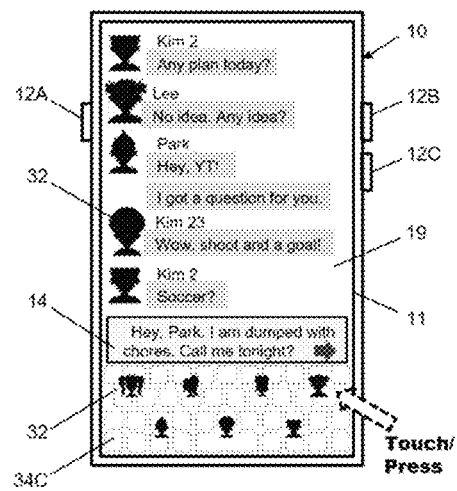

The fourth exemplary embodiment of this fifth exemplary aspect relates to various configurations and methods for a terminal which may allow a user to directly select a labeled receiver using a member list displayed in a content window. FIG. 6I exemplifies configurations and methods for selecting a labeled receiver in the content window, where a user may provide various user inputs by directly manipulating a hard keyboard, a soft keyboard or other input units or by directly touching a display unit.

The terminal of FIG. 6I may include various hardware elements or software elements which may be similar or identical to those of FIGS. 6E and 6F and, therefore, further details are omitted. The content window (19) which the terminal (10) displays on a display unit (11) may be similar or identical to the content window of FIGS. 6E and 6F and, therefore, a user may manipulate the terminal (10) in such methods which may be similar or identical to those of the terminal of FIGS. 6E and 6F. Therefore, further details are omitted herein.

The user who drives the terminal of FIG. 6I may select at least one member of a certain group before, during or after creating a content to be transmitted. The user may also provide the user input in various methods exemplified in FIGS. 6E and 6F. In response thereto, the terminal (10) displays a member list (34C) on the display unit (11). The user may select a certain member who is included in the member list (34C) as the labeled receiver [1] by pressing or contacting a certain member icon (32) or member ID (17) in the member list (34C), [2] by manipulating the hard keyboard or soft keyboard, or [3] manipulating other input units.

The terminal (10) may display a member list (34C) of a shape or a type which may is different from those of the member lists (34A)(34B) of FIGS. 6E to 6H. For example, the terminal of FIG. 6I may display the member list (34C) below an input window (14) which is displayed on a display unit (11), where the member list (34C) includes the member icons (32) or IDs (17) of all (or multiple) members of the group. It is noted that the member list (34C) is typically similar to the member list (34B) of FIGS. 6G and 6H. However, unlike the member list (34B) which is displayed above the input window (14), the member list (34C) of FIG. 6I may be displayed below the input window (14). Unlike the member list (34B) which lists the member icons (32) or IDs (17) in a single row, the member list (34C) of FIG. 6I lists such icons (32) or IDs (17) in multiple rows.

When the display unit (11) is a touch-screen, the terminal (10) may display the member icons (32) in locations where the terminal (10) may display a soft keyboard (13). Alternatively, the terminal (10) may only dimly display the soft keyboard (13), while displaying such member icons (32) over the soft keyboard (13). Or the terminal (10) may display the members' names or IDs in addition to the member icons (32).

However, when a certain group has too many members to display the member IDs (17) or member icons (32) of all members on such a list (34C) displayed on the display unit, the terminal (10) may [1] display such member IDs (17) or member icons (32) in smaller sizes in order to display as many IDs (17) or icons (32) as possible, or [2] allow a user to scroll the member list (34C) in a lateral direction when the user provides various user inputs. Alternatively, the terminal (10) may display the member IDs (17) or icons (32) in multiple lateral or vertical rows or columns or in other arrangements.

As the user completes manipulating the member icon (32) or member ID (17) and selects a labeled receiver, the terminal (10) may create a "label signal" for denoting a labeled receiver using the same or similar manipulations exemplified in FIGS. 6E to 6H, may also create various data packets, and may transmit the data packet to a receiver. Details of such creation or transmission of the contents and data packets are similar or identical to those of FIGS. 6E to 6H and, therefore, are omitted here.

Figure 6J:
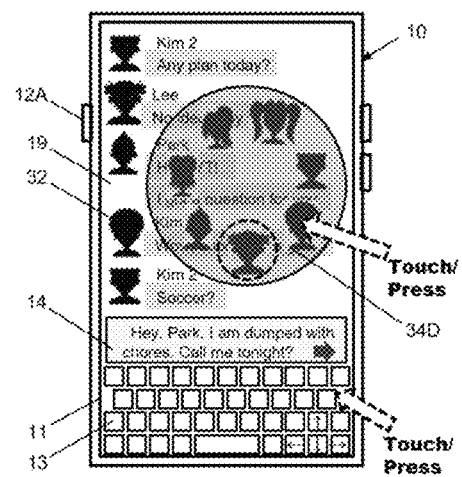
Figure 6K:
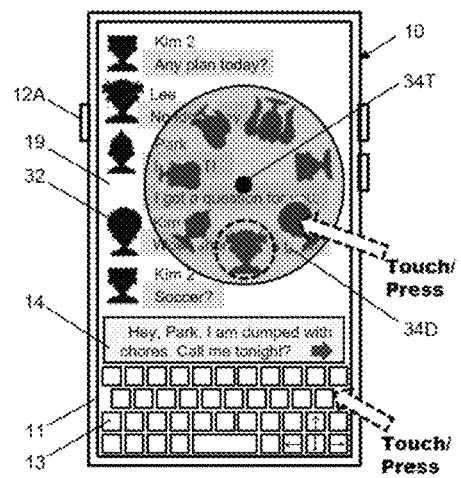

The fifth exemplary embodiment of this fifth exemplary aspect relates to various configurations or operational sequences of a terminal which may allow a user to directly select a labeled receiver by using a different member list displayed on a content window. FIGS. 6J and 6K exemplify various configurations and methods of selecting a labeled receiver in a content window by providing various user inputs by manipulating a soft (or hard) keyboard or other input units or by directly contacting a display unit.

The terminal of FIG. 6J may include various hardware elements or software elements which may be similar or identical to those of FIGS. 6E to 6I and, therefore, further details are omitted. The content window (19) which the terminal (10) displays on a display unit (11) may be similar or identical to the content window of FIGS. 6E to 6I and, thus, a user may manipulate the terminal (10) in such methods which are similar or identical to those of the terminal of FIGS. 6E to 6I. Therefore, further details are omitted herein.

The user driving the terminal (10) of FIG. 6J may select at least one member of a certain group before, during or after creating a content to be transmitted. The user may also provide the user input in various methods exemplified in FIGS. 6E to 6I, and the terminal (10) may display a member list (34D) on the display unit (11), where the member list (34D) may display such member icons (32) or member IDs (17) along a periphery of a circle or oval.

The user may select a certain member who is included in the member list (34D) as the labeled receiver [1] by pressing or contacting a certain member icon (32) or member ID (17) of the member list (34D), [2] by manipulating the hard keyboard or the soft keyboard, or [3] by manipulating other input units. When desirable, the terminal (10) may configure the member list (34D) to rotate such that the user may readily select the certain member as the labeled member by rotating the member list (34D) in a clockwise or counter-clockwise direction.

However, when a certain group has too many members to display the member IDs (17) or member icons (32) of all members on such a list (34D) displayed on the display unit, the terminal (10) may [1] display such member IDs (17) or member icons (32) in smaller sizes in order to display as many IDs (17) or icons (32) as possible, or [2] allow a user to rotate the member list (34D) in a clockwise direction or in a counter-clockwise direction when the user provides various user inputs, while arranging the terminal to display the member IDs or icons of other members who were not included in the member list (34D) before the rotation. The terminal (10) may display the member icons (32) or IDs (17) in multiple concentric layers or in other arrangements.

The terminal (10) of FIG. 6K is similar to that of FIG. 6J, but includes a different member list (34D). For example, the terminal (10) of FIG. 6K may use the member list (34D) which displays the member icons (32) of the members of a certain groups along a circular periphery, however, the terminal (10) displays the member icons (32) in an orientation which is in a point symmetry with respect to a center of the circle.

As the user completes manipulating the member icon (32) or member ID (17) and selects a labeled receiver, the terminal (10) may create a "label signal" for denoting a labeled receiver using the same or similar manipulations exemplified in FIGS. 6E to 6I, may create various data packets, and may transmit the data packet to a receiver. Details of such creation or transmission of the contents and data packets are similar or identical to those of FIGS. 6E to 6I and, therefore, are omitted here.

The above terminals, labeled contents, or labeled icon badges of the fifth exemplary aspect may be also modified or varied in various configurations or methods. Followings are various examples of such modifications or variations, where such modifications or variations [1] may be applied to modify or vary various embodiments or examples of this fifth exemplary aspect, or [2] may be applied to modify or vary different embodiments or examples of different exemplary aspects described hereinabove or hereinafter. Except employing various member lists, the modifications or variations of the fifth exemplary aspect are generally similar or identical to modifications or variations of the above fourth exemplary aspect and, therefore, following modifications and variations focus on major differences.

The first to third examples of such modifications or variations of this fifth exemplary aspect relate to various configurations and methods of creating and using such label signals. For example, instead of the label signal in the form of a matrix or a database, the terminal may employ a label signal which may be either "0" or "1." Or the terminal may employ "2" in addition to "0" and "1" as the label signal. Or the terminal may create the "unlabeled data packet" which does not include a label signal in addition to the "labeled data packet," and may transmit one or both of such data packets to a receiver. Further details may be generally similar or identical to the first to third examples of the modifications or variations of the fourth exemplary aspect and, therefore, are omitted here.

The fourth example of such modifications or variations of this fifth exemplary aspect relates to the configurations or methods of creating and using various contents, label signals, and data packets including such contents and label signals. For example, the central (or local) server or terminal may store the content, label signal or (labeled or unlabeled) data packet with various methods. Further details may be generally similar or identical to the fourth example of the modifications or variations of the fourth exemplary aspect and, accordingly, are omitted here.

The fifth and sixth examples of such modifications or variations of this fifth exemplary aspect relate to various user inputs which the user provides for selecting a labeled receiver. The user may select a labeled receiver by providing various user input and, more particularly, the user may select a labeled receiver by providing various mechanical, electrical, magnetic, electromagnetic or acoustic user inputs. Or the terminal (10) may proactively select a labeled receiver, even when the user may not select a labeled receiver. Further details may be generally similar or identical to the fifth and sixth examples of the modifications or variations of the above fourth exemplary aspect and, therefore, are omitted here.

When a user knows a name, a nickname or other titles of a certain receiver whom the user is going to label, the user may select at least one member as a labeled receiver by speaking a name, a nickname or a title of the member, even when a terminal does not display any member list on a display unit. Of course, the user may provide a certain command or may speak a word so that the terminal may display the member list on the display unit.

The seventh example of such modifications or variations of this fifth exemplary aspect relates to the configurations or methods of using "0" or "1" as the label signal. That is, the user may select multiple members of a certain group as the labeled receivers by using "0" or "1" as the label signal. When desirable, the terminal may also use "2," "3" or other numerals so that the terminal may classify the receivers into 2 types, 3 types, 4 types or more. The terminal may use such numerals themselves as the label signal or may include the numerals into a matrix or a database and then use the matrix or database as the label signal. Further details may be generally similar or identical to the seventh example of the modifications or variations of the fourth exemplary aspect and, therefore, are omitted here.

The eighth example of such modifications or variations of this fifth exemplary aspect relates to the configurations or methods of creating and using the anti-label signal which corresponds to the opposite to the label signal. Thus, the terminal may create the anti-label signal instead of the label signal, and then create the unlabeled data packet including the anti-label signal, instead of creating the labeled data packet which includes the label signal. Further details may be generally similar or identical to the eighth example of the modifications or variations of the fourth exemplary aspect and, therefore, are omitted here.

The ninth example of such modifications or variations of this fifth exemplary aspect relates to the configurations or methods of sending the labeled content or the labeled data packet only to the labeled receiver. For example, the user may transmit the labeled content and the labeled data packet, not to all members of a certain group, but only to the labeled receiver. Therefore, the terminal may block such unlabeled receivers from even receiving the unlabeled data packet which includes the unlabeled content. Other details may be generally similar or identical to the ninth example of the modifications or variations of the fourth exemplary aspect and, thus, are omitted here.

The tenth example of such modifications or variations of this fifth exemplary aspect relates to the configurations or methods of sending the contents or data packets without necessarily going through a server. For example, the user may change the settings of the terminal or may change the network structure with the server, thereby transmitting the content, unlabeled data packet, labeled data packet, label signal, or the like, directly to other members. Other details may be typically similar or identical to the tenth example of the modifications or variations of the fourth exemplary aspect and, therefore, are omitted here.

The eleventh example of such modifications or variations of this fifth exemplary aspect relates to the order in which the terminal displays different members in the member list. For example, the terminal may display the member icons or IDs in the member list based upon [1] the order of the members' names or ID characters (e.g., English alphabets or Korean letters), [2] the order of various numbers related to the members, [3] the order of the time of joining a certain group, or [4] the order of the contents as displayed in the content window, i.e., from top to bottom or the order of reception of such contents. Or the terminal may display the member icons (32) or IDs (17) according to user preference or in a reverse order of the user preference.

Various embodiments and examples of the above fifth exemplary aspect may be interchangeable with the embodiments or examples of other exemplary aspects. Therefore, as long as there is no contradiction, various embodiments or examples of this fifth aspect [1] may also apply to corresponding features of other embodiments or examples of this fifth aspect or other embodiments or examples of other aspects, [2] may be incorporated into corresponding features of other embodiments or examples of this fifth or other aspects, [3] may replace corresponding features of other embodiments or examples of this fifth or other aspects, [4] may be replaced by corresponding features of other embodiments or examples of this fifth or other aspects, or [5] may be combined with corresponding features of other embodiments or examples of this fifth or other aspects.

The sixth exemplary aspect of this disclosure relates to various configurations and operational sequences for employing the information analysis algorithms and allowing the terminal to "proactively" select a labeled receiver, to create a label signal, and then to create a labeled data packet which includes the content and the label signal. As described above, this is equivalent to "proactively" create a label signal, to select a labeled receiver, and then to create a labeled data packet which includes the content and the label signal.

As discussed in the above sixth objective and as also exemplified in the above fourth and fifth exemplary aspects, [1] a user may select a labeled receiver by providing various user inputs to a terminal, and the terminal may create a label signal based upon such selection, may create a labeled data packet including the label signal, and may then transmit the data packet to all or some members of a certain group, or [2] a user may create the label signal by supplying various user inputs to the terminal, and the terminal may select a certain labeled receiver based on such selection, may create the labeled data packet including the label signal, and may transmit the labeled data packet to all (or some) members of the group. It is noted that the difference between the [1] or [2] of this paragraph is attributed to different perspectives and, therefore, the [1] and [2] of this paragraph are deemed to be identical to each other in this disclosure.

The user may select the labeled receiver [1] by providing a user input such as a movement or a gesture to a terminal or [2] by providing various electrical, magnetic, electromagnetic or acoustic user inputs to the terminal. More particularly, the terminal may generate a label signal [1] by directly sensing such a movement or a gesture mechanically, electrically, magnetically, electromagnetically or acoustically, or [2] by electromagnetically acquiring a still image or a video clip of such a movement of a gesture and then by analyzing the image or video clip.

Alternatively, the user may create a label signal by providing a terminal with a user input which selects (or designates) a labeled receiver or which creates a label signal. Or the terminal may create an unlabeled data packet which does not include the label signal, and [1] may not transmit the label signal but may transmit the unlabeled data packet to all members of the group, or [2] may transmit both the label signal and the unlabeled data packet to the labeled receiver. In contrary, the user may transmit the unlabeled data packet to all members of the group, without providing a user input for selecting a labeled receiver or without providing any user input for creating the label signal.

All of the methods which have been exemplified in the above three paragraphs require a user to provide the user input to a terminal, i.e., where a user may [1] select a labeled receiver or [2] create a label signal, by actively providing the user input to the terminal. Therefore, when a user transmits the unlabeled data packet to all (or some) members of a certain group without creating a label signal (i.e., without actively selecting a labeled receiver), the terminals of those receivers may display the content included in the unlabeled data pack as an unlabeled content.

Even when a user does not provide a user input for selecting a labeled receiver or a user input for creating a label signal, a terminal may proactively [1] select the labeled receiver or [2] create the label signal. This sixth exemplary aspect of this disclosure exemplifies various configurations or methods for proactively creating a label signal by analyzing various contents with various prior art information analysis algorithms and for proactively creating a label signal. It is noted that such contents may include a content [1] which is to be transmitted by a sender, [2] which has been transmitted by a sender, [3] which is to be transmitted by a server, [4] which has been transmitted by a server, or [5] which is received by a receiver.

To this end, the terminal may analyze whether any content described in the above paragraph may include any information [1] which may designate a certain member of the group, [2] which may request or recommend the member to read or confirm the content, or [3] which may refer to an action which the member has to take after reading or confirming the content. Examples of such information may include [1] a name, title, nickname or rank of the member, [2] a text, image or sound denoting the member, [3] a name, title or nickname of the task which the member has to perform, or [4] a text, image or sound denoting the task. As used in this disclosure, various information of this paragraph is to be collectively referred to as "label request information" hereinafter. Regardless of the types of the apps, groups or members, such label request information may be those words, phrases or expressions included in the content created by a sender or may be an image file or a sound file included in or attached to the content.

The terminal may use various information analysis algorithms to proactively check whether a content which is being created by a user, a content created by the user, or a content which is to be transmitted by the user may include the "label request information." Examples of the information analysis algorithms may include various prior art data analysis algorithms for or related to [1] AI, [2] machine learning, [3] deep learning, [4] natural language processing, [5] big data, [6] text analysis, or [7] voice analysis.

When a terminal analyzes the user's content and confirms that a content includes the "label request information," the terminal may then select a labeled receiver, create a label signal, and create a labeled data packet including the content and label signal. Alternatively, the terminal may analyze an image or a sound attached to the user's content with the above information analysis algorithms, and checks for the "label request information." Therefore, when the algorithm may confirm that the image corresponds to a picture of a certain member, to a video clip of the member, or to the member's name, title or nickname, the terminal may regard such information as the "label request information."

Or the terminal may analyze the sound which is attached to the user's content using the information analysis algorithms. Upon finding that the sound corresponds to a certain member's voice or that the sound relates to a certain member's name, title or nickname, the terminal may then regard the sound as the "label request information." Based thereupon, the terminal may select a labeled receiver, create a label signal, and then create a labeled data packet including the content and the label signal.

Using the above information analysis algorithms, the user's terminal may analyze the content [1] which a user is creating, [2] which a user completes creating, or [3] which is to be transmitted. The terminal may check whether the content may include the "label request information and, if it does, may regard the content as a labeled content. Once the terminal transmits the labeled data packet including the content and the label signal created based on the label request information, a receiver's terminal receives the labeled data packet and display the contents included in such a packet as the labeled content.

In contrary, a user's terminal may analyze the received content using the above information analysis algorithms and check whether the received content includes the "label request information." When the received content includes such information, the user's terminal may regard the content as the labeled content and may then display the content as the labeled content on its display unit. In other words, the user's terminal may run the "operation of proactively selecting a labeled receiver" with respect to the content which the user may create or transmit or, when desirable, may run the "operation of proactively confirming a labeled sender" with respect to the content received by a receiver's terminal.

As described above, the operation of proactively confirming a labeled sender offers additional benefits to a user. That is, when a sender [1] may make a mistake of not selecting a user as a labeled receiver while transmitting the content or [2] may not select the user as the labeled receiver due to various limitations of the app implemented to a terminal of the sender, the user's terminal may analyze whether the received content corresponds to the labeled content when analyzed in the perspective of the user. Thus, the user may readily check for the labeled content transmitted by the sender.

In other words, the user may render a terminal run an operation of proactively confirming a labeled sender, regardless of an actual intent of a sender who transmitted the content. Thus, a user's terminal may proactively confirm an unread content which the user may regard to be important or which may be presumed to be important by the user, and may display such a content as a labeled content. As a result, the terminal may offer the user with a benefit of confirming the content earlier than late or of not missing such a content.

To the contrary, even when a sender of a content may label the content as a labeled content such that a user may confirm the content, a terminal of the user may run the operation of proactively confirming a labeled sender, thereby confirming whether the content may be the one which the user may regard to be important or which may be presumed to be important to the user. In other words, the user's terminal may provide the user with a benefit of choosing those contents which the user may regard to be important and labeling such contents as the labeled contents, regardless of the intent of the sender.

It is appreciated that the terminal of this sixth exemplary aspect may drive various information analysis algorithms in various ways which are identical to those of the terminals of the above fourth exemplary aspect. However, the difference in the fourth and sixth exemplary aspects is that the information analysis algorithms of the fourth aspect may analyze the content which a sender transmits and which a user receives, whereas the information analysis algorithms of the sixth aspect may analyze the content which the user creates and then transmits (or plans to transmit). Accordingly, except the content to be analyzed, the terminal may use the information analysis algorithms in the same way in both the fourth and sixth aspects and, therefore, further explanations are to be omitted.

Figure 7A:
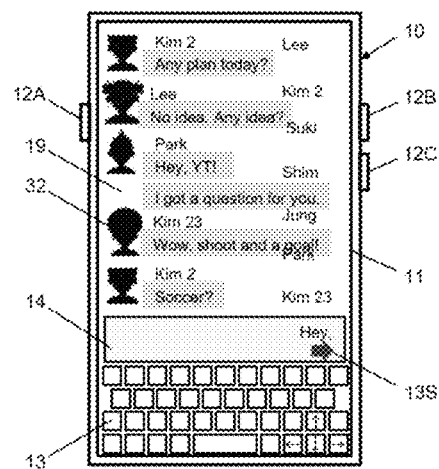
FIGS. 7A and 7B show exemplary configurations and methods for a terminal to select a labeled receiver even when a sender does not actively create a label signal.
Figure 7B:
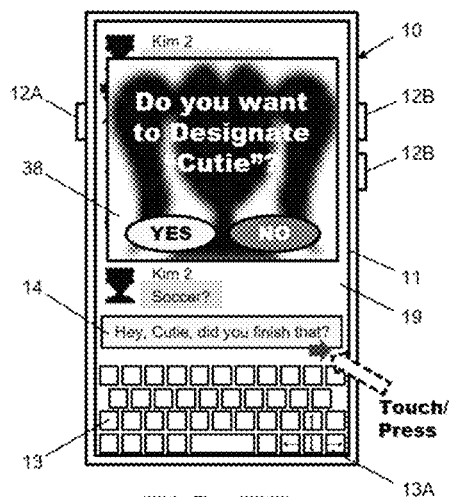

FIGS. 7A and 7B exemplify various configurations or methods of selecting a labeled receiver and creating a label signal by confirming label request information with a terminal even when a user may not actively create the label signal.

The first exemplary embodiment of this sixth exemplary aspect relates to various configurations or operational sequences for a terminal which may proactively select a labeled receiver by analyzing various transmitted or received contents using various information analysis algorithms. The terminal (10) of FIGS. 7A and 7B may include the hardware elements or the software elements which may be identical or similar to those of FIGS. 6A to 6K and, therefore, further details are omitted herein. In addition, a user may create a content in an input window (14) in various methods which may be similar or identical to those explained in FIGS. 6A to 6K. Thus, further details are omitted herein.

FIG. 7A exemplifies a case where a user drives a certain app and then selects a certain group from a group window (15) displayed on a display unit (11), where a terminal (10) displays a content window (19) on the display unit (11) and then opens an input window (14) after a user manipulates a soft keyboard or a hard keyboard (13), and where the user types in "Hey," in the input window (14). At this moment, it may be presumed that a user plans to transmit an unlabeled content to all members of the group. To the contrary, FIG. 7B exemplifies a case where the user types in "Cutie, did you finish that?" after the phrase "Hey," and is about to provide the user input for manipulating a send button (13S). Therefore, the user may send the content which reads "Hey, Cutie, did you finish that?" to all members of the group, without creating a label signal which may specifically label a certain member of the group.

If the terminal (10) does not include (or use) any of the above information analysis algorithms, the user did not select any member as the labeled receiver and, therefore, the terminal (10) has not received any label signal. Therefore, the terminal (10) may regard the content as an unlabeled content, and may transmit an unlabeled data packet which includes the unlabeled content to all members of the group.

However, when a terminal (10) of FIGS. 7A and 7B is implemented with the above information analysis algorithms, the terminal (10) may easily analyze whether the content which the user has created, which the user is creating or which is ready for transmission may include the "label request information," thereby running an operation of proactively selecting a labeled receiver. For example, the terminal (10) of FIG. 7B may recognize "Cutie" in the content and, utilizing various methods, may check whether "Cutie" corresponds to the label request information.

For example, using the above information analysis algorithm, the terminal (10) may check [1] whether "Cutie" may be one of the member IDs (17) of the group, [2] whether "Cutie" may correspond to a nickname or a short name of a certain member of the group by analyzing past contents of the group which have been exchanged among the members of the group, [3] whether "Cutie" may instead correspond to a name, a nickname or a short name of a member of a certain group by analyzing past contents which have been exchanged among the members of the group or among the members of all groups, or [4] whether "Cutie" may correspond to a name, a nickname or a short name of a member of a certain group of a certain app by analyzing all data related to all apps implemented to the user's terminal.

When the data analysis algorithms confirm, based on such analysis, that "Cutie" is not the label request information, the terminal (10) may create an unlabeled data packet which may include the content, a header, and a tail, and may transmit the data packet to the members of the group. However, when such algorithms confirm, based on such analysis, that "Cutie" corresponds to the label request information, the terminal (10) may select at least one labeled receiver based on the label request information, and may create a label signal which may correspond to the labeled receiver.

Thereafter, using various methods as explained above, the terminal (10) [1] may include the content into a labeled data packet, and then transmit the labeled data packet to all members of the group, [2] may include the content into the labeled data packet, and then transmit the labeled data packet to a certain labeled receiver of a certain group of a certain app or to that labeled member of all the groups set up by that app, [3] may include the content into an unlabeled data packet, and then transmit the label signal and the unlabeled data packet to all members of a certain group established by a certain app or to all members of all groups set up by the same app, [4] may include the content into an unlabeled data packet, and then transmit the label signal and unlabeled data packet only to a labeled receiver of a certain group of a certain app or to the labeled receiver of all groups set up by that app, or [5] may include the content into an unlabeled data packet, and then transmit the label signal and the unlabeled data packet to all members of all apps implemented into the terminal.

The second exemplary embodiment of this sixth exemplary aspect exemplify different configurations and operational sequences for a terminal which may proactively select a labeled receiver by analyzing various contents using various information analysis algorithms. For example, regardless of a type of an app, a feature of a group, characteristics of the members of the group, or the names or titles of the members of the group, a terminal (10) may search for the label request information by analyzing a word, a phrase or an expression of the content created by the user using such information analysis algorithms. In other words, even when a user does not actively create any label signal, a user's terminal may run the operation of proactively selecting a labeled receiver on a content which the user is creating or which the user is about to transmit, thereby proactively selecting a labeled receiver and creating a label signal which corresponds to the labeled receiver.

As described in the above paragraph, the terminal may proactively select a labeled receiver by searching for a certain word, phrase or expression included in a content created by a user. Or the terminal may proactively select a member who cannot be a labeled receiver by searching for a certain word, phrase or expression included in a content created by a user as well. For example, when the group includes male and female members, the information analysis algorithms may analyze the content created by a male user. When the algorithm may find a word or a substance which may disfavor a female member, the terminal may transmit the content only to the male members while treating the content as a labeled content or as an unlabeled content, but may not transmit the content to the female members. In another example, when the group includes military members and civilian members, the algorithm may analyze the content created by a military member. When the algorithm may find secret military information, the terminal may regard the content either as a labeled content or an unlabeled content, and may then transmit the content only to the military members but not to civilian members.

When the data analysis algorithm confirms the label request information in a content created by the user, the terminal may select a labeled receiver and then may create a label signal corresponding to the labeled receiver. Or, using the aforementioned various methods, the terminal may [1] may include the content into the labeled data packet, and may then transmit the labeled data packet to all members of a certain group set up by a certain app, [2] may include the content into the labeled data packet and may then transmit the labeled data packet only to a labeled receiver of the app, [3] may include the content into an unlabeled data packet, and may then transmit the label signal and the unlabeled data packet to all members of the group of the app, [4] may include the content into an unlabeled data packet and may transmit the label signal and unlabeled data packet only to the labeled receiver, or [5] may include the content into the unlabeled data packet, and may then transmit the label signal and the unlabeled data packet to all members of the group of the app.

The above terminals, labeled contents, or labeled icon badges of the sixth exemplary aspect may be also modified or varied in various configurations or methods. Followings are various examples of such modifications or variations, where such modifications or variations [1] may be applied to modify or vary various embodiments or examples of this sixth exemplary aspect, or [2] may be applied to modify or vary different embodiments or examples of different exemplary aspects described hereinabove or hereinafter.

The first example of such modifications or variations of this sixth exemplary aspect relates to the scope of confirmation as to the label request information, where the terminal may search for the label request information by analyzing various data stored inside or outside the terminal, using the aforementioned information analysis algorithms. For example, the terminal may analyze various data which may be related to a certain group set up by a certain app and which may be stored inside or outside the terminal. In another example, the terminal may analyze various data related to all groups set up by the app and stored inside or outside the terminal. In yet another example, the terminal may analyze various data which may relate to that app or other apps which may be driven by a terminal and which may be stored inside or outside the terminal.

The second example of such modifications or variations of this sixth exemplary aspect also relates to the scope of confirmation as to the label request information. That is, although it may differ depending upon the configuration or function of the terminal, or a configuration or function of a network, the terminal may generally search for the label request information by analyzing various data which are stored in various locations, using the above information analysis algorithms. Accordingly, the terminal may analyze its own database, databases in a central server or local server, or databased in a cloud storage. Or the terminal may also analyze [1] an external memory device which may be accessed by the terminal wirelessly or through wire, or [2] other databases accessible by an internet.

The third example of such modifications or variations of this sixth exemplary aspect relates to the terminal settings related to searching for the label request information. That is, even though a user does not create a label signal himself, a user may manipulate the settings of a terminal or an app so that the terminal may proactively search for the label request information from a certain content. For example, regardless of the app types, whenever the user creates a content, the user may set up the terminal settings such that the terminal may search for the label request information on certain cases or in all cases. Alternatively, the user may manipulate the terminal settings so that, whenever the user creates a content with a certain app, the terminal may search for such information from the content on certain occasions or on every occasion. Alternatively, the user may manipulate the terminal settings such that, whenever the user may create a content in a certain group using a certain app, the terminal may search for the label request information on every case or only on certain cases. Alternatively, regardless of the app type, the group type or the content type, the user may manipulate the terminal settings such that whenever the user may create a content and then may attempt to transmit the content to a certain member (or transmit the content to the certain member), the terminal may search for such information from the content on all occasions or only on certain occasions.

The fourth example of such modifications or variations of this sixth exemplary aspect relates to methods of creating and using a label signal based on the confirmation of the label request information. That is, when the terminal confirms the label request information from the content which is to be transmitted, which is transmitted, or which is received by analyzing various data using the above information analysis algorithms, the terminal may automatically create the label signal or may create the label signal only upon confirmation by the user. For example, when the terminal confirms the label request information from the content created by the user, the terminal may then automatically create the label signal correspond to that content.

Alternatively, when the terminal may confirm the label request information from the user-created content, the terminal may request the user to confirm, before creating the label signal corresponding to that content. For example, the terminal (10) may display a confirmation window (38) on a display unit (11) as exemplified in FIG. 7B, thereby requesting the user to confirm the selection of the labeled receiver or the creation of the label signal. When the user presses "Yes" in the confirmation window (38), the terminal may create the label signal, and may transmit the content to various members in various methods as described above. However, when the user presses "No" in the confirmation window (38) or may not press "Yes" in a certain period of time, the terminal may not create the label signal, may regard the content as the unlabeled content, and may then transmit the content to all members of a certain group.

Various embodiments and examples of this sixth exemplary aspects may be interchangeable with other embodiments or examples of other aspects disclosed heretofore and hereinafter. Therefore, as long as the embodiments or examples may not contradict each other, such embodiments or examples of this sixth aspect [1] may also apply to corresponding features of other embodiments or examples of this sixth aspect or other aspects, [2] may be incorporated into corresponding features of other embodiments or examples of the sixth or other aspects, [3] may replace corresponding features of other embodiments or examples of this sixth aspect or other aspects, [4] may be replaced by corresponding features of other embodiments or examples of this sixth aspect or other aspects, or [5] may be combined with corresponding features of other embodiments or examples of this sixth or other aspects.

3. Utilizing the Labeled Contents in the Perspective of the User

Various terminals of this disclosure may create a "label signal" and may also create a "labeled content" or an "unlabeled content" using the label signal. Various terminals of this disclosure may also create various data packets such as, e.g., a "labeled data packet" including a labeled content, or an "unlabeled data packet" including an unlabeled content, and may transmit or receive such data packets.

The unread contents generally refer to those contents which a user has not read or confirmed because the user has not run a certain app or because the user has not opened a certain group window that is established by the app. The unread contents may include [1] a labeled content and [2] an unlabeled content. Thus, when a numeral (i.e., a number of contents which have not been read or confirmed by a user) for the unread icon badge of the app or for the group is large, it may take a long time and lots of efforts on the part of the user to open and read all unread contents in order to find the unread labeled contents (even if a number of the unread labeled contents may be small).

To resolve such inconvenience, various terminals of this disclosure may allow a user to selectively read and confirm the unread labeled contents from all unread contents by utilizing various features of the labeled and unlabeled contents or those of the label signals. To this end, while displaying various contents in a content window, the terminal [1] may display the unread labeled content as it is or with a highlight (i.e., an emphasis), while simplifying or minimizing the unread unlabeled content, or [2] may display unread the labeled content as is or with a highlight, while not displaying the unread unlabeled content. Thus, the terminal may get rid of or minimize any obstruction by the unlabeled contents when the user searches for the labeled contents which are mixed with the unread unlabeled contents in the unread contents, thereby offering the benefit of allowing the user to more easily locate the unread labeled contents which are mixed with the unread unlabeled contents.

In addition, all read contents may include the "read labeled contents" as well as the "read unlabeled contents", where such read contents refer to those contents which the user ran an app, opened a group window of a certain group established by the app, and a user has read or confirmed. Accordingly, when a number of such read contents is big, it may take a long time and lots of efforts on the part of the user to re-read or re-confirm such read contents in order to find the read labeled contents related to the user (even when a number of the read labeled contents may be small).

Various terminals of this disclosure may allow a user to selectively read and confirm the read labeled contents in a content window from all read contents by using various features of the labeled and unlabeled contents or those of the label signals. To this end, the terminal may [1] may display the read labeled content as it is or with a highlight, while simplifying or minimizing the read unlabeled content, or [2] display the labeled content as it is or with a highlight, while not displaying at all the unread unlabeled content.

Figure 8A:
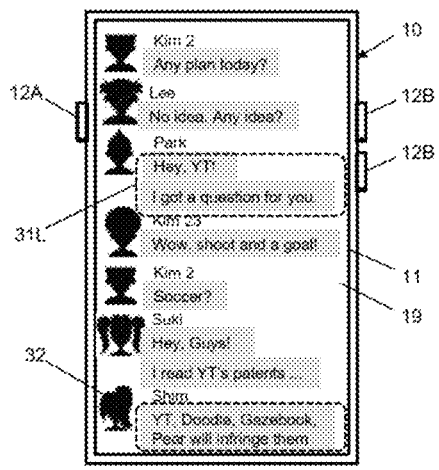
FIGS. 8A and 8B show exemplary configurations and methods of selectively displaying the labeled contents on a display unit.
Figure 8B:
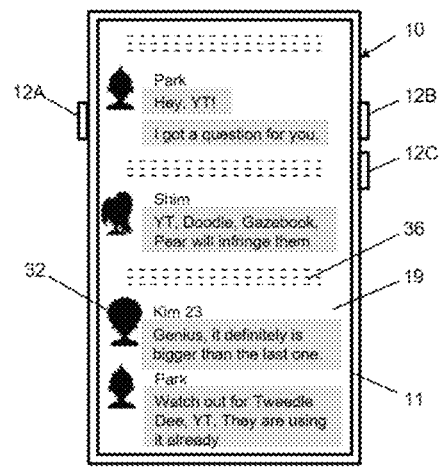

Thus, the terminal may get rid of or minimize any obstruction by the read unlabeled contents when the user searches for the read labeled contents, thereby offering a benefit of allowing the user to more easily locate the read labeled contents. FIGS. 8A and 8B exemplify various configurations or methods for selectively displaying the labeled contents on the display unit.

It is noted that unread contents include unread unlabeled contents and unread labeled contents. For example, when N unread contents are all unread unlabeled contents, such unread contents include N unread unlabeled contents and 0 unread labeled content. In contrary, when N unread contents are all unread labeled contents, such unread contents include 0 unread unlabeled content and N unread labeled contents. With this definition, the seventh exemplary aspect of this disclosure relates to various configurations or operational sequences for selectively displaying the unread unlabeled contents, by selectively simplifying, minimizing or omitting the unread unlabeled contents. That is, when a user may provide a proper user input, a terminal may display the unread unlabeled content in a simplified or minimized format, while displaying the unread labeled content as is or highlighted (i.e., emphasized). As a result, the user may readily recognize the unread labeled content which is included in the unread contents. For ease of illustration, unless otherwise specified, an unread unlabeled content may be referred to as an "(unread) unlabeled content" or simply "unlabeled content," whereas an unread labeled content may be referred to as an "(unread) labeled content" or simply "labeled content" hereinafter.

The first exemplary embodiment of this seventh exemplary aspect relates to the configurations or operational sequences of displaying the unread labeled content in a format highlighted (i.e., emphasized) than the unread unlabeled content, when the unread content includes both of such contents. For example, upon receiving a certain user input, the terminal may display an unread labeled content highlighted than an unread unlabeled content in a content window provided in a display unit. FIG. 8A exemplifies the configurations or methods for a terminal which may display the unread unlabeled content as well as the unread labeled content, but highlight the unread labeled content.

As illustrated in FIG. 8A, the terminal (10) may display multiple app icons for multiple apps on its display unit (11) and display the unread icon badges for such apps. A user may run an app of his choice by manipulating various input units (12A)(12B)(12) or by manipulating an app icon displayed on a touch-screen type display unit (11). As the terminal (10) runs the app, the terminal (10) may display on the display unit (11) a group window (15) of the app. As the user manipulates the group icon (16) of his choice from multiple group icons, the terminal (10) may display a content window (19) for the group on the display unit (11). The terminal (10) may display the unread contents in the content window (19), where the content may not be displayed on the content window (19) in the order of reception. To the contrary, the terminal (10) may display such contents in the order of the reception, with the most recently received content at the bottom.

Thereafter, the terminal (10) may highlight the unread labeled content (31L) which is included in the unread content and which is displayed in the content window (19) in various timings. In one example, whenever displaying the content window (19), the terminal (10) may display the (unread) unlabeled content (31N) as is, however, may highlight the (unread) labeled content (31L). In another example, after displaying the content window (19) on the display unit (11), the terminal (10) may highlight the labeled content (31L) when the user provides a certain user input by manipulating a certain soft button or a certain hard button. In another example, before displaying the content window (19) on the display unit (11), the terminal (10) may highlight the labeled content (31L) when the user provides a certain user input by manipulating a certain soft button or hard button.

When the user provides an additional user input, the terminal (10) may cancel the highlighting on the labeled content (31L) and, therefore, the terminal (10) may equally display the labeled content and the unlabeled content, without any difference. Alternatively, the user may provide another user input such as a certain movement, gesture or sound, thereby starting or stopping to highlight the labeled content (31L).

The terminal (10) may also highlight the labeled content (31L) in various modes. For example, the terminal [1] may highlight the labeled content (31L) in a certain font, color or thickness, [2] may highlight a background of the labeled content (31L), [3] may display the labeled content (31L) bigger, or [4] may emphasize the labeled content (31L) in other modes. Alternatively, when the user manipulates a certain hard or soft button again or when the user manipulates a different soft button or hard button, the terminal (10) may start to highlight or stop highlighting the labeled content (31L). As a result, the terminal (10) may display the labeled content and the unlabeled content in the same mode or without any difference in the content window (19).

The second exemplary embodiment of this seventh exemplary aspect relates to various configurations and operational sequences for simplifying or minimizing the (unread) unlabeled content, while displaying the (unread) labeled content as is or highlighted (or emphasized), when the terminal displays the unread contents which include the (unread) unlabeled content as well as the (unread) labeled content. For example, when the user provides a certain user input, the terminal may minimize or simplify the (unread) unlabeled content in the content window which is displayed on the display unit, while displaying the (unread) labeled content as is or highlighted. FIG. 8A exemplifies the configurations or methods of highlighting, simplifying or minimizing various contents in a content window.

The terminal (10) of FIG. 8B may display various app icons and unread icon badges in those configurations or methods identical to those of the first embodiment of the seventh exemplary aspect. After the user runs the app, the terminal may display a group window (15) of the app. When the user selects a certain group, the terminal (10) may display a content window (19) of the group.

The terminal (10) may selectively simplify or minimize the unlabeled content (31N) which is included in the unread contents displayed in a content window (19). For example, the terminal (10) [1] may replace the unlabeled contents (31N) by various simplified marks (36) whenever the terminal (10) displays the content window (19), [2] may display the content window (19) and may replace the unlabeled content (31N) by the simplified marks (36) whenever the user manipulates a certain soft button or a certain hard button, or [3] may replace the unlabeled content (31N) by the simplified marks (36) before the terminal (10) displays the content window (19) on the display unit (11) and whenever the user manipulates a certain soft button or a certain hard button.

The terminal (10) may simplify or minimize the unlabeled content (31N) in various methods. For example, the terminal (10) may [1] dimly display the unlabeled content (31N), [2] display the unlabeled content (31N) in a simplifying font, color or mode, [3] display the unlabeled content (31N) smaller, or [4] display the unlabeled content (31N) using a figure.

When the user may optionally manipulate the certain soft or hard button one more time or manipulate a different soft or hard button, the terminal (10) may stop such simplification or minimization and may display the unlabeled content (31N) as is. As a result, the terminal (10) may display the labeled content and the unlabeled content in the same mode in the content window (19).

The third exemplary embodiment of this seventh exemplary aspect exemplifies various configurations or operational sequences for the terminal which may display the unread labeled content as is or highlight the unread labeled content, but which may not display the unread unlabeled content, when the unread contents include both the unread unlabeled content and the unread labeled content.

Upon receiving a certain user input, the terminal may display the unread labeled content as is or with highlight, while not displaying the unread unlabeled content in the content window displayed on the display unit. For example, the terminal (10) may display multiple apps and unread icon badges together in those configurations or methods identical to those of the first embodiment of the seventh exemplary aspect. Thereafter, the terminal (10) may display the group window (15) of the app, and then the content window (19) of a certain group.

Among multiple unread contents displayed in the content window (19), the terminal (10) may selectively display the labeled content (31L) in various methods. In one example, the terminal (10) may only display the labeled content (31L) whenever displaying a content window (19). In another example, the terminal (10) may display a content window (19) on a display unit (11), and then only display the labeled content (31L) whenever a user may manipulate a certain soft or hard button. In another example, whenever the user manipulates a certain soft button or hard button before a terminal (10) displays the content window (19) on the display unit (11), the terminal (10) may only display the labeled content (31L).

The terminal (10) may display only the labeled content (31L) in various methods. In one example, the terminal may display such labeled contents (31L) continuously or consecutively, without displaying any unlabeled contents (31N) which have been received between such labeled contents (31L). In another example, the terminal may display the labeled contents (31L) but may also display gaps between such contents (31L) when there exist any unlabeled contents (31N) sandwiched between the displayed labeled contents (31L) so that the user may easily learn the existence of such unlabeled contents (31L). In another example, the terminal may display such labeled contents (31L) but, when the terminal does not display the unlabeled contents (31N) that are sandwiched between the displayed labeled contents (31L), the terminal may display those labeled contents (31L) in different sizes, backgrounds, colors or fonts such that the user may easily learn the existence of such unlabeled contents (31L).

When the user may optionally manipulate a certain soft or hard button once more or manipulate a different soft or hard button, the terminal may optionally display the unlabeled contents (31N) between the labeled contents (31L), where such unlabeled contents (31N) have not been displayed before such manipulation. As a result, the terminal may display the labeled content and the unlabeled content in the identical manner, without any difference.

Such terminals, labeled contents, and labeled icon badges of the seventh exemplary aspect may be also modified or varied in various configurations or methods. Followings are various examples of such modifications or variations, where the modifications or variations [1] may be applied to modify or vary various embodiments or examples of the seventh exemplary aspect, or [2] may be applied to modify or vary different embodiments or examples of different exemplary aspects described hereinabove or hereinafter.

The first example of such modifications or variations of this seventh exemplary aspect relates to various configurations or methods of simplifying, minimizing or omitting the unread unlabeled content but displaying the unread labeled content as is or highlighted, while also displaying the content which was transmitted by the user to a sender of the labeled content and which is the reason why the sender has transmitted the labeled contents to the user.

For example, when a user receives a labeled content from a sender, a user's terminal may display the sender's labeled content on the display unit as well as display another labeled or unlabeled content which the user had transmitted to the sender in the past and which may be the reason why the sender transmits that labeled content to the user. When the sender initiates the exchange of contents and, therefore, there does not exist any prior content which the user had sent to the member, the terminal may just display the content which the sender transmits to the user.

Accordingly, the user may easily understand the reason why that sender sends a labeled content to the user and, based thereon, the user may effectively respond to the sender. In addition, when the sender sends the labeled content as a reply to another content which the user has transmitted to the sender in the past, the user may readily learn that the user may not have to transmit a reply content to the sender. However, when the labeled content transmitted by the sender is not the reply to the user's past content, the user may easily learn that the user may have to reply to the sender.

The second example of such modifications or variations of this seventh exemplary aspect relates to various configurations or methods of simplifying, minimizing or omitting the unlabeled content but displaying the labeled content as is or highlighted, while also displaying all (or some) labeled contents or all (or some) unlabeled contents which have been exchanged in the past between the user and sender.

For example, when a sender transmits a labeled content to a user, the terminal (or app) may display on its display unit all read contents as well as all unread contents between the sender and the user. In this case, as to those contents which have been exchanged between the user (or sender) and other members, the terminal [1] may simplify or minimize such contents, or [2] may not display such contents. As a result, the user may readily read or confirm all contents between himself and the sender.

When a labeled content transmitted to the user by a sender is a reply to an earlier content which the user had transmitted to the sender, the user may choose to not reply to the sender's content. However, when the labeled content is not the reply from the sender to an earlier content which the user has transmitted to the sender, but a content which initiates the exchange of content between the user and sender, the user may easily learn that he may have to transmit a reply content to the sender.

Various embodiments and examples of this seventh exemplary aspects may be interchangeable with other embodiments or examples of other aspects disclosed heretofore and hereinafter. Therefore, as long as the embodiments or examples may not contradict each other, such embodiments or examples of this seventh aspect [1] may also apply to corresponding features of other embodiments or examples of this seventh or other aspects, [2] may be incorporated into corresponding features of other embodiments or examples of this seventh or other aspects, [3] may replace corresponding features of other embodiments or examples of this seventh or other aspects, [4] may be replaced by corresponding features of other embodiments or examples of this seventh or other aspects, or [5] may instead be combined with corresponding features of other embodiments or examples of this seventh or other aspects.

The eighth exemplary aspect of this disclosure relates to various configurations and operational sequences for displaying the unlabeled but read contents, e.g., by selectively simplifying, minimizing or omitting (i.e., not displaying) the read unlabeled contents. Therefore, upon receiving a proper user input, the terminal may simplify or minimize the read unlabeled contents or even omit the read unlabeled contents, while displaying read labeled content as is or highlighted (i.e., emphasized). As a result, the user may readily recognize the read labeled content which is included in the read contents.

For example, upon receiving a proper user input, the terminal may display the unread contents as well as the read contents on a display unit, where such contents may include the unlabeled contents or labeled contents. When the user provides an additional user input, the terminal may display the unlabeled or labeled contents exchanged between at least two members who are not the user. Accordingly, the user may be able to readily read or confirm the unlabeled and labeled contents exchanged between such at least two members.

For example, the terminal may display multiple app icons and unread icon badges as explained in the first embodiment of the seventh exemplary aspect, may display a group window of the app, and may then display a content window of a certain group. As also exemplified in various embodiments of the seventh exemplary aspect, the terminal may display multiple unread contents as well as read contents in a content window.

Thereafter, when the user labels at least two members without creating a content, as exemplified in the sixth exemplary embodiment, the terminal may display various (read or unread) labeled or unlabeled contents exchanged between the members in the past. In this case, the terminal may simplify, minimize or omit other contents exchanged between the rest of the members (except such at least two members).

In the alternative, the terminal may highlight or emphasize the contents exchanged between those two members, while displaying other unlabeled or labeled contents exchanged between the rest of the members as is or without any highlight. In addition, when the user may select more than two members, the terminal may selectively display those (read or unread) labeled or unlabeled contents that have been exchanged between such three or more members.

The terminal may perform the simplification, minimization or omitting of the read unlabeled contents independently or in conjunction with various simplification, minimization or omitting of the unread unlabeled contents as exemplified in the above seventh exemplary aspect. In addition, upon request by the user, the terminal may selectively display [1] unread labeled contents, [2] unread unlabeled contents, [3] read labeled contents, or [4] read unlabeled contents exchanged between such members (except the user).

Various embodiments and examples of this eighth exemplary aspects may be interchangeable with other embodiments or examples of other aspects disclosed heretofore and hereinafter. Therefore, as long as the embodiments or examples may not contradict each other, such embodiments or examples of this eighth aspect [1] may also apply to corresponding features of other embodiments or examples of this eighth aspect or other aspects, [2] may be incorporated into corresponding features of other embodiments or examples of the eighth or other aspects, [3] may replace corresponding features of other embodiments or examples of this eighth aspect or other aspects, [4] may be replaced by corresponding features of other embodiments or examples of this eighth aspect or other aspects, or [5] may instead be combined with corresponding features of other embodiments or examples of this eighth or other aspects.

4. Additionally Utilizing the Label Signals and the Labeled Contents

The ninth exemplary aspect of this disclosure relates to various configurations or operational sequences of applying such label signals, labeled contents, and labeled icon badges to various apps other than such apps as, e.g., a SNS app, a messenger app, an e-mail app, a groupware software app, and the like.

Various exemplary aspects, their embodiments or examples explained above relate to various configurations or operational sequences of applying various label signals, labeled contents, and labeled icon badges to wired or wireless calling app, a SNS app, an e-mail app, a groupware software app, or a messenger app. For example, in the case of the wired or wireless calling app, a terminal may represent a number of missed incoming calls using an unread icon badge. The terminal may search for the label request information by analyzing a message left by a caller of the missed incoming call, or may search for the label request information from a special code accompanied by the missed incoming call, whereby the terminal may display not only the unread icon badge but also the (unread) labeled icon badge.

As described above, the terminal may also display various information with the labeled icon badge. Examples of such information may include [1] a caller of the missed call, a caller's phone number, other information of the caller, or a time of the missed call, [2] a number of missed calls for a certain period (or after a certain time), a caller, a caller's phone number, other information of the caller, or a time of such a call, [3] a number of calls which a user answered for a certain period (or after a certain time), a caller, a caller's phone number, other information of the caller, or a time of such a call, [4] a number of voice messages left to a user, a caller, a caller's phone number, other information of the caller, or a time of recording the message, or [5] information related to an operating status of a wired or wireless phone, or malfunctions of the phone.

In particular, such labeled icon badges may serve as various push notifications [1] which may be limited to unread information (or related contents) which the user have not yet confirmed or read, [2] which may be limited to unread information (or relate contents) received after a certain time, or [3] which may relate to all read (i.e., confirmed) information (or related contents) received after a certain time.

In another example and in the case of a SNS app, a groupware software app, a messenger app, an e-mail app, or the like, the terminal may provide various information (or related contents) to a user using the unread icon badge. Thus, in the case of a SNS app, the terminal may represent a number of unread contents (i.e., unread messages in this case) using an unread icon badge, and also denote a number of unread labeled contents (i.e., labeled messages in this case) included in the unread contents using a labeled icon badge. The terminal may also display the aforementioned information exchanged through a SNS app as the labeled content.

It is appreciated that various embodiments or examples of the above first to eighth exemplary aspects of this disclosure generally relate to a SNS app which may be implemented into various data processing terminals of this disclosure. Accordingly, further details of applying the label signals, labeled contents, and labeled icon badges to the SNS app are omitted herein.

In the case of a groupware software app, a messenger app, or an e-mail app, a terminal [1] may represent a number of unread contents such as unread messages or unread e-mails using the "unread icon badge," or [2] may represent a number (or a type) of unread labeled contents which may be included in the unread contents using the "labeled icon badge." The terminal may also label various information which may be exchanged through a groupware software app, a messenger app or an e-mail app, as the labeled content, i.e., labeled message.

Accordingly, various push information and various push notification for notifying such push information for various communication apps such as, e.g., the SNS app, the groupware software app, the messenger app or the e-mail, app may be similar or identical to the push information or push notification for notifying such push information for the wired or wireless calling app. In addition, the terminal may create the label signals and labeled data packets which include such label signals, and transmit or receive the packets or contents using the SNS app, the groupware software app, the messenger app or the e-mail app in various configurations or operational sequences which may be similar to those using the wired or wireless calling app and, therefore, further details are to be omitted here.

As discussed above, various label signals, labeled contents, or labeled icon badges exemplified in the first to eighth exemplary aspects and their embodiments or examples may be applied to the SNS app, the groupware software app, the messenger app or the e-mail app in the same or similar configurations or methods. Following embodiments may generally relate to the applications of such label signals, labeled contents or labeled icon badges to a scheduling app, an advertisement displaying app, an event notifying app, an alarm app, and the like.

Figure 9A:
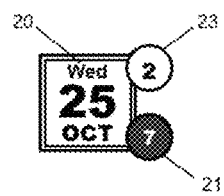
FIGS. 9A and 9B show exemplary configurations and methods of applying the label signal, the labeled content, and the labeled icon badge to a scheduling app.
Figure 9B:
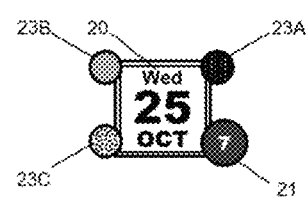

The first exemplary embodiment of this ninth exemplary aspect relates to various configurations or methods for applying the label signal, labeled content or labeled icon badge to a scheduling app. More particularly, a terminal may apply various configurations or methods of the label signal and labeled icon badge of the first to eighth aspects of this disclosure to the scheduling app. FIGS. 9A and 9B exemplify various configurations or methods for applying various label signals, labeled contents, and labeled icon badges to a scheduling app.

The terminal of FIG. 9A displays an unread icon badge (21) as well as a labeled icon badge (23), one over the other, on the right side of a scheduling app or an app icon (or its U/I) (20) of the app. The terminal may display various information using such badges (21)(23). For example, the terminal may notify a user that he has seven schedules scheduled on a certain day (or within a certain period of time) using the unread icon badge (21). Using the labeled icon badge (23), the terminal may notify the user, e.g., that two schedules out of a total of seven schedules relate to [1] the meetings important to the user, [2] the meetings which the user has called for, [3] the meetings in which the user is going to present, or [4] the meetings which the user is in charge of. Thus, the user may visually identify a number of schedules or various information of the schedules, just by looking the labeled icon badge (23).

The terminal of FIG. 9B displays an unread icon badge (21) on the right side of an app icon (20). The terminal may also display multiple labeled icon badges (23A)(23B)(23C) around the app icon (20). In particular, the terminal may manipulate backgrounds of the labeled icon badges (23A)(23B)(23C) and deliver various information. For example, the terminal may manipulate the background of the labeled icon badge (23A) [1] to be darker, thereby denoting a work-related schedule, [2] to have a hatch pattern, thereby denoting a medical- or health-related schedule, or [3] to have diagonal lines, thereby denoting family-related schedules. Thus, the user may easily recognize a number or a type of such schedules just by looking at the background, size, shape, color or position of the icon badge.

The terminal may also provide various push information about various schedules in the form of push notifications by manipulating, e.g., various features of the labeled icon badges such as, e.g., its size, shape, position, color, or number. The push information may include various contents such as, e.g., [1] a number of imminent schedules, its time, its location, or its participants, [2] a number of confirmed schedules, its time, its location, or its participants, [3] a number of confirmed schedules which the user has not attended, its location, its time, its participants or its agenda, or [4] a number of schedules in which the user has a special task to perform, its time, or its location. As a result, the terminal may display at least one of various push information as described above using the labeled icon badges (23A). The user or the terminal may limit such push information to [1] unread information (or related contents) which the user has not read or confirmed, or [2] all unread and read information (or related contents) received after a certain time.

A variety of subjects may create the labeled content related to the scheduling app. For example, a certain member of a certain group set up by a certain app may decide a certain schedule, may label the schedule as a labeled content, and may transmit the content to a user. Or the user may determine the schedule, may label the schedule as a labeled content, and may then transmit the labeled content to all members of the group, including himself. Or the terminal may receive the schedule from the user or another member of the group, may analyze the schedule itself or other information related to such a schedule using various information analysis algorithms, and may then transmit the content to the user as the labeled content, when the terminal may regard the schedule to be important to the user.

Based on the analysis by the information analysis algorithm, when the terminal determines that a certain schedule is deemed to be not important, the terminal may display the schedule as an unlabeled content. When the terminal determines that a new schedule may conflict with an existing schedule (e.g., the new schedule may overlap the existing schedule or may render a user unable to attend the existing schedule), the terminal [1] may deem the new schedule as the one which the user does not have to attend, and label it as an unlabeled schedule, or [2] may display the new schedule as a label schedule so that the user may adjust his schedule.

As described hereinabove, classifying an unread content into either an (unread) labeled content or an (unread) unlabeled content is in general relative in its nature. Therefore, when a terminal proactively selects a labeled content using various information analysis algorithms, the terminal may employ various standards for such classification, where examples of such standards may include [1] the user preference, [2] the user's past life pattern, [3] various contents transmitted or received by the user, [4] only labeled contents related to the user, or [5] a terminal setting. When a terminal proactively creates a labeled content, the terminal may also create various visual, audible, or tactile signals and use such signals to ask the user to confirm the labeling of such a content. Various configurations of this paragraph may be applied to other embodiments of this ninth exemplary aspect as well as to other embodiments or examples of other exemplary aspects.

Figure 9C:
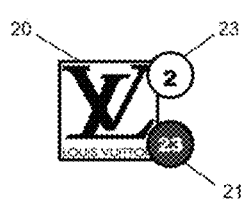
FIGS. 9C and 9D show exemplary configurations and methods of applying the label signal, the labeled content, and the labeled icon badge to an ad displaying app.
Figure 9D:
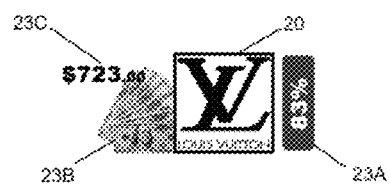

The second exemplary embodiment of this ninth exemplary aspect relates to various configurations and methods for applying the label signal, labeled content or labeled icon badge to an advertisement (to be abbreviated as an "ad" hereinafter) displaying app. In particular, a terminal may apply various configurations and methods of the label signal and labeled icon badge of the first to eighth aspects of this disclosure to the ad displaying app. FIGS. 9C and 9D exemplify various configurations and methods for applying various label signals, labeled contents, and labeled icon badges to an ad displaying app.

The terminal of FIG. 9C displays an unread icon badge (21) as well as a labeled icon badge (23), one over the other, on the right side of an app or an app icon (or its U/I) (20) of the app, and display various information in various configurations or methods. For example, using the unread icon badge (21), the terminal may notify a user [1] that a total of twenty-three items are on sale on that day (or for a certain period of time), [2] that twenty-three merchandises which the user ordered are now ready for purchase or delivery, [3] that twenty-three merchandises which are similar or identical to the merchandise to which the user showed interest are ready for purchase or delivery, or that twenty-three new merchandises are ready for purchase.

With the unread icon badge (21), the terminal may notify the user of an unread content which an ad provider has transmitted, regardless of the user's request or interest. That is, the terminal may notify the user with the unread icon badge (21) [1] that there are twenty-three unread contents which the ad provider transmitted regarding merchandises, [2] that there are twenty-three unread contents which the ad provider transmitted but which are not related to merchandises, or [3] that there are twenty-three coupons sent by the ad provider.

In addition, by displaying a labeled icon badge (23), a terminal may provide the user with information which is different from the information which may be provided by the unread icon badge (21). For example, with the labeled icon badge (23), the terminal may notify the user [1] that two sales out of twenty-three planned for the day (or within a certain period) offer a significantly huge discount, [2] that two out of twenty-three merchandises which the user may order are those listed in the user's preference, or [3] that, out of twenty-three on-going sales, two sales end on the day (or on a certain day). Therefore, based on the labeled icon badge (23), the user may be able to easily recognize the merchandises or sales which the user is interested in or which the ad provider is offering.

The terminal of FIG. 9D displays multiple labeled icon badges (23A)(23B)(23C) around the app icon (20), without displaying any unread icon badges (21). The terminal may display the labeled icon badge (23A)(23B)(23C) of different shapes. For example, a numeral of the labeled icon badge (23A) may notify the user that the discount rate is 83%, the labeled icon badge (23B) denotes that the discount is for the cash sales, and the labeled icon badge (23C) represents that the price after the discount is $723 or that the discount is $723. Thus, the user may easily recognize an extent of the discount, a sales period or a merchandise price, just by looking at the size, shape, color, position or background of the labeled icon badges (23A)(23B)(23C).

The terminal may also provide various push information about various ads in the form of push notifications by manipulating, e.g., various features of the labeled icon badges such as, e.g., its size, shape, position, color, or number. The terminal may deliver various contents in the form of push information, where examples of such contents may include, e.g., [1] a message including a character, a symbol or a text related to an ad, a number of such messages, its sender, or its time of reception, [2] a number of image files related to the ad, a sender of such files, or a reception time, [3] a number of sound files related to the ad, a sender of such files, or a reception time, [4] a merchandise requested or reserved by a user, a number of ads for certain services, an ad sender, or a time of reception, [5] a number of ads including special sales or other benefits, an ad sender, or a time of reception, [6] a number of ads related to the user preference, an ad sender, or a time of reception, or [7] a number of ads which are related to a user's current location, a destination of the user who is on the move, a future location of a user based on his or her schedule, an ad sender, or a time of reception. From such information, the user or the terminal may also limit such push information to [1] unread information (or related contents) which the user has not read or confirmed, [2] all unread information (or related contents) received after a certain time, or [3] all unread and read information (or related contents) received after a certain time.

A variety of subjects may create a labeled content related to the ad displaying app. For example, a certain member of a certain group set up by a certain app may decide a certain ad, may label the ad as a labeled content, and may then transmit the content to a user. In the alternative, when the user may select a certain merchandise in the group, a merchandise provider (e.g., a merchant or his website) may select a content related to the merchandise, may label the content as a labeled content, and may transmit the labeled content to the user. Or the terminal may receive the content transmitted by the merchant or his website, may analyze the content using various information analysis algorithms, and may create the content as the labeled content when the content is deemed to be important to the user.

Instead of displaying a labeled content which is related to an ad and which is transmitted by a provider of the ad, a terminal may use the information analysis algorithm and may determine whether such a labeled content may be the one which a user is needed to confirm. For example, the terminal may analyze the user preference, past purchase history, or contents transmitted by the user. Based on such analysis, the terminal may display the content as the labeled content, as the unlabeled content, or as a spam ad.

The terminal may instead analyze the user's activity or circumstances in the SNS app, groupware software app, messenger app, e-mail app, event notifying app, alarm app or other apps implemented to the terminal, may select an ad related to the activity or circumstance, and may directly (or via the ad displaying app) display the ad as the labeled content to the user. For example, when the user happens to be in an emergency and has to visit an hospital, the terminal may display the labeled content such as an ad which is related to [1] a doctor or a hospital which the user may visit or [2] a treatment which the user may need.

As described hereinabove, classifying an unread content into either an (unread) labeled content or an (unread) unlabeled content is in general relative in its nature. Therefore, when a terminal proactively selects a labeled content using various information analysis algorithms, the terminal may employ various standards for such classification, where examples of such standards may include [1] the user preference, [2] the user's past purchase history, [3] a terminal setting, [4] a status of merchandise stock or distribution, or [5] other databases. The terminal may create a labeled content, and may ask the user to confirm. To this end, the terminal may generate various visual, audible, or tactile signals. Various configurations of this paragraph may also be applied to other embodiments of this ninth exemplary aspect as well as to other embodiments or examples of other exemplary aspects.

Figure 9E:
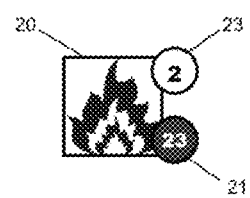
FIGS. 9E and 9F show exemplary configurations and methods of applying the label signal, the labeled content, and the labeled icon badge to an event notifying app.
Figure 9F:
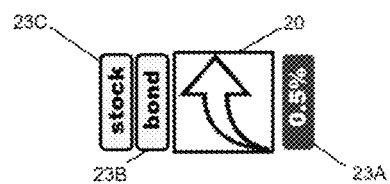

The third exemplary embodiment of this ninth exemplary aspect may relate to various configurations or methods for applying such label signals, labeled contents or labeled icon badges to an event notifying app. In particular, a terminal may apply various configurations and methods of the label signal and labeled icon badge of the first to eighth aspects of this disclosure to various event notifying apps. FIGS. 9E and 9F exemplify various configurations and methods for applying various label signals, labeled contents, and labeled icon badges to an event notifying app.

The terminal of FIG. 9E displays an unread icon badge (21) as well as a labeled icon badge (23), one over the other, on the right side of an app icon. The terminal may deliver various information to a user by using various configurations of such badges (21)(23) or methods of using the badges (21)(23). For example, with an unread icon badge (21), the terminal may notify a user [1] that twenty-three events related to the user's task have happened, [2] twenty-three events which are of the types labeled by the user have happened, or [3] that twenty-three events related to the group to which the user belongs have happened.

Using the labeled icon badge (23), the terminal may provide a user with information which may be different from the information provided by the unread icon badge (21). For example, with the labeled icon badge (23), the terminal may notify a user that [1] two events out of twenty-three events may be directly related to the user's business, [2] two events out of twenty-three events may be crucial to the user, or [3] it may be likely that two events which may be related to the user's business or which may be important to the user may happen as a result of such twenty-three events. Therefore, by looking at the labeled icon badge (23), the user may easily recognize the information regarding a number or a type of events which he is interested in or which may be related to his business. In addition, when the terminal displays the app icon (20), the terminal may also display an image related to the event. For example, the terminal of FIG. 9E may display an image of fire inside the app icon, thereby visually notifying that the unread content is related to the fire.

FIG. 9F may relate to various configurations or methods for a terminal which may display multiple labeled icon badges around or inside an app icon, while not displaying an unread icon badge. The terminal may display multiple labeled icon badges (23A)(23B)(23C) which may have different shapes or sizes. For example, a numeral of the labeled icon badge (23A) may denote that an interest rate increased by 0.5%, the labeled icon badge (23B) may notify the user that the interest rate hike resulted (or may result) in changes in bond prices, and the labeled icon badge (23C) may notify the user of the change (or an expected changes) in stock price. Thus, the user may readily recognize the number or type of such events by observing a size, a numeral, a shape, a color, a location or a background of the labeled icon badge.

The terminal may provide various push information about various events in the form of push notifications by manipulating various features of the labeled icon badges such as, e.g., its size, shape, position, color, or number. The push information may include various information such as, e.g., [1] a number or a type of a certain event selected by the user, [2] a number or a type of a character, a symbol, or a text related to a certain event, [3] a number or a type of an image file or a sound file related to a certain event, [4] a location or a time of a certain event, [5] a number or a type of characters, symbols or texts related to economic or political events which may induce a certain event, or [6] a number of an image file or a sound file related to the information of the [5] of this paragraph.

Other examples of such events may also include [1] those events related to health or safety of the user, [2] economic events which may relate to the user's investment in stocks, bonds or real estate, [3] those events related to the user's business, or [4] those events related to the user, the user's family, or the user's friends. In addition, the user or the terminal may also limit such push information to [1] unread information which the user has not read or confirmed, or [2] all unread and read information received after a certain time.

Various subjects may create the labeled content related to the event notifying app. For example, a certain member of a certain group set up by a certain app may decide a certain event, may label the event as a labeled content, and may then transmit the content to a user. Or the terminal may receive various contents from various media, news provider or news websites, may analyze the contents using various information analysis algorithms, and may then create the contents into the labeled contents. In the alternative, the terminal may connect to various media, news provider or news website, may search for the contents which may be important to the user using various information analysis algorithms, and may then create the labeled contents.

As described hereinabove, classifying an unread content into either an (unread) labeled content or an (unread) unlabeled content is in general relative in its nature. Therefore, when a terminal proactively selects a labeled content using various information analysis algorithms, the terminal may employ various standards for such classification, where examples of such standards may include [1] a user's occupation, [2] a user's preference, [3] a user's past experience related to such an event, [4] various contents or labeled contents related to the user, or [5] a terminal setting. When a terminal proactively creates a labeled content, the terminal may also create various visual, audible, or tactile signals and use such signals to ask the user to confirm the labeling of such a content. Various configurations of this paragraph may be applied to other embodiments of this ninth exemplary aspect as well as to other embodiments or examples of other exemplary aspects.

The fourth exemplary embodiment of this ninth exemplary aspect may relate to various configurations or methods for applying the label signals, labeled contents or labeled icon badges to an alarm app. More particularly, the terminal may display various push information about various alarms in the form of push notification by manipulating various features of the labeled icon badge such as, e.g., its size, its shape, its position, its color or its number. Examples of such push information may include [1] a number of alarms which have been set by a user, [2] a number of imminent alarms, a time or a place of an appointment related to the alarm, or its participants, [3] a number of appointments which the user failed to attend and which are related to the alarm, the place, the time, or its participants, or [4] a number of appointments in which the user have a certain task and which are related to the alarm, the place, the time, or its participants. A user or the terminal may limit such push information to [1] the unread information (or related contents) which the user has not read or confirmed, or [2] all unread and read information (or related contents) received after a certain time.

The fifth exemplary embodiment of this ninth exemplary aspect relates to various configurations or methods for applying the label signal, labeled content or labeled icon badge to various control apps for the above electrical or electronic devices (to be referred to as "device" hereinafter). Examples of such "devices" may include, but not be limited to, [1] data processing terminals such as a mobile phone or a smart-phone, [2] wired or wireless communication devices such as a mobile pad, a web pad, a personal digital assistant, a wired phone, an inter-phone, a wireless communication device, a wired or wireless data processing device, or a computer, [3] wired or wireless data processing units of various devices such as a building, a vehicle, a vessel, a submarine, an airplane, a helicopter, a robot or a drone, [4] various communication units or control units of such "devices," [5] various control units or data processing units of a network of an IoT (i.e., an internet-of-things), or [6] control units or data processing units of various electrical or electronic devices that may be connected to the IoT network. Thus, the user may be able to more effectively control such "devices" of the [1] to [6] of this paragraph by driving various apps which are implemented into the terminal and by utilizing the above label signals, labeled contents or labeled icon badges.

When a terminal is coupled to various devices of the [3] to [6] of the above paragraph wirelessly or through wire, a user may manipulate his terminal, thereby manipulating the devices wirelessly or through wire with the terminal. Alternatively, the user may releasably couple a terminal to the devices of the [3] to [6] of the above paragraph, and may manipulate such devices by manipulating the terminal. In the alternative, the user may manipulate the control units or data processing units of various devices of the [3] to [6] of the above paragraph with a terminal wirelessly or through wire, thereby manipulating such devices using the terminal. Therefore, the terminal, the above units, the above devices may use the label signal, the labeled data packet, and the labeled icon badge, thereby transmitting the user various contents [1] which may be related to the manipulation of such devices or [2] which may be related to the operating status of such devices.

Or the user may utilize various examples of the above paragraph in an opposite way such that a user may receive various contents which are related to the labeled signal, labeled data packet or labeled icon badge from such devices or such units. Thereafter, the terminal may run a certain operation based on the labeled content or may transmit the labeled content to another member.

It is appreciated that the above "building" may collectively refer to a residential building, a commercial building, a smart building, a smart factory, or the like. A data processing unit of the building may correspond to a unit which may perform surveillance or control [1] opening or closing an entrance, an exit or another door, [2] a temperature or humidity, [3] a fire alarm system, [4] a power supply system, or [5] a hot or cool water supply system, where such surveillance or control may be for an entire building or a portion (e.g., a certain space, room, floor, entrance, emergency exit, or stairs) of the building.

It is appreciated that the above "vehicle" may collectively refer to a driverless vehicle or a manned vehicle. In addition, a data processing unit of the vehicle may be a unit which may perform surveillance or control of [1] opening or closing doors of an entire portion or only a portion (e.g., an interior or a frame) of the vehicle, [2] turning on or off an engine or a motor, or [3] an operating status of another part of the vehicle. The vehicle may employ a source of energy as gasoline, diesel, hydrogen, electricity, fuel cell, or sunlight and, therefore, such a vehicle may include a hybrid vehicle. The vehicle may also run on two wheels, three wheels, four wheels or more or may also run without any wheels, e.g., a caterpillar vehicle.

It is appreciated that the above "robot" may collectively refer to an industrial robot, a military robot, or a personal robot. The "robot" may include its own transportation means and, therefore, may move. Alternatively, the "robot" may not include any transportation means. In addition, the "robot" may be a passive robot which may be manipulated by a user and, without any command from the user, may not run any operation. In contrary, the "robot" may be an active robot which may run various operations and perform various functions without or with the user command. Alternatively, the "robot" may be in-between the above active and passive robot in such a way that the robot may run some operations without any user command but may run other operations only with the user command. Whichever type the robot may be, the terminal, user or robot may create various contents, may deliver such contents in the form of the unlabeled or labeled data packets among each other, and may utilize the label signal, unread icon badge or labeled icon badge.

Similarly, the above "drone" may collectively refer to an industrial drone, a military drone or a personal drone. The drone includes its own transportation means such as at least one propeller or an engine, thereby generating a lift-off force and navigating in every direction. The "drone" may be a passive drone which may be manipulated by a user and, without any command from the user, may not travel in the air or may not run any operation. In contrary, the "drone" may be an active drone which may travel in the air, run various operations, and perform various functions without or with the user command. Alternatively, the "drone" may be in-between the above active and passive drone in such a way that the drone may navigate (or run some operations) in some circumstances even without any user command, but may only navigate (run other operations) only with the user command. Whichever type the drone may be, the terminal, user or drone may create various contents, may deliver such contents in the form of the unlabeled or labeled data packets among each other, and may utilize the label signal, unread icon badge or labeled icon badge.

FIGS. 9G to 9N exemplify various configurations or methods for applying various label signals, labeled contents or labeled icon badges to various terminals or devices as defined in this fifth embodiment of the ninth exemplary aspect of this disclosure.

Figure 9G:
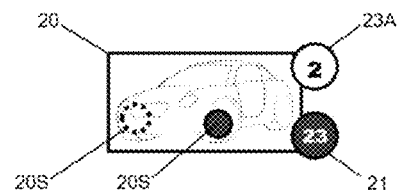
FIGS. 9G and 9H show exemplary configurations or methods of applying the label signal, the labeled content, and the labeled icon badge to a vehicle control app.
Figure 9H:
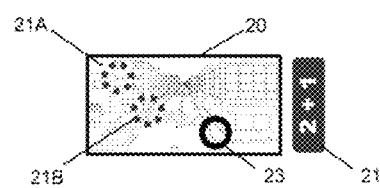

The first example of this fifth exemplary embodiment of this ninth exemplary aspect may relate to various configurations or methods for applying such label signals, labeled contents or labeled icon badges to various data processing units which may run surveillance or control operations of opening or closing doors or windows, or of checking an operational status of an entire (or only a) portion of a vehicle (e.g., a driverless vehicle or a manned vehicle). For ease of illustration, the following example relates to an operation of an entire vehicle. FIGS. 9G and 9H exemplify various configurations and methods for applying various label signals, labeled contents, and labeled icon badges to a vehicle control app.

The terminal of FIG. 9G may display an unread icon badge (21) and a labeled icon badge (23) around an app icon (20) for manipulating or controlling a manned vehicle or a driverless vehicle. For example, a terminal may display multiple sub-app icons (20S) along with an app icon (20) in order to notify a user that a right headlight and a left front wheel may need a maintenance. The terminal may display the sub-app icon (20S) as the U/I on a display unit so that, when the user manipulates the sub-app icon (20S), the terminal may provide detailed information about a status or maintenance of such parts of the vehicle.

The terminal may provide additional information using an unread icon badge (21) or a labeled icon badge (23), where examples of such information may include [1] information of a status of each part of the vehicle after the user has finished manipulation of the vehicle, [2] information which the user may confirm before resuming the manipulation of the vehicle, [3] information required to reach a destination according to a user's schedule if the user resumes the manipulation of the vehicle, [4] information as to where the user parked the vehicle, [5] information about a schedule of a certain day which has been stored to a vehicle control app by the user or which is obtained through synchronization with a scheduling app, and an operation plan of the vehicle based on the daily schedule, or [6] information about traffic violations or tickets which the user committed and collected.

More particularly, the information of the [1] of the above paragraph may include an amount of remaining fuel or battery, a travel distance that can be attained by such an amount, a status of tires or other parts of the vehicle, or a travel record of the past day. The information of the [2] of the above paragraph may include [1] the information of the [1] of the above paragraph, [2] a schedule of the new day, [3] a transportation plan of the new day, or a part which may need maintenance or repair. The information of the [3] of the above paragraph may include a schedule for the travel destinations, an agenda or participants of the schedule, an address of the destination, or various routes to get to the destination.

The unread labeled content may relate to [1] a content transmitted by a manned vehicle or a driverless vehicle, [2] a content which the vehicle transmitted to a user as a reply to an earlier content transmitted by the user to the vehicle, [3] a content which one unit of the vehicle transmits to another unit of the vehicle and to the user, [4] the content which the vehicle labels the user as the labeled receiver, while sending the same content to another unit of the vehicle, or [5] the content which the vehicle labels the user as the labeled receiver but which is not transmitted to other units of the vehicle.

Even when the vehicle does not generate a label signal, the unread labeled content may be the content [1] from which the terminal may extract (or already extracted) a "label request information" using various information analysis algorithms, or [2] where, based on the analysis results from using the information analysis algorithms, the terminal may determine that the need for the user to read or confirm a certain content may be greater than the need to confirm an unread unlabeled content.

As explained above, the terminal may display various information by using the labeled icon badge (23) which may be different from that displayed by the unread icon badge (21). To this end, the terminal may manipulate a size, a shape, a color, a position, a background or a numeral of the labeled icon badge (23) to be different from that of the unread icon badge (21). Therefore, the user may easily and visually recognize the size, shape, color, position, background or numeral, thereby readily recognizing the status of the vehicle, a number or a type of operations which the user may check or confirm.

While the app icon of FIG. 9G shows an icon for the vehicle control app in a state in which the user finished manipulation of the vehicle, the app icon of FIG. 9H may be regarded as the vehicle control app in a state where the user is currently manipulating the vehicle. The terminal of FIG. 9H displays a total of three unread icon badge (21)(21A) (21B) together with a labeled icon badge (23) around the app icon (20), where the unread icon badge (21) displays "2+1." The unread icon badge (21) may display a variety of information, but the unread icon badge (21) in FIG. 9H is deemed to represent that a user has two unread unlabeled contents as well as one unread labeled content.

More particularly, the terminal of FIG. 9H may visually display various information using the unread icon badge (21A)(21B) positioned around the app icon (20). For example, the unread unlabeled icon badge (21A) represents that the location is the user's favorite law firm, while the unlabeled icon badge (21B) may inform the user that a parking space is available. In contrary, the unread labeled icon badge (23) may display information which has a greater need for the user to confirm or decide than the information represented by the unlabeled icon badge (21A)(21B). For example, the terminal may use the labeled icon badge (23) to ask the user whether to make a left turn or a right turn in an upcoming intersection.

The second example of this fifth exemplary embodiment of this ninth exemplary aspect may relate to application of the label signal, the labeled content, and labeled icon badges to a data processing unit which may perform surveillance or control of turning on, operations, or operational state of industrial, military, or personal drones.

It is noted that various configurations or methods of using the labeled contents, labeled data packets or labeled icon badges to maintain or control the vehicles may be applied identically or similarly to maintaining or controlling the drones. Of course, the vehicles may move on land, while the drones may move in the air. However, such labeled contents, labeled data packets or labeled icon badges related to the manipulation of the drones may be similar or identical to the labeled contents, labeled data packets or labeled icon badges to control the vehicles. Accordingly, further details of various configurations or methods for managing or manipulating the drones using the labeled contents, the labeled data packets or the labeled icon badges are omitted herein.

The third example of this fifth exemplary embodiment of this ninth exemplary aspect relates to exemplary application of the label signal, the labeled content, and labeled icon badges [1] to a network of an IoT which may in turn include a control unit or a data processing unit, or [2] to an electrical device which may be coupled to a network of an IoT and which may include a data processing unit or a control unit. As a result, using the label signals, labeled contents or labeled icon badges, a user may [1] manage the entire IoT network which the user may access and control, or [2] manage, manipulate or control various electrical or electronic devices which are coupled to the IoT network wirelessly or through wire.

Figure 9I:
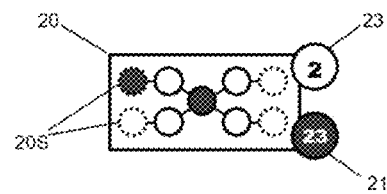
FIGS. 9I and 9J show exemplary configurations and methods of applying the label signal, the labeled content, and the labeled icon badge to an internet-of-things control app.
Figure 9J:
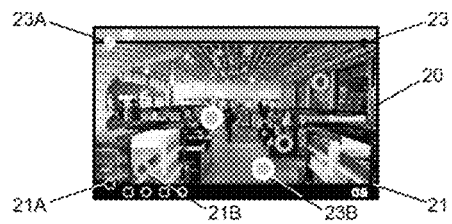

For simplicity of illustration, following exemplary embodiment relate to managing various electrical or electronic devices which may be coupled to the IoT network using a personal robot. That is, the robot may be used as a control unit or a data processing unit of the IoT, thereby increasing the efficiency in controlling data processing or the efficiency of controlling the control unit or data processing unit using the label signals, labeled contents or labeled icon badges. FIGS. 9I and 9J exemplify the configurations or methods for applying various label signal, labeled content, and labeled icon badge to an IoT management app and, in particular, such configurations and methods for managing the IoT network as well as various electrical or electronic devices coupled to the network using the robot.

The terminal of FIG. 9I displays an app icon (20) for an all-purpose IoT network, and also displays an unread icon badge (21), a labeled icon badge, and multiple sub-app icons (20S). The terminal may display the app icon (20) with [1] an image representing the IoT network or [2] with an image of various electrical or electronic devices coupled to each other via the IoT network. The terminal of FIG. 9I displays the unread icon badge (21) and the unread labeled icon badge (23), where each badge (21)(23) may respectively represent that a total of 23 unlabeled contents have been received and that two out of 23 contents are the labeled contents.

The terminal may also display the app icon (20) with its multiple sub-app icons (20S) which correspond to multiple devices included in the IoT network. For example, the terminal of FIG. 9I displays a black dot in the center of a display unit, where the black dot may represent a personal robot capable of managing and manipulating various devices coupled to the IoT network. In addition, the terminal may inform a user that [1] there is one labeled content related to the personal robot and [2] there is another labeled content which is represented by another black dot on a left upper corner and which is related to that electrical device denoted by the black dot. The terminal may also display other dots in the form of an U/Is or sub-app icons (20S) each representing one of such devices. Therefore, when the user click the sub-app icon (20S), the terminal may display various options such as an operational status, problems or manipulations of the device which is synchronized with the sub-app icon (20S).

The terminal may display app icons and sub-app icons related to various IoT networks. Such IoT networks may include the IoT networks for [1] a smart city, [2] smart building, [3] a smart factory, [4] a smart home, [5] a smart office, [6] a smart farm, [7] a smart system, or [8] a smart grid, where each of such IoT networks may include its own electrical or electronic devices, and may directly or indirectly couple such devices to each other. In particular, the smart system of the [7] of this paragraph may relate to a system for a solar power generation system, a wind power generation system, a water treatment system, or a traffic control system. Alternatively, the IoT network may include multiple electronic or electrical devices, and may couple them to each other. Accordingly, the IoT network may include at least one smart device, where examples of such smart devices may include [1] a smart household device, [2] smart lighting device, [3] a smart security device, [4] a smart vehicle, [5] a smart airplane, [6] a smart robot, [7] a smart drone, [8] a smart health device, [9] a smart diagnostic device, [10] a smart medical device, [11] a smart wearable device, [12] a smart TV, [13] a smart tele-communication device, [14] a smart computer network (including peripheral devices), or [15] a smart internet network (including a central or local server).

The terminal may display a number of various contents or various information about such contents using an unread icon badge (21) or an unread labeled icon badge (23). Examples of such information may include [1] information related to a status, operation, malfunction or repair of the IoT network, or such information of the electrical or electronic devices which are coupled to or included in the IoT network, [2] information as to a setting or changes in the setting of the IoT network or such devices, [3] information as to a setting or changes in the setting related to the manipulation of the IoT network or such devices, [4] information as to adding (or manipulating to add) at least one new device to the IoT network, [5] information as to deleting (or manipulating to delete) at least one existing device out of the IoT network, [6] information as to the maintenance, repair, manipulation or fixing of an entire (or at least a) portion of the IoT network, or [7] information as to the status, repair, operation, malfunction or manipulation of the robot which controls an entire (or at least a) portion of the IoT network.

More particularly, the unread contents may include the content [1] which the device included in the IoT network may create and transmit to the user, [2] which the device may transmit to the user as a reply to an earlier content which the user has transmitted to the device, [3] which one device of the IoT network may transmit to another device of the IoT network and to the user, [4] which the IoT network or the robot may create and transmit to the user, or [5] which the IoT network or robot may create and transmit not only to the device but also to the user. Similarly, the unread labeled contents may include the content [1] which the device, robot or IoT network may label the user as the labeled receiver and may transmit to other devices in the IoT network, or [2] which the device, robot or IoT network may label the user as the labeled receiver and transmit not to all devices in the IoT network but to the user.

The labeled contents may be a content from which a terminal may extract a "label request information" using various information analysis algorithms, even when the device, robot or IoT network does not create the label signal. Or the labeled content may be a content which a terminal regards to carry a greater need for a user to confirm (compared with the unlabeled content) based on the analysis performed by the information analysis algorithms, even when the device, robot or IoT network does not create the label signal.

The terminal of FIG. 9J may display an image as an app icon (20), where a robot which operates in a merchandise store acquires such an image of the store which is implemented with an IoT network. The terminal may also display multiple unread icon badges (21)(21A)(21B) and multiple labeled icon badges (23)(23A)(23B) on the display unit. The terminal may receive various contents transmitted by a customer who are visiting the store through an IoT network, a robot or a certain app. The terminal may also receive various contents transmitted by an employee of the store, through the IoT network, the device included in the network, or the robot. Thus, the user may control the store either inside or outside the store by managing the inventory of merchandises, answering customer's inquiries, performing the transactions or approving the sales.

Based thereon, the terminal may display the unread icon badge (21) with which the terminal may inform the user of a number of received contents after the user has most recently driven the app. Or the terminal may display a symbol representing the number and use such a symbol as the unread icon badge (21A). Or the terminal may display the unread icon badge (21B) related to a location or a merchandise related to the unread contents.

The terminal may display the labeled icon badge (23) related to a number of labeled contents which the IoT network, robot, customer or employee transmits while labeling the user as the labeled receiver. Or the terminal may display a symbol corresponding to the number on a display unit, and use the symbol as the labeled icon badge (23A). Or the terminal may display a labeled icon badge (23B) which represents a location or a merchandise related the labeled content.

For example, the terminal of FIG. 9J may display the unread icon badges (21)(21A) to notify the user that the user received five unread contents since the user drove the app last time. The terminal may further display the labeled icon badges (23)(23A) to notify the user that two of five unread contents are the labeled contents. In the alternative, a terminal may display two unread labeled icon badges (23A) (23B) as well as three unread unlabeled icon badges (21) (21A)(21B) on a display unit. As a result, the user may easily recognize the merchandise or the location related to the unread unlabeled and labeled contents using various icon badges.

The terminal may display a number of or information related to the contents using the unread icon badge (21) or labeled icon badge (23). Examples of such information may include [1] information related to a status, an operation, a malfunction or a repair of an IoT network or such information of various electric or electronic devices which are included in or coupled to an IoT network, [2] information related to a store confirmed by the IoT network or by the robot, [3] information related to sold merchandise confirmed by the IoT network or robot, [4] information related to the merchandises or a certain location of the store which needs rearrangement, [5] information related to changes in inventory due to sales or a new supply, [6] information requested by a customer, or [7] information requested by an employee.

More particularly, the unread contents may include the content [1] which an IoT network, various electrical or electronic devices of such a network, a robot, a customer or an employee may create and then transmit to the user, [2] which the IoT network, device, robot, customer or employee may transmit to the user as a reply to an earlier content which the user has transmitted, or [3] which one of such a network, device, robot, customer or employee may transmit to another and also transmit to the user. The unread labeled contents may include the content [1] which one of the IoT network, device, robot, customer or employee may label a user as a labeled receiver, and transmit to the user, IoT network, device, robot, customer, or employee, or [2] which the IoT network, device, robot, customer or employee may label the user as the labeled receiver, and transmit only to the user.

When the IoT network, device, robot, customer or employee does not create any label signal, a labeled content may be the content [1] from which the terminal may be able to extract the "label request information" using various information analysis algorithms, or [2] where, after analyzing such a content with various information analysis algorithms, the terminal may determine that the need of the user to confirm such a content may be greater than the need of the user to confirm the unread unlabeled content.

The fourth example of this fifth exemplary embodiment of this ninth exemplary aspect may relate to an application of such label signals, labeled contents or labeled icon badges to various household, industrial or military robots which may include various control units, data processing units, and the like. Thus, the user may manage, manipulate or control such robots using such label signals, labeled contents or labeled icon badges of this disclosure.

Figure 9K:
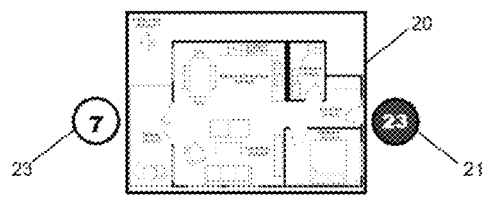
FIGS. 9K and 9L show exemplary configurations and methods of applying the label signal, the labeled content, and the labeled icon badge to a robot control app.
Figure 9L:
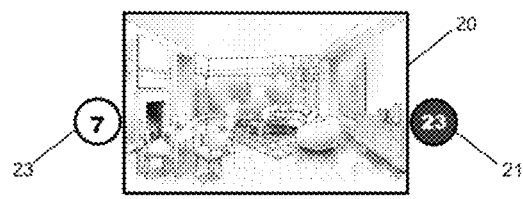

More particularly, the user may utilize the robot as a control unit or a data processing unit of the IoT network, and use such label signals, labeled contents or labeled icon badges in readily improving the efficiency in controlling the robots or in processing data. It is appreciated that the example of FIG. 9I relates to a case of manipulating or controlling the IoT network or various devices coupled to the IoT network. Thus, the following example may relate to managing a house using the robot, where the house is not implemented with the IoT network. FIGS. 9K and 9L exemplify various configurations or methods of applying such label signals, labeled contents or labeled icon badge to a robot control app.

The terminal of FIG. 9K displays a robot control app as an app icon (20) which also corresponds to a floor plan of a house, and may also displays an unread icon badge (21) and a labeled icon badge (23) on a display unit. A robot may transmit a user various contents related to [1] various locations of the house in which various operations are performed, or [2] a status of such operations to a user. Upon receiving such contents, the terminal of the user may display such contents inside the app icon (20). Therefore, the user may readily confirm various contents which are transmitted by the robot using the unread icon badge (21) or the labeled icon badge (23). The terminal may also display such icon badges (21)(23) in various configurations or methods which are similar or identical to those explained in the first to third examples of this fifth embodiment and, therefore, further details are omitted herein.

The terminal of FIG. 9L may display a certain image as an app icon (20) on a display unit, where the image is the one captured by a robot. The terminal may display the unread icon badge (21) and the labeled icon badge (23) on the display unit as well. The robot may transmit the contents related to the location in which certain operations are performed or the status of such operations. As a result, the terminal may display a number of received contents or a type of such contents inside the app icon (20). Therefore, the user may easily confirm various contents transmitted by the robot using the unread icon badge (21) or the labeled icon badge (23). The terminal may also display the icon badges (21)(23) in various configurations or methods which are similar or identical to those explained in the first to third examples of this fifth embodiment and, therefore, further details are omitted herein.

The fifth example of this fifth exemplary embodiment of this ninth exemplary aspect relates to an exemplary application of various label signals, labeled contents or labeled icon badges to a U-healthcare (i.e., ubiquitous-healthcare) app. Thus, the user may use such label signals, labeled contents or labeled icon badges to manage his health, to react to medical emergencies, manage health of members of a certain group, and take preemptive actions. FIGS. 9M and 9N exemplify various configurations and methods of applying such label signals, labeled contents or labeled icon badge to a healthcare app.

The terminal of FIG. 9M displays an image related to health as an app icon (20) on a display unit, along with an unread icon badge (21) and an unread labeled icon badge (23). The terminal may inform a user that the user receives a total of seven contents related to his health after he has run the app the last time, using an unread icon badge (21). The terminal may also inform the user that two out of seven unread contents are relatively important contents, using an unread labeled icon badge (23).

Various subjects may create user's health-related contents, and then transmit the contents to the user. Examples of such subjects may include [1] a doctor or a medical institution which may analyze the user's health in real time, on certain times, or on certain occasions, [2] a medical device of a U-healthcare network which is related (or not related) to a medical institution or a medical staff or a medical institution which belongs to the network, [3] a wearable device which can be worn by a user and which can acquire at least one biometric information of the user, [4] a biometric information analysis device which can be releasably or fixedly implemented to the terminal of the user, [5] a medical insurance institution, or [6] a medical doctor, a medical institution or a medical device related to the medical insurance.

Various subjects may analyze the health-related contents of a user using various means, may check the user's health, and may render the user take responsive actions. To this end, various subjects may transmit the unlabeled content or labeled content to the user based on the health status of the user.

For example, when a user's terminal receives an unlabeled content from one of the above subjects, the terminal may determine that the user is in a good health in general, and may inform a user of such results and of a responsive action. However, the contents which may relate to medical emergencies or to issues which need to be confirmed in a hospital may become more important to the user than other contents. In such cases, one of such subjects may transmit the contents to the user as the labeled content. Upon receiving the content, a user's terminal may display the content as the labeled content on the display unit. When desirable, the terminal may generate various visual, audible or tactile signals such that the user may readily recognize such contents. Thus, depending upon a number or type of the contents, the user may call for emergency assistance, immediately go to the hospital, or get a special or regular medical examination as soon as possible.

A terminal of FIG. 9N exemplifies a configuration or method for an icon badge which a terminal may display on a display unit to inform a user to take an immediate action, particularly when the terminal confirms a medical emergency of the user. The terminal may display an app icon (20), unread icon badge (21), and labeled icon badge (23). The terminal may display a body diagram as the app icon (20), and may display two unread labeled icon badges (23) and related body parts, instead of displaying "2" as the labeled icon badge (23). Thus, the user may readily find out which body part need immediate examination or treatment.

One of the above subjects may transmit a content related to a user's health as the unlabeled content, but may search for the label request information from a text, an image or a sound using various information analysts algorithms. Once finding such information, a user's terminal may regard the content as the labeled content, and display it as the labeled content on the display unit. The terminal may similarly generate various visual, audible or tactile signals such that the user may readily recognize such contents.

The above terminals, labeled contents, or labeled icon badges of the ninth exemplary aspect may be also modified or varied in various configurations or methods. Followings are various examples of such modifications or variations, where such modifications or variations [1] may be applied to modify or vary various embodiments or examples of this ninth exemplary aspect, or [2] may be applied to modify or vary different embodiments or examples of different exemplary aspects described hereinabove or hereinafter.

The first example of the modifications or variations of this ninth exemplary aspect relates to a "control app" for various electrical devices or electronic devices as explained above, where the terminal may display various icon badges using various types of "push notification." Examples of such "push notification" may include various information about

[1] a number or type of control operations which the device may request to the user, [2] about a number or type of the user's command to the device, [3] about a number or a symbol representing a status of progress of an operation which the device may perform in response to the user's control or command, [4] about number or type of operations or parts of the device which may need the user's control, [5] about a number or type of operations or parts of the device which malfunctions, [6] about a number or a symbol which may represent an operational status of the device, [7] about a number or type of an imminent user's control or command, or [8] about a number or substance of operations which have been performed after a certain time or within a certain period of time. The terminal may also limit such push notification [1] to those unread contents which the user has not confirmed, or [2] to both unread and read contents which the user has received after a certain time.

The second example of such modifications or variations of this ninth exemplary aspect relates to various configurations or methods for allowing a user to react to the unread labeled content using various push notifications. For example, the terminal may induce a user to take an cation by using different method of delivering push notifications based on the nature or number of such unread labeled contents.

For example, the subjects as explained above may create an unread labeled content about an emergency situation, and may transmit the labeled content to a user, thereby preparing a user to respond to the situation immediately or within a certain time. To this end, the terminal may generate the visual, audible or tactile signal, and provide the signal to the user as the push notification, thereby allowing the user to directly react to the situation or to react to the situation through the terminal. In particular, such subjects which may transmit the unread labeled content may include [1] a member (e.g., a colleague, an employee or a customer) of a certain group established by a certain app, [2] a user's terminal, [3] a sender's terminal, [4] a robot, [5] a vehicle, [6] a drone, [7] an IoT network, or [8] various electrical or electronic devices which may be included or coupled to the IoT network.

Examples of such situations may include [1] in the case of a scheduling app, the schedules of meeting in which a user has to attend, [2] in the case of an ad displaying app, starting or ending of a special discount for a merchandise in which a user has a high preference, [3] in the case of an event notifying app, an occurrence of an event [3-1] which relates to the user's important tasks, [3-2] which relates to the user's financial status, or [3-3] which relates to an emergency situation which may have a crucial effect on the health of the user, [4] in the case of an alarm app, an alarm for an upcoming event which may not be rearranged (e.g., boarding an airplane) or an emergency situation based on the user's biometric information, [5] in the case of a vehicle control app, an occurrence of an event in which the user may have to take an action (e.g., making a turn or a maneuver to avoid accidents), [6] in the case of a drone control app, an occurrence of an event in which a user has to manipulate the drone to prevent crash or fall, [7] in the case of an IoT control app, an occurrence of a malfunction of the device of the IoT network or an occurrence of an emergency situation such as a fire or a theft, or [8] in the case of a robot control app, an occurrence of [8-1] an emergency detected by the robot, [8-2] an event which may likely to lead to an emergency situation, or [8-3] a malfunction of the robot.

Various subjects explained above may transmit a labeled content related to such occurrences to the user or may transmit a label signal, therefore, a user's terminal may display the content as the labeled content. In contrary, such subjects may transmit the content related to such situation as an unlabeled content to the user, but the user's terminal may search for the label request information from a text, image or sound of the unlabeled content using various information analysis algorithms. Upon finding the label request information, the user's terminal may regard the content as the labeled content, and display such a content as the labeled content.

Figure 10B:
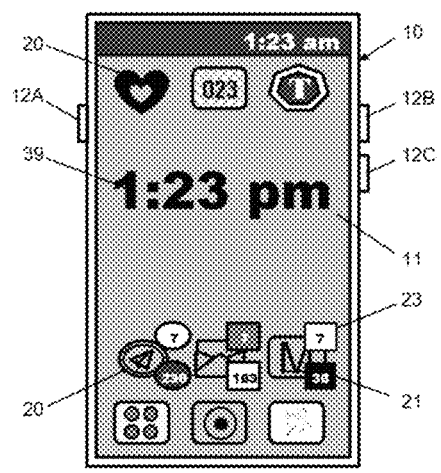
FIG. 10B shows an exemplary configurations and methods of displaying various icon badges when a lock screen is displayed on a display unit.

The third example of such modifications or variations of this ninth exemplary aspect relates to various configurations or methods with or in which a terminal may display various icon badges on a display unit which is in an off state, in a lock state or in an unlock state. For example, a terminal may display various icon badges in various methods [1] in an off state in which the display unit is turned off, [2] in a lock state in which the display unit is turned on but the user has not finished (or passed) a user authentication, or [3] in an unlock state in which the display unit is turned on and the user has passed the user authentication. FIGS. 10A and 10B exemplify various configurations or methods for displaying various icon badges on a display unit which is respectively in its off state and in its lock state.

For example, when a content which the terminal has received after the user has finished running the app may not require an immediate confirmation or response by a user, the terminal may display icon badges on the display unit as routine data. FIG. 10A exemplifies some configurations or methods of displaying various icon badges in a display unit which is turned off (i.e., which is in its off state), where the display unit (11) in a black color denotes that the display unit (11) is turned off.

In one example, a terminal may display some routine data (e.g., a time or a date) on a display unit, even if the display unit remains turned off. The terminal may treat an app icon, an unread icon badge or an (unread) labeled badge as the routine data, and display the app icon and such badges on a turned off display unit. As a result, a user may readily confirm a number or a substance of the unread contents as well as the unread labeled contents (which are a part of the unread contents), from the unread icon badge (21) and labeled icon badge (23), [1] without having to turn on the display unit, [2] without having to pass a user authentication, or [3] without having to run a certain app.

As described above, an "off state" is a state in which a display unit (11) is turned off. Accordingly, various hardware elements or software elements of a terminal (10) may not be ready to be run by a user. As a result, when a user attempts to provide various user inputs to an app icon (20) displayed on the display unit (11) in its off state, the terminal (10) may prevent the user from running the app. In a contrary configuration, the terminal (10) may allow a user to run a certain app when the user may manipulate an app icon (20) of the app in the off state. In particular, the terminal of this configuration may [1] allow the user to run only certain apps in the off state, or [2] may request the user to authenticate himself in the off state in order to run such apps.

In another example, when a terminal receives a content after a user finished driving a certain app and when the content may not require an immediate confirmation or response by a user, the terminal may display various icon badges on the lock screen in the lock state. But when a terminal receives a content after a user finished driving the app and when the content requires an immediate confirmation of the user or an immediate response by the user, a terminal may turn on a display unit (i.e., switching the display unit from its off state to its on state), and display various icon badges on the lock screen of a display unit in its lock state. FIG. 10B exemplifies various configurations or methods of displaying various icon badges on a lock screen displayed on the display unit in the lock state. It is noted that the display unit (11) in a gray color represents that the display unit (11) is turned on but the terminal may provide a user with limited access authority because the user has not passed the user authentication.

In one case, a terminal (10) may display certain routine data (39) (e.g., a time or a date) on a display unit (11) in an off state. In addition, the terminal (11) may display multiple app icons (20), unread icon badges (21), or unread labeled icon badges (23) in certain areas of the display unit (11). As a result, a user may readily confirm a number or a substance of the unread contents which the user has received after finishing to drive the app the last time, as well as a number or a substance of the unread labeled contents which are included in the unread contents.

As described above, a "lock state" is a state in which a display unit (11) is turned on. Accordingly, various hardware elements or software elements of a terminal (10) or at least some of such elements may be ready to be run by a user or may already be running. However, the lock state refers to a state in which a user has not passes a user authentication operation. As a result, when a user attempts to provide various user inputs to an app icon (20) displayed on the display unit (11) in its lock state, the terminal (10) may prevent the user from running the app. In a contrary configuration, the terminal (10) may allow a user to run a certain app when the user may manipulate an app icon (20) of the app in the lock state. In particular, the terminal of this configuration may [1] allow the user to run only certain apps in the off state, or [2] may request the user to run an authentication operation in the off state and to pass such an operation in order to run such apps.

In another example, when a terminal receives a content after a user finished driving a certain app and when the content may not require an immediate confirmation or response by a user, the terminal may display various icon badges on the lock screen in an unlock state. Or when a terminal receives a content after a user finished driving the app and when the content requires an immediate confirmation of the user or an immediate response by the user, a terminal may display various icon badges on a home screen of a display unit in its unlock state. This configuration or method is generally similar to that of displaying such badges on the lock screen and, therefore, further details are omitted.

It is appreciated that the terminal in its off state and exemplified in FIG. 10A displays three app icons, whereas the terminal in its lock state and exemplified in FIG. 10B displays nine app icons. This means that a terminal may generally display more app icons to a user in the lock state than in the off state and may confer bigger access authority or more options to a user in the lock state than in the off state. Of course, this is a general case, because a user may have a less intention of driving a terminal in the off state and because the lock state is the state through which the user has to proceed in order to switch to the unlock state for driving the terminal.

A terminal in its off state [1] may not display any routine data on the display unit, [2] may display the routine data such as a time or a date on the display unit, or [3] may display a certain unread icon badge along with such routine data. Similarly, a terminal in its lock state [1] may display an app icon on a lock screen but may not display any icon badge for the app, [2] may display a certain labeled icon badge on a lock screen but may not display any labeled content represented by the labeled icon badge until a user passes a user authentication operation, or [3] may display not only the labeled icon badge but also an entire portion (or a limited portion, e.g., a first line) of the labeled content, even before the user passes the user authentication operation.

The fourth example of such modifications or variations of this ninth exemplary aspect relates to various configurations or methods for displaying an unread labeled icon badge along with not the unread icon badge but the unread unlabeled icon badge. As defined above, the unread contents of this disclosure include unread unlabeled contents and unread labeled contents. Thus, a number of unread contents is a sum of a number of unread labeled contents and a number of unread unlabeled contents.

But in order for a user to confirm a number of unread unlabeled contents, the user has to subtract a number of unread labeled contents from a number of unread contents, where most users may not favor performing a subtraction operation. In order to relieve a user from such a burden, a terminal may display an unread unlabeled icon badge instead of an unread icon badge and, therefore, without performing any subtraction operation, the user may readily and visually confirm the number of such unlabeled contents as well as the number of such labeled contents. FIGS. 11A and 11B exemplify various configurations or methods for displaying the numbers of the unlabeled contents and labeled contents using a labeled icon badge and an unlabeled icon badge.

The terminal of FIG. 11A may display an (unread) unlabeled icon badge (22) and an (unread) labeled icon badge (23) around or inside an app icon (20) of a certain app. In this example, the unlabeled icon badge (22) is attached with a numeral "223," whereas the labeled icon badge (23) is attached with another numeral "7." Therefore, a user may readily and visually confirm that, since the user terminated driving the app the last time, he has received 7 labeled contents as well as 223 unlabeled contents.

Alternatively, a terminal may display an unread icon badge (21) in addition to the unlabeled icon badge (22) and labeled icon badge (23) around or inside an app icon (20) of a certain app. In this example, the unread icon badge (21) is attached with a numeral "230," the labeled icon badge (23) is attached with another numeral "7," and the unlabeled icon badge (22) is attached with a numeral "223." Thus, the user may readily and visually confirm that, since the user terminated driving the app the last time, he has received a total of 230 unread contents, in which seven are the labeled contents, while 223 are the unlabeled contents.

The terminal may display the unlabeled icon badge (22) and labeled icon badge (23) in various arrangements or configurations which may be identical to those exemplified in FIGS. 3A to 3G or FIGS. 4A to 4D. Thus, the terminal may display one badge [1] above another badge, [2] next to another badge, [3] inside another badge, [4] to overlap at least a portion of another badge, or [5] may contact (but not overlap) at least a portion of another badge. In addition, the terminal may display such badges (22)(23) in different sizes, shapes, colors, positions, arrangements or orientations in such a way that the user may easily distinguish one badge from the other.

Instead of displaying the unread badge and the labeled icon badge, or displaying the unlabeled icon badge and the labeled icon badge, the terminal may display the unread icon badge and the unlabeled icon badge. In addition, unlike those exemplified in FIGS. 3A to 3G or FIGS. 4A to 4D, the terminal may display [1] the unread icon badge above the labeled icon badge, [2] the unlabeled icon badge above the labeled icon badge, or [3] the unread icon badge above the unlabeled icon badge.

As explained above, the unread contents always include the unread unlabeled content and the unread labeled contents. Accordingly, the number of unread contents is always bigger than or equal to the number of labeled contents. But the number of the unlabeled contents may be bigger than, equal to or smaller than the number of the labeled contents. In addition, all unread contents may correspond to the labeled contents and, therefore, may not include any unlabeled content. More particularly, when the unread contents may not include any unlabeled content, i.e., the numeral for the unlabeled icon badge is "0," the terminal may display the numeral in various configurations or arrangements exemplified in FIGS. 4A to 4H or FIGS. 5A to 5D.

As explained above, various terminals of this disclosure may display the labeled contents to a user using various icon badges, where the labeled contents are included in the unread contents received by a certain app and where such labeled contents may carry more necessity of a user to read or confirm than other contents. More particularly, such terminals may display a number or a substance of such labeled contents using such icon badges. Thus, as long as these objectives of this paragraph may be accomplished, the terminals of this disclosure may display the badges in various different configurations or methods. When desirable, the terminals may create new labeled icon badges and display such new labeled icon badges on a display unit, where such new labeled icon badges may be created by combining at least two of such labeled icon badges exemplified herein or by combining multiple features of such labeled icon badges exemplified herein.

The fifth example of such modifications or variations of this ninth exemplary aspect relates to the configurations or methods of displaying a number of the unread contents, or a number of the unread labeled (or unlabeled) contents included in the unread contents received by a certain app, without necessarily displaying any numeral around or inside an app icon. To this end, a terminal may manipulate a shape, a size, a color, an orientation, an arrangement or a position of at least one portion of an icon badge.

In one example, a terminal may display various unread icon badges or labeled icon badges exemplified in FIGS. 3A to 43G or FIGS. 4A to 4D, but may not display any numeral attached to such badges. Instead, the terminal may manipulate a shape, a size, a color, an extent of transparency, a position, an orientation, or an arrangement of at least one portion of such icon badges, thereby visually and relatively representing a number of unread contents or another number of unread labeled contents received by a certain app related to the badge.

In another example, a terminal may visually represent a number of unread contents or unread labeled contents, not by using such numerals but by using a certain text or a symbol. That is, the terminal may represent the number of unread contents or unread labeled contents [1] by attaching a text or a symbol to an app icon or [2] by including a text or a symbol in the unread icon badge or the labeled icon badge. For example, a terminal may adopt a configuration similar to that of FIG. 5D, except that the terminal does not use any numerals but use a certain text or a symbol in such a way that the text or symbol may represent an absolute or relative value of such numbers. As far as such terminals of this disclosure may represent such numbers of unread contents or unread labeled contents without using such numerals, the terminal may modify or vary various labeled icon badges or unread icon badges by attaching any text or symbol.

In another example, a terminal may visually represent a number of unread contents or unread labeled contents, not by using such numerals but by using a certain figure or an image. That is, the terminal may represent the number of unread contents or unread labeled contents [1] by attaching a certain figure or an image to an app icon or [2] by including the figure or image in the unread icon badge or the labeled icon badge. As far as such terminals of this disclosure may represent such numbers of unread contents or unread labeled contents without using such numerals, the terminal may modify or vary various labeled icon badges or unread icon badges explained in this disclosure by attaching any figure or image.

The sixth example of such modifications or variations of this ninth exemplary aspect relates to the configurations or methods of replacing various icon badges, by utilizing an app icon (or U/I) of a certain app itself, i.e., various configurations or methods of using the app icon as such icon badges. To this end, the terminal may replace the icon badges by an app icon or a certain portion of the app icon, by manipulating a shape, a size, a color, an extent of transparency, an orientation, an arrangement or a position of at least one portion of the app icon, without displaying any unread icon badge or labeled icon badge.

In one example, a terminal may manipulate a shape of at least one portion of an app icon, similar to the shapes of various unread icon badges or labeled icon badges exemplified in FIGS. 3A to 43G or FIGS. 4A to 4D. In one case, a terminal may replace the unread icon badge with a right portion of the app icon, while replacing the labeled icon badge with a left portion of the app icon. Thereafter, based on the number or type of the unread contents or labeled contents, the terminal may manipulate a shape or a size of such right or left portion of the app icon. As a result, just by observing some features (e.g., a shape or a size) of a certain portion of the app icon, a user may readily and visually confirm the number or type of such unread contents or labeled contents.

In another example, a terminal may visually represent a number of unread contents or unread labeled contents by using a certain text or symbol. That is, the terminal may represent a number of unread contents or unread labeled contents by attaching a certain text or symbol to an app icon. As far as a user may confirm the number or type of unread contents or unread labeled contents, the terminal may modify or vary various features of the app icon and using such app icon either as the labeled icon badge or as the unread icon badge.

The seventh example of such modifications or variations of this ninth exemplary aspect relates to the configurations or methods of using various icon badges along with multiple app icons. To this end, a terminal may display two or more app icons for each app.

For example, a terminal may display a $1^{st}$ app icon and a $2^{nd}$ app icon, both of which correspond to a certain app or to an U/I of the app on a display unit. More particularly, the terminal may display an unread icon badge around or inside the $1^{st}$ app icon, while displaying an unread labeled icon badge around or inside the $2^{nd}$ app icon. By displaying multiple app icons for a certain app and displaying each icon badge around or inside each app icon, a user may readily and individually confirm a number or a type of the unread contents, unlabeled contents or labeled contents.

In a first case, a terminal may display the $1^{st}$ app icon and the $2^{nd}$ app icon for a certain app on a display unit. More particularly, the terminal may manipulate a shape, a size, a color, an extent of transparency, an orientation, an arrangement or a position of the $1^{st}$ app icon such that the terminal can use the $1^{st}$ app icon as the unread icon badge. That is, the terminal may manipulate such features of the $1^{st}$ app icon differently based on the number of unread contents. Therefore, the user may visually or qualitatively confirm the number or type of the unread contents received by the app. Similarly, the terminal may also manipulate a shape, a size, a color, an extent of transparency, an orientation, an arrangement or a position of the $2^{nd}$ app icon and use the $2^{nd}$ app icon as the labeled icon badge.

In a second case, when multiple apps are implemented into a terminal and when each of such apps may receive contents, a terminal may display the $1^{st}$ app icon and the $2^{nd}$ app icon for each of such multiple apps. The terminal may also display an unread icon badge (which may represent a number or a type of unread contents) around or inside each of multiple $1^{st}$ app icons, and display a labeled icon badge (which may represent a number of a type of unread labeled contents) inside or around each of multiple $2^{nd}$ app icons. The terminal may also display multiple $1^{st}$ app icons and their unread icon badges in a first region of the display unit, while displaying multiple $2^{nd}$ app icons and their labeled icon badges in a second region which may be different from the first region.

As a result, using multiple labeled icon badges and their multiple $2^{nd}$ app icons displayed as a cluster in the second region of the display unit, the user may easily confirm a number of the labeled contents received by each of multiple apps. Similarly, using multiple unread icon badges and multiple $1^{st}$ app icons displayed as a cluster in the first region of the display unit, the user may also easily confirm a number or a type of unread contents received by each of multiple apps.

FIG. 11C exemplifies such configurations or methods for displaying a first cluster of unread icon badges and a second cluster of labeled (or unlabeled) icon badges in different regions of the display unit depending upon the types of contents, where this corresponds to the second case of the variations or modifications of the seventh example of the ninth exemplary aspect. A terminal (10) of FIG. 11C is in a lock state, and displays a total of 6 app icons, i.e., three $1^{st}$ app icons and three $2^{nd}$ app icons. More particularly, the terminal (10) may display three $1^{st}$ app icons for such three apps in a lower portion of a display unit (11), while attaching to such app icons three unread icon badges for representing the number of received unread contents for each app. The terminal (10) may also display three $2^{nd}$ app icons for such three apps in an upper portion of the display unit (11), while attaching to such app icons three labeled icon badges for representing the number of received, unread labeled contents for each app. As a result, when checking the number of labeled contents received by each app, the user has only to look at the upper portion of the display unit (11), while looking at the lower portion of the display unit (11) in checking the number of unread contents received by each app.

In a third case, when multiple apps are implemented into a terminal and when each of such apps may receive contents, the terminal may display multiple $1^{st}$ app icons for certain apps, their multiple unread icon badges, multiple $2^{nd}$ app icons for those apps, and their labeled icon badges, when such apps have received unread contents which also include the labeled contents. However, when other apps have received unread contents which do not include the labeled contents, the terminal may only display multiple $1^{st}$ app icons for those other apps and their multiple unread icon badges. In addition, the terminal may display only the $1^{st}$ app icons and their unread icon badges in the first portion of the display unit, but may display only the $2^{nd}$ app icons and their labeled icon badges in the second portion of the display unit which is different from the first portion. As a result, using multiple labeled icon badges and multiple $2^{nd}$ app icons displayed as a cluster in the second portion of the display unit, the user may easily confirm a number of labeled contents received by each of multiple apps.

Figure 11D:
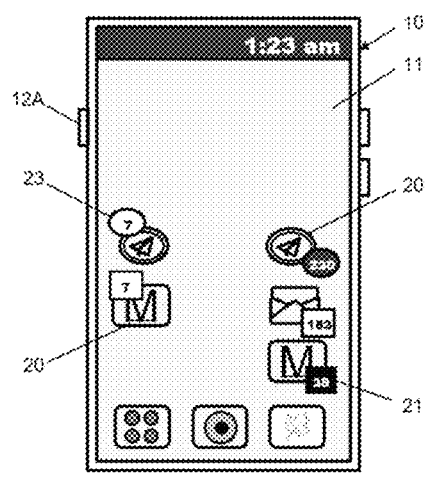

FIG. 11D exemplifies such configurations or methods for displaying a first cluster of unread icon badges and a second cluster of labeled (or unlabeled) icon badges in different portions of the display unit depending upon the types of contents, where this corresponds to the third case of the variations or modifications of the seventh example of the ninth exemplary aspect. A terminal (10) of FIG. 11D is in an unlock state, and displays a total of 8 app icons, i.e., three $1^{st}$ app icons for three apps, two 2nd app icons for two apps, and three app icons each of which has not received or may not receive any content.

The terminal (10) may display three $1^{st}$ app icons for such three apps in a right portion of the display unit (11), while attaching to such app icons three unread icon badges for representing the number of received, unread contents for each app. In contrary, the terminal (10) may only display two $2^{nd}$ app icons for two apps in a left portion of the display unit (11), while attaching to such app icons two unread labeled icon badges for representing the number of received, unread labeled contents for each app.

In FIG. 11D, the terminal (10) may display the $1^{st}$ icon of a messenger app which has received a total of 183 unread contents as well as a numeral "183" on the right portion of the display unit (11). But when those 183 unread contents do not include any labeled contents, the terminal (10) may display the $1^{st}$ app icon of the messenger app on the right portion of the display unit (11), but does not display any $2^{nd}$ app icon of the messenger app on the left portion of the display unit (11). In other words, when the unread contents include the labeled contents as in the second case of this example, the terminal (10) displays not only the $1^{st}$ app icon of the app but also the $2^{nd}$ app icon of the same app. However, when the unread contents do not include any labeled content as in the third case of this example, the terminal (10) displays only the $1^{st}$ app icon of the app but may not display the $2^{nd}$ app icon of the same app.

As a result, when checking the number of unread contents received by each app, a user who drives the terminal or app of the third case of this example has only to look at the right portion of the display unit. In contrary, when checking the number of labeled contents received by each app, a user who drives the terminal or app of the third case of this example has only to look at the left portion of the display unit.

Because the terminal does not display any app icon or any icon badge for an app which receives unread contents which, however, do not include any labeled content, the user may more readily check [1] those apps which have received at least one labeled contents or [2] the number or the type of the labeled contents.

In the above cases of the variations or modifications of the seventh example of the ninth exemplary aspect, a terminal may arrange such multiple app icons to perform the same or similar functions. In other words, when a certain app displays a $1^{st}$ app icon and a $2^{nd}$ app icon and when a user provides a user input to the 1$^{st}$ or 2$^{nd}$ app icon, each app icon may open the same group window or content window on a display unit (11).

In contrary and in the same cases, a terminal may instead arrange such multiple app icons to perform different functions. That is, when a certain app displays a 1$^{st}$ app icon and a 2$^{nd}$ app icon and when a user provides the same user input to the 1$^{st}$ or 2$^{nd}$ app icon, each app icon may display a different group window or a different content window on the display unit (11). For example, when a user provides a user input to a 1$^{st}$ app icon of a certain app, the app may open a group window or a content window each of which may include not only labeled contents but also unlabeled contents. But when the user provides the same user input to a 2nd app of the same app, the app [1] may open a group window which selectively includes those groups which have received (unread) labeled contents, or [2] may open a content window in which the unlabeled contents are simplified or omitted, while the labeled contents may be highlighted.

The eighth example of such modifications or variations of this ninth exemplary aspect relates to the configurations or methods for a user or a terminal to respond to such labeled contents or labeled icon badges. First, when a user confirms the presence of the unread labeled content included in the unread contents received by a certain app implemented into a terminal, a user may respond to the labeled contents in various methods. In the case of a scheduling app, the user may transmit a content informing that he will attend a meeting, that he can't attend the meeting, that he will be late for the meeting, or that he requests to postpone the meeting. In the case of an ad displaying app, the user may transmit a content informing that he will purchase a merchandise, that he cancels a reservation of the merchandise, or that he wants the merchandise to be delivered. In the case of an event notifying app, the user may transmit a content notifying the police, law enforcement or medical institution, or another content that he asks for help or that he will make an investment (e.g., buying stocks, bonds, or the like). In the case of a control app for the above electrical or electronic devices, the user may transmit a content for manipulating the devices.

The user may also request a terminal to respond to various contents described in the above paragraph. For example, when a user finds about fire by confirming a labeled content received through the event notifying app, the user may render the terminal call a fire station by manipulating a certain button or another input unit, instead of the user calling the fire station himself.

The ninth example of such modifications or variations of this ninth exemplary aspect relates to such configurations or methods of applying various labeled contents, labeled data packets or labeled icon badge to other programs or apps implemented not to a mobile terminal, but to a desktop computer or a control panel of an office or a factory. FIGS. 11E and 11F exemplify such configurations or methods of applying the label signals, labeled contents, labeled data packets or labeled icon badges to computer programs utilizing a network.

FIG. 11E exemplify an app icon, an unread icon badge, and a labeled icon badge for an e-mail app, all displayed on a screen of a desktop computer, where the computer may inform a user with an unread icon badge (21) and a numeral "230" that 230 unread e-mails have been received after the user has run the app the last time. In addition, the computer may also inform the user with the labeled icon badge (23) that 23 of such unread e-mails are the labeled e-mails.

FIG. 11F exemplify a different screen displayed on a display unit of a laptop computer, where an "inbox (21)" informs a user that a total of 230 unread e-mails have been received, while an "labeled box (23)" informs the user that seven out of 230 unread e-mails are the labeled e-mails. In this aspect, the inbox may correspond to an unread icon badge, while the labeled box may correspond to a labeled icon badge. The laptop computer may also create a label signal, create a labeled data packet including the label signal, and transmit or receive such a data packet through a network, in various configurations or methods which are similar to those of various terminals described above.

Various embodiments and examples of this ninth exemplary aspects may be interchangeable with other embodiments or examples of other aspects disclosed heretofore and hereinafter. Therefore, as long as the embodiments or examples may not contradict each other, such embodiments or examples of this ninth aspect [1] may also apply to corresponding features of other embodiments or examples of this ninth aspect or other aspects, [2] may be incorporated into corresponding features of other embodiments or examples of the ninth or other aspects, [3] may replace corresponding features of other embodiments or examples of this ninth aspect or other aspects, [4] may be replaced by corresponding features of other embodiments or examples of this ninth aspect or other aspects, or [5] may instead be combined with corresponding features of other embodiments or examples of this ninth or other aspects.

5. Creating Labeled Signals and Labeled Contents in the Perspective of the System The tenth exemplary aspect of this disclosure relates to various configurations or operational sequences of software elements capable of creating various icon badges. To this end, a terminal or an app may determine the presence or absence of unread contents received by a certain app or by a certain group established by the app or may count a number of the unread contents. In addition, the terminal or app may also determine the presence or absence of labeled (or unlabeled) contents included in the unread contents or may count a number of the labeled (or unlabeled) contents.

The counting of the above paragraph may be performed by various subjects such as, e.g., various software elements of a terminal, various apps implemented or downloaded into the terminal, various computer programs of an external server, various apps implemented to the server, various computer programs in a cloud storage, or various apps stored or implemented into the cloud storage. But for simplicity of illustration, such counting by above various subjects is to be collectively referred to as "counting performed by a terminal" or simply as "counting." Therefore, such counting in the following explanation may be performed by any of the terminal, the app implemented into the terminal, by the external server, the cloud, as well as any device which includes or is implemented with an app or a computer program capable of performing such counting. In this case, the terminal may perform an entire (or only a) portion of such counting.

For example, when an app implemented to a terminal or a certain group of the app has received an unread content which a user does not confirm yet, the terminal may display an unread icon badge which represents the presence of an unread content. Whenever the terminal receives another unread content, the terminal may count a (cumulative) number of the unread contents and, when desirable, can display not only the unread icon badge but also a numeral which represents the (cumulative) number. Of course, the terminal may display the unread icon badge and the numeral in any position on a display unit. For the ease of a user, however, the terminal may display the unread icon badge and the numeral around or inside an app icon of the app.

In addition, the terminal [1] may check the presence of a labeled content included in unread contents based on the label signals, and may count a number of such labeled contents, or [2] may proactively check the presence of a labeled content in the unread contents using the information analysis algorithms, and may count the number of such labeled contents. Upon confirming the presence of the labeled contents in the unread contents, the terminal may then display an (unread) labeled icon badge or, simply, labeled icon badge, thereby representing that the unread contents include the labeled contents. Whenever a terminal receives an additional unread content, the terminal may check whether the unread contents include the labeled contents. In addition, the terminal may update a (cumulative) number of such (unread) labeled contents and, when desirable, the terminal may display not only the unread labeled icon badge as well as a numeral representing the number of such labeled contents.

A terminal may display the unread labeled icon badge and the numeral representing the number of the labeled contents in any portion of a display unit. However, for the sake of the user's convenience, a terminal may display the badge and the numeral [1] inside or around an app icon for a certain app in an unlock screen, in a lock screen, or in a display screen when a display unit is in its off state, or [2] inside or around a group icon displayed on a group window of a certain app. In addition, a terminal may display the unread icon badge, a numeral for representing a number of unread contents, the unread labeled icon badge, or a numeral for representing a number of unread labeled contents, in various configurations or arrangements as explained hereinabove and hereinafter.

The first exemplary embodiment of this tenth exemplary aspect relates to a computer program for checking the presence or absence of unread contents received by a certain app and capable of counting a number of such unread contents. For example, FIG. 12A exemplifies a computer program for counting and displaying a number of unread contents. In the first five lines of its codes, like calling a camera app or an album app, the program may assign a constant value of an intent action, "int," to a "badgeCount" which represents a (cumulative) number of unread contents. In this case, "getPackageName( )" is a function for calling a present package name, while the class name is the name of an activity class in which a certain is first run or executed. When "MainActivity.class" is the first activity class, the program can use such a name. Because the program sets up a separate class for display with "int" and switches to "MainActivity" after a certain period, the program may use a function for calling a launcher screen.

The program can create two classes which may inherit two services based on the FCM, while performing a "sendNotification method" or an "onMessageReceived method" of a class which inherits "FirevaseMessagingService." When the program receives push information such as, e.g., an unread content or an unlabeled data packet which includes the unread content, the program can increase a "BadgeCount variable" (to be referred to as a "badge count" hereinafter) by 1. It is noted that the badge count may have to be initialized as "0" when the app is executed. The terminal or the app may save the badge count in databases such as "SharedPreference" or "SQLite." The terminal or the app may call a function for checking the badge count and, when the count is not "0," it can initialize the badge count as "0." That is, when a user runs an app, the program initializes the badge count as "0." When the user finishes running the app, the program increases the badge count when the terminal or the app receives push information such as, e.g., an unread content or an unlabeled data packet including the unread content.

Therefore, the terminal or app may display the badge count which represents a number of unread contents received by a certain app or by a certain group of the app, along with the unread icon badge. For example, when the terminal displays an app icon (or U/I) of a certain app on a display unit, the terminal may display the badge count as well as the unread icon badge around or inside the app icon (or U/I). The terminal or the app may execute the above program when it receives the push information, i.e., the unread content.

When a terminal displays multiple group icons for multiple groups which have been set by a certain app, the terminal may display the unread icon badge for each group as well as the badge count (i.e., a number of unread contents) for each group around or inside each group icon (or U/I). To this end, the program of FIG. 12A may be modified in such a way that the program assigns a group count as well as a unique connection information to each of multiple groups which are set up by the app, and that the program may increase the group count as well as the badge count when the terminal or the app receives the push information such as the unread content or the unlabeled data packet which includes the unread content. Accordingly, the terminal or the app may count and display the number of unread contents received by the app as well as the number of unread contents received by each of such multiple groups of the app.

The second exemplary embodiment of this tenth exemplary aspect relates to a computer program for checking the presence or absence of any labeled content included in the unread contents received by a terminal or a certain app and capable of counting a number of such unlabeled contents. For example, FIG. 12B exemplifies a computer program for counting and displaying a number of the labeled contents. In the first five lines of its codes, the program may assign a constant value of an intent action, "int," to a "labelCount" which represents a (cumulative) number of unread labeled contents. In this case, "getPackageName( )" is a function for calling a present package name, while the class name is the name of an activity class in which a certain is first run or executed. When "MainActivity.class" is the first activity class, the program can use such a name. Because the program sets up a separate class for display with "int" and switches to "MainActivity" after a certain period, the program may use a function for calling a launcher screen.

The program can create two classes which may inherit two services based on the FCM, while performing a "sendNotification method" or an "onMessageReceived method" of a class which inherits "FirevaseMessagingService." When the program receives push information such as, e.g., a label signal, a labeled content, or a labeled data packet, the program can increase a "labelCount variable" (to be referred to as a "label count" hereinafter) by 1. It is appreciated that the label count may have to be initialized as "0" when the app is executed or run. The terminal or the app may save the label count in databases such as "SharedPreference" or "SQLite." The terminal or the app may call a function for checking the label count and, when the count is not "0," it can initialize the badge count as "0." That is, when a user runs an app, the program initializes the label count as "0." When the user finishes running the app, the program increases the label count when the terminal or the app receives push information such as the labeled content.

Therefore, the terminal or app may display the label count which represents a number of (unread) labeled contents included in the unread content received by a certain app or by a certain group of the app, along with the (unread) labeled icon badge. For example, when the terminal displays an app icon (or U/I) of a certain app on a display unit, the terminal may display the labeled icon badge as well as the label count (i.e., a number of the labeled contents) around or inside the app icon (or U/I). Or when a terminal displays multiple group icons for multiple groups which have been set by the app, the terminal may display the unread labeled icon badge for each group as well as the label count (i.e., a number of unread labeled contents) for each group around or inside each group icon (or U/I). The terminal or app may execute the above program when it receives the push information, i.e., the unread content.

In general, the program of FIG. 12A is similar to that of FIG. 12B. Whereas the program of FIG. 12A employs the variable "badge count" to count a (cumulative) number of unread contents, the program of FIG. 12B uses the variable "label count" to count a number of unread labeled contents. Therefore, the terminal or the app may display an unread icon badge and labeled icon badge on the display unit, while also displaying a number of unread contents or another number of labeled content by executing the programs exemplified in FIGS. 12A and 12B or other programs which may be similar to such programs.

It is noted that the program of FIG. 12A is independent of that of FIG. 12B and, therefore, the terminal or the app may execute only one of such programs. That is, the terminal or the app may use the variable, the "label count," to count the (cumulative) number of the unread labeled contents, and may display the labeled icon badge and the number of the labeled contents, while not displaying the unread icon badge and the number of unread contents.

The third exemplary embodiment of this tenth exemplary aspect relates to a computer program capable of counting a number of labeled contents included in unread contents received by a certain app, on the perspective of both a terminal and a server. FIG. 12C exemplifies a program of a server and another program of a terminal for counting the number of unread labeled contents. More particularly, an upper portion of the program of FIG. 12C corresponds to the program in the server, while the lower portion is the program in the terminal.

For example and as explained in the first and second embodiments of this tenth aspect, a server may count a number of unread contents which are received by a certain app or a certain group set up by the app, and may represent that number and its related unique connection information as "Badge_Count." In addition, the server may count a number of the labeled contents included in the unread contents, and may represent that number and its related unique connection information as "Badge_Prioirty_Count." In addition to the Badge_Count and Badge_Prioirty_Count, the server may transmit [1] Device_ID (unique information of a receiver's terminal which is to receive that "number" and such information or the receiver's phone number), [2] APP_ID (unique information of the app implemented to the receiver's terminal which is to receive that "number" and such information), [3] Service_ID (information related to broadcast service of the receiver's terminal), [4] Mode (preset information related to a mode of display, a shape of an icon, and the like), or [5] Code (information accessible by the receiver's terminal such as, e.g., a scope of a terminal's notifying, an icon, a notifying screen, a lock screen, or displayed information).

A server may execute "Update_Badge" and save or manage information obtained by executing "Calculate_Badgecount." In this case, the "Setting Parameter" is a set value related to transmission such as, e.g., a period of transmission, an option for retransmission in case of failure, or an option for a notice after transmission. In addition, the server may deliver such notice information to a terminal in the form of "Badge_Info," where "Database{Badge_info}" represents data to be transmitted to a receiver as well as unique information of the terminal, where "PARAMETER" represents information such as a setting for calling in case of transmission, or a mode of notifying a user. A server may also execute "Management_BadgeQ," save or manage information for checking for successful transmission to a receiver's terminal, and determine whether or not to retransmit the content.

A receiver's terminal may receive various information from a server or may request the server to transmit various information to itself. For example, a terminal may execute "Broadcating_RequestBadge," may communicate with a server either wirelessly or through wire using the broadcast function provided by an O/S, and may request various information explained in the above two paragraphs. More particularly, the terminal may execute "Get_BadgeInfo( )" and receive the notice displaying information. Once receiving such information, the terminal may deliver such information to "Display_Badgeinfo( )," thereby displaying an unread icon badge, a labeled icon badge, a numeral which represents a number of unread contents, or another numeral which represents a number of unread labeled contents, inside or around an app icon (or a group icon of a certain group).

The above programs which are implemented to a terminal, an app or a server and which may check the presence or absence of unread contents or unread labeled contents and which may count a number of such unread contents or unread labeled contents of the tenth exemplary aspect may be also modified or varied in various operational sequences or methods. Followings are various examples of such modifications or variations, where such modifications or variations [1] may be applied to modify or vary various embodiments or examples of this tenth exemplary aspect, or [2] may be applied to modify or vary different embodiments or examples of different exemplary aspects described hereinabove or hereinafter.

In the first example of such modifications or variations of this tenth exemplary aspect, a server which provides services to a certain app may transmit push information to the app implemented to a terminal, where the push information may include [1] the unread contents which have been received by the app or by a certain group of multiple groups set up by the app, or [2] the (unread) labeled contents which have been received by the app or by a certain group of multiple groups set up by the app. After executing "Calculate_Badgecount( )" of FIG. 12C, the server may also update its database through "Update_Badge( )" periodically or in real time. The server may transmit such updated information to the terminal either as the unread content or as the labeled content through "Pushing_Badge( )" The server may also manage various information related to transmission of various contents or data packets through "Management_BadgeQ."

In the second example of such modifications or variations of this tenth exemplary aspect, a certain app which is implemented to a terminal and which provides certain services may request a server to transmit information related to the unread contents, the labeled contents, and a number of such unread contents or a number of such labeled contents.

For example, when the terminal request such information or when a user runs the app, the terminal or app may request the information to the server through "Broadcating_RequestBadge( )." Once the server transmits such information, the terminal may receive the information through "Get_BadgeInfo( )" and display the information on a display unit through "Display_Badgeinfo( )."

In the third example of such modifications or variations of this tenth exemplary aspect, various subjects may determine whether the data packet received by a terminal or an app may include a label signal or whether a content received by the terminal or the app may be the labeled content. The above exemplary programs may then be modified accordingly. For example, a sender or a terminal may create a label signal or a labeled content when a sender may provide a mechanical user input to a terminal or when a sender's terminal may use various information analysis algorithms stored in or outside the terminal. Or a server may create a label signal or a labeled content based on the user input provided by a user, or may create a label signal or a labeled content use various information analysis algorithms stored in or outside the server. Alternatively, a receiver's terminal may extract the label signal from the data packet or may create the label signal or the labeled content by using the information analysis algorithms stored in the terminal or stored outside. Based thereupon, the above programs may be easily modified accordingly.

6. Variations or Modifications

Various terminals, labeled data packets or labeled icon badges of the first exemplary aspect to the tenth exemplary aspect may be also modified or varied in various configurations or methods. In particular, followings exemplary aspects, their various embodiments, and their various examples may be applied to modify or to vary each embodiment or each example of the above first to tenth exemplary aspects.

The eleventh exemplary aspect of this disclosure relates to various configurations or methods for various subjects which may create the label signal, where this eleventh aspect may be applied to each of the above first to tenth exemplary aspects. As described above, the label signal may be created by various subjects examples of which may include [1] a terminal of a user who may create a content, [2] a terminal of a receiver, e.g., a member of a certain group of a certain app, who may receive the content, or [3] a server (i.e., a central or local server) which may relay the content from a sender to a receiver. These subjects may create the label signal while coupled to each other or individually. Similarly, a user's terminal, a receiver's terminal or a server may check while coupled to each other or individually, whether a certain data packet may include the label signal.

In general, creation of the label signal or checking the label signal may be different based on the features of configurations or operational sequences of a terminal, a certain app, or a server. Therefore, creation or checking for the label signal may be designed differently based on a selection by a terminal manufacturer, a server manager, or an app developer, as long as the terminal, server or app may operate properly.

In general, a terminal may run an operation of creating a label signal, and then another operation of including the label signal into a data packet, thereby running an operation of creating a labeled data packet. The hardware elements of a terminal which may run the operations may include a CPU unit, whereas the software elements of the terminal running these operations may include an O/S, an app or other computer programs assigned to such operations. For simplicity of illustration, the terminal is deemed to run such operations throughout this disclosure.

The following embodiments of this eleventh aspect relate to various configurations or methods of creating the label signal by the above subjects and of creating the labeled data packet. In addition, the following embodiments may apply to the above first to tenth exemplary aspects.

In the first exemplary embodiment of this eleventh exemplary aspect, a user's terminal (i.e., the user's terminal or an app implemented to the terminal) may create a label signal. For example, a user who creates a content can also create various label signals in various methods as exemplified in various embodiments or examples of the fourth or fifth exemplary aspect. Alternatively, a user's terminal may create a label signal using various prior art information analysis algorithms as exemplified in various embodiments or examples of the sixth aspect of this disclosure. The user's terminal may include the label signal into a data packet, create a labeled data packet, and then transmit the data packet to a server or directly to a receiver's terminal.

In the second exemplary embodiment of this eleventh exemplary aspect, a server may create a label signal. For example, when a user does not actively create a label signal and include the label signal into a data packet, a server may receive the data packet from a user's terminal, may analyze the data packet using various information analysis algorithms as exemplified in various embodiments and examples of the sixth aspect of this disclosure, and may determine whether or not to create a label signal. It is noted that, when the user actively creates the label signal and include the label signal into the data packet, the server may not necessarily perform such analysis using the information analysis algorithms.

In the third exemplary embodiment of this eleventh exemplary aspect, a server may check whether a received data packet may include a label signal. For example, a server which receives a data packet of the first embodiment may analyze the data packet and check whether the data packet includes the label signal. When the data packet includes the label signal, the server may transmit the data packet to the receiver's terminal, and may inform the terminal that the label signal is included in the data packet. Alternatively, the server may store the content of the data packet and only transmit the label signal to a receiver's terminal. The receiver's terminal may then contact the server, confirm the content, and then display the content as a labeled content on a display unit.

In the fourth exemplary embodiment of this eleventh exemplary aspect, a receiver's terminal may generate a label signal. For example, the receiver's terminal may receive a data packet from a server or from a user's terminal, may analyze a content included in the data packet using various information analysis algorithms as exemplified in various embodiments or examples of the sixth exemplary aspect of this disclosure, and then determine whether or not to create a label signal.

In the fifth exemplary embodiment of this eleventh exemplary aspect, a receiver's terminal may confirm whether or not a received data packet may include a label signal. For example, a receiver's terminal may receive a data packet, and may check whether the data packet may include the label signal as created in the first or second exemplary aspect of this disclosure. Alternatively, a receiver's terminal may confirm the label signal which it generated according to the fourth embodiment of this eleventh aspect.

In the sixth exemplary embodiment of this eleventh exemplary aspect, a user's terminal and a server may share the task of creating or checking a label signal. Or a receiver's terminal and a server may instead share the task of creating or checking a label signal. Or a user's terminal and a receiver's terminal may share the task of creating or checking a label signal. Alternatively, a user's terminal, a server, and a receiver's terminal may share the task of creating or checking a label signal.

The twelfth exemplary aspect of this disclosure relates to various configurations or methods of creating the unread icon badges and the labeled icon badges which may be formed by manipulating various features of app icons, where various icons of this twelfth aspect may be applied to the foregoing first to tenth exemplary aspects. For example, the terminal may manipulate various features of the app icons and may then use the manipulated app icons as the unread icon badge or the labeled icon badge. Therefore, as the number of the unread contents or the number of the labeled contents may increase, the terminal may increase an extent of such manipulation as well, thereby utilizing the manipulated app icons as the unread icon badge or the labeled icon badge. Examples of such features of the app icons may include a shape, a size, a position, an orientation, a background, a color, a brightness or an extent of transparency.

Therefore, a terminal may change a length or a height of an app icon of an e-mail app and use the app icon as an unread icon badge or as a labeled icon badge. A terminal may instead change a font, a color, a position or a background of a data included in an app icon of a scheduling app and use the app icon as an unread icon badge or as a labeled icon badge. Or a terminal may change a size or a color of one side (e.g., a left side or a right side) of an app icon of a messenger app and use the app icon as an unread icon badge or as a labeled icon badge. Or the terminal may change various features of the app icon in real time based on the numbers of the unread contents or the unread labeled contents, and may use such app icons as an unread icon badge or as a labeled icon badge.

The thirteenth exemplary aspect of this disclosure relates to various configurations or methods of selecting a labeled receiver based on a relationship between a certain sender and a certain receiver, not based on [1] a unilateral labeling by a sender, [2] a unilateral labeling by the analysis of the content transmitted by the sender, or [3] a unilateral labeling by a receiver's terminal.

The first exemplary embodiment of this thirteenth exemplary aspect relates to a case where a user is a sender. That is, a user may select at least one receiver as a labeled receiver by, e.g., [1] selecting a certain receiver of a certain group of a certain app, [2] selecting at least one receiver from multiple groups of a certain app, or [3] selecting at least one receiver from all persons or entities listed in all apps of the receiver's terminal, where information of such persons or entities are stored in the receiver's terminal. Once a user may select a labeled receiver, the user's terminal may include all contents into the labeled data packet and transmit the data packet to the labeled receiver, regardless of whether it is the user or others who may create the label signal. Or the user's terminal may transmit the data packet either only to the labeled receiver as the labeled data packet or to all receivers as the unlabeled data packet. The receiver's terminal may display the content included in the data packet either as the labeled content or as the unlabeled content.

To this end, a user may select his boss, family, other important people or institutions in advance as the labeled receivers. When a user wants to control various electrical or electronic devices, the user may select such devices as labeled receivers. Thus, the user may render a receiver confirm or read the labeled content, whether or not the labeled content may include information related to the receiver.

In the second exemplary embodiment of this thirteenth exemplary aspect, a user is a receiver. The user may label at least one sender as a labeled sender. For example, a user may [1] select a labeled sender from the members of a certain group, [2] select a labeled sender from multiple groups of a certain app, or [3] select a labeled sender from all people or institutions listed in a user's terminal, regardless of the kind of the apps. When the user selects the labeled sender, a user's terminal may display a content included in a labeled data packet received by the labeled sender, and may also display a content included in an unlabeled data packet as the labeled content as well.

To this end, a user may select his boss, family, other important people or institutions in advance as the labeled receivers. When a user wants to confirm a status of various electrical or electronic devices or to control such devices, the user may select such devices as labeled receivers. Therefore, the user may render a receiver confirm or read the labeled content, whether the labeled content may be related to the user or to other receivers.

In the third exemplary embodiment of this thirteenth exemplary aspect, a server selects a labeled receiver. A serve may receive a list of labeled receivers from a sender. Thereafter, when the server receives a data packet from a sender, the server may transmit the labeled data packet to the labeled receiver, while transmitting the unlabeled data packet to the unlabeled receiver, regardless of whether the data packet may or may not include the label signal.

Or the server may receive a list of labeled senders from a receiver. Thereafter, when a server receives a data packet from a sender and when a sender is the labeled sender, the server may transmit a labeled data packet to the labeled receiver, while transmitting an unlabeled data packet to the unlabeled receiver, regardless of whether the data packet may or may not include the label signal when the sender.

Or the server may proactively select a labeled receiver as well. That is, regardless of whether or not a data packet transmitted by a sender may include a label signal, the server may analyze the content included in the data packet with the information analysis algorithms and, based on the analysis, the server may proactively select a labeled receiver. More particularly, the server may search for a name, an ID, or e-mail address of a boss, a family member, other important persons or institutions using the information analysis algorithms, and may then select a labeled receiver.

The fourteenth exemplary aspect of this disclosure relates to various configurations or methods of unilaterally selecting a labeled receiver, not by unilateral labeling of a labeled receiver by a sender, or not by unilateral labeling based on the analysis of the sender's content by the server or by the receiver's terminal. Therefore, in this fourteenth aspect, a terminal may label a content received by a receiver as the labeled content only when at least two of the sender, server, and receiver may make a prior agreement.

It is noted in this aspect that the sender may include a sender's terminal as well as the aforementioned vehicle, drone, robot, electrical or electronic device, various IoT networks, or various devices connected to the network. In addition, the sender may include a user as well as other members of a certain group such as, e.g., a customer or an employee who is also a member of the group. Similarly, in this aspect, the receiver may include a receiver's terminal as well as the aforementioned vehicle, drone, robot, various electrical or electronic devices, various IoT networks, or various devices coupled to the network. The receiver may also include a user and other members such as, e.g., a customer or an employee who belongs to a certain group.

In the first exemplary embodiment of this fourteenth exemplary aspect, a terminal or a server may only label a certain content as a labeled content only when a sender and a receiver agree to each other. Therefore, even when a sender labels a content as a labeled content, the sender may receive that content as an unlabeled content when there is no agreement between the sender and the receiver. In addition, even when a receiver wants to receive a sender's content as a labeled content, the receiver may not receive the content as the labeled content when the sender does not transmit the content as the labeled content. Or when the terminal or the server labels a content as the labeled content after proactively analyzing a sender's content, the receiver's terminal may not regard the content as the labeled content unless there is an agreement with the receiver or receiver's terminal.

A sender and a receiver can arrange various agreements. For example, a sender and a receiver may agree that the receiver may receive all contents transmitted by the sender as the labeled contents. Or a sender and a receiver may agree that the receiver is to receive the content transmitted by the sender as the labeled content only when the content may include a certain substance, a certain word or phrase, or the like.

When an agreement between a sender and a receiver may require a mutual consent, a receiver may receive a labeled content transmitted by the sender as an unlabeled content when the receiver does not agree with the labeling by the sender. However, when the agreement gives a priority to the sender, the receiver may receive the unlabeled content chosen as unlabeled and transmitted by the sender as the unlabeled content, however, may receive the labeled chosen as labeled and transmitted by the sender as the labeled content, regardless of the receiver's preference. However, when the agreement gives a priority to the receiver, the receiver may receive the unlabeled content transmitted by the sender as the labeled or unlabeled content based on the receiver's preference, or may also receive the labeled content transmitted by the sender as the labeled or unlabeled content based on the receiver's preference. In this case, the receiver [1] may include a certain sender in the list of labeled senders and may receive any content transmitted by the sender as the labeled content, or [2] may receive the sender's content as the labeled content only when the content may include a certain substance, word or phrase.

In the second exemplary embodiment of this fourteenth exemplary aspect, a terminal or a server may label a certain content based upon an agreement between a sender and the server. Thus, when there is no agreement with a server, when a sender labels a certain content as a labeled content, the receiving server may transmit the content as an unlabeled content to a receiver. Or even when a receiver may attempt to receive a content transmitted by a certain sender as a labeled content, the receiver may not do so unless the server labels and transmits the content as the labeled content to the receiver. Or unless there is a prior agreement with a sender, the terminal or server may not label a content as a labeled content unless the terminal or server may proactively analyze a content created by the sender.

A sender may make a variety of agreements with a server. For example, a sender may agree with a server so that all contents transmitted by the sender may be received as labeled contents by the server. Or a sender and a server may agree that the server may receive the content transmitted by the sender as a labeled content only when the content may include a certain substance, word or a phrase.

In the third exemplary embodiment of this fourteenth exemplary aspect, a terminal or a server may label a content as a labeled content based on an agreement between a sender and the server. Therefore, when a sender labels a content which the sender is to transmit as a labeled content, a server may receive and then transmit the content to a receiver as an unlabeled content, unless there exists a prior agreement between a sender and a server which transmits the content to the receiver. Or even when the receiver may attempt to receive a content transmitted by a sender as a labeled content, the receiver may not receive the content as the labeled content, unless the server transmits the content as the labeled content. Or the terminal or server may not proactively analyze a content and select the content as a labeled content unless there is a prior agreement with the sender.

A receiver may make various agreements with a server as well. For example, a server may agree with a receiver that all contents which are transmitted by a server to the receiver may be received as the labeled contents. Or a receiver and a server may agree that a content which includes a certain substance, word or phrase may be received as a labeled content.

The fifteenth exemplary aspect of this disclosure relates to various configurations or methods of additional manipulation of various icon badges or their features. For example, when a user provides a certain user input to an app icon, a labeled icon badge or an unlabeled icon badge, a terminal may run certain additional operations or may provide additional functions to a user.

In the first exemplary embodiment of this fifteenth exemplary aspect, when a user provides a certain user input to an app icon, a terminal may display an unread content on a display unit. That is, when a user may press, contact or otherwise manipulate an app icon of a certain app, a terminal may display the unread contents received by the app (i.e., an unread content received by multiple groups set up by the app) in various arrangements or methods. In this case, the terminal may display the unread content in a lock screen, an unlock screen, a group window or a content window displayed on a display unit.

In various examples of such configurations of the above paragraph, a terminal [1] may display all unread contents received by the app on a lock (or unlock) screen or on a group (or content) window, [2] may display certain unread contents selected based on a reception time, a substance of the content, a sender or a group to which the sender belongs on such screens or windows, instead of displaying the unread contents, or [3] not entire portions but only portions (i.e., the first sentences, summaries or keywords) of all or some unread contents. Or a terminal may display a name of a sender of the content, his nickname, his ID or his picture, instead of displaying entire or some portions of the unread contents. When a terminal may not display all unread contents in one screen (or window) because a number of such unread contents is big, the terminal may allow a user to scroll the lock (or unlock) screen or the group (or content) window, thereby allowing the user to confirm all unread contents.

When a user provides another user input which may be identical to or different from the one in the above paragraph thereafter, the terminal [1] may stop displaying the unread contents described in the above paragraph and may display the prior screen, [2] may display entire portions of the unread contents selected by the user, or [3] may open a content window such that the receiver may respond to the labeled content.

In the second exemplary embodiment of this fifteenth exemplary aspect, a terminal may display a labeled content on a display unit when a user may provide a certain user input to a labeled icon badge. For example, when a user may press, touches or otherwise manipulate a labeled icon badge or a numeral representing a number or a substance of the labeled icon badge which is displayed inside or around an app icon of a certain app, the terminal may display the labeled contents received by the app. The terminal may also display whether a certain labeled content has been labeled directly by a sender or proactively by a terminal. In this case, the terminal may display the labeled contents in an arrangement or methods which are identical to or similar to those explained in the above two paragraphs and, therefore, further explanations are omitted herein.

In the third exemplary embodiment of this fifteenth exemplary aspect, as a user provides a certain user input to an unlabeled icon badge, a terminal may display an unlabeled content on a display unit. For example, when a user presses, contacts or otherwise manipulates an unlabeled icon badge displayed around or inside an app icon of a certain app, the terminal may display an unlabeled content received by the app. In this case, the terminal may display whether the labeled content has been labeled directly by a sender or proactively labeled by the terminal. The terminal may display the unlabeled contents in an arrangement or methods which are identical to or similar to those explained in the above paragraph and, therefore, further explanations are omitted herein.

In the fourth exemplary embodiment of this fifteenth exemplary aspect, a terminal may apply such additional functions not only to certain apps as explained in the above two paragraphs but also to a certain group of multiple apps set up by the app. Therefore, when a user presses, touches or otherwise manipulates a certain group of multiple groups set up by the app, the terminal may display unread contents, labeled contents or unlabeled contents in arrangements or methods which are similar or identical to those of the fifteenth exemplary aspect of this disclosure.

The sixteenth exemplary aspect of this disclosure relates to various additional configurations or arrangements of such icon badges.

In the first exemplary embodiment of this sixteenth exemplary aspect, a terminal may not only create an unread icon badge, an unlabeled icon badge or a labeled icon badge for each of multiple apps implemented to a terminal, but also create an unread icon badge, a labeled icon badge or an unlabeled icon badge for each of multiple groups established by the apps. That is, as explained in various exemplary aspects of this disclosure, the terminal may not only display such (unread, labeled or unlabeled) icon badges or various numerals related to such badges around or inside an app icon of the app, but also display such icon badges or numerals inside or around a group icon of multiple groups displayed in a certain group window.

In other words, various badges or numerals exemplified in relation to an app icon of a certain app may be applied to each of multiple group icons displayed in a group window of the app. Accordingly, in the case of a SNS app, a terminal may inform a number or substance of the contents received by the app by displaying an app icon, an unread icon badge or labeled (or unlabeled) icon badge of the app. Similarly, the terminal may inform a number of substances of various contents by displaying an app icon, unread icon badge or labeled (or unlabeled) icon badge, or numeral related to the badge in a group window in which multiple groups established by the app are displayed.

In the second exemplary embodiment of this sixteenth exemplary aspect, a terminal may create multiple labeled icons based on a process of creating such labeled contents. For example, upon receiving a labeled content which is crated directly by a sender, the terminal may regard such a content as a $1^{st}$ type labeled signal, and may display a $1^{st}$ type labeled icon badge and a $1^{st}$ type numeral which represents a number of such $1^{st}$ type labeled contents on a display unit. However, when the labeled content is created by a sender's terminal which proactively analyzes the content and selects as the labeled content, the terminal may regard such a content as a $2^{nd}$ type labeled signal, and may display a $2^{nd}$ type labeled icon badge and a $2^{nd}$ type numeral which represents a number of such $2^{nd}$ type labeled contents on a display unit.

When a terminal may proactively analyze a content which has been received from another member or which is about to be transmitted by a user, it may happen that the content may exactly correspond neither to a labeled content nor to an unlabeled content. For example, the analysis obtained by various information analysis algorithms may lead to a conclusion that the probability of a content to correspond to a labeled content is 76%, neither 0% nor 100%. In such circumstances, the terminal may display the labeled contents differently based on such probability or reliability, and may create different labeled icon badges for such labeled content with different probability or reliability.

The seventeenth exemplary aspect of this disclosure relates to additional configurations and arrangements of various icon badges. For example, when a user provides a user input to an unread icon badge or to a numeral attached to the unread icon badge, a terminal or an app may display only unread contents. Or when a user provides a certain user input or a single user input to an app icon, a terminal or an app may display only unread contents. Alternatively, when a user provides a user input to a labeled icon badge or to a numeral attached to the labeled icon badge, a terminal or an app may only display unread labeled contents. Or when a user provides a different user input or multiple user inputs, a terminal or an app may only display the labeled contents.

The eighteenth exemplary aspect of this disclosure relates to additional configurations or additional arrangements of various icon badges. For example, when a single content may include multiple information of different types such as, e.g., a text, an image file or a sound file, a terminal, a server or an app may regard the content as a single content or, alternatively, as multiple contents. Therefore, a terminal or an app may count the numbers of various contents or calculate the numerals of such numbers in ways which may be different from those explained above.

Instead of calculating and displaying a number of unread contents or a number of unread labeled (or unlabeled) contents, a terminal, an app or a server may count and display the number of the data packets which include unread contents or the number of unread labeled (or unlabeled) data packets which include unread labeled (or unlabeled) contents. When the content includes various information of different types such as a text, an image file or a sound file, a terminal, an app or a server may regard this data packet as a single data packet or as multiple data packets. Accordingly, a terminal or an app may count the numbers of various data packets or calculate the numerals of such numbers in ways which may be different from those explained above.

The nineteenth exemplary aspect of this disclosure relates to various methods of displaying such icon badges or various numbers.

In the first exemplary embodiment of this nineteenth exemplary aspect, a terminal or an app may display various icon badges or various numbers (or numerals) attached to such icon badges in various temporal modes (i.e., in the perspective of time). For example, a terminal or an app may display [1] a single badge and a single number (or numeral), [2] multiple badges, or [3] multiple numbers (or numerals), at the same time (or simultaneously). In other words, a terminal or an app may render operations of displaying multiple badges (or multiple numbers or numerals) may overlap each other in the clock cycles of a CPU of a terminal. Or a terminal or an app may render operations of displaying multiple badges (or multiple numbers or numerals) have at least one overlapping clock cycle. Alternatively, a terminal or an app may render operations of displaying multiple badges (or multiple numbers or numerals) may not overlap each other in the clock cycles of a CPU of a terminal. Or a terminal or an app may render operations of displaying multiple badges (or multiple numbers or numerals) have at least one temporal gap between their clock cycles. When the temporal gap us too short, a user may regard such operations to be run at the same time or may feel such operations to be sequential. Thus, unless otherwise specified, a terminal or an app may regard the operations of displaying multiple badges (numbers or numerals) as being at the same time (or simultaneously) when a user may regard it as being at the same time (e.g., a temporal gap may be less than ¹⁄₁₆ second), although such operations may be sequential in terms of the clock cycles. In addition and in terms of spatial modes, a terminal or an app may display such badges or numbers (or numerals) inside or around an app icon, or may display such badges or numbers (or numerals) to overlap (or not overlap) an edge of the app icon.

In the second exemplary embodiment of this nineteenth exemplary aspect, a terminal or app may display various icon badges or various numbers (or numerals) attached to such badges in various spatial modes (i.e., in the perspective of an area or a space). For example, a terminal or an app may display a single or multiple badges, numbers or numerals inside or around an app icon displayed on a display unit. A terminal or an app may display such badges or numbers to overlap an edge of an app icon. In this case and as explained above, an app or a terminal may [1] display the app icon and such badges (or numbers) simultaneously or sequentially, [2] display the badges and the numbers simultaneously or sequentially, [3] display multiple badges simultaneously or sequentially, or [4] display multiple numbers simultaneously or sequentially.

The twentieth exemplary aspect of this disclosure relates to various configurations of "app system" which can provide or use various label signals, labeled contents or labeled icon badges, and relates to various methods of using such an "app system." To this end, the "app system" of this disclosure is collectively defined as the above "app" as well as various hardware elements or software elements each of which may be managed or manipulated by an app provider for proper operation of the app. Therefore, various servers, related hardware elements or related software elements which the app provider may directly or indirectly manage or manipulate are deemed to belong to the "app system" within this disclosure.

When the "app system" may directly or indirectly manage or manipulate an app which is implemented (or downloaded) into a terminal of a user, such an app may be regarded to belong to the "app system." In addition, when the "app system" of the app provider may manage or manipulate at least a portion of a wired or wireless network which provides communication between the user and the "app system," the portion of the network may also be regarded to belong to the "app system."

The first exemplary embodiment of this twentieth exemplary aspect relates to a case in which a user may manage or manipulate an app which is implemented) or downloaded) into a terminal of the user by manipulating the terminal. Therefore, the user may use various label signals, labeled contents or labeled icon badges by various methods exemplified in various exemplary embodiments or examples of this disclosure. For example, the user may manipulate the app or the terminal by directly running various operations, where various app have been exemplified to run such operations in various embodiments or examples of this disclosure. Similarly, the user may also manipulate the app or the terminal by directly running various operations, where various servers have been exemplified to run such operations in various embodiments or examples of this disclosure. Therefore, the "app system" of this case may be regarded to serve the operation of the app implemented (or downloaded) to the terminal of the user.

For example, a part of the computer program exemplified in FIG. 12C may be implemented into a server, while the rest of the computer program may be implemented into a terminal of a user. When applying such configurations or methods to the first exemplary embodiment of this twentieth aspect, a user's terminal may include the entire computer program. Thus, whenever receiving a content or data packet which is directly transmitted by the sender or which is transmitted through a server, the computer program may count the number of the unread contents or the number of the unread labeled contents, and then display such numbers on the display unit.

In the third embodiment of the thirteenth exemplary aspect, a server may receive the list of labeled receivers from a content sender or from a receiver, or may proactively select a labeled receiver. When applying the above configurations or methods to the first embodiment of this first embodiment of the twentieth exemplary aspect, a user's terminal may receive the list of the labeled receivers from a sender, or may store and use the list of the labeled receivers. Alternatively, the terminal may proactively select the labeled receiver using its own app or O/S.

When a user as well as the "app system" can manage or manipulate the app implemented (or downloaded) on to the terminal of the user, the "app system" may use various label signals, labeled contents or labeled icon badges by manipulating the app in various methods as exemplified in the above exemplary aspects, embodiments or examples.

The second exemplary embodiment of this twentieth exemplary aspect relates to a case where an app provider may directly manage or manipulate an app using an "app system." It is appreciated that, even in this embodiment, a user may use the app by providing various user inputs to an app icon which serves as a user interface of the app implemented (or downloaded) which is into a terminal of the user. In addition, the user may change a setting of the app within the scope allowed by the "app system," however, the "app system" may not allow the user to manage or manipulate the app beyond that scope. Accordingly, the app provider may run various operations which have been exemplified to be run by the user, the user's terminal or the server in the above various embodiments or examples of this disclosure.

For example and as exemplified in FIGS. 3A to 3C, the terminal of the first embodiment of the first exemplary aspect of this disclosure have been exemplified to display the unread icon badge and the labeled icon badge on certain positions of the display unit. when applying such configurations or methods to the second embodiment of this twentieth exemplary aspect, the "app system" may deliver various commands to the user's terminal or to the app implemented to the terminal, where examples of such commands may include a command for displaying an app icon and a labeled icon badge, a detailed command for specifying a size or a location each of the app icon and the labeled icon badge.

In another example, a terminal of the first embodiment of the sixth exemplary aspect of this disclosure may receive a content directly from a sender or through a server, and may proactively select at least one labeled receiver by analyzing the content with information analysis algorithms. When applying such configurations or methods to the second embodiment of this twentieth exemplary aspect, the "app system" may proactively check whether the content may include a label request information before transmitting the content receiver from a sender to a receiver. When the server conforms the label request information from the content, the server may create a label signal which may label the content as the labeled content, and then may transmit the labeled content as well as the label signal to the terminal of the user. Alternatively, the server may incorporate the labeled content and the label signal to a labeled data packet, and may transmit the labeled data packet to the user's terminal.

In another example and as explained in the third embodiment of the seventh exemplary aspect of this disclosure, the terminal may display the unread contents which include both of the unlabeled contents as well as the labeled contents, while simplifying the unlabeled contents but highlighting the labeled contents (or displaying the labeled contents as is). In applying such configurations or methods to the second embodiment of the twentieth exemplary aspect, the terminal of the user transmits the user input to the server. Based thereon, the server may create a command for simplifying (or omitting) the unlabeled contents, and another command for highlighting the labeled contents (or as is), and may then transmit such commands back to the terminal of the user. Based on such commands, the terminal may display the labeled contents, while simplifying or omitting the unlabeled contents.

The third exemplary embodiment of this twentieth exemplary aspect relates to a case where an app provider installs its hardware elements or software elements in different locations. In this context, this third exemplary embodiment may be identical to the second exemplary embodiment, except that an "app system" may use various servers distributed in different locations.

Thus, when applying the first exemplary embodiment of the first exemplary aspect of this disclosure to the third exemplary embodiment of this twentieth exemplary aspect, the "app system" may drive a $1^{st}$ server in a $1^{st}$ location in order to deliver a command for displaying the labeled icon badge on the display unit to the user's terminal or the app implemented to the terminal. But the "app system" may drive a $2^{nd}$ server in a $2^{nd}$ location to drive to count the number of the labeled contents, and may deliver a command for displaying the number around or inside the labeled icon badge to the user's terminal or the app implemented to the terminal.

In another example, when applying the first exemplary embodiment of the sixth exemplary aspect of this disclosure to the third exemplary embodiment of this twentieth exemplary aspect, the "app system" may store various information analysis algorithms in a 3rd server in a 3rd location, and may execute such algorithms using a 4th server in a 4th location in order to proactively analyze the content. In addition, the "app system" may connect the 3rd server to the 4th server via a 5th server, and may transmit the analysis results to the terminal of the user.

In this third exemplary embodiment of the twentieth exemplary aspect, the app provider may manage or manipulate the "app system" in various methods. Therefore and for example, the app provider may designate a certain server to manage or manipulate other servers, hardware elements or software elements. Or the "app system" may designate two or more servers to manage or manipulate other servers, hardware elements or software elements. That is, when the "app system" includes multiple servers, it is generally a matter of selection of a manager of the "app system" in determining which server is to manage or manipulate the entire "app system."

7. Interchangeability

Various data processing terminals capable of incorporating the above label signals, labeled contents, labeled data packets or labeled icon badges, methods of constructing or using such terminals, and methods of using such terminals have been described above, particularly with reference to various exemplary aspects, their embodiments, examples, and objectives, along with details thereof. Such description is intended only for better understanding various configurational or operational features or characteristics of such terminals and methods. Accordingly, it will be apparent to those skilled in the relevant art that various modifications and variations of such terminals may be made from the above disclosure.

While exemplary aspects, embodiments, examples, and objectives of various data processing terminals capable of incorporating various label signals, labeled contents, labeled data packets or labeled icon badges have been disclosed hereinabove, it is appreciated that other modifications or variations are still possible. Therefore, such modifications or variations are not to be regarded as a departure from the spirit and scope of such exemplary aspects, embodiments, examples, and objectives of this disclosure, and all of such modifications or variations which would be obvious to one skilled in the art are regarded to be included within this disclosure as well as within the scope of the following claims.

Unless otherwise specified, such features of a certain aspect, embodiment, example or objective exemplified in this disclosure may apply interchangeably to corresponding features of other aspects, embodiments, examples or objectives throughout this disclosure. Of course, such interchangeability may be limited when such application, incorporation, replacement, or combination may contradict each other.

Various data processing terminals capable of using various label signals, labeled contents, labeled data packets or labeled icon badges, and various methods of using various hardware or software elements of such terminals and using the foregoing terminals may also run similar operations and perform similar functions when such terminals are incorporated different electrical or digital parts. As discussed above, however, such terminals may also include any program, software, source code, binary code or other instructions as long as such terminals may use the above label signals, labeled contents, labeled data packets or labeled icon badges.

It is to be understood that, while various aspects, embodiments, and examples of this disclosure have been described in conjunction with detailed description provided above, the above disclosure is intended to illustrate and not to limit the scope of the data processing terminals, which is defined by the scope of the appended claims. Other aspects, embodiments, examples, advantages, and modifications are within the scope of the following claims as well.

What is claimed is:

1. A method of displaying a plurality of icons of a plurality of apps on a display unit of a data processing terminal which is installed with said apps and which receives contents which are related with said apps, said method comprising the steps of:
a receiving step wherein said terminal receives a plurality of unread contents related to said apps after a user of said terminal has finished running said apps;
a label checking step wherein said terminal selects a first group of said apps each of which has received at least one of said unread contents and wherein said at least one of said unread contents is an unread labeled content which labels said user as its labeled receiver; and
a first group displaying step wherein said terminal displays icons of said apps of said first group closer to each other on said display unit than to icons of said apps of a second group, wherein each of said apps of said first group has received at least one of said unread labeled content, and wherein each of said apps of said second group has not received any unread labeled content,
whereby said terminal allows said user to easily identify said apps of said first group simply by looking at said display unit.

2. The method of claim 1 further comprising one of the steps of:
performing said first group displaying step when said terminal is in its lock state;
and performing said first group displaying step when said terminal is in its unlock state.

3. The method of claim 1 further comprising one of the steps of:
performing said first group displaying step while said terminal switches from its off state to its lock state;
performing said first group displaying step while said terminal switches from its off state to its unlock state; and
performing said first group displaying step while said terminal switches from its lock state to its unlock state.

4. The method of claim 1 further comprising the steps of:
a first number counting step wherein said terminal confirms a first number representing a total number of said unread labeled contents included in a first app of said first group of said apps; and
a first number displaying step wherein said terminal displays said first number on one of an upper portion of an icon of said first app, a lower portion thereof, a side thereof, an outside thereof, an inside thereof, and an edge thereof.

5. The method of claim 4 further comprising the steps of:
an unread number counting step wherein said terminal confirms a second number representing a total number of said unread contents included in said first app of said first group of said apps; and
a second number displaying step wherein said terminal displays both of said first number and said second number on said display unit.

6. The method of claim 4 further comprising the steps of:
a net unread number counting step wherein said terminal confirms a third number representing a difference between a second number representing a total number of said unread contents included in said first app of said first group of said apps and said first number; and
a third number displaying step wherein said terminal displays both of said first number and said third number on said display unit.

7. The method of claim 1 further comprising the step of:
a group window displaying step wherein a first app of said apps of said first group sets up a plurality of said group windows, wherein said terminal displays said plurality of group windows on said display unit when said user provides a first user input to an icon of said first app,
wherein said terminal displays a first set of said group windows closer to each other on said display unit than to a second set of said group windows,
wherein each of said group windows of said first group includes at least one unread labeled content therein, and
wherein each of said group windows of said second group does not include any unread labeled content therein.

8. The method of claim 1 further comprising the steps of:
a label classifying step wherein said terminal classifies each of said unread contents into either of said unread labeled content and an unread unlabeled content and wherein said unread unlabeled content is a content which has not been read by said user and which does not label said user as said labeled receiver;
a labeled group window displaying step wherein said terminal displays a plurality of group windows of a first app of said first group on said display unit when said user provides a first user input to an icon of said first app, and wherein said terminal also displays that a first group window of said group windows includes said unread labeled content; and
an emphasizing step wherein said terminal displays both of said unread labeled content and said unread unlabeled content, while emphasizing said unread labeled content compared with said unread unlabeled content, when said user provides a second user input to said first group window.

9. The method of claim 8, wherein said emphasizing includes at least one of:
simplifying said unread unlabeled content;
minimizing said unread unlabeled content;
dimly displaying said unread unlabeled content;
displaying said unread unlabeled content in a simplifying font;
displaying said unread unlabeled content in a simplifying color;
displaying said unread unlabeled content in a simplifying mode; and
displaying said unread unlabeled content in a smaller size.

10. The method of claim 8 further comprising the step of:
a deemphasizing step wherein said terminal stops and removes said emphasizing of said unread labeled content compared with said unread unlabeled content, when said user provides a third user input.

11. The method of claim 8 further comprising the step of:
a selectively displaying step wherein said terminal displays said unread labeled content on said display unit but wherein said terminal does not display said unread unlabeled content on said display unit.

12. The method of claim 11 further comprising the step of:
a non-selectively displaying step wherein said terminal displays said unread unlabeled content on said display unit when said user provides a fourth user input.

13. A data processing terminal for sending and receiving contents comprising:
a transmitting unit for transmitting a transmitting content created by a user of said terminal;
a receiving unit for receiving a receiving content created by a sender who is not said user;
a display unit for displaying at least one of said transmitting and receiving contents thereon; and
a plurality of apps which are installed in said terminal,
wherein, when said terminal has received said receiving content after said user finished running said apps and when said user has not confirmed said receiving content, said terminal classifies said receiving content as an unread content,
wherein, when said user is designated as a labeled receiver of said unread content, said terminal classifies said unread content as an unread labeled content,
wherein, when said user is not designated as said labeled receiver of said unread content, said terminal classifies said unread content as an unread unlabeled content, and
wherein said terminal displays icons of a first group of apps each of which has received at least one unread labeled content closer to each other than to icons of a second group of said apps each of which has not received any unread labeled content on said display unit,
whereby said terminal allows said user to easily identify said first group of said apps.

14. The terminal of claim 13, wherein said terminal displays said icons of said first group of said apps in one of its lock state and its unlock state.

15. The terminal of claim 13, wherein said terminal displays said icons of said first group of said apps in one of a first timing of said terminal switching from its off state to its lock state, a second timing of said terminal switching from its off state to its unlock state, and a third timing of said terminal switching from its lock state to its unlock state.

16. The data processing terminal of claim 13,
wherein one of said sender, a sending data processing terminal of said sender, said data processing terminal of said user, and said app designates said user as said labeled receiver.

17. The data processing terminal of claim 13 further comprising an information analysis algorithm,
wherein said algorithm analyzes said unread content and determines whether said user is said labeled receiver of said unread content.

18. The data processing terminal of claim 13, wherein said terminal counts a first number representing a total number of said unread labeled contents received by a first app and wherein said terminal displays said first number on one of an inside of an icon of said first app, an outside thereof, and an edge thereof.

19. The data processing terminal of claim 18, wherein said terminal counts a second number which represents a total number of said unread contents received by said first app and wherein said terminal displays said second number along with said first number.

20. The data processing terminal of claim 13, wherein said terminal defines a first portion and a second portion on said display unit, wherein said first and second portions are different from each other, wherein, when said user provides a first user input to a first icon of a first app, said terminal displays a plurality of group windows set up by said first app on said display unit, wherein said terminal displays in said first portion of said display unit at least one of said group windows each of which includes at least one unread labeled content, and wherein said terminal displays in said second portion of said display unit at least another of said group windows which does not include said unread labeled content.

21. The data processing terminal of claim 20, wherein said first portion is one of an upper portion of said display unit, a center portion thereof, a lower portion thereof, a left portion thereof, and a right portion thereof.

* * * * *

UNITED STATES PATENT AND TRADEMARK OFFICE
CERTIFICATE OF CORRECTION

PATENT NO. : 11,677,707 B2
APPLICATION NO. : 17/382170
DATED : June 13, 2023
INVENTOR(S) : Jae kyu Lee, Youngtack Shim and Jae lark Jung Page 1 of 1

It is certified that error appears in the above-identified patent and that said Letters Patent is hereby corrected as shown below:

On the Title Page

Item (30) The Foreign Application Priority Data reads:
Nov. 26, 2018 (KR) 10-2018-0147249

Should correctly read as:
Sep. 29, 2018 (KR) 10-2018-0116652
Nov. 26, 2018 (KR) 10-2018-0147249

In the Specification

Column 1, at Line 12, the Korean Patent Application No. should be corrected from:
'10-2018-011662'

To:
10-2018-0116652

Signed and Sealed this
Thirtieth Day of July, 2024

Katherine Kelly Vidal
*Director of the United States Patent and Trademark Office*